(12) United States Patent
Nagasawa et al.

(10) Patent No.: US 7,171,974 B2
(45) Date of Patent: Feb. 6, 2007

(54) PRODUCTION METHOD OF SILVER HALIDE PHOTOGRAPHIC EMULSION AND PRODUCTION APPARATUS THEREOF

(75) Inventors: Hideharu Nagasawa, Kanagawa (JP); Yasunori Ichikawa, Kanagawa (JP); Fumiko Shiraishi, Kanagawa (JP); Hiroshi Maeda, Kanagawa (JP); Mamoru Fujisawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 251 days.

(21) Appl. No.: 10/995,121

(22) Filed: Nov. 24, 2004

(65) Prior Publication Data

US 2005/0152690 A1    Jul. 14, 2005

Related U.S. Application Data

(62) Division of application No. 10/345,406, filed on Jan. 16, 2003, now Pat. No. 6,838,232.

(30) Foreign Application Priority Data

Jan. 18, 2002   (JP) ............................... 2002-10553

(51) Int. Cl.
  *E03B 1/00*   (2006.01)
  *F17D 1/00*   (2006.01)
  *B01J 10/00*  (2006.01)
  *G03B 13/00*  (2006.01)
  *G03C 1/005*  (2006.01)

(52) U.S. Cl. .................... 137/3; 422/129; 422/224; 422/225; 396/567; 396/568; 396/626; 396/628; 430/569

(58) Field of Classification Search .................... 137/3; 422/129, 224, 225; 396/567, 568, 626, 628; 430/569
See application file for complete search history.

(56) References Cited

U.S. PATENT DOCUMENTS

| 5,985,535 A  | 11/1999 | Urabe       |
| 6,048,906 A  | 4/2000  | Ernst et al. |
| 6,605,422 B2 | 8/2003  | Urabe       |
| 6,682,882 B2 | 1/2004  | Ikari et al. |

FOREIGN PATENT DOCUMENTS

| EP | 0 744 653 A1 | 11/1996 |
| JP | 10-239787 A  | 9/1998  |

*Primary Examiner*—Geraldina Visconti
(74) *Attorney, Agent, or Firm*—Sughrue Mion, PLLC

(57) ABSTRACT

At least one of a nucleus forming process, a nucleus growing process, a chemical sensitizing process, and a spectral sensitizing process for producing a silver halide photographic emulsion is performed by using a microreactor. A minute region of the microreactor is used to precisely perform a reaction of nucleus formation. A condition under which host grains are allowed to react with newly supplied silver halide nuclei is made uniform to cause uniform crystal growth. A predetermined quantity of molecules for chemical sensitization is doped in a crystal lattice of a nucleus of silver halide to effect a sensitizing process. Alternatively, a spectral sensitizing process in which a single molecular layer of a spectral sensitizer is uniformly adsorbed on a silver halide nucleus grain surface is securely carried out.

8 Claims, 35 Drawing Sheets

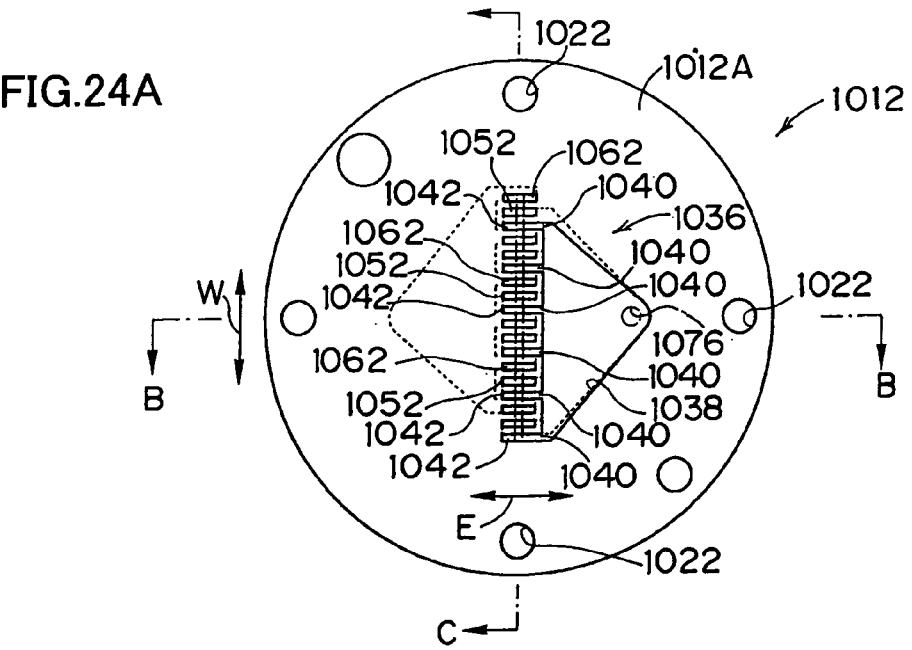
FIG.24A
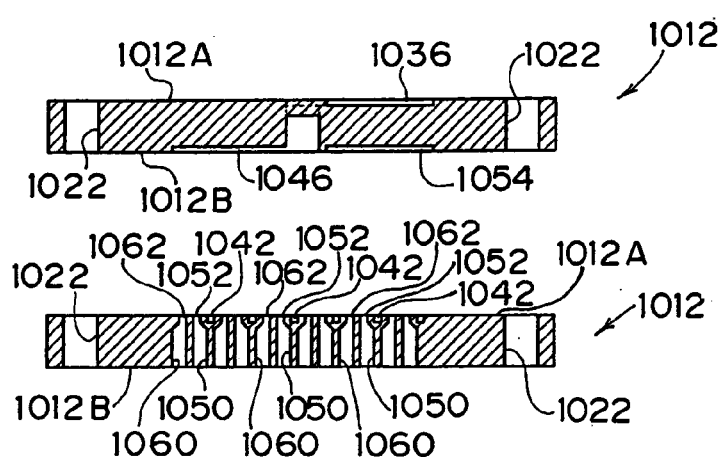
FIG.24B
FIG.24C
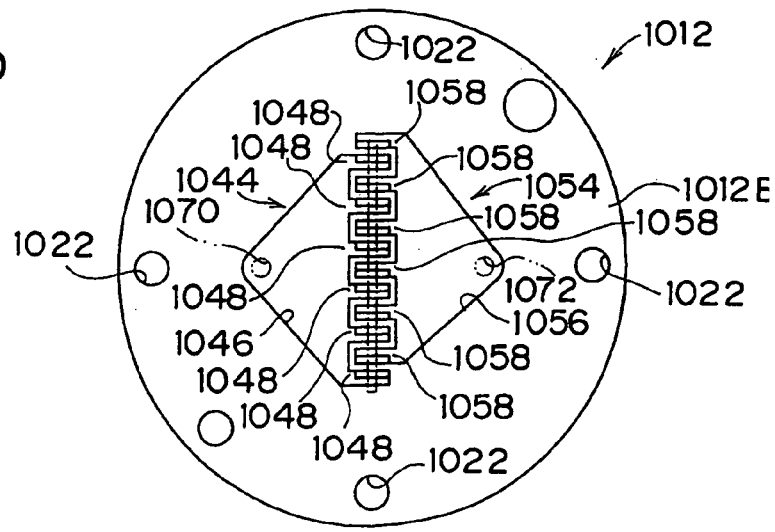
FIG.24D

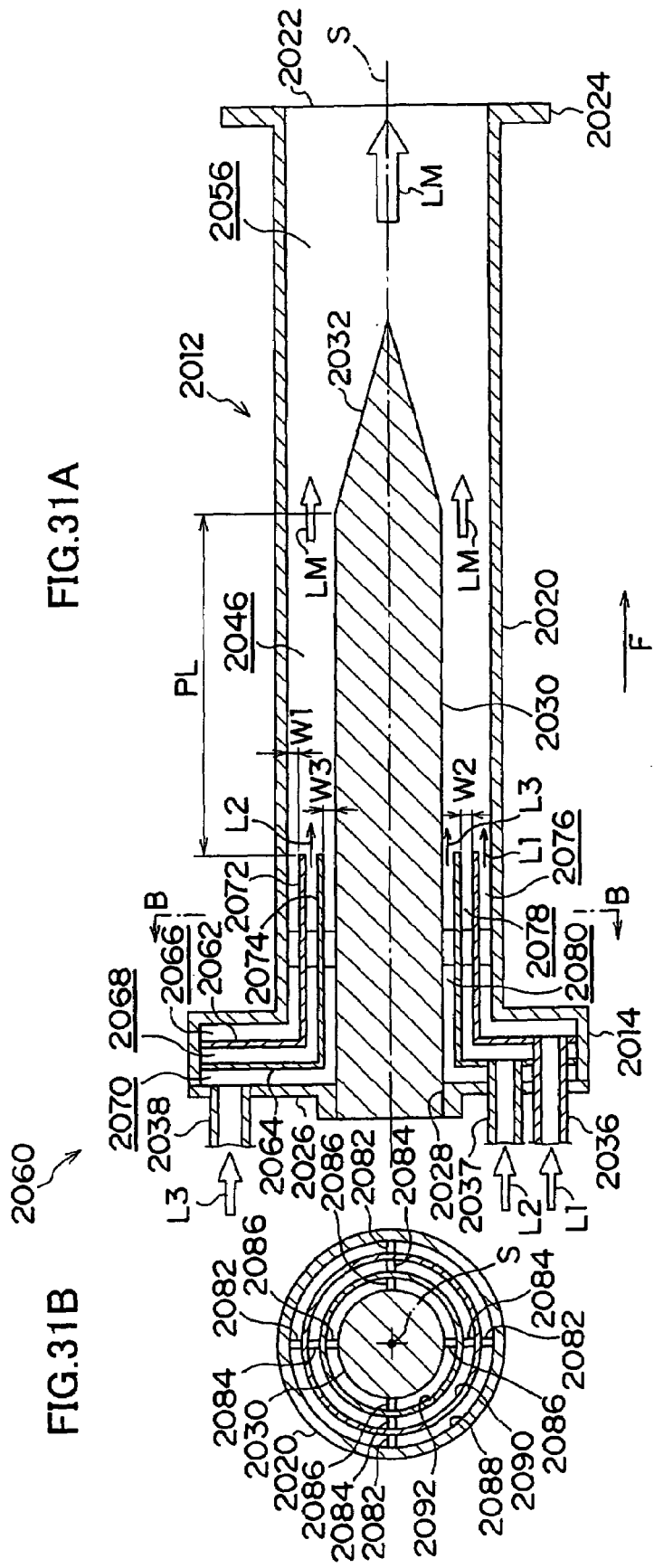

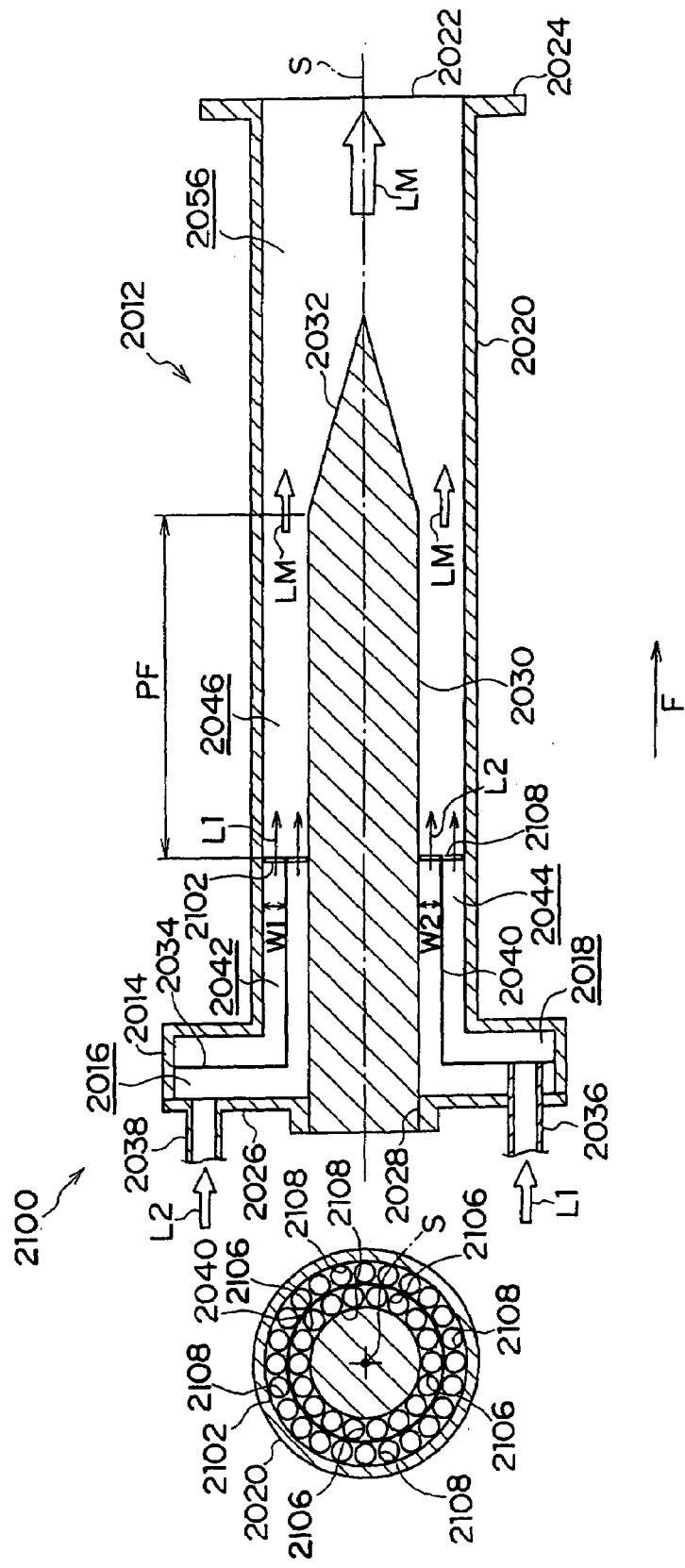

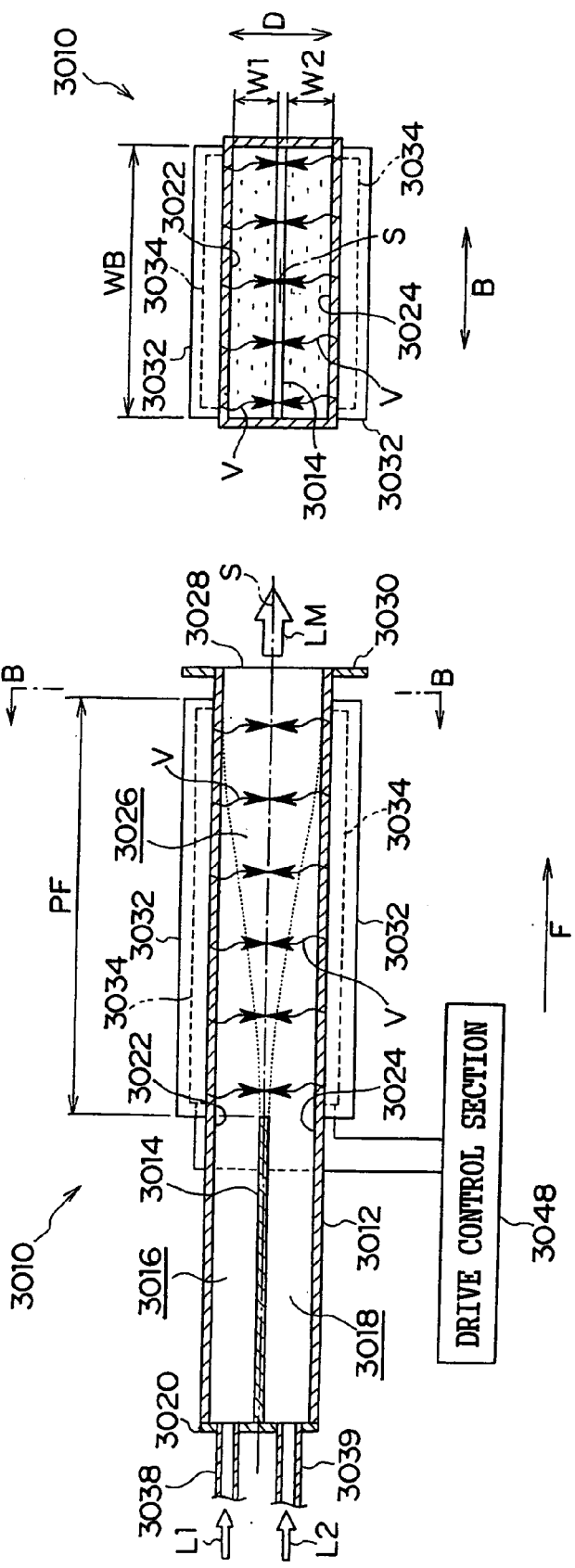

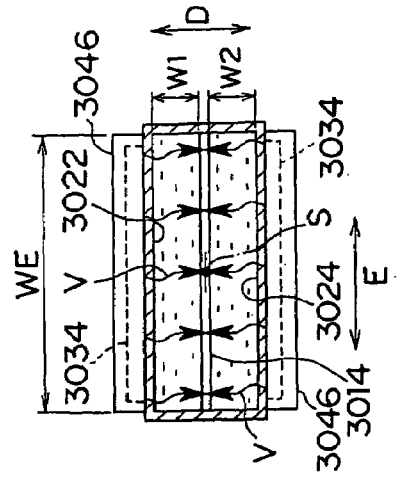
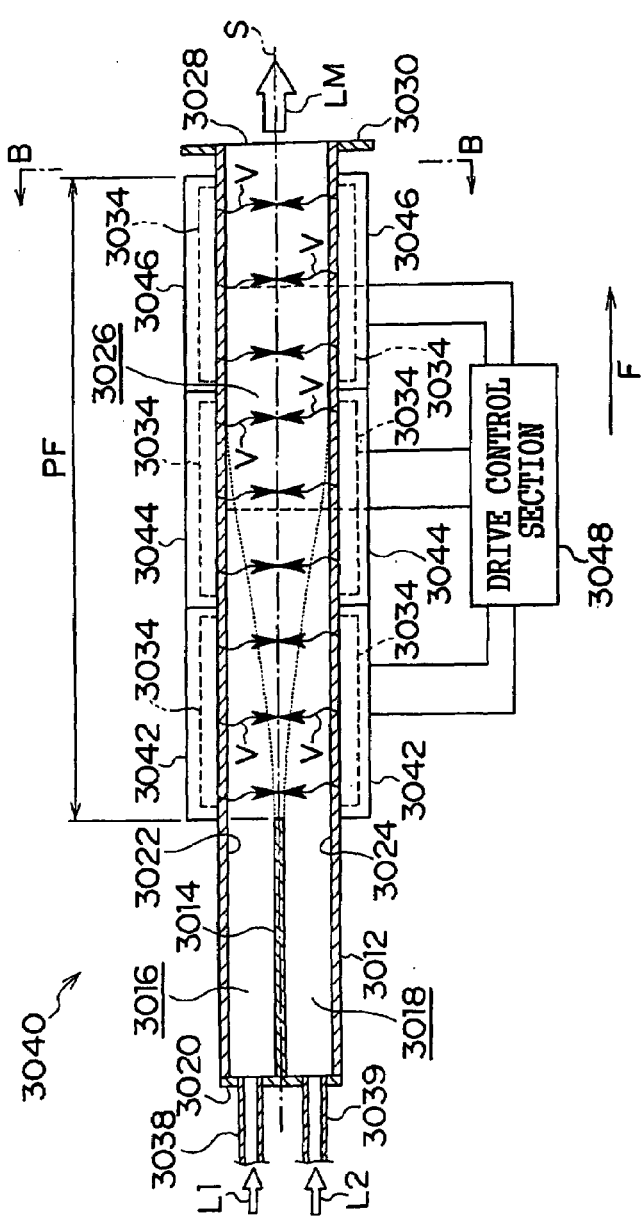
FIG.35B
FIG.35A

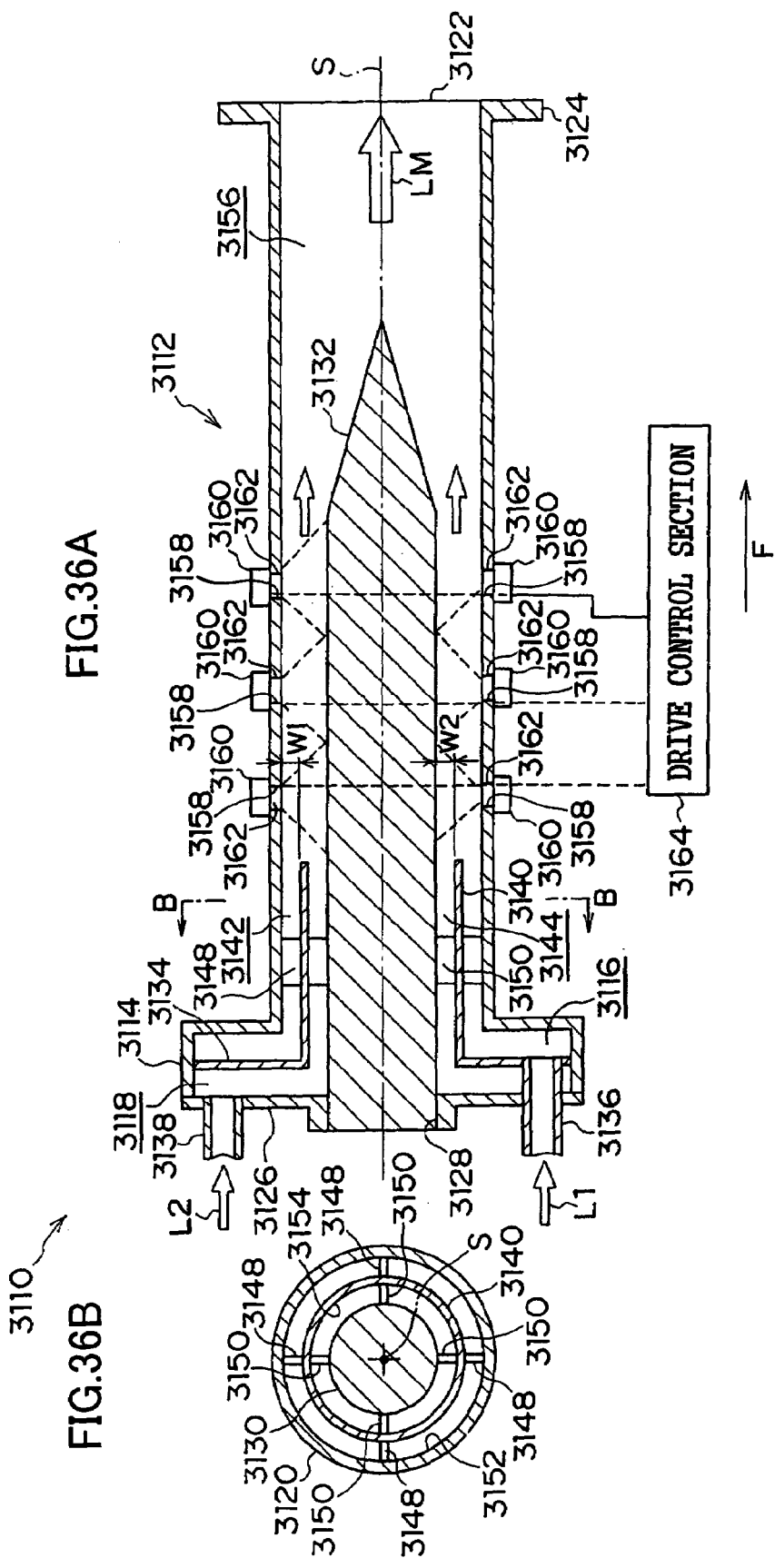

PRODUCTION METHOD OF SILVER HALIDE PHOTOGRAPHIC EMULSION AND PRODUCTION APPARATUS THEREOF

CROSS REFERENCE TO RELATED APPLICATIONS

This is a divisional of application Ser. No. 10/345,406 filed Jan. 16, 2003 now U.S. Pat. No. 6,838,232, the disclosure of which is incorporated herein by reference.

BACKGROUND OF THE INVENTION

1. Field of the Invention

The present invention relates to a production method of silver halide photographic emulsion in which reaction, mixing or the like in a production process of silver halide photographic emulsion is carried out by a chemical unit operation, and a production apparatus thereof.

2. Description of the Related Art

In general, a silver halide photographic emulsion used for a photosensitive material is produced through a pre-ripening process in which a nucleus forming process (formation of a microcrystal dispersion of silver halide in protective colloid), a physical ripening process (crystal growth for obtaining a desired grain shape and size), and a crystal growth process are performed to form silver halide photographic emulsion grains having an objective size, shape and structure, a desalting process (removal of soluble salts from the dispersion), a sensitizing process (heat treatment performed in the presence of a sensitizing agent, for increasing sensitivity to light) for increasing the sensitivity of the emulsion after desalting, and a after-ripening process for adding various agents (sensitizing dye, stabilizing agent, and etc.) for giving various properties to the emulsion required as the need arises.

Incidentally, in the foregoing production process of the silver halide photographic emulsion, two or more processes among these processes, may be combined and carried out in one operation. Further, in the foregoing production process, one or more production stages may be omitted from the production process. Furthermore, there is also a case where plural operations are repeated in each stage in order to obtain a desired emulsion.

In addition, in a production system for industrially mass-producing silver halide emulsion, a so-called batch type production system using a large capacity reaction container is usually used.

As a conventional batch-type production system for producing silver halide emulsion, there is proposed one using a tank 10 as a reaction container as exemplified in FIG. 37 (for example, see JP-A No. 5-173267).

This tank 10 is constituted as a batch type reaction container apparatus having an agitator capable of producing of silver halide photographic emulsion at a time in a predetermined large amount, for example, 1000 l (1 t).

In this tank 10, in order to agitate a solution with which the tank is filled, a magnetic agitation means 16 is provided such that an agitation vane 12 is rotatively driven through a transmission means 14 for transmitting a rotation driving force of a motor 15 in a non-contact manner by using a magnetic force.

In addition, in order to perform a temperature control of the solution with which the tank is filled, a temperature control means 18 for heating or cooling the reaction solution is disposed at the outer peripheral part of the tank 10. The temperature control means 18 is constituted by use of means for heating or cooling by allowing a heat exchange medium (water, water vapor, liquid organic material, flame gas, etc.) to flow to a temperature control part, or a means for performing a temperature control by installing an element for electrically heating or cooling at the temperature control part.

The tank 10 is constituted to be capable of being hermetically closed by mounting a sealing lid 20 to the tank 10. Further, an emulsion introduction pipe 22 with an opening and closing cock is disposed in the sealing lid 20 of the tank 10. Furthermore, a liquid transfer pipe 24 with an opening and closing cock is disposed at the bottom of the tank 10.

In the butch type production system using this tank 10, at the nucleus forming process in the pre-ripening process at the time of producing a silver halide emulsion, a predetermined quantity of an aqueous dispersion medium solution containing at least a dispersion medium and water is injected through the emulsion introduction pipe 22 into the tank 10, and further, a silver salt solution or a silver salt solution and a halide solution are added under the conditions of pBr 2.5 or less and are agitated by the magnetic agitation means 16 for a predetermined time (several minutes), and temperature is controlled by means of a temperature control means 18 so as to keep the reaction solution in the tank 10 within a predetermined temperature range (for example, 5° C. to 45° C.), so that nuclei of minute tabular grains including, for example, a parallel twinning plane are formed.

In this nucleus forming process, since solute ions are randomly walking in the solution when the nuclei are formed, minute tabular grain nuclei and a large number of other minute grains (especially, non-twin, single twin, or non-parallel double twin grains) are simultaneously formed in the tank 10.

Next, in the butch-type production system using this tank 10, at the ripening process in the pre-ripening process at the time when the silver halide photographic emulsion is produced, grains other than the tabular grain nucleus are made to disappeared by the Ostwald ripening process, and the tabular grain nucleus is made to grow.

In this ripening process, three ripening methods that have conventionally been used described below can be used. The first type of the ripening method is a method in which after nucleus formation, a pBr value of the reaction solution in the tank 10 is adjusted to 2.5 to 1.0, preferably 2.3 to 1.4, a solvent for AgX is added through the emulsion introduction pipe 22 ($AgNO_3$ may be added during the ripening), agitation is performed by the magnetic agitation means 16, and the temperature of the reaction solution in the tank 10 is raised by the temperature control means 18 by preferably 10° C. or higher, more preferably 20° C. or higher with respect to the nucleus formation temperature, sob that ripening is performed for predetermined several minutes or more.

The second type of the ripening method is a method in which after nucleus formation, a pBr value of the solution is adjusted to 2.5 or less, preferably 1.0 to 2.0, a first ripening is performed for predetermined several minutes or more in a state where there is no solvent for AgX, and next, $AgNO_3$ is added through the emulsion introduction pipe 22 to increase the pBr value by 0.1 or more, preferably 0.3 or more, the solvent for AgX is added through the emulsion introduction pipe 22, agitation is performed by the magnetic agitation means 16, and the temperature of the reaction solution in the tank 10 is raised by the temperature control means 18 by preferably 10° C. or higher, more preferably 20° C. or higher with respect to the nucleus formation temperature, so that second type of ripening is performed for predetermined several minutes or more.

The third type of ripening method is a method in which after nucleus formation, a pBr value of the solution is adjusted to 2.5 or less, preferably 1.0 to 2.0, agitation is performed by the magnetic agitation means 16 in a state where there is no solvent for AgX, the temperature of the reaction solution in the tank 10 is raised by the temperature control means 18 by preferably 10° C. or higher, more preferably 20° C. or higher with respect to the nucleus formation temperature, so that the third type of ripening is performed for predetermined several minutes or more. Incidentally, there is also a method in which $AgNO_3$ is added during the ripening.

Further, in the foregoing first to third type of ripening methods, there is also a method using a pressure ripening method in which the tank 10 is made a hermetically sealed system only at the time of ripening, and ripening is performed in a state where the pressure in the tank 10 at the time of nucleus ripening is more than several times as high as the atmospheric pressure. Further, there is also a method in which the ripening is performed by the foregoing first to third ripening methods in the presence of an anti-fogging agent.

Next, in the batch type production system using this tank 10, after the ripening process in the pre-ripening process at the time of production of the silver halide emulsion has been ended, tabular grain nuclei are made to grow in the crystal growth process.

In the crystal growth process, it is possible to use a method of adding a silver salt solution and a halide solution as a solute for growing a crystal of tabular grain nuclei, a flow acceleration addition method, a concentration acceleration addition method, and a combined addition method of two or more of these methods.

In the batch type production system using this tank 10, also at the crystal growth stage in the pre-ripening process at the time of production of the silver halide emulsion, a predetermined quantity of silver salt solution and halide solution as solutes for growing the crystals of the tabular grain nuclei is injected from the emulsion introduction pipe 22 into the reaction solution stored in the tank 10, agitation is performed by the magnetic agitation means 16 for a predetermined time (several minutes), a temperature control is performed by the temperature control means 18 to bring the reaction solution in the tank 10 to a predetermined temperature, and a chemical reaction for suitably allowing to grow crystals is accelerated (see, for example, Japanese Patent Application Nos. 2-142635 and 2-43791).

In the batch type production system using this tank 10, after the crystal growth process in the pre-ripening process at the time of production of the silver halide emulsion has been ended, the desalting process is carried out.

The desalting process is a process of removing unnecessary materials (for example, K, Na) formed during the emulsion grain formation of the pre-ripening process, excessively existing ions (for example, Ag, Br, Cl) and the like.

In the desalting process, various desalting methods, such as a flocculation method or a noodle washing method in which water washing is performed to effect desalting, or an ultrafiltration or an electrodialysis method in which desalting is carried out by separation (film), can be used.

In the desalting process, for example, in the case where the flocculation method is used, the reaction solution which has been subjected to the pre-ripening process in the tank 10 as shown in FIG. 37 is taken out from the liquid transfer pipe 24, and is transferred to a desalting tank (not-show), and a flocculant is added to the reaction solution in the desalting tank, and a pH value of the solution is adjusted, so that emulsion grains together with gelatin, are flocculating-sedimented (natural sedimentation), a supernatant liquid containing unnecessary materials is removed, and next, after washing water is newly added into the desalting tank, the flocculation of gelatin is deflocculated by adjusting pH value of the solution. These processes are repeated two or three times.

Further, in this batch type production system, after the desalting process at the time of production of the silver halide emulsion has been ended, an after-ripening process is carried out. This after-ripening process is a process in which the emulsion having a low sensitivity in the reaction solution after desalting process is sensitized to impart sensitivity suitable for practical use.

In the sensitizing method at the after-ripening process in the batch type production system, there are a chemical sensitizing method and a spectral sensitizing method. The chemical sensitizing method is a method for increasing the intrinsic sensitivity of the emulsion. A typical chemical sensitizing method includes three kinds of methods, that is, a sulfur sensitizing method, a gold sensitizing method and a reduction sensitizing method.

In the case where this chemical sensitizing method is performed, the reaction solution which has been subjected to the desalting process is transferred to a tank as a reaction container (not-shown) constituted similarly to the foregoing tank 10, a chemical sensitizing agent is metered and a predetermined quantity of the agent is added through an agent introduction pipe to the reaction solution stored in the tank. An agitation vane stirs the solution, and the temperature of the solution is controlled by a temperature control means so that the chemical sensitizing agent is uniformly distributed to emulsion grains to complete a desired chemical reaction equally.

In addition, the spectral sensitizing method as the sensitizing method in the after-ripening process is a method in which in the case where the emulsions are used in a color photosensitive material or the like, sensitizing wavelength ranges are respectively widened into the wavelength ranges of the three primary colors of light, that is, blue (400 to 500 nm), green (500 to 600 nm), and red (600 to 700 nm) from the intrinsic sensitivities of the emulsions in the reaction solutions.

The spectral sensitizing method is generally performed by adsorbing a sensitizing dye onto an emulsion. As the sensitizing dye used here, there is an orthochromatic sensitizing dye (for green) or a panchromatic dye (for red). The sensitizing dyes are dissolved in methanol to form a solution, or are made a dye solid dispersed solution in gelatin, and are added to the emulsion as the reaction solution.

Incidentally, the dye solid dispersed solution in gelatin is prepared at a preparation process, and is temporarily refrigerated, and at the time of use, it is melted to add to the emulsion.

When the spectral sensitizing method is used, the reaction solution which has been subjected to the desalting process is transferred to a tank as a reaction container (not-shown) constituted similarly to the foregoing tank 10, a solution in which a sensitizing dye is dissolved in methanol or a solution in which a sensitizing dye is made to a solid dispersed solution in gelatin (this solid dispersed solution in gelatin is prepared at a preparation process, is temporarily refrigerated, is melted at the time of use to be added to the emulsion) is metered and a predetermined quantity of solution is added through an agent introduction pipe to the reaction solution stored in the tank. The solution is stirred well by an agitation vane, the temperature of the solution is controlled by a temperature control means so that the chemical sensitizing agent is uniformly distributed to the emulsion grains and is uniformly adsorbed by the grains.

In this batch type production system, after the after-ripening process in the production processes of the silver halide emulsion has been completed, a storage process is performed. The storage process is a process of temporarily storing the emulsion prepared in the batch operation for the purpose of supplying the emulsion to an emulsion coating process in continuous operation.

Further, in addition to the function of temporal storage, this storage process also provides a function to stop the progress of ripening by cooling the emulsion to eliminate differences in characteristics among emulsion preparation batches by batch-blending a plurality of the same kind emulsions, as well as a function for quality assurance by measuring physical properties of the prepared emulsions to assure the characteristics of the emulsions.

Thus, in the batch type production system, the equipment for the storage process is constituted by a cooling apparatus, a blend tank, a storage apparatus and the like. The cooling apparatus for stopping the progress of ripening may be constituted by a heat exchange system using a plate type heat exchanger or the like, or by a vacuum cooling system for effecting cooling by utilizing latent heat of vaporization.

In this batch type production system, in order to perform the production process of the silver halide emulsion in one or plural stages, the tank 10 as the batch type reaction container device equipped with the agitator is used, and a plurality of chemicals in large amounts introduced into the tank 10 for producing an emulsion are forcibly mixed by a magnetic agitation means 16.

The tank 10 as the batch type reaction container device equipped with the agitator is suitable for production of a large quantity of emulsion. However, when another new liquid chemical is injected through the emulsion introduction pipe 22 to the chemicals for producing the emulsion stored in the tank 10, and a plurality of chemicals in a large amount introduced into the tank 10 are agitated by the agitation vane 12 and are mixed, the liquid chemicals newly injected through the emulsion introduction pipe 22 are stagnant in the vicinity of the injection port of the emulsion introduction pipe 22 or circulates in the tank 10.

Accordingly, in the initial state where a plurality of liquid chemicals in a large quantity for producing the emulsion are agitated by the agitation vane 12 to start mixing thereof, it is inevitable such a state that the liquid chemical newly injected through the injection port of the emulsion introduction pipe 22 is locally mixed at a high concentration into a part of the liquid chemicals for producing the emulsion stored in the tank 10 existing at a place where the chemicals are circulated in the tank 10, and a mixing concentration of the liquid chemicals becomes low at a portion which is remote from the injection port of the emulsion introduction pipe 22 and which the newly injected liquid chemical does not reach through the circulation by the agitation vane 12.

Accordingly, when a plurality of liquid chemicals in a large amount for producing an emulsion are stirred by the agitation vane 12, a difference in history of a chemical change arises between one where mixing of the newly injected liquid chemical is started at a high concentration thereof and one where mixing of the newly injected liquid agent is started at a low concentration thereof, so that the compounds formed become non-uniform in the entire tank 10.

Further, a non-uniform chemical reaction may occur due to a dead space existing in a small part in the tank 10, or due to variation in the liquid flow when the liquid chemicals for producing the emulsion is stirred by the agitation vane 12.

In addition, when the liquid chemicals in a large quantity for producing an emulsion in the tank 10 are heated by the temperature control means 18, since the temperature control means 18 heats the chemicals through the wall of the tank 10, there is a case where when a heating process is started, the liquid chemicals for producing the emulsion in the tank 10 are rapidly heated only at the place close to the wall of the tank 10, and the temperature is not raised at the center in the tank 10, so that the temperature distribution of the liquid chemicals for producing the emulsion in the tank 10 becomes uneven, a history difference in the chemical change, and compounds formed becomes non-uniform in the entire tank 10.

Furthermore, in the method of forming silver halide grains constituting the silver halide emulsion, which is industrially carried out today, there is a process in which a silver nitrate solution and a halide solution are added to a dispersion medium solution (protective colloid solution) typified by gelatin under vigorous agitation, and are mixed as quickly as possible to form silver halide grains.

In this silver halide grain forming process, since an ionic reaction in which a silver ion and a halogen ion react with each other to form silver halide is very rapid, it is essential to quickly agitate and mix these two ionic solutions in a short time in order to perform a uniform reaction.

Here, for example, in the case where nucleus formation is performed by a method in which a silver salt solution and a halide solution are added to a dispersion medium in the tank 10 from the emulsion introduction pipe 22 and are agitated by the agitation vane 12, a vortex is generated by the agitation vane 12 rotating at a high speed in the liquid chemicals for producing the emulsion in which the silver salt solution and the halide solution are added in the dispersion medium in the tank 10, and mixing by turbulent flow is carried out in the process in which the vortex is subdivided.

Even in this case, once the nuclei thus formed circulate in the tank 10 to cause a so-called local recycling, and at the same time as the formation of the nuclei, crystal growth from the nuclei occurs in parallel, so that it is difficult to form monodispersed nuclei.

Further, in the field of silver halide photography, a tabular silver halide grain having a large light receiving area is widely used as a photosensitive element. In order to increase a light receiving efficiency, a thin tabular silver halide grain is preferable.

However, in the batch type production system using the tank 10 and the agitation vane 12 mentioned above, when the agitation is performed by the agitation vane 12 to produce the silver halide emulsion, the tabular silver halide grains during the process of crystal growth pass through a high supersaturation region in the vicinity of the injection port of the emulsion introduction pipe 22 for adding silver ion or halide ion, and an adverse effect such that the thickness of the tabular grains increases is apt to occur.

Furthermore, in the batch type production system using the tank 10 and the agitation vane 12, on the assumption that the quantity of silver halide emulsion produced at one time in the tank 10 is a predetermined constant quantity, the shape of the agitation vane 12 is determined to obtain an appropriate agitating state in the tank 10. Accordingly, when a production scale is changed to produce a desired quantity of emulsion, there is a fear that the characteristics of the emulsion are changed, and the preparation scale cannot be changed. Therefore, a predetermined quantity of silver halide emulsion larger than a desired quantity of emulsion must be produced, and as a result, there is a drawback that the silver halide emulsion produced in an excess amount is wastefully discarded.

On the other hand, with respect to a newly prescribed silver halide emulsion developed by using an experimental apparatus, in the case where a small production system using the experimental apparatus is scaled up to a mass production system using a mass production apparatus, it is necessary to repeat trial production and product test many times in order to verify conditions under which the same characteristics as the emulsion characteristics obtained by the experimental apparatus for small production can be achieved in the newly prescribed silver halide emulsion produced by the production apparatus for mass production. Accordingly, there are problems that it takes a long time to develop the production system for mass production, and the loss of raw material consumed for the product test is large.

Furthermore, it has been proposed that a microreactor is used for a part of a production process of silver halide photographic emulsion used for photosensitive material (see, for example, Japanese Patent Application No. 2001-76564).

The microreactor used in this method is one of micro devices, in which a plurality of solutions introduce into each mixing space through microchannels having an equivalent diameter of several μm to several hundred μm having a cross-section when converted into a circle, to cause a chemical reaction.

In such a microreactor, two kinds of solutions are made to flow through fine liquid supply passages called microchannels and are supplied as very thin lamella-like laminar flows into the mixing space, so that the two kinds of solutions are mixed and are allowed to react with each other in the mixing space (see, for example, JP-W No. 9-512742, WIPO International Publication WO 00/62913).

In a fluid circuit used in such a microreactor, there is a case where it is required that three or more kinds of fluids are allowed to rapidly react with one another by the microreactor. However, the conventional microreactor is constituted such that two kinds of fluids are allowed to react with each other. Thus, in the case where three or more kinds of fluids are made to react with each other by the conventional microreactor, it is necessary that a fluid circuit is constituted such that two or more microreactors are connected in series by piping or the like, and three or more kinds of fluids are made to react with each other stepwisely by using this fluid circuit.

In such a fluid circuit, there is a limit in shortening a distance between a microreactor disposed at the upstream side and a microreactor disposed at the downstream side, a certain period of time is necessary to mix another fluid with two kinds of fluids in a reaction container to make to react with the fluids each other. Therefore, it is impossible to make to react with three kinds of fluids one another at the same time. Moreover, in the fluid circuit, as the kinds of fluids to be supplied are increased, the number of elements (microreactors) constituting the circuit is increased, so that the circuit structure becomes complicated. Incidentally, this applies in the case where three or more kinds of fluids are mixed at the same time.

In addition, in the conventional microreactor, plural liquid supply passages respectively have liquid supply ports facing a mixing space so as to open respective liquid supply openings, and solutions are introduced into the mixing space through these plural liquid supply ports. However, there exists a portion where the cross-section of the mixing space is abruptly enlarged with respect to the sum of the opening areas of these liquid supply ports, and there exists a portion in the mixing space where the direction of flow of solutions to be mixed is abruptly changed. The solutions are apt to stagnate in the vicinity of the portion where the cross-section is abruptly enlarged in this mixing space or in the vicinity of the portion where the direction of the flow of the solutions to be mixed is abruptly changed, and especially in the case where a reaction between solutions is a precipitation generation reaction accompanied by coalescence or growth, aggregation or deposition occurs in the stagnant part, and there is a fear that there occurs clogging due to this, or reduction of uniformity of a reaction product due to the mixture of aggregates or deposits.

Further, in the conventional microreactor, according to the kinds of solutions supplied to plural liquid supply passages, a time when these solutions are mixed or a time when the mixing of the solutions accompanying a chemical reaction is performed, (hereinafter referred to as "mixing time") is changed. That is, as the viscosity of the solution becomes high, the mixing time becomes longer in general, and in the case where the aggregation or deposition occurs accompanying the chemical reaction between the solutions, the aggregates or deposits become an inhibiting factor of mixing, that is, causes the lowering of diffusing power to the solution, and the mixing time is changed.

In such a microreactor, since the passage length in the flow direction of the solutions in the mixing space is constant, in the case where the flow rate of the solutions is constant, a time (passing time) when the solutions pass through the mixing space becomes constant. Accordingly, in the case where the mixing time of the solutions in the mixing space is longer than the passing time, it is necessary to reduce the flow rate of the solutions in the mixing space, so that the processing rate of the solutions in the microreactor is lowered. At this time, in order to prevent the decrease in the process rate of the solution, it is conceivable to extend the passage length of the mixing space. However, in the case where such measures are taken, the microreactor is enlarged or the production cost is increased. Further, in the case where the passage length of the mixing space is extended more than needs, the aggregation, deposition or the like of the solution is promoted by contraries, the clogging occurs in the mixing space, and the maintenance of the microreactor becomes troublesome.

Accordingly, in the foregoing conventional microreactor, an actuator is coupled to a block-shaped mixer element in which liquid supply passages branching from a supply part of a solution in the shape of the teeth of a comb are formed, a mechanical vibration is given to the mixer element by this actuator, and the mixing of plural solutions is accelerated by this mechanical vibration.

However, in this conventional microreactor, the vibration is given to only the mixer element in which plural liquid supply passages are formed, and this vibration is transmitted to the solutions in the mixing space through the solutions in the liquid supply passages, so that the mixing of the solutions in the mixing space is accelerated. Thus, in such a microreactor, it is difficult to control the progress of the mixing of the solutions in the mixing space and the progress of the chemical reaction accompanying the mixing with high accuracy. For example, in the case where the chemical reaction between the solutions in the mixing space is desired to be performed stepwise, or in the case where the solution and reaction product are desired to be diffused and mixed over the whole length of the mixing space, it is difficult to realize such progress of the mixing or the chemical reaction.

SUMMARY OF THE INVENTION

In view of the above facts, in the present invention, disturbance factors, such as a deviation of a mixing state of liquid chemicals caused due to liquid chemicals in a large quantity for producing an emulsion stirred and mixed by a turbulent flow, a deviation of a recycling flow state, or a deviation of a temperature distribution, are eliminated, and while a uniform chemical reaction in liquid chemicals for producing an emulsion is accelerated, a difference in history of chemical change is made not to occur, and all produced compounds are made to have a uniform emulsion property. Alternatively, the invention has an object to provide a production method of silver halide photographic emulsion and a production apparatus of the emulsion, in which a small production system by an experimental apparatus can be easily scaled up to a production apparatus for mass production, and the emulsion production is enabled at an optimum production scale corresponding to a required production quantity.

According to a first aspect of the invention, a production method of silver halide photographic emulsion comprises a nucleus forming process, a nucleus growing process, a chemical sensitizing process, and a spectral sensitizing process, wherein at least one of the nucleus forming process, the nucleus growing process, the chemical sensitizing process, and the spectral sensitizing process is performed by using a microreactor.

By the constitution as described above, when viewed microscopically, the nucleus forming process for bonding a single silver ion and a single halogen ion in one-to-one correspondence is carried out by using a minute region of the microreactor, and a reaction for forming desired nuclei can be accurately carried out, or, nuclei of silver halide newly supplied to grow grains (host grains) of nuclei of silver halide formed by the nucleus forming process are made to uniformly meet the grains (host grains) of the nuclei of silver halide to allow to react with each other, conditions from the meeting of the grains (host grains) of the nuclei of silver halide and the nuclei of newly supplied silver halide at the same timing to the end of the reactions are made uniform, and the grains (host grains) of the nuclei of silver halide can be uniformly grown. Alternatively, each crystal lattice in the single nucleus of silver halide is accurately doped with a predetermined number (for example, one molecule for each crystal lattice) of molecules for chemical sensitization, and the sensitizing process is performed, so that it is possible to prevent a crystal lattice which is not doped with the molecule for chemical sensitization from being formed, to prevent a crystal lattice which is excessively doped with the molecule for chemical sensitization from being formed, or to prevent a molecule for chemical sensitization from being in excess, and it is possible to prevent the agent for chemical sensitization from wasting. Alternatively, the spectral sensitizing process is performed in which one layer of molecules of a spectral sensitizing agent is uniformly adsorbed on the surface of the single nucleus (grain) of silver halide, so that it is possible to prevent the generation of a nucleus (grain) of silver halide on which the molecule for spectral sensitization is not adsorbed, to prevent the generation of a nucleus (grain) of silver halide in an adsorption state in which molecules for spectral sensitization are excessive (multi-molecule adsorption state in which multi-layer molecules of the spectral sensitizing agent are adsorbed by the surface of the nucleus (grain) of silver halide), or to prevent the molecule for spectral sensitization from being in excess, and it is possible to prevent the agent for spectral sensitization from wasting.

As stated above, a silver halide photographic emulsion having uniform emulsion characteristics can be produced by using the microreactor. Further, since the microreactor is used, a small production system can be easily scaled up to a mass production system, and the emulsion can be produced at an optimum production scale corresponding to a required production quantity.

According to a second aspect of the invention, a production method of silver halide photographic emulsion comprises a nucleus forming process, a nucleus growing process, a chemical sensitizing process, and a spectral sensitizing process, wherein, when at least one of the nucleus forming process, the nucleus growing process, the chemical sensitizing process, and the spectral sensitizing process is carried out, temperature control of a process liquid is executed by using a microreactor including a temperature control means for controlling the temperature of the process liquid.

By the constitution as described above, in the case where the temperature control is executed by introducing the process liquid into the microreactor having the temperature control means for controlling the temperatures of the process liquids to perform heat transfer, the thermal energy is transmitted in a state where the process liquid forms a thin layer and the quantity thereof is very small, so that temperature changes rapidly to an objective set temperature. Thus, in the case where the temperature control is executed by the microreactor having the temperature control means for controlling the temperature of the process liquids, since it can be said that the timing of temperature change does not deviate between infinitesimal liquid chemicals for producing an emulsion forming thin layers, it is possible to prevent occurrence of difference in the liquid chemicals for producing the emulsion due to the difference in the history of the temperature change. Further, in the case where the temperature control is executed by the microreactor having the temperature control means for controlling the temperature of the process liquid, thermal energy is transferred to the infinitesimal liquid chemicals for producing an emulsion which form very thin layers and flow within the microreactor having the temperature control means for controlling the temperature of the process liquids, so that the temperature change of the liquid chemicals for producing the emulsion is completed.

Thus, in the case where the temperature control is executed by the microreactor having the temperature control means for controlling the temperature of the process liquids, a waiting time from the start of the temperature change of the liquid chemicals for producing the emulsion to the completion is eliminated, and the whole process time can be greatly shortened. In addition, in the case where the temperature control is executed by the microreactor having the temperature control means for controlling the temperature the process liquids, the rate of the temperature change of the liquid chemicals for producing the emulsion is high (good responsiveness to the temperature change), and there is no stagnancy and no recycling flow, so that the control operation of the temperature of the liquid chemicals for producing the emulsion can be precisely controlled, and an appropriate silver halide photographic emulsion can be produced.

In addition, since the microreactor is used, a small production system can be easily scaled up to a mass production system, and the emulsion can be manufactured at an optimum production scale in accordance with a required production quantity.

According to a third aspect of the invention, a production apparatus of silver halide photographic emulsion, which performs a nucleus forming process, a nucleus growing process, a chemical sensitizing process or a spectral sensitizing process, comprises: a first liquid guiding pipe which collects process liquids processed by using plural microreactors for performing the nucleus forming process, and thereafter feeds the liquids to a next process; a second liquid guiding pipe which is connected to the first liquid guiding pipe for distributing and supplying the process liquids to plural microreactors which has a processing capacity equivalent to all of the processing capacities of the plural microreactors for performing the nucleus forming process for performing the nucleus growing process; a third liquid guiding pipe which collects the process liquids processed by using the plural microreactors for performing the nucleus growing process, and thereafter feeds the process liquids to a next process; and a fourth liquid guiding pipe for distributing and supplying the process liquids for the chemical sensitizing process or the spectral sensitizing process to plural microreactors.

By the constitution as described above, when each of the nucleus forming process, the nucleus growing process, the chemical sensitizing process and the spectral sensitizing process is ended and started, the collection and distribution of the process liquids are repeated, so that the liquid chemicals for producing the emulsion processed in the respective microreactors are mutually mixed to be uniform at the end point of each process, and the quality and performance of the finally produced silver halide photographic emulsion can be made uniform.

In the production apparatus of the silver halide photographic emulsion constituted in this series of lines, the number of predetermined plural microreactors installed at each process is suitably set in accordance with the processing capacity or the like, so that the flow rate of the liquid chemicals for producing the emulsion between the respective processes becomes constant, and the whole production system can be constituted such that the process liquids do not stagnate and the process can be efficiently performed.

As stated above, the silver halide photographic emulsion having uniform emulsion performance can be produced by the microreactors.

A fourth aspect of the present invention is a production apparatus of silver halide photographic emulsion, which performs a nucleus forming process by using plural microreactors, performs a nucleus growing process by using plural microreactors, and performs a chemical sensitizing process or a spectral sensitizing process by using plural microreactors, wherein process liquids which have been forwarded to a next process from the plural microreactors for performing at least one process of the plural microreactors for carrying out the nucleus forming process, the plural microreactors for carrying out the nucleus growing process, the plural microreactors for carrying out the chemical sensitizing process, and the plural microreactors for carrying out the spectral sensitizing process are collected and are temporarily stored in a storage tank, and the process liquids are distributed and supplied to the plural microreactors from the storage tank for performing the next process.

By the constitution as described above, it is possible to proceed with the operation in such a way that the process liquids are temporarily stored in the storage tank at the point of time when the nucleus forming process, the nucleus growing process, the chemical sensitizing process, or the spectral sensitizing process in the production process of the silver halide photographic emulsion is performed, and thereafter, a subsequent process is carried out at a suitable point of time of the operation. Further, the process liquids processed by the plural microreactors provided in parallel are respectively collected in the storage tank, are blended and can be used.

Therefore, the process liquids having the same characteristics, which have been respectively collected in the storage tanks, are mixed, distributed and supplied to the plural microreactors provided in parallel, so that the uniform silver halide photographic emulsion can be produced.

In addition, since the microreactors are used, a small production system can be easily scaled up to a mass production system, and the emulsion can be manufactured at an optimum production scale corresponding to a required production quantity.

BRIEF DESCRIPTION OF THE DRAWINGS

FIGS. 24A and 24D are plan views showing a structure of a base plate in the microreactor shown in FIG. 22, and FIGS. 24B and 24C are side cross-sectional views thereof.

FIG. 31A is a cross-sectional view showing a structure of a modified example of the microreactor according to No. 1 of the ninth embodiment of the invention in the axial direction, and FIG. 31B is a cross-sectional view in the direction orthogonal to the axis.

FIG. 32A is a cross-sectional view showing a structure of another modified example of the microreactor according to No. 1 of the ninth embodiment of the invention in the axial direction, and FIG. 32B is a cross-sectional view in the direction orthogonal to the axis.

FIG. 34A is a cross-sectional view showing a structure of an example of a microreactor according to No. 1 of a tenth embodiment of the invention in an axial direction, and FIG. 34B is a cross-sectional view in a direction orthogonal to an axis.

FIG. 35A is a cross-sectional view showing a structure of a modified example of the microreactor according to No. 1 of the tenth embodiment of the invention in the axial direction, and FIG. 35B is a cross-sectional view in the direction orthogonal to the axis.

FIG. 36A is a cross-sectional view showing a structure of a microreactor according to No. 2 of the tenth embodiment of the invention in the axial direction, and FIG. 36B is a cross-sectional view in the direction orthogonal to the axis.

DETAILED DESCRIPTION OF THE INVENTION

Embodiments of a production apparatus of silver halide photographic emulsion of the present invention will be described with reference to the accompanying drawings.

Figure 1:
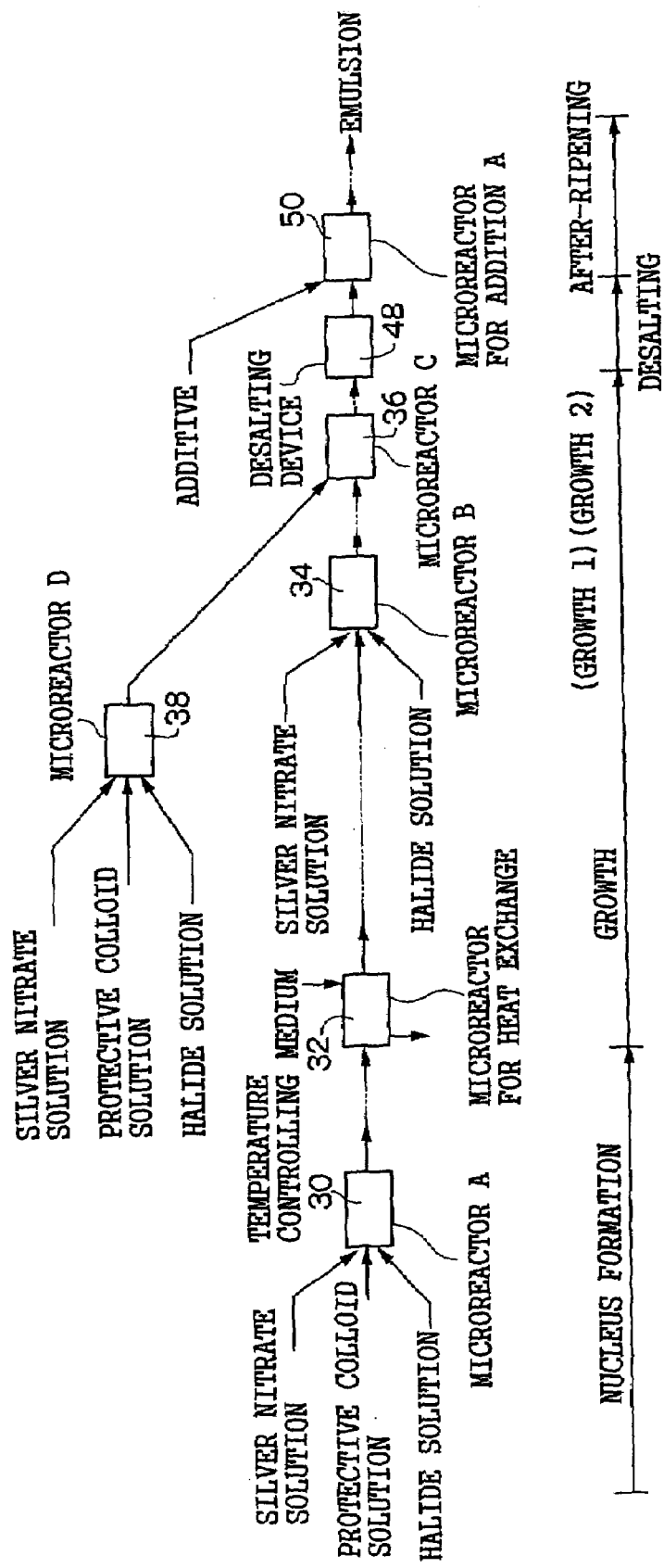
FIG. 1 is a schematic structural explanatory diagram showing the whole of a single line production apparatus of silver halide photographic emulsion according to a first embodiment of the present invention.

FIG. 1 is a whole schematic structural view showing a production system according to a first embodiment in a production apparatus of silver halide photographic emulsion of the invention. The production system of the first embodiment shown in FIG. 1 is constituted as a single line production system in which a pre-ripening process (a nucleus forming process, a first crystal growing process, and a second crystal growing process), a desalting process and an after-ripening process are successively performed.

Incidentally, the single line production system may be constituted such that in these processes, two or more processes are combined into one operation and are performed, one or more stages are omitted from the production processes, or plural operations are repeated at each stage to obtain a desired emulsion.

The single line production system for producing the silver halide photographic emulsion as shown in FIG. 1 is constituted such that microreactors are used to perform the pre-ripening process (the nucleus forming process, the first crystal growing process, and the second crystal growing process) and the after-ripening process.

Here, the microreactor in the specification is defined such that "the microreactor has a three-dimensional structure used for performing mixing, or mixing and chemical reaction, and is formed on a solid substrate by a suitable process in the microtechnology, and the microreactor normally introduces a fluid from a flow passage (microchannel) having an equivalent diameter of 500 μm or less per one introduction passage to a space where the mixing, or the mixing and chemical reaction are performed, and performs the mixing, or the mixing and the chemical reaction."

Further, in the specification, as long as the construction is the same, the microreactor includes a so-called micromixer (one having the function of mixing fluids). At the same time as this, it is presumed that the term of the micromixer includes the microreactor, and the microreactor and the micromixer are recognized to be the same.

Furthermore, in the specification, a heat exchange microreactor is defined such that "a heat exchange microreactor has a three-dimensional structure used for performing mixing, or mixing and chemical reaction, and is formed on a solid substrate by a suitable process in the microtechnology, and the heat exchange microreactor normally introduces a fluid from a flow passage (microchannel) having an equivalent diameter of 500 μm or less per one introduction passage to a space where the mixing or the mixing and the chemical reaction are performed, and performs the mixing, or the mixing and chemical reaction, and further, the heat exchange microreactor includes means for performing a temperature control of fluid for the purpose of controlling the mixing, or the mixing and chemical reaction."

In addition, a micro heat exchanger in the specification is defined such that "a micro heat exchanger is a three-dimensional structure used for performing a temperature control of fluid, and is formed on a solid substrate by a suitable process in the microtechnology, and the micro heat exchanger normally includes a flow passage (microchannel) having an equivalent diameter of 500 μm or less per one introduction passage, and includes means for performing a temperature control of fluid flowing through this flow passage."

As shown in FIG. 1, in the single line production system for producing a silver halide photographic emulsion, a nucleus forming process in a pre-ripening process is performed by a microreactor A30.

This microreactor A30 is constituted as a microreactor for simultaneously mixing three liquids. A silver nitrate solution, an aqueous protective colloid solution, and a halide solution are simultaneously mixed by this microreactor A30, and a nucleus forming process for forming microcrystalline dispersion of silver halide in the aqueous protective colloid solution is performed.

In the case where the nucleus forming process is performed by using this microreactor A30, when viewed microscopically, a single silver ion and a single halogen ion are bonded to each other in one-to-one correspondence. Heat generated at this time is absorbed so as to suppress and control Ostwald ripening, so that a reaction of suitably forming desired nuclei can be stably performed.

This microreactor A30 is constituted to be automatically controlled by a control device on the basis of a detection value detected by an unillustrated detection sensor. Incidentally, in the automatic control for the microreactor A30 by this control device, a potential control means for a nucleus forming process or a means for controlling a nucleus forming process by detecting a physical quantity such as a pH value, which have conventionally been used, may be used.

Figure 2:
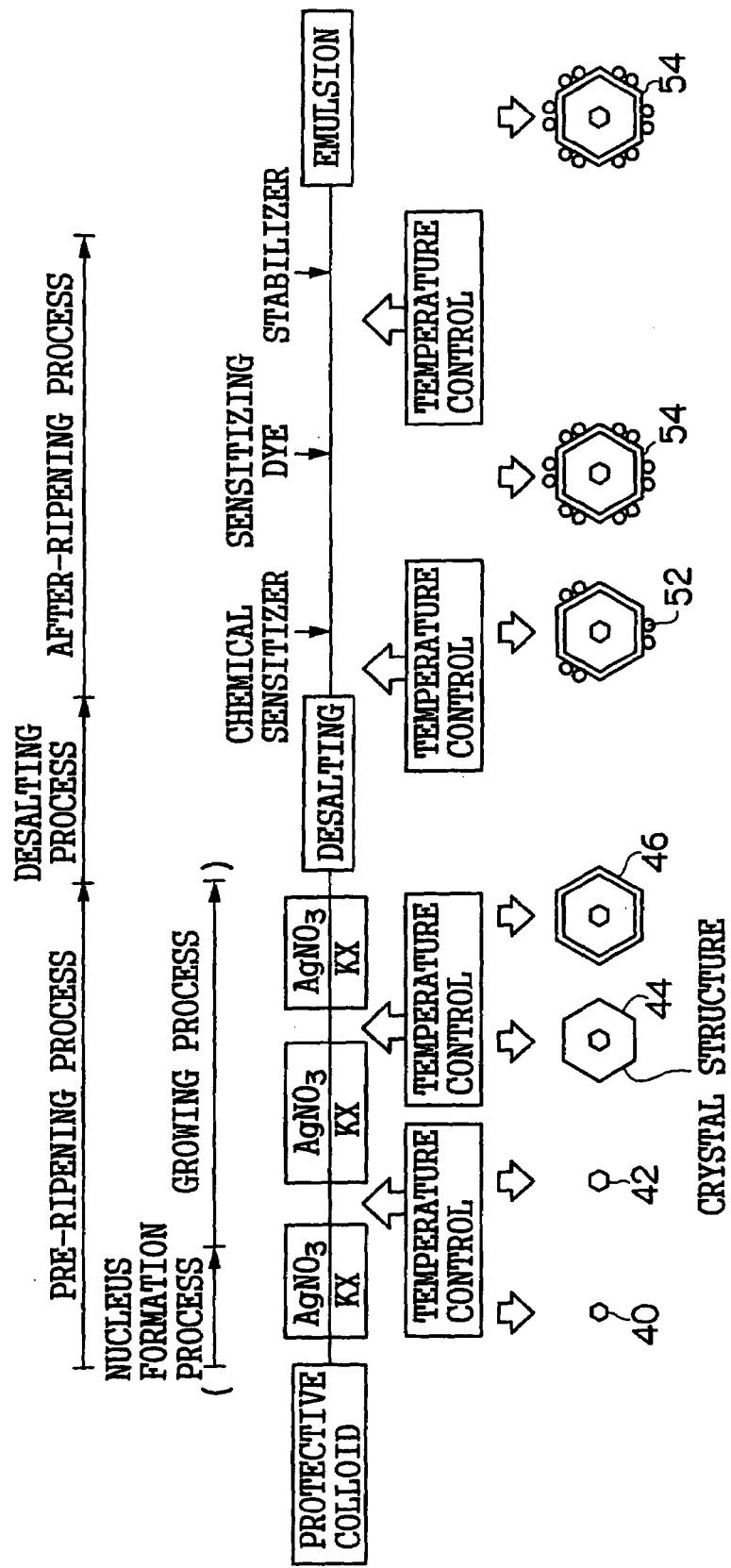
FIG. 2 is a schematic explanatory diagram showing the process contents of respective production processes in the single line production apparatus of the silver halide photographic emulsion according to the first embodiment of the invention.

A nucleus 40 that is a microcrystal of silver halide as exemplified in FIG. 2 is formed in this nucleus forming process, and the process proceeds to the subsequent first crystal growing process in the pre-ripening process.

In the first crystal growing process, the liquid chemicals for producing the emulsion, in which the silver halide microcrystals are dispersed in the aqueous protective colloid solution, which are sent from the microreactor A30, are introduced into a heat exchange microreactor A32 as a microreactor including a temperature control means for controlling the temperature of a process liquid, and temperature control and physical ripening are performed so that the liquid chemicals for producing the emulsion are brought to a predetermined temperature suitable for nucleus growth at the first crystal growing process. This heat exchange microreactor A32 executes the temperature control by making a heat exchange between the liquid chemicals for producing the emulsion introduced into the microreactor 32 and a temperature-controlling medium.

In the case where the liquid chemicals for producing the emulsion, in which the nuclei of silver halide are dispersed in the aqueous protective colloid solution, are introduced into the heat exchange microreactor A32, and the temperature control is executed by making the heat exchange of the liquid chemicals with the temperature-controlling medium. Since heat energy is transferred in an infinitesimal state where the liquid chemicals for producing the emulsion form a thin layer, the temperature of the liquid chemicals changes rapidly to an objective set temperature.

Thus, in the case where the temperature control is executed by the heat exchange microreactor A32, since it can be said that the timing of temperature change does not deviate between the infinitesimal liquid chemicals for producing an emulsion forming the thin layers, occurrence of differences in produced chemical substances due to differences in history of temperature changes can be prevented.

Further, in the case where the temperature control is executed by the heat exchange microreactor A32, heat energy is exchanged with the infinitesimal liquid chemicals for producing an emulsion which form thin layers and flow in the inside of the heat exchange microreactor A32, and the temperature change of the liquid chemicals for producing the emulsion is completed.

Thus, in the case where the temperature control is executed by the heat exchange microreactor A32, it is possible to eliminate a waiting time from the start of the temperature change of the liquid chemicals for producing the emulsion to the completion of the heat change. For example, when a large quantity of liquid chemicals for producing an emulsion stored in a large tank is heated through the outer peripheral wall of the tank, it takes a long waiting time (waiting time of a time order) for the large quantity of liquid chemicals for producing an emulsion in the large tank to change to a predetermined temperature. On the other hand, in the case where the temperature control is executed by the heat exchange microreactor A32, this long waiting time (loss time) can be eliminated, so that the process time can be greatly shortened.

In addition, in the case where the temperature control is executed by the heat exchange microreactor A32, the rate of the temperature change of the liquid chemicals for producing the emulsion is high (good responsiveness to the temperature change), and there is no stagnant flow and no recycling flow, so that the control operation of temperature of the liquid chemicals for producing the emulsion can be precisely controlled, and it is suitably used for a case where temperature is a dominant factor of a chemical change.

At this time, the nucleus 40 of the silver halide microcrystal exemplified in FIG. 2 grows into a nucleus 42 of a small crystal of silver halide.

The liquid chemicals for producing the emulsion containing the nucleus 42 of the small crystal of silver halide, as a so-called host grain, which have been subjected to a temperature control and physical ripening at a predetermined temperature by the heat exchange microreactor A32, are introduced into a microreactor B34, and are simultaneously mixed with an additional silver nitrate solution and halide solution to accelerate an Ostwald ripening. The nucleus 42 of the small crystal of silver halide as exemplified in FIG. 2 grows into the nucleus 44 of a medium-sized crystal of silver halide, and the process proceeds to the next second crystal growing process in the pre-ripening process.

In the second crystal growing process, the liquid chemicals for producing the emulsion in which the nuclei 44 of the medium-sized crystal of silver halide are dispersed in the aqueous protective colloid solution, which have been sent from the microreactor B34 are introduced into an unillustrated heat exchange microreactor as the need arises. The temperature control is performed so that the liquid chemicals for producing the emulsion have a predetermined temperature suitable for the growth of the nuclei in the second crystal growing process, and the liquid chemicals are introduced into a microreactor C36.

This microreactor C36 is constituted as a micromixer for simultaneously mixing two liquids. In this two-liquid mixing microreactor C36, the liquid chemicals for producing the emulsion in which the nuclei 44 of the medium-sized crystals of silver halide are dispersed in the aqueous protective colloid solution and the aqueous protective colloid solution containing the nuclei 40 of the microcrystals of silver halide formed by the microreactor D38 are simultaneously mixed to further promote the Ostwald ripening, and the nuclei 40 of the microcrystals of silver halide are consumed, so that the nuclei 44 of the middle crystal of silver halide as exemplified in FIG. 2 are made to grow into a nuclei 46 of large crystals of silver halide.

At this time, in the microreactor C36, in the liquid chemicals for producing the emulsion in which the nuclei 44 (host grains) of the medium-sized crystals of silver halide are dispersed in the aqueous protective colloid solution, nuclei of silver halide formed by the microreactor D38 which are to be newly supplied to grow the grains (host grains) of the nuclei 44 of silver halide are made to uniformly meet the grains (host grains) of silver halide in the inside of minute channels in the microreactor C36 to cause the Ostwald ripening reaction, and conditions from the meeting of the grains (host grains) of the nuclei of silver halide and the newly supplied nuclei of silver halide at the same timing to the end of the reaction are made uniform, and the respective grains (host grains) of the nuclei of silver halide can be made to uniformly grow.

This microreactor D38 is constituted similarly to the foregoing microreactor A30, and is constituted as a micromixer for simultaneously mixing three liquids, in which a silver nitrate solution, an aqueous protective colloid solution and a halide solution are simultaneously mixed to effect a nucleus forming process for forming a microcrystal dispersion of silver halide in the aqueous protective colloid solution, and the aqueous protective colloid solution containing the nuclei 40 of the microcrystals of silver halide thus formed is supplied to the microreactor C36.

The liquid chemicals for producing the emulsion which the second crystal growing process in the pre-ripening process has been completed and in which the nuclei 46 of the large crystals of silver halide are dispersed in the aqueous protective colloid solution as stated above, are sent from the microreactor C36 to a desalting device 48 of the subsequent desalting process.

In the desalting device 48, by using flocculation method, a noodle method, an ultrafiltration method, or an electrodialysis method, which is generally used, a process of removing unnecessary substances formed during the emulsion grain formation in the pre-ripening process, excessively existing ions, and the like from the liquid chemicals for producing the emulsion is carried out. Incidentally, the desalting process may be performed by a microreactor constituted such that the unnecessary substances and the excessively existing ions can be separated.

The liquid chemicals for producing the emulsion in which the desalting process have been completed in the desalting device 48 and the nuclei 46 of the large crystal of silver halide are dispersed in the aqueous protective colloid solution, are sent to an after-ripening process.

In the after-ripening process, the liquid chemicals for producing the emulsion which are sent from the desalting device 48 and in which the nuclei 46 of the large crystals of silver halide are dispersed in the aqueous protective colloid solution is introduced into an unillustrated heat exchange microreactor as the need arises. A temperature control is performed so that the liquid chemicals for producing the emulsion in which the nuclei 46 of the large crystals of silver halide are dispersed have a predetermined temperature suitable for a chemical sensitizing process for increasing the sensitivity thereof to a high sensitivity of a practical level, and subsequently, the liquid chemicals are introduced into a microreactor A50 for addition.

This microreactor A50 for addition is constituted as a microreactor for simultaneously mixing two liquids. In the microreactor A50 for addition, the liquid chemicals for producing the emulsion in which the nuclei 46 of the large crystal of silver halide are dispersed in the aqueous protective colloid solution, and a chemical sensitizing agent are simultaneously mixed, the nuclei 46 of the large crystals of silver halide are subjected to the sensitizing process to form chemically sensitized nuclei 52 of silver halide as shown in FIG. 2.

In the chemical sensitizing process, a sulfur sensitizing process, gold sensitizing process, or reduction sensitizing process is carried out which has been conventionally used. When the chemical sensitizing process is carried out by doping the nuclei 46 of silver halide with the chemical sensitizing agent by using the microreactor A50 for addition, when viewed microscopically, since a predetermined quantity (for example, one molecule for each crystal lattice) of molecule for chemical sensitization can be accurately doped in the respective crystal lattices in the single nucleus 46 of silver halide, the suitable chemical sensitizing process can be performed.

Thus, in the case where the chemical sensitizing process is effected by using the microreactor A50 for addition, it is possible to prevent a crystal lattice which is not doped with the molecule for chemical sensitization from being formed, to prevent a crystal lattice which is excessively doped with the molecules for chemical sensitization from being formed, or to prevent a molecule for chemical sensitization from being in excess, so that it is possible to prevent the agent for chemical sensitization from being wasted.

Further, in this after-ripening process, as shown in FIG. 2, subsequent to the chemical sensitizing process, by using an unillustrated microreactor for addition, spectral sensitizing processes are performed to widen the intrinsic photosensitive region of the liquid chemicals for producing the emulsion, in which the chemically sensitized nucleus 52 of silver halide are dispersed, to the respective photosensitive wavelength regions of blue, green, and red as the three primary colors of light, so that the spectrally sensitized nuclei 54 of silver halide are formed as shown in FIG. 2.

The spectral sensitizing process is a conventionally used process in which a solution containing a sensitizing dye dissolved in methanol is mixed and the sensitizing dye is adsorbed by the nuclei 52 of silver halide.

In the case where the liquid chemicals for producing the emulsion in which the nuclei (grain) of silver halide are dispersed in the aqueous protective colloid solution are simultaneously mixed with the spectral sensitizing agent in which the spectral sensitizing dye is dissolved in methanol and the spectral sensitizing process is performed by using the microreactor for addition, when viewed microscopically, since a single layer of molecules of the spectral sensitizing agent can be uniformly adsorbed by the surface of the single nucleus (grain) of silver halide, the suitable spectral sensitizing process can be effected.

Thus, in the case where the microreactor for addition is used to effect the spectral sensitizing process, it is possible to prevent the formation of nuclei (grain) of silver halide on which the molecule of the spectral sensitizer is not adsorbed, to prevent the formation of nuclei (grain) of silver halide on which the molecules are excessively adsorbed (multi-molecule adsorbed state in which multi-layer molecules of the spectral sensitizing agent are adsorbed on the surface of the nuclei (grain) of silver halide), or to prevent molecules for spectral sensitization from being in excess, so that it is possible to prevent the chemicals for spectral sensitization from being wasted.

In the solution of the silver halide photographic emulsion subjected to the spectral sensitizing process, a stabilizing agent or the like is added in the after-ripening process by using an unillustrated microreactor for addition to impart required properties thereto.

Incidentally, in the solution of the silver halide photographic emulsion, also in the case where the stabilizing agent or the like is added by using an unillustrated mixing microreactor to impart the required properties thereto, the same function and effect can be obtained.

After a temperature control is performed to attain a predetermined temperature suitable for storage, the thus produced silver halide photographic emulsion is sent to a unillustrated storage container and is refrigerated, and the series of production operations of the silver halide photographic emulsion are completed.

The production apparatus of the silver halide photographic emulsion having a single line in series by using the aforementioned microreactors as shown in FIG. 1 constitutes an apparatus for so-called fine chemicals, which is suitable for a case where a silver halide photographic emulsion having uniform characteristics is continuously produced little by little with a high reproducibility.

Thus, the production apparatus of the silver halide photographic emulsion using the microreactors is also suitable for an experimental apparatus used when the combination of various agents for production of silver halide photographic emulsion is changed, and of emulsions are produced in a small quantity and are evaluated to study formulations during the process in the development of a new silver halide photographic emulsion in a laboratory.

Figure 19:
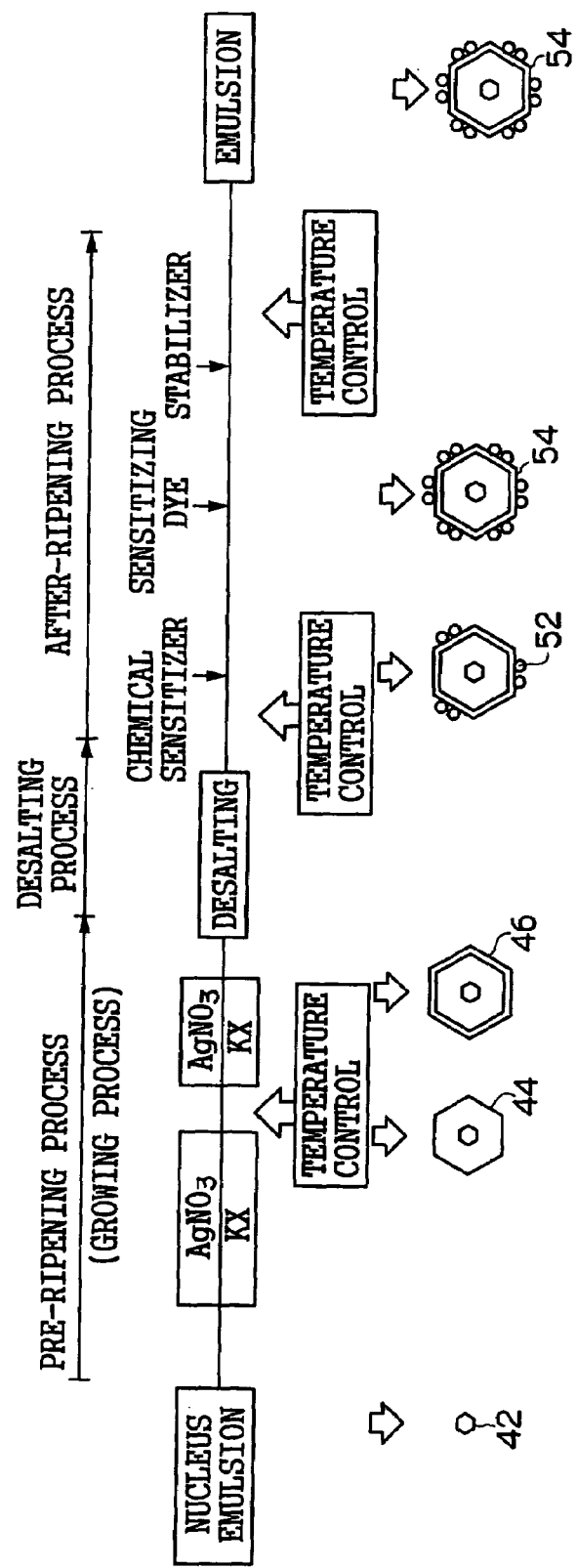
FIG. 19 is a schematic explanatory view showing the process content in another production process in a production apparatus of silver halide photographic emulsion of the invention.

In addition, the production apparatus of the silver halide photographic emulsion having a single line in series by using the microreactors shown in FIG. 1 may be constituted such that as shown in FIG. 19, a nucleus forming process is performed by another device (the device may not use a microreactor), liquid chemicals for producing an emulsion separately prepared in advance, in which the nuclei 42 of the small crystal of silver halide are dispersed in an aqueous protective colloid solution, are directly introduced into a microreactor B (not shown) for the first crystal growing process, and the operation proceeds to the subsequent second crystal growing process, desalting process, and after-ripening process.

By the constitution as described above, since a fine nucleus forming process is performed by a specific apparatus and various nuclei are formed as desired and can be used, the degree of freedom concerning a method for producing the silver halide photographic emulsion can be widened.

Further, the production apparatus of the silver halide photographic emulsion constituted to have the single line in series by using the microreactors according to the first embodiment may be constituted such that at least one of the nucleus forming process, the first crystal growing process, the second crystal growing process, and the after-ripening process is performed by a microreactor. That is, the production apparatus of the silver halide photographic emulsion according to the first embodiment may be constituted as a single line production apparatus in series in which the microreactor and a batch type reaction container device having an agitator and a temperature control means are used in combination.

Specific conditions of the production apparatus of the silver halide photographic emulsion structured as the single line in series utilizing the microreactor, are exemplified below:

1) flow rate range of liquid for use in each microreactor;
one or more micro liters per minute, preferably one or more milliliters per minute;

2) temperature range of liquid for in each microreactor;
from 5° C. to 95° C., preferably from 5° C. to 75° C.;

3) throughput of the production apparatus of the silver halide photographic emulsion constituted as a single line;
one or more micro liters per minute, preferably one or more milliliters per minute, more preferably, ten or more milliliters per minute;

4) connection method for a microreactor, a heat exchange microreactor, and a micro heat exchanger;
the respective microdevices may be disposed to be brought into direct contact with each other without an interval, or the respective microdevices may be disposed to be coupled by fixed pipes or removable pipes, and the pipe may be a pipe made of metal, ceramic, glass, resin, or composite material and may be firmly fixed or flexibly removable; and 5) liquid feed method of liquid for use to a microreactor, a heat exchange microreactor, or a micro heat exchanger;
both a continuous flow type and a liquid droplet (liquid plug) type may be used, and as a driving force, both an electric driving system and a pressure driving system may be used.

In the case of continuous production of silver halide photographic emulsion, the pressure driving method of the continuous flow type is desirable. In that case, a commercially available normal pump may be used (for example, a syringe pump, a plunger pump or the like may be used). Here, as a method of quantitatively feeding a liquid without pulsation, for example, means described in JP-A Nos. 62-182623, 8-146543, 2001-109092, 2001-113219 and 2001-114397 can be used.

Next, chemical matters used in the production apparatus of the silver halide photographic emulsion of the invention will be described.

The foregoing halide solution used in the invention is normally a solution of potassium bromide, sodium bromide, potassium chloride, sodium chloride, potassium iodide, sodium iodide, or a mixture thereof.

When a silver halide grain obtained by the method of the invention is used as a nucleus, the concentration of the solution is preferably 4 mol/L or less, more preferably 1 mol/L or less, and most preferably 0.2 mol/L or less. In the case where it is used for crystal growth, in view of the productivity, it is preferable to use a highly concentrated aqueous solution. The concentration is preferably from 0.5 mol/L to 4 mol/L, and more preferably 1.0 mol/L or more. The temperature of the aqueous solution is from 5° C. to 95° C., and preferably from 5° C. to 75° C.

It is preferable that gelatin is contained in at least one of a silver salt solution and a halide solution. Since the gelatin has a great influence on a probability of formation of twin crystals in the generated silver halide grain, the preferable concentration of an aqueous gelatin solution varies with the objects of formed fine-grain silver halide grain to be used.

In the case where continuously formed silver halide grains are used as nuclei at the time when a tabular silver halide grains are prepared, since parallel double twin crystal nuclei are required, it is necessary to adjust the concentration of the aqueous gelatin solution so as to achieve a desired probability of twin crystal generation. It is preferable to select the gelatin concentration so that when the aqueous silver salt solution and the aqueous halide solution are mixed, the quantity of gelatin per 1 g of silver becomes from 0.03 g to 0.4 g, and more preferably, 0.3 g or less.

In the case where continuously produced silver halide grains are used as nuclei at the time when normal crystal grains are prepared, since it is necessary to make a probability of formation of twin crystals as low as possible, it is necessary to raise the gelatin concentration at the time of nucleus formation, and the quantity of gelatin per 1 g of silver nitrate is 0.4 g or more (although there is no upper limit, preferably 50 g or less), preferably 1 g or more, and more preferably 5 g or more.

The fine-grain silver halide emulsion obtained by this invention can be used at the time of crystal growth of the silver halide grain. In the case where it is used for the crystal growth, it is preferable that added silver halide fine grains are rapidly dissolved. For this purpose, it is preferable that the number of twin crystals is small, and therefore, it is preferable that the concentration of an aqueous gelatin solution is high. The concentration of the aqueous gelatin solution is preferably made such a concentration that gelatin of from 0.2 g to 1 g is added per 1 g of silver nitrate, more preferably 0.3 g or more, and most preferably 0.4 g or more.

In the case where the concentration of an aqueous gelatin solution is made high, the viscosity of the aqueous gelatin solution increases, so that the addition of the aqueous gelatin solution becomes difficult. When the molecular weight of the gelatin is made low by a method of enzymatic decomposition or the like, the viscosity can be lowered. The molecular weight of gelatin is preferably from 5,000 to 100,000, more preferably 50,000 or less, and most preferably 30,000 or less. When gelatin is used for the crystal growth, the gelatin added together with the silver halide grain has an influence on the thickness of the tabular silver halide grains. The influence on the thickness can be variously changed by the chemical modification of gelatin. In order to obtain thin tabular silver halide grains, an oxidizing treatment, a succinic acid treatment or a trimellitic acid treatment is preferably used.

The mixing for the formation of the silver halide grains in the invention is not the mixing by a turbulent flow that has conventionally been used, but the mixing utilizing a laminar flow. In the mixing in accordance with the present invention, the silver nitrate solution and the halide solution are subdivided into thin layers (lamellas), and they are respectively brought into contact with each other at a large area, so that ions are diffused uniformly in a short time, and more rapid and more uniform mixing are realized. The movement of an ion by diffusion is given by the following expression in terms of a diffusion coefficient and a temperature gradient in accordance with the Fick law that relates the change of temperature to time;

$t \sim dl^2 / D$ wherein, D denotes a diffusion constant, dl denotes a thickness of a thin layer, and t denotes a mixing time.

From the above expression, since the mixing time t is in proportion to the square the thickness dl of the thin layer, the mixing time can be shortened very effectively by thinning this layer.

That is, the principle is based on multi-lamination of a fluid and subsequent diffusion mixing. The fluids of the silver salt solution and the halide solution pass through intricate slits having a thickness of several tens microns, so that they are divided into a large number of thin layers fluids, they come into contact with each other at the exits of the slits in the normal direction of the traveling direction and in a wide area, the diffusion of silver ions and halogen ions starts immediately, the mixing due to the diffusion is completed in a short time, and micro grains of silver halide are formed by ionic reactions which take place simultaneously.

The reaction in the invention takes place while the fluids are flowing in a flow passage, that is, in a flowing state.

The thickness of the thin layer in the invention is from 1 μm to 900 μm in the normal direction to the traveling direction, preferably from 1 μm to 300 μm. The mixing time in the invention utilizing the laminar flow varies with the diffusion time of a mixture or reactants, and is preferably from 0.5 second to 2 minutes, more preferably from 1 second to 1 minute. In the case of less than 0.5 second, although the mixing time varies with the diffusion distance and the diffusion rate, mixing and reaction accompanied by the mixing may be insufficient. Further, in the case of exceeding 2 minutes, the mixing becomes similar to that of a batch type-agitating container, and an effect of using a microreactor lessens.

The microreactor used in the invention is a device including a flow passage (microchannel) having an equivalent diameter of 500 μm or less per one introduction flow passage. The equivalent diameter in the invention is called also a nominal diameter, and is a term used in the mechanical engineering. When a circular pipe equivalent to a pipe (flow passage in the invention) having an arbitrary cross-sectional shape is considered, the diameter of the equivalent circular pipe is called the equivalent diameter. When A is a cross-sectional area of the pipe, and P is wetted perimeter length (peripheral length) of the pipe are used, the equivalent diameter is defined as $deq=4A/p$. In the case where it is applied to a circular pipe, the equivalent diameter is coincident with the diameter of the circular pipe. The equivalent diameter is used for estimating the fluidity or the thermal conduction properties in the pipe on the basis of data of the equivalent circular pipe, and represents the spatial scale (typical length) of a phenomenon. The equivalent diameter becomes $deq=4a^2/4a=a$ for a square pipe having one side a, $deq=a/3^{1/2}$ for an equilateral triangle pipe having one side a, and $deq=2h$ for a flow between parallel flat plates with a height h (see "Mechanical Engineering Dictionary" edited by Japanese Mechanical Society, 1997, Maruzen Co.).

Although the length of a flow passage used in the invention is not particularly restricted, it is preferably from 1 mm to 1000 mm, more preferably from 10 mm to 500 mm.

It is not necessary that the number of flow passages used in the invention is one, and plural flow passages can be provided in parallel (numbering-up) as the need arises, so that the throughput can be increased.

The flow passage of the invention is prepared on a solid substrate by micro-fabricating technologies. An example of a material to be used includes metal, silicon, TEFLON™, glass, ceramic and plastic. When heat resistance, pressure resistance, and solvent resistance are necessary, a preferable material includes silicon, TEFLON™, glass and ceramic, and especially preferably metal. An example of metal includes nickel, aluminum, silver, gold, platinum, tantalum, stainless, hastelloy (Ni—Fe alloy), and titanium, and preferably stainless having high corrosion resistance, hastelloy and titanium. In the conventional batch type reaction apparatus, when an acidic material or the like is handled, an apparatus in which the metal (stainless etc.) surface is lined with glass is used. Similarly, the metal surface may be lined with glass in the microreactor. In addition to glass, according to an object, metal may be coated with another metal or another material, and a material (for example, ceramic) other than metal may be coated with metal or glass.

A typical micro-fabricating technology for preparing a flow passage includes an LIGA technology using an X-ray lithography, a high aspect ratio photolithography method using EPON SU-8, a micro-electric discharge machining process (μ-EDM), a high aspect ratio machining method of silicon by Deep RIE, a Hot Emboss machining method, a light shaping method, a laser machining method, an ion-beam machining method, and a mechanical micro-cutting work method using a micro-tool made of hard material such as diamond. These technologies may be singly used, or may be used in combination. A preferable micro-fabricating technology includes the LIGA technology using X-ray lithography, the high aspect ratio photolithography using EPON SU-8, the micro-electric discharge machining method (μ-EDM), and the mechanical micro-cutting work method.

When the microreactor of the invention is assembled, a joining technique is often used. A normal joining technique is roughly divided into solid-phase joining and liquid-phase joining. In joining methods generally used, a typical joining method includes, pressure welding and diffusion bonding as the solid-phase joining, and welding, eutectic bonding, brazing, and gluing as the liquid joining. Further, at the time of assembling, it is desirable to use a highly precise joining method in which dimension accuracy is maintained in such a way that deterioration of material due to high temperature heating, or destruction of a micro-structure such as a flow passage by a large deformation of material does not take place. Such technique includes a silicon direct joining, anode joining, surface activation joining, direct joining using hydrogen bonding, joining using aqueous HF solution, Au—Si eutectic bonding, and void-free bonding.

The flow passage of the microreactor of the invention may be subjected to a surface treatment according to an object. In particular, when a surface is treated with an aqueous solution, since the adsorption of a sample to glass or silicon may become a problem, the surface treatment is important. In the fluid control in the micro-sized flow passage, it is desirable to realize this without incorporating a movable part requiring a complicated manufacturing process. For example, a hydrophilic region and a hydrophobic region are prepared in the flow passage by the surface treatment, so that it becomes possible to treat a fluid by using a difference in surface tension exerting on the boundary between these regions.

In order to introduce a reagent or a sample into the micro-sized flow passage of the microreactor to effect mixing, a fluid control function is necessary. Especially, since the behavior of a fluid in a micro region has a property different from that in a macro scale, a control system suitable for the micro scale must be taken into consideration. When fluid control systems are classified in terms of the form, the fluid control system includes a continuous flow system and a droplet (liquid plug) system. When classified in terms of the driving force, the system includes an electrical driving system and a pressure driving system. These systems will be described below in detail. As the form for handling a fluid, the continuous flow system is most widely used. In the fluid control of the continuous flow type, the inside of the whole flow passage of the microreactor is filled with the fluid, and the whole fluid is generally driven by a pressure source such as a syringe pump provide at the exterior of the passage. In this case, although one advantage is that the control system can be realized by a relatively simple setup, there are disadvantages that reaction comprising a plurality of steps or manipulation accompanied by an exchange of samples is difficult, the degree of freedom concerning the system constitution is low, and a dead volume is large since an action medium is a solution itself. As a system different from the continuous flow system, there is a droplet (liquid plug) system. In this system, droplets partitioned by air are moved in the inside of a reactor or a flow passage leading to the reactor, and each droplet is driven by air pressure. At this time, it is necessary that a vent structure for releasing the air between the droplet and the wall of the flow passage, or between the droplets to the outside as the need arises, and a valve structure for keeping the pressure in a branched flow passage independently from other portions are provided in the inside of the reactor system. In addition, in order to perform the manipulation of the droplet by controlling the pressure difference, it is necessary to construct a pressure control system comprising a pressure band and a selector valve at the outside of the reactor. In the liquid droplet system, although the apparatus configuration and the structure of the reactor become rather complicated as stated above, a multi-stage operation is enabled, for example, plural droplets are individually operated and some reactions are sequentially performed, and the degree of freedom concerning the system configuration becomes high.

As the driving system for performing the fluid control, there are generally and widely used an electrical driving method in which a high voltage is applied between both ends of a flow passage (channel) to generate an electro-osmotic flow, thereby fluid is moved, and a pressure driving method in which a pressure band is provided at the outside of the passage and a pressure is applied to a fluid to move the fluid. It has been known that both systems are different in that, for example, as the behavior of the fluid, the flow rate profile in the cross-section of the flow passage becomes a flat distribution in the case of the electrical driving system, whereas it becomes a hyperbolic flow distribution in the pressure driving system, in which the flow rate is high at the center of the flow passage and low at the wall surface part. Therefore, the electrical driving system is suitable for such an object that a movement is made while the shape of a sample plug or the like is kept. In the case where the electrical driving system is performed, since it is necessary that the inside of the flow passage is filled with the fluid, the form of the continuous flow system must be adopted. However, since the fluid can be treated by an electrical control, a comparatively complicated process is also realized, for example, a concentration gradient varying with time is formed by continuously changing the mixing ratio of two kinds of solutions. In the case of the pressure driving system, the control can be made irrespective of electrical properties of the fluid, and secondary effects such as heat generation or electrolysis may not be considered, and therefore, an influence on the base quality hardly exists, and its application range is wide. On the contrary, a pressure source must be prepared outside, and for example, response characteristics to manipulation are changed according to the magnitude of a dead volume of a pressure system, and it is necessary to automate the complicated process.

Although a method used as a fluid control method is suitably selected according to its object, the pressure driving system of the continuous flow system is preferable.

The temperature control of the microreactor may be performed by putting the whole device in a container in which the temperature is controlled, or a heater structure such as a metal resistance wire or polysilicon is formed in the device and a thermal cycle may be performed in such a manner that the heater structure is used when heating, and cooling is natural cooling. With respect to the sensing of temperature, when a metal resistance wire is used, the same resistance wire as the heater is additionally formed, and the temperature detection is performed on the basis of the change of the resistance value of the additional wire. When the polysilicon is used, a thermocouple is used to detect the temperature. Further, heating and cooling may be performed from the outside by bringing a Peltier element into contact with the reactor. A suitable method is selected in accordance with the use, the material of the reactor body and the like.

The details of the microreactor are described in Section 3 of "Microreactor" (W. Ehrfeld, V. Hessel, H. Loewe, 1Ed. (2000) WILEY-VCH), and the micro heat exchanger is described in Section 4 thereof.

Next, a second embodiment of the invention will be described with reference with FIGS. 3 to 5.

Figure 3:
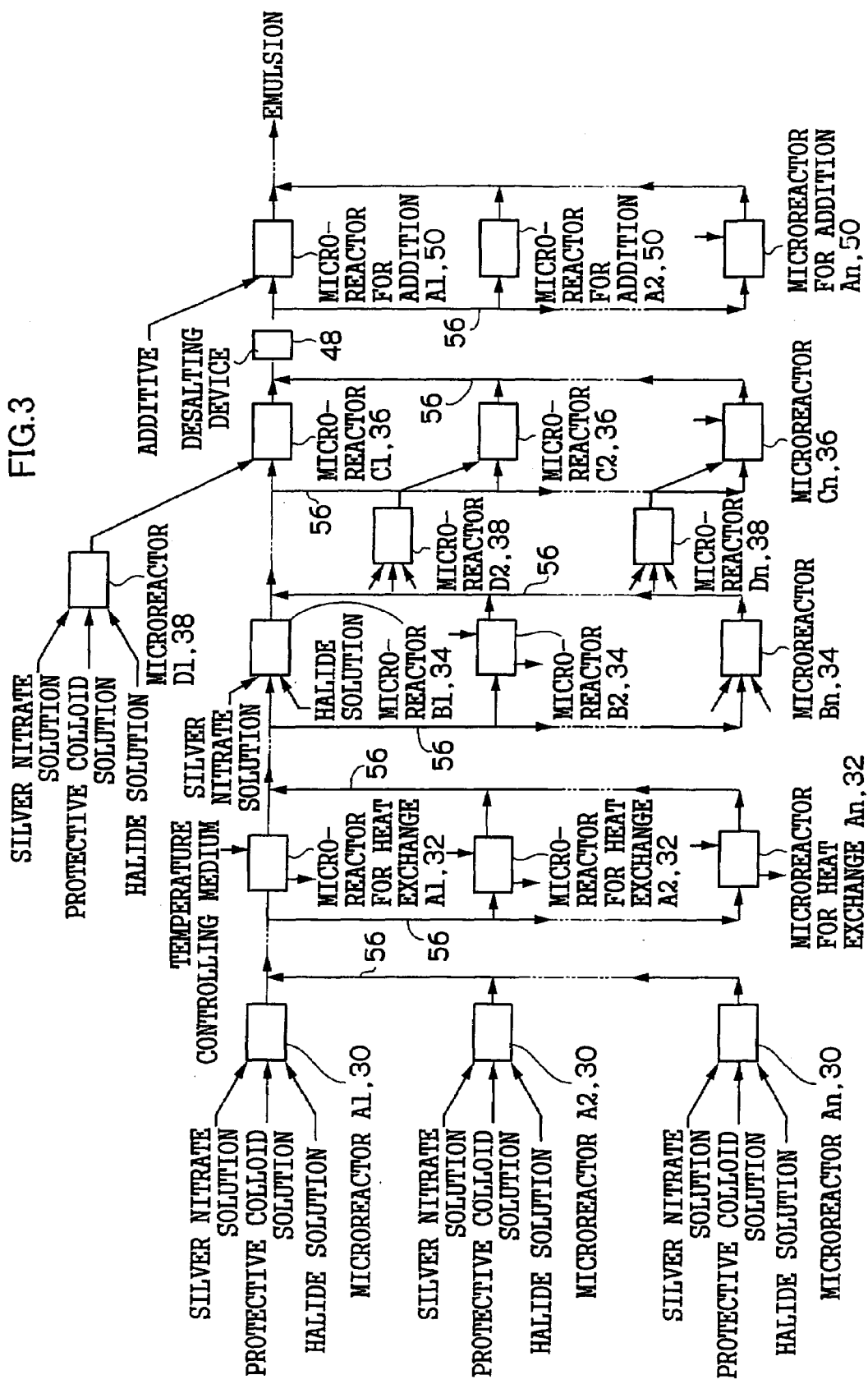
FIG. 3 is a schematic structural explanatory diagram showing the whole of a production apparatus of silver halide photographic emulsion of a first structural example according to a second embodiment of the invention.

FIG. 3 is a whole schematic structural view showing a production system according to a first structural example of the second embodiment. The production system according to the first structural example shown in FIG. 3 is intended to scale up the production scale by using a plurality of microreactors for each step or process in a pre-ripening process (a nucleus forming process, a first crystal growing process, and a second crystal growing process), and an after-ripening process. The number of parallel devices is from 1 to 10,000, preferably from 1 to 100.

In the production apparatus of the silver halide photographic emulsion according to this first structural example, the liquid chemicals for producing the emulsion which are obtained through nucleus forming processes by a plurality of microreactors (A1 to An) 30 and in which microcrystals of silver halide are dispersed in protective colloid solutions, are collected by liquid guiding pipes 56, and are again distributed through the liquid guiding pipes 56 to a plurality of heat exchange microreactors A32 (the number of the parallel devices is from 1 to 10,000, preferably from 1 to 100), and the temperature control and physical ripening process are carried out.

Next, in the production apparatus of the first structural example, the liquid chemicals for producing the emulsion which are subjected to the temperature control by the plural heat exchange microreactors A32 and are adjusted to pre-determined temperature, are collected by the liquid guiding pipes 56, and are again distributed through the liquid guiding pipes 56 to a plurality of microreactors (B1 to Bn) 34, and the first crystal growing process is carried out.

Next, in the production apparatus of the first structural example, the liquid chemicals for producing the emulsion which are subjected to the first crystal growing process by the plural microreactors (B1 to Bn) 34 and in which nuclei 44 of middle crystals of silver halide are dispersed in the aqueous protective colloid solutions, are collected by the liquid guiding pipe 56, and are again distributed through the liquid guiding pipe 56 to plural microreactors (C1 to Cn) 36, and liquid chemicals for producing an emulsion produced by plural microreactors (D1 to Dn) 38 are mixed, so that the second crystal growing process is carried out.

Next, in the production apparatus of the first structural example, the liquid chemicals for producing the emulsion which are subjected to the second crystal growing process by the plural microreactors (C1 to Cn) 36 and in which nuclei 46 of large crystals of silver halide are dispersed in the aqueous protective colloid solutions, are collected by the liquid guiding pipes 56 and are introduced to a desalting device 48.

After a desalting process is carried out, the liquid chemicals are again distributed to a plurality of addition microreactors (A1 to An) 50 through the liquid guiding pipes 56, and the after-ripening process is carried out.

In the production apparatus of the liquid chemicals for producing the emulsion of the first structural example constituted as stated above, the collection and distribution of the liquid chemicals for producing the emulsion are repeated at each step of the pre-ripening process (the nucleus forming process, the first crystal growing process, and the second crystal growing process) and the after-ripening process, so that the liquid chemicals for producing the emulsion are mutually mixed and are uniform at the end points of the respective processes, and the quality and characteristics of the silver halide photographic emulsion finally produced can be made uniform.

In the production apparatus of the liquid chemicals for producing the emulsion constituted to have the series of lines, by suitably setting the number of the microreactors (A1 to An) 30, the heat exchange microreactors A32, the microreactors (B1 to Bn) 34, the microreactors (C1 to Cn) 36, the microreactors (D1 to Dn) 38 or the microreactors (A1 to An) 50 disposed at the respective processes according to the processing capacity and the like, the flow rates of the liquid chemicals for producing the emulsion between the respective processes become constant, and the production apparatus can be constituted such that the process can be efficiently performed without stagnancy in the whole production system.

Figure 4:
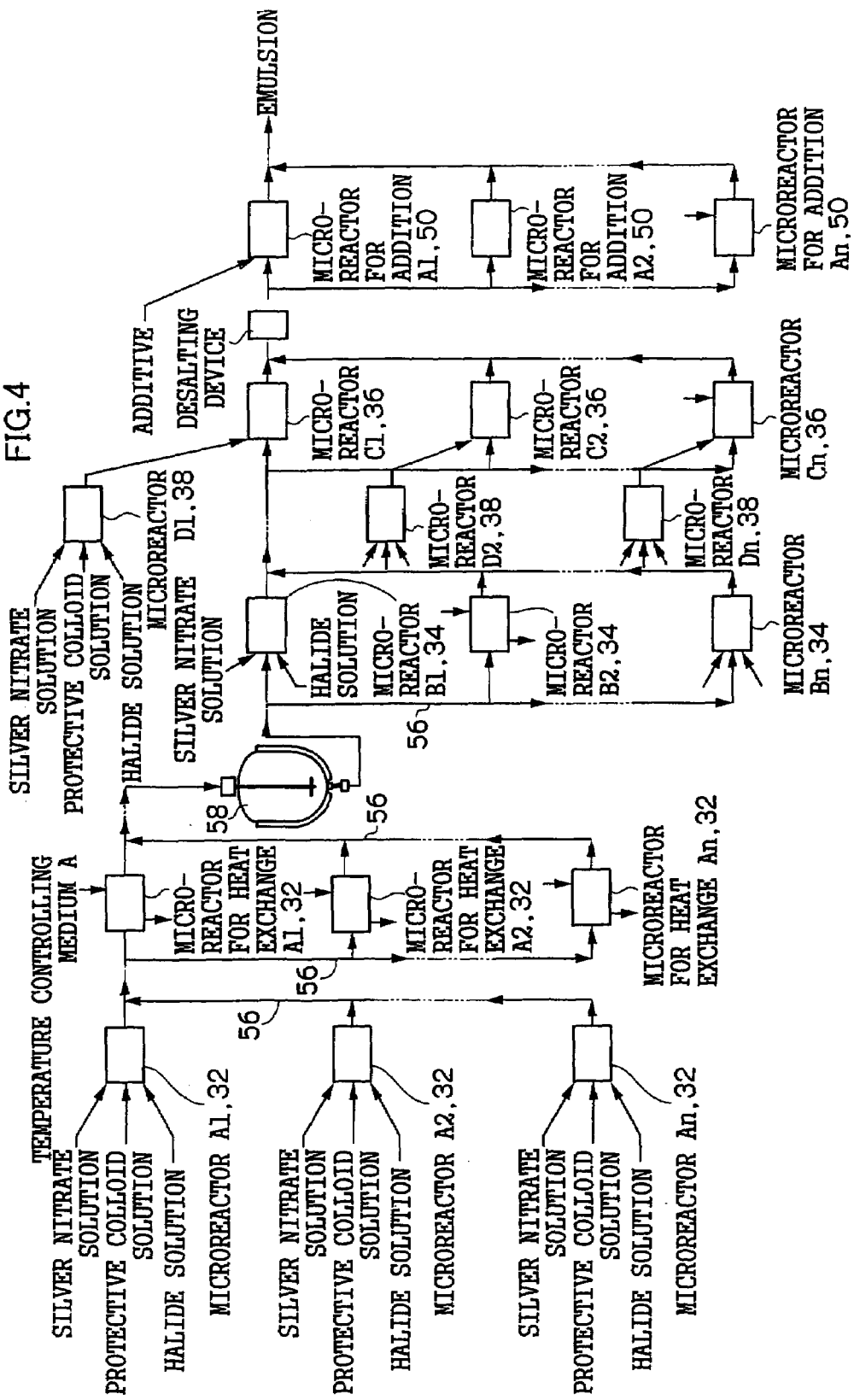
FIG. 4 is a schematic structural explanatory diagram showing the whole of a production apparatus of silver halide photographic emulsion of a second structural example according to the second embodiment of the invention.

Next, a second structural example of the second embodiment will be described with reference to a whole schematic structural view of FIG. 4 showing a production system. In the production system according to the second structural example shown in FIG. 4, in the foregoing structure of the first structural example in which each of the pre-ripening process (the nucleus forming process, the first crystal growing process, and the second crystal growing process), and the after-ripening process is performed by using the plural microreactors to scale up the production scale, a segmental process or treatment can be separated and performed.

In the production apparatus of the liquid chemicals for producing the emulsion according to the second structural example, the liquid chemicals for producing the emulsion which are subjected to the temperature control by plural heat exchange microreactors A32 and are adjusted to predetermined temperature, are collected through liquid guiding pipes 56 and are stored in a storage tank 58.

In the storage tank 58, temperature adjustment and agitation of the liquid chemicals for producing the emulsion are performed by using a temperature control means and agitating means of the liquid chemicals for producing the emulsion, if necessary, to mix the liquid chemicals for producing the emulsion to be uniform, so that the liquid chemicals can be stored under suitable conditions.

Next, in the production apparatus of the second structural example, the liquid chemicals for producing the emulsion stored in the storage tank 58 are distributed to a plurality of microreactors (B1 to Bn) 34 through the liquid guiding pipes 56 at a predetermined timing, and the first crystal growing process is carried out.

Incidentally, the storage tank 58 may be installed at a single or plural places between the respective processes as occasion demands.

In the production apparatus of the liquid chemicals for producing the emulsion according to the second structural example constituted as stated above, as exemplified in FIG. 4, the storage tank 58 is installed between the nucleus forming process and the first crystal growing process in the pre-ripening process, so that the operation can be made to proceed in such a way that only the nucleus forming process is first performed, and at a subsequent suitable timing, each of the subsequent second crystal growing process, the after-ripening process, and the desalting process is performed.

Further, the process liquids processed by the plurality of microreactors C36 may be collected and the desalting process may be performed by one desalting device 48, or may be performed by respective desalting devices 48 corresponding to each microreactor C36.

Incidentally, since the structure, operation and effect of the second structural example of the second embodiment other than the above description are the same as the foregoing first embodiment or the first structural example of the second embodiment, the detailed descriptions are omitted.

Figure 5:
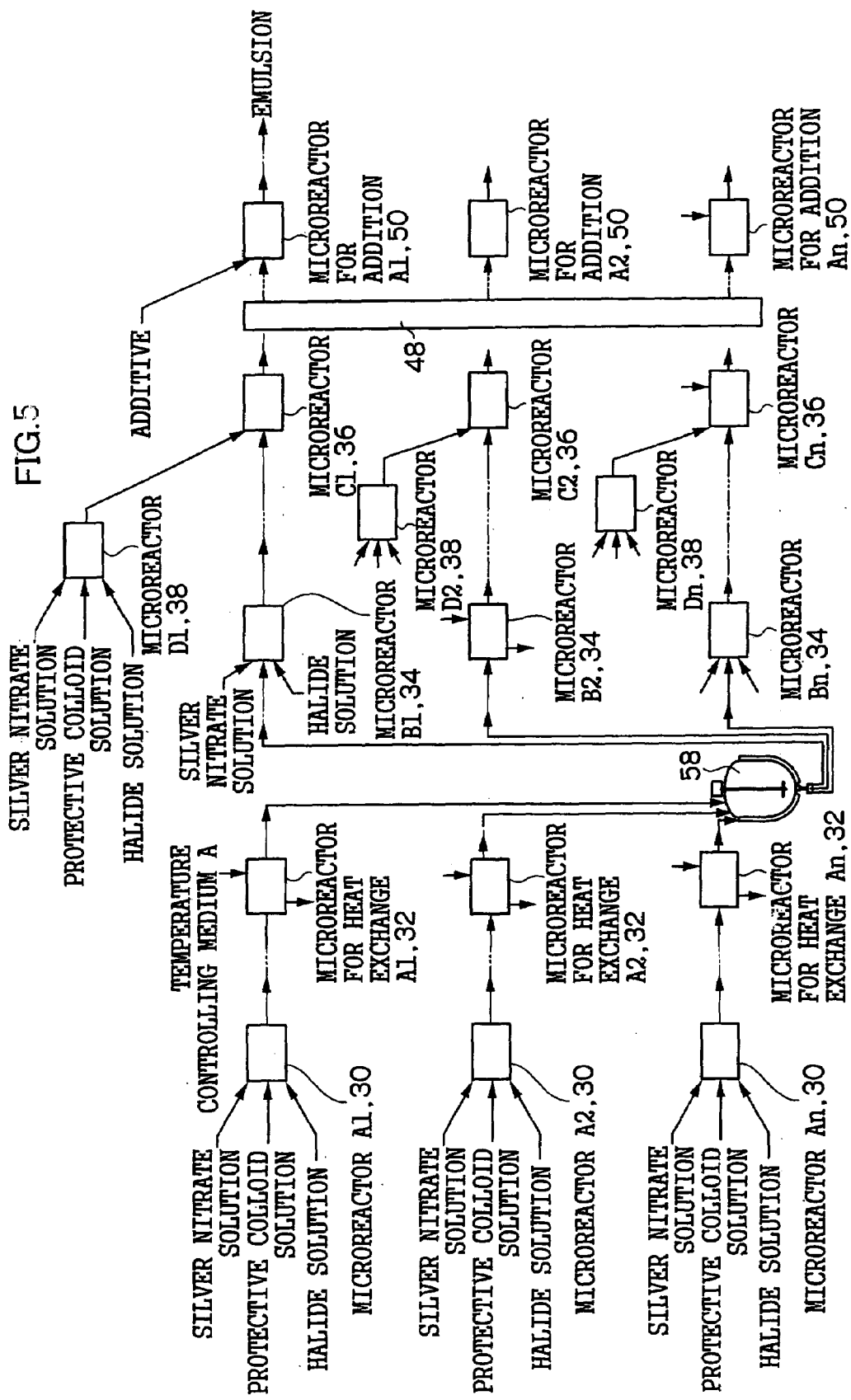
FIG. 5 is a schematic structural explanatory diagram showing the whole of a production apparatus of silver halide photographic emulsion of a third structural example according to the second embodiment of the invention.

Next, a third structural example of the second embodiment will be described with reference to a whole schematic structural view of FIG. 5 showing a production system. In the production system according to the third structural example as shown in FIG. 5, in the structure for scaling up the production scale by using plural production apparatuses of silver halide photographic emulsion in parallel, each of which is constituted to have a single line in series using the foregoing microreactor shown in FIG. 1, a part of process or treatment is separated and can be performed.

In the production apparatus of the silver halide photographic emulsion according to the third structural example, the liquid chemicals for producing the emulsion which have been subjected to the nucleus forming process by a plurality of microreactors A30 provided in parallel and have been fed, and in which microcrystals of silver halide are dispersed in an aqueous protective colloid solution, are introduced into respective heat exchange microreactors A32. The liquid chemicals for producing the emulsion subjected to temperature control and adjusted to predetermined temperature by the respective reactors are collected by respective liquid guiding pipes 56 and are stored in a storage tank 58.

In this storage tank 58, if necessary, the temperature adjustment and agitation of the liquid chemicals for producing the emulsion are performed by using a temperature control means of the liquid chemicals for producing the emulsion and an agitating means, and the liquid chemicals for producing the emulsion are mixed to be uniform, and can be stored under suitable conditions.

Next, in the production apparatus of the third structural example, the liquid chemicals for producing the emulsion stored in the storage tank 58 are distributed to a plurality of microreactors (B1 to Bn) 34 through the respective liquid guiding pipes 56 at predetermined timing and the first crystal growing process is carried out.

Incidentally, the storage tank 58 may be installed at a single place or plural places between the respective processes as occasion demands.

In the production apparatus of the silver halide photographic emulsion according to the third structural example structured as stated above, as exemplified in FIG. 5, the storage tank 58 is installed between the nucleus forming process and the first crystal growing process in the pre-ripening process, so that the operation can be made to proceed in such a way that only the nucleus forming process is first performed, and at a subsequent suitable point of time, each of the subsequent second crystal growing process and the after-ripening process is performed.

In the production apparatus of the silver halide photographic emulsion according to the third structural example, the plural microreactors A30 provided in parallel and the heat exchange microreactors A32 to make counterparts thereto are respectively divided into a plurality of groups, nuclei having different in characteristics are formed in the respective groups, the liquid chemicals for producing the emulsion containing the nuclei having different characteristics are collected through the respective liquid guiding pipes 56, are collected in the storage tank 58, and are blended to be uniform for use.

Further, the uniform liquid chemicals for producing an emulsion containing the nuclei having the same characteristics which have been collected in the storage tank 58 are supplied to those obtained by dividing plural microreactors B34, microreactors C36, microreactors D38, desalting devices 48 and microreactors for addition A50, which are provided in parallel, into a plurality of groups, respectively. The second crystal growing process, after-ripening process, and liquid preparation process that are different from each other for each group are carried out, so that the silver halide photographic emulsions having different characteristics can be produced.

In addition, in a configuration (not shown) in which a plurality of the production apparatuses of silver halide photographic emulsion constituted to have a single line in series using the foregoing microreactor shown in FIG. 1, are used in parallel to scale up the production scale, the plurality of single lines in series are put together to make one-system production apparatus, the plural lines of the one system are divided into two or more groups, and the silver halide photographic emulsions having different characteristics or other chemicals may be produced for each group. In this case, the number of parallel lines in one system is from 1 to 10000, preferably from 1 to 100. Further, the number of parallel systems in multiple systems is from 1 to 10000, preferably from 1 to 100.

In this way, a plurality of production apparatuses of silver halide photographic emulsion, each of which is constituted to have a single line in series, are put together to form one-system production apparatus, the one-system production apparatus is divided into two or more groups, and two or more kinds of emulsions are simultaneously produced in the respective groups, so that multiple kinds of emulsions can efficiently be carried out.

By constructing the production system in this way, each of the production apparatuses of the silver halide photographic emulsion having a number of single lines in series can be effectively used.

Further, only a desired portion in the production apparatuses of the silver halide photographic emulsion having a number of series of single lines for constituting the production system is used for performing the process corresponding to the portion, so that the production system is effectively used in part.

Since the structure, operation and effect of the third structural example of the second embodiment other than the above description are the same as the first embodiment or the first structural example of the second embodiment, the detailed descriptions are omitted.

In a configuration (not shown) in which a plurality of the production apparatuses of silver halide photographic emulsion constituted to have a single line in series using the foregoing microreactor shown in FIG. 1, are used in parallel to scale up the production scale, the total production quantity can be controlled by the number of the production apparatuses of silver halide photographic emulsion, each of which is constituted to have a single line in series and is simultaneously used in parallel, and their operation time. In addition a high quality and high performance of the silver halide photographic emulsion thus produced can be kept constant.

Thus, in the case where a desired quantity of silver halide photographic emulsion is produced, for example, when it is desired to produce only a desired quantity of silver halide photographic emulsion in a short time, the production apparatuses of the silver halide photographic emulsion having a relatively large number of lines in series corresponding to the desired quantity is used for production, and when a desired quantity of silver halide photographic emulsion is produced over a long period of time, the production apparatuses of the silver halide photographic emulsion having a relatively small number of lines in series is used for production, so that the high quality, high performance and uniform silver halide photographic emulsion can be produced.

Further, in the case where a predetermined quantity of silver halide photographic emulsion is produced in a predetermined time, the total number of production apparatuses of silver halide photographic emulsion to be used, each of which is constituted to have a single line in series, is calculated from the production quantity per unit in the production apparatus of the silver halide photographic emulsion having the single line in series and a predetermined production time, and a so-called tailor-made production apparatus satisfying these conditions can be temporarily or permanently constituted.

That is, by adjusting the number (so-called line number) of production apparatuses of silver halide photographic emulsion, to be used simultaneously in parallel, and the production time, each of the apparatuses being constituted to have a single line in series, it is possible to constitute a collective unit of the production apparatuses of silver halide photographic emulsion, which meets an arbitrary production quantity in total, and can produce the high quality, high performance and uniform silver halide photographic emulsion.

In this way, for example, in the case where the silver halide photographic emulsion is produced by the batch system using a tank having a large capacity as in a conventional manner, only a fixed large quantity of silver halide photographic emulsion can be produced, so that an excess amount of silver halide photographic emulsion must be discarded and wasted, but in the production apparatus of the silver halide photographic emulsion constituted to have the single line in series according to this embodiment, the waste can be eliminated.

Further, in a conventional method, when the silver halide photographic emulsion is manufactured by a batch system using a tank having a large capacity, the time required for completing one production operation is constant. However, according to the present embodiment, the production apparatus of the silver halide photographic emulsion constituted to have a single line in series has adaptability, for example, the production time can be shortened or lengthened, so that the cooperation with other production lines is realized, and the productivity can be improved as a whole.

In addition, in a conventional method, when the silver halide photographic emulsion is manufactured by a batch system using a tank having a large capacity, the performance and quality of the silver halide photographic emulsions produced by the tank having a large capacity deviate slightly from each other. In contrast, in the production apparatus of the silver halide photographic emulsion constituted to have the single line in series according to the present embodiment, the performance and quality of all of the produced silver halide photographic emulsions can be made uniform.

Next, a third embodiment of the present invention will be described with reference to FIGS. 6 to 8.

The gist of the third embodiment is as follows.

First, a production apparatus of silver halide photographic emulsion is constituted by a nuclei forming and two-liquid mixing microreactor for producing a sliver halide grain by introducing a silver salt solution and a halide solution to cause a silver ion and a halogen ion to react with each other, and a nuclei stabilizing and two-liquid mixing microreactor for introducing a reaction solution which has been subjected to a silver halide nucleus forming reaction by being connected to the nucleus forming and two-liquid mixing microreactor, and introducing water or an aqueous protective colloid solution to instantaneously mix the reaction solution and the water or the aqueous protective colloid solution, so that a distance between nucleus grains is extended to stabilize the nucleus grains.

By the constitution as described above, immediately after the nuclei of silver halide are formed by the nucleus forming reaction microreactor, the reaction solution is introduced into the nucleus grain stabilizing microreactor, the reaction solution and the water or the aqueous protective colloid solution are instantaneously mixed to extend the distance between the nucleus grains and the process of stabilizing the nucleus grains is performed, so that the grains are separated as far as possible so as not to occur a nucleus forming reaction and a grain growth reaction simultaneously, and after the nucleus grains of the silver halide emulsion formed by the nucleus forming reaction are stably taken out, the grain growth reaction is suitably promoted, so that monodispersed silver halide emulsion grains can be finally produced.

Further, the silver halide photographic emulsions having uniform emulsion performance can be produced by the microreactor. In addition, since the microreactor is used, a small production system can be easily scaled up to a mass production system, and the emulsion production is enabled at an optimum production scale corresponding to a required production quantity.

Second, a production apparatus of silver halide photographic emulsion is constituted by a nucleus forming reaction and three-liquid mixing microreactor for producing nucleus grains of silver halide by introducing water or an aqueous protective colloid solution from a first flow passage to form a straightened lamella-shaped laminar flow, introducing a silver salt solution from a second flow passages to form a straightened lamella-shaped laminar flow, bringing the silver salt solution into contact with one contact interface of the laminar flow of the water or the aqueous protective colloid solution, and introducing a halide solution from a third flow passage to form a straightened lamella-shaped laminar flow, and bringing the halide solution, as the straightened flow of the thin layer, into contact with the other contact interface of the laminar flow of the water or the aqueous protective colloid solution so as not come into direct contact with the laminar flow of the silver salt solution, so that a silver ion and a halogen ion are diffused and moved in the water or the aqueous protective colloid solution to allow to react with each other; and a nucleus grain stabilizing and two-liquid mixing microreactor for introducing a reaction solution which contains the water or the aqueous protective colloid solution and is subjected to a silver halide nucleus forming reaction by being connected to the nucleus forming reaction and three-liquid mixing microreactor, and newly introducing water or an aqueous protective colloid solution to instantaneously mix the reaction solution and the new water or the aqueous protective colloid solution, so that a distance between nucleus grains is extended to stabilize the nucleus grains.

By the constitution as described above, in the inside of the nucleus forming reaction and three-liquid mixing microreactor, when viewed microscopically, a single silver ion and a single halogen ion dispersed at suitable intervals in the water or the aqueous protective colloid solution meet each other in one-to-one correspondence, and are bonded to form a nucleus. The control is performed such that heat generated at this time is absorbed by the water or the aqueous protective colloid solution around the nuclei of silver halide to suppress the Ostwald ripening, so that the nuclei are separated so as not to occur a nucleus forming reaction and a grain growth reaction simultaneously, the nuclei of silver halide formed by the nucleus forming reaction are stably taken out, the reaction solution containing the nuclei of silver halide is introduced into the nucleus grain stabilizing and two-liquid mixing microreactor, and the reaction solution and the water or the aqueous protective colloid solution are instantaneously mixed to further extend the distance between the nucleus grains and to perform the process of stabilizing the nucleus grains, so that the grains are sufficiently separated so as not to occur the nucleus forming reaction and the grain growth reaction simultaneously, and after the nucleus grain of silver halide emulsion formed by the nucleus forming reaction is stably taken out, the grain growth reaction is suitably accelerated, so that the monodispersed silver halide emulsion particles can be finally produced. That is, the size distribution of the nucleus grains is made narrow so that the crystals of the nucleus grains become only those having a desired single crystal structure, and it becomes possible to unify the shape, size and number of the nucleus grains, the growth reaction becomes easy to perform, and the crystal shape of the final grain and the size distribution can be made more uniform.

It is also possible to produce the silver halide photographic emulsion having uniform emulsion performance by the microreactor. Further, since the microreactor is used, a small production system can be easily scaled up to a mass production system, and, the emulsion can be produced at an optimum production scale corresponding to a required production quantity.

Third, in the production apparatus of the silver halide photographic emulsion as described above in the first or the second, temperature control means for performing a temperature control of an objective reaction solution is provided in the nucleus forming and two-liquid or three-liquid mixing microreactor and/or the nucleus grain stabilizing and two-liquid mixing microreactor.

By the constitution as described above, the nucleus forming and two-liquid or three-liquid mixing microreactor and/or the nucleus grain stabilizing and two-liquid mixing microreactor makes a heat exchange with the objective reaction solution introduced into the inside of the microreactor by the temperature control means to perform a rapid temperature control of the objective reaction solution. By this, the nucleus forming and two-liquid or three-liquid mixing microreactor and/or the nucleus stabilizing and two-liquid mixing microreactor, which are provided with the temperature control means, suitably executes the temperature control at the time when the silver halide nucleus forming reaction is made to occur, and the silver halide nucleus forming reaction can be more precisely controlled.

Namely, in the nucleus forming and two-liquid or three-liquid mixing microreactor and/or the nucleus grain stabilizing and two-liquid mixing microreactor, which are provided with the temperature control means, since heat energy is transmitted in an infinitesimal state in which the reaction solutions form thin layers, the temperature change rapidly takes place to the objective set temperature, so that it can be said that a deviation of timing of temperature change does not occur between the infinitesimal reaction solutions forming the thin layers in the inside of the microreactor. Thus, it is possible to prevent difference in the formed chemical materials due to the difference in the history of temperature change.

Further, in the case where the temperature control is performed by the nucleus forming and two-liquid or three-liquid mixing microreactor and/or the nucleus stabilizing and two-liquid mixing microreactor, which are provided with the temperature control means, the heat energy is exchanged with the infinitesimal reaction solutions which form the thin layers and flow in the inside of the microreactor, and the temperature change of the reaction solutions is completed in a short time. Thus, in the case where the temperature control is performed by the nucleus forming and two-liquid or three-liquid mixing microreactor and/or the nucleus stabilizing and two-liquid mixing microreactor, which are provided with the temperature control means, a waiting time from the start of the temperature change of the reaction solutions to the completion is eliminated, and the total processing time can be greatly reduced. In addition, in the case where temperature control is performed by the nucleus forming and two-liquid or three-liquid mixing microreactor and/or the nucleus stabilizing and two-liquid mixing microreactor, which are provided with the temperature control means, the rate of the temperature change of the liquid chemicals for producing the emulsion is high (high responsiveness to the temperature change), and there is no stagnation and no recycling flow, so that the control operation of temperature of the liquid chemicals for producing the emulsion can be precisely controlled, and an appropriate silver halide photographic emulsion can be produced by a subsequent process.

(Third Embodiment)

Figure 6:
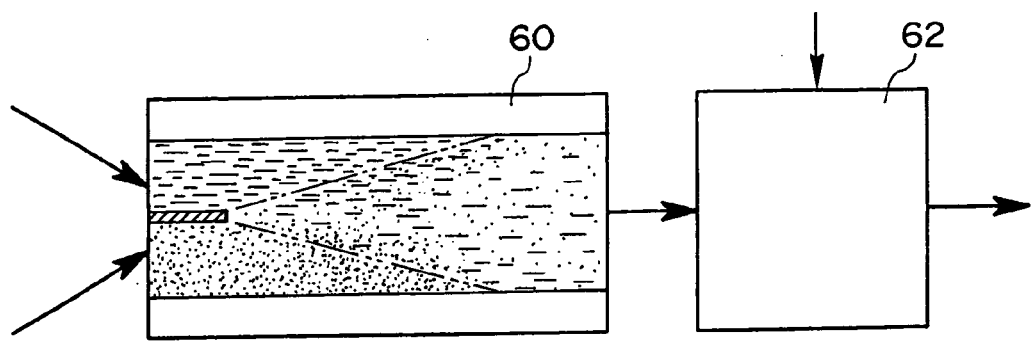
FIG. 6 is a schematic structural explanatory diagram showing a structural example of a nucleus forming reaction microreactor for mixing two liquids and a nucleus growing reaction controlling microreactor in a silver halide photographic emulsion production apparatus according to a third embodiment of the invention.

FIG. 6 is a schematic view of a nucleus forming reaction microreactor 60 for performing a nucleus forming process in the grain formation of a silver halide emulsion in a pre-ripening process in a production apparatus of silver halide photographic emulsion of the invention and a nucleus growth reaction controlling microreactor 62 (corresponding to the process of the microreactor A30 of FIG. 1).

The pair of the nucleus forming reaction microreactor 60 and the nucleus growth reaction controlling microreactor 62 are designed such that a nucleus forming reaction and a grain growth reaction during the time of grain formation of silver halide photographic emulsion is separated as far as possible so that the nucleus forming reaction and the grain growth reaction do not simultaneously occur at the time of the formation of the silver halide grains, and after the nucleus grains of the silver halide emulsion formed by the nucleus forming reaction is stably taken out, the grain growth reaction is suitably accelerated, whereby the monodispersed silver halide emulsion grain can be finally produced.

The nucleus forming reaction microreactor 60 can be constituted by using a general two-liquid mixing microreactor.

Here, the nucleus forming reaction microreactor 60 is formed such that a first flow passage into which a silver salt solution (fluid 1) flows and a second flow passage into which a halide solution (fluid 2) flows are formed, and parts of these two flow passages come in contact with each other.

Further, the nucleus forming reaction microreactor 60 is constituted as a device for continuously forming silver halide grains, in which each of these two fluids 1 and 2 (silver salt solution and halide solution) substantially forms a thin layer, an open interface is formed between the adjacent fluids 1 and 2 (silver salt solution and halide solution), the thicknesses of the thin layers of these two fluids 1 and 2 (silver salt solution and halide solution) become 1 to 900 µm per layer in the normal direction of the contact interface, a silver ion and a halogen ion diffuse and move to the interface formed by the silver salt solution and the halide solution, and the silver ion and the halogen ion react with each other, so that the silver halide grain is continuously produced.

In the nucleus forming reaction microreactor 60, since the nucleus formation is performed while the laminar flow flows in one direction, the so-called local recycling in which nuclei circularly flow does not occur. Thus, when the nucleus formation is performed, it is possible to prevent the occurrence of such a state that the so-called local recycling occurs in which the once formed nuclei circularly flow and the growth simultaneously takes place.

In the case where the nucleus forming process is performed by using the nucleus forming reaction microreactor 60, when viewed microscopically, a single silver ion and a single halogen ion are bonded in one-to-one correspondence. When a control is performed to absorb heat generated at this time and to suppress Ostwald ripening, a reaction for suitably forming desired nuclei can be stably performed.

In addition, similarly to the nucleus forming reaction microreactor 60, the nucleus growth controlling microreactor 62 is constituted as a general two-liquid mixing microreactor, and a first flow passage for leading a reaction solution (fluid 1) sent from the nucleus forming reaction microreactor 60 and a second flow passage for leading water or an aqueous protective colloid solution (fluid 2) are formed, so that parts of these two flow passages come in contact with each other.

Further, the nucleus growth controlling microreactor 62 is connected to a process liquid discharge port of the nucleus forming reaction microreactor 60 and is disposed so that at the point of time when 60% or more, preferably 90% or more of the silver halide nucleus forming reaction occurring by diffusion in the nucleus forming reaction microreactor 60 is ended, this reaction solution is introduced to the nucleus growth reaction controlling microreactor 62.

The nucleus growth reaction controlling microreactor 62 uses the function of instantaneously mixing the reaction solution introduced from the first flow passage and the water or the aqueous protective colloid solution introduced from the second flow passage, and performs a process of extending a distance between nucleus grains by making the water or the aqueous protective colloid solution intervene between the nucleus grains formed by the nucleus forming reaction.

When the distance between nucleus grains immediately after the nucleus forming reaction is instantaneously spread by the nucleus growth controlling microreactor 62 as stated above, since the nucleus forming reaction and the grain growth reaction can be separated while the nucleus forming reaction and the grain growth reaction do not occur simultaneously, after the nucleus grain of the silver halide emulsion formed by the nucleus forming reaction is stably taken out, it can be suitably guided to a process of performing the grain growth reaction.

That is, the size distribution of nucleus grains is made narrow so that crystals of nucleus grains become only those having desired single crystalline structures exemplified in FIGS. 13A, 13B, 13C, 13D or 13E, and the shape, size and number of nucleus grains can be made uniform, so that the growth reaction becomes easy to perform, and the crystal shape of the final grain and the size distribution can be made more uniform.

The nucleus forming reaction microreactor 60 and the nucleus growth reaction controlling microreactor 62 are provided with temperature control means capable of controlling temperatures of an objective fluid at a rate of 3° C. per minute, preferably 5° C. or higher by making a heat exchange between the objective fluid introduced into the inside of the reactor and a temperature controlling medium separately introduced thereto.

In the case where the nucleus forming reaction microreactor 60 and the nucleus growth controlling microreactor 62 are constituted as stated above, the temperature control at the time of performing the silver halide nucleus forming reaction is suitably performed, and the silver halide nucleus forming reaction can be more precisely controlled.

That is, in the case where the liquid chemicals for producing the emulsion in which the nucleus of silver halide is dispersed in the aqueous protective colloid solution is introduced in the inside of the nucleus forming reaction microreactor 60 by using the nucleus forming reaction microreactor 60 and the nucleus growth controlling microreactor 62 provided with the temperature control means, and the temperature control is executed by making the heat exchange with the temperature control medium, since the heat energy is transmitted in an infinitesimal state in which the liquid chemicals for producing the emulsion forms the thin layer, the temperature change is quickly performed to an objective set temperature.

Thus, in the case where the temperature control is performed by the temperature control means of the microreactor, since it can be said that a deviation of the timing of the temperature change does not occur between the infinitesimal liquid chemicals for producing an emulsion forming the thin layers, it is possible to prevent a difference caused by a difference in the history of the temperature change from occurring in the formed chemical materials.

Further, in the case where the temperature control is performed by the temperature control means of the microreactor, the heat energy is exchanged with the infinitesimal liquid chemicals for producing an emulsion forming the thin layer and flowing in the inside of the microreactor, and the temperature change of the liquid chemicals for producing the emulsion is completed.

Thus, in the case where the temperature control is executed by the temperature control means of the microreactor, it is possible to eliminate a waiting time from the start of the temperature change of the liquid chemicals for producing the emulsion to the completion. For example, in the case where a large quantity of liquid chemicals for producing an emulsion is stored in a large tank, and a method of heating through the outer peripheral wall of this tank is used, it takes a long waiting time (waiting time of order of hours) for the large quantity of liquid chemicals for producing an emulsion in the large tank to be changed to a predetermined temperature, whereas in the case where the temperature control is performed by the microreactor having the temperature control means, this long waiting time (loss time) is omitted and the process time can be greatly shortened.

In addition to this, in the case where the temperature control is executed by the temperature control means of the microreactor, the rate of the temperature change of the liquid chemicals for producing the emulsion is high (high responsiveness to the temperature change), and there is no stagnation and no recycling flow, so that the control operation of temperature to the liquid chemicals for producing the emulsion can be precisely controlled, and accordingly, it is suitably used for the nucleus forming process of silver halide in which temperature is a dominant factor of chemical change.

Next, a structural example of the third embodiment shown in FIG. 7 will be described. FIG. 7 is a schematic view of a nucleus forming reaction microreactor 64 for performing a nucleus forming process in grain formation of a silver halide emulsion in a pre-ripening process concerning a production apparatus of silver halide photographic emulsion of the invention and a nucleus growth reaction controlling microreactor 66 (corresponding to the process of the microreactor A30 of FIG. 1).

The nucleus forming reaction microreactor 64 is constituted as a three-liquid mixing microreactor.

Here, the nucleus forming reaction microreactor 64 is formed such that a first flow passage for leading a silver salt solution (fluid 1), a second flow passage for leading a halide solution (fluid 2), and a third flow passage for leading water or an aqueous protective colloid solution (fluid 3) as an intermediate layer for preventing the former two solutions from immediately coming in contact with each other are formed, and adjacent parts of these three flow passages come in contact with each other.

Further, the nucleus forming reaction microreactor 64 is constituted as such a device that these three fluids 1, 2 (the silver salt solution and the halide solution) substantially form thin layers, open interfaces are formed between adjacent ones of the fluids 1, 2 and 3 (the silver salt solution, the halide solution, and the water or the aqueous protective colloid solution), the thicknesses of the thin layers of these three fluids 1, 2 and 3 (the silver salt solution, the halide solution, and the water or the aqueous protective colloid solution) become 1 to 900 µm per layer in the normal direction of the contact interface, a silver ion and a halogen ion diffuse and move to the intermediate layer of the water or the aqueous protective colloid solution provided between the silver salt solution and the halide solution, and the silver ion and the halogen ion react with each other so that a silver halide grain is continuously produced.

In the nucleus forming reaction microreactor 64, since the nucleus formation is performed while the laminar flow flows in one direction, the so-called local recycling in which nuclei circularly flow does not occur. Thus, when the nucleus formation is performed, it is possible to prevent the occurrence of such a state that the so-called local recycling occurs in which the once formed nuclei circularly flow and the growth simultaneously takes place.

In the case where the nucleus forming reaction microreactor 64 is used for performing the nucleus forming process, when viewed microscopically, a single silver ion and a single halogen ion are bonded to each other in one-to-one correspondence. By performing the control to absorb heat generated at this time and to suppress Ostwald ripening, the reaction of suitably forming desired nuclei can be stably performed.

Further, the nucleus growth reaction controlling microreactor 66 is connected to a process liquid discharge port of the nucleus forming reaction microreactor 64 and is disposed so that at the point of time when 60% or more, preferably 90% or more of the silver halide nucleus forming reaction occurring by diffusion in the nucleus forming reaction microreactor 64 is ended, this reaction solution is introduced to the nucleus growth reaction controlling microreactor 66.

The nucleus growth reaction controlling microreactor 66 performs a process of spreading a distance between nucleus grains by the operation of instantaneously mixing the reaction solution introduced from the first flow passage and the water or the aqueous protective colloid solution newly introduced from the second flow passage and by making the water or the aqueous protective colloid solution intervene between the nucleus grains formed by the nucleus forming reaction.

When the distance between grains immediately after the nucleus forming reaction is instantaneously extended relatively largely by the nucleus growth reaction controlling microreactor 66 as stated above, since the nucleus forming reaction and the grain growth reaction can be sufficiently separated while this nucleus forming reaction and the grain growth reaction do not occur simultaneously, after the nucleus grains of the silver halide emulsion formed by the nucleus forming reaction is stably taken out, it can be suitably guided to the process of performing the grain growth reaction.

The nucleus forming reaction microreactor 64 and the nucleus growth reaction controlling microreactor 66 are constituted such that a heat exchange is made between an objective fluid introduced into the inside of the reactors and a temperature controlling medium separately introduced, so that a temperature control of the objective fluid can be performed at a rate of 3° C. per minute, preferably 5° C. or more.

In the case where the nucleus forming reaction microreactor 64 and the nucleus growth reaction controlling microreactor 66 are constituted as stated above, the temperature control when the silver halide nucleus forming reaction is performed is suitably performed, and the silver halide nucleus forming reaction can be more precisely controlled.

Next, a structural example of the third embodiment shown in FIG. 8 will be described. FIG. 8 is a schematic view of a pre-processing microreactor 68 for performing a nucleus forming process in grain formation of the silver halide emulsion in the pre-ripening process concerning the production apparatus of silver halide photographic emulsion of the present invention and a nucleus forming reaction microreactor 70 (corresponding to the process of the microreactor A30 of FIG. 1).

Figure 7:
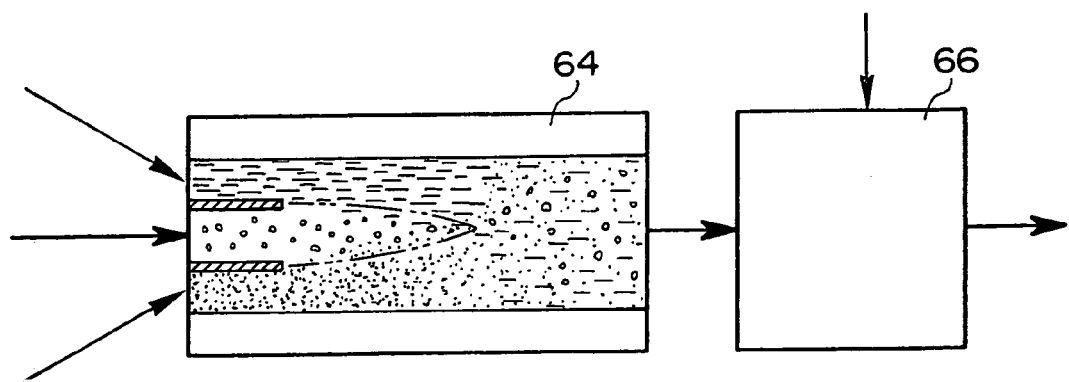
FIG. 7 is a schematic structural explanatory diagram showing a structural example of a nucleus forming reaction microreactor for mixing three liquids and a nucleus growing reaction-controlling microreactor in the silver halide photographic emulsion production apparatus according to the third embodiment of the invention.

Similarly to the structure shown in FIGS. 6 and 7, monodispersed silver halide emulsion grains can finally be produced by the pair of the pre-processing microreactor 68 and the nucleus forming reaction microreactor 70 by separating the nucleus forming reaction and the grain growth reaction at the time of grain formation of silver halide emulsion as far as possible so that the nucleus forming reaction and the grain growth reaction do not simultaneously occur at the time of formation of the silver halide grains, and by suitably accelerating the grain growth reaction after the nucleus grains of the silver halide emulsion formed by the nucleus forming reaction is taken out.

The pre-processing microreactor 68 and the nucleus forming reaction microreactor 70 can be respectively constituted by using general two-liquid mixing microreactors.

Here, the pre-processing microreactor 68 is formed such that a first passage for leading a halide solution (fluid 1) and a second flow passage for leading water or an aqueous protective-colloid solution (fluid 2) are formed, and parts of these two flow passages come in contact with each other.

Further, the pre-processing microreactor 68 is constituted as such a device that these two fluids 1 and 2 (the halide solution and the water or the aqueous protective colloid solution) substantially form thin layers, an open interface is formed between the adjacent fluids 1 and 2 (the halide solution and the water or the aqueous protective colloid solution), the thicknesses of the thin layers of these two fluids 1 and 2 (the halide solution and the water or the aqueous protective colloid solution) become 1 to 900 µm per layer in the normal direction of the contact interface.

Thus, in a microreactor 68, the interface is formed between the aqueous halide solution and the aqueous colloid solution, and halogen ions which are formed from the halide through ionic dissociation thereof diffuse into the interface, and subsequently, the halogen ions meet an aqueous silver nitrate solution in a microreactor 70, so that a sudden nucleus forming reaction does not take place. In other words, the halogen ions formed from the aqueous halide solution diffuse into a layer formed by the water or the aqueous protective colloid solution in accordance with the concentration gradient of the halogen ions. By utilizing the phenomenon, silver ions which diffuse from the aqueous silver nitrate solution added to a microreactor 70 into the layer supplied from the microreactor 68 react with the halogen ions supplied from the microreactor 68 in the vicinity of an interface formed therebetween in the microreactor 70, so that the supply of halogen ions for the nucleus forming reaction is controlled in a silver halide grain forming device.

The nucleus forming reaction microreactor 70 is constituted as a general two-liquid mixing microreactor, and is formed such that a first passage for leading a mixed liquid (fluid 1) sent from the pre-processing microreactor 68 and a second flow passage for leading a silver salt solution (fluid 2) are formed, and parts of these two flow passages come in contact with each other.

Further, the nucleus forming reaction microreactor 70 is constituted as such a device that these two fluids 1 and 2 (what is obtained by mixing the halide solution with the water or the aqueous protective colloid solution, and the silver salt solution) substantially form thin layers, an open interface is formed between the adjacent fluids 1 and 2 (what is obtained by mixing the halide solution with the water or the aqueous protective colloid solution, and the silver salt solution), the thicknesses of the thin layers of these two fluids 1 and 2 (what is obtained by mixing the halide solution with the water or the aqueous protective colloid solution, and the silver salt solution) become 1 to 900 µm per layer in the normal direction of the contact interface, a silver ion and a halogen ion move by diffusion to an interface formed by what is obtained by mixing the halide solution with the water or the aqueous protective colloid solution, and the silver salt solution, and the silver ion and the halogen ion react with each other, so that the silver halide grain is continuously produced in a state where the water or the aqueous protective colloid solution is made to intervene between the nucleus grains formed by the nucleus forming reaction to extend the distance between nucleus grains.

In the nucleus forming reaction microreactor 70, since the nucleus formation is performed while the flow of the laminar flow occurs in one direction, the so-called local recycling in which a nucleus circularly flows does not occur. Thus, when the nucleus formation is performed, it is possible to prevent the occurrence of such a state that the so-called local recycling occurs in which the once formed nuclei circularly flow and the growth simultaneously occurs.

The pre-processing microreactor 68 and the nucleus forming reaction microreactor 70 are constituted such that a heat exchange is made between an objective fluid introduced into the inside of the reactors and a temperature controlling medium separately introduced therein, so that the temperature control of the objective fluids can be performed at a rate of 3° C. per minute, preferably 5° C. or more per minute.

In the case where the pre-processing microreactor 68 and the nucleus forming reaction microreactor 70 are constituted as stated above, the temperature control when the silver halide nucleus forming reaction is performed is suitably performed, and the silver halide nucleus forming reaction can be more precisely controlled.

Incidentally, since the structure, operation and effect of the third embodiment other than the above description are similar to the first embodiment, the detailed descriptions are omitted.

Next, a fourth embodiment of the invention will be described with reference to FIG. 9.

The gist of the fourth embodiment is as follows.

First, a production apparatus of silver halide photographic emulsion is constituted by providing a reaction tank for producing a silver halide photographic emulsion, a circulating system for taking out a solution in the reaction tank to the outside and returning the solution to the reaction tank through a mixer, and a nucleus forming microreactor in which, silver halide grains, which are produced by causing a silver ion and a halogen ion to react with each other by introducing a silver salt solution and a halide solution, are supplied to the mixer and are mixed with the solution.

By the constitution as described above, the water or the aqueous protective colloid solution in which the nucleus of small crystal of silver halide formed by the nucleus forming microreactor is quickly mixed into the dispersion medium solution in the tank by the mixer. In this way, feeding can be performed such that the nuclei of silver halide having a desired shape and size formed by the nucleus forming reaction are uniformly dispersed into the reaction tank.

In this way, the size distribution of the nucleus grains can be made narrow, the shape, size and number of the nucleus grains can be made uniform, the growth reaction becomes easy to perform in the subsequent process, and the crystal shape of the final grain and the size distribution can be made more uniform. Thus, it is possible to obtain the silver halide photographic emulsion having a high aspect ratio, containing of tabular grains with a narrow grain size distribution, and uniform emulsion performance.

Further, since the microreactor is used, a small production system can be easily scaled up to a mass production system, and the emulsion can be produced at an optimum production scale corresponding to a required production quantity.

Second, the production apparatus of the silver halide photographic emulsion as described above in the first is constituted such that a potential of a system is measured by a pAg measurement device provided in the reaction tank or the circulating system, the flow volume of the silver nitrate solution and/or the halide solution added to the nucleus forming microreactor is controlled, so that the potential of the reaction system is controlled and the growth of nuclei is controlled.

By the constitution as described above, the operation of the nucleus growing process can be suitably performed in the reaction tank by automatic control.

Third, the production apparatus of the silver halide photographic emulsion as described in the first above is constituted such that a pH value of the reaction system is measured by a pH measurement device provided in the reaction tank or the circulating system, and an acid or alkali is added into the mixer or the reaction tank, so that the reaction in the mixer and/or the pH value of the solution in the reaction tank is controlled to a predetermined condition, and the growth of the nuclei is controlled.

By the constructing as described above, the operation of the nucleus growing process can be suitably performed in the reaction tank by the automatic control.

(Fourth Embodiment)

Figure 9:
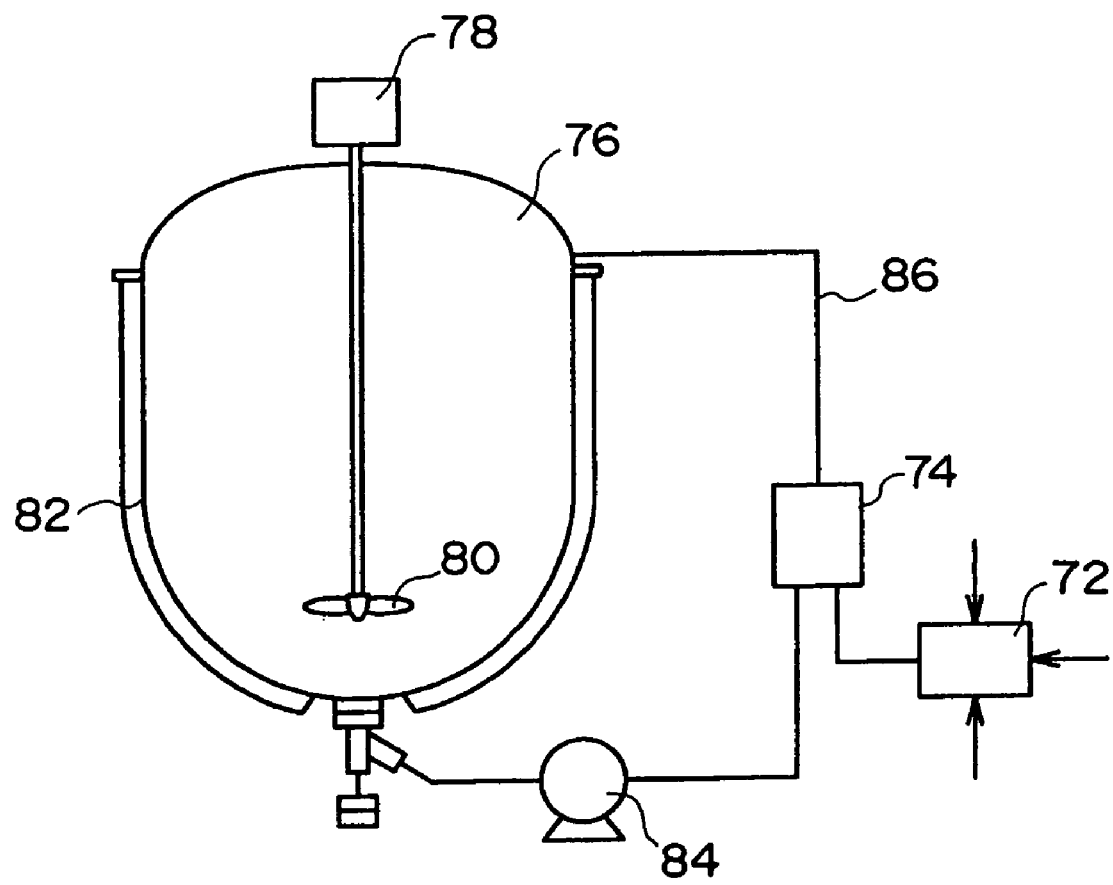
FIG. 9 is a schematic structural explanatory diagram showing a structure in which a nucleus forming process microreactor and a mixer are provided in a sidearm emulsion preparation for performing a nucleus forming process in the grain formation of silver halide emulsion at a pre-ripening process according to a fourth embodiment of the invention.

FIG. 9 is a schematic view exemplifying a structure in which a nucleus forming processing microreactor 72 and a mixer 74 are provided in a sidearm emulsion preparation for performing a nucleus forming process in the grain formation of a silver halide photographic emulsion in a pre-ripening process concerning a production apparatus of silver halide photographic emulsion of the invention.

As shown in FIG. 9, in the sidearm emulsion preparation, a tank 76 as a reaction container (may be a reaction tank for performing grain growth) is used. This tank 76 is constituted as a batch type reaction container device provided with an agitator capable of processing a fixed large quantity, for example, 1000 l (1 t) of liquid at a time.

An agitation vane 80 rotatively driven by a rotating driving force of a motor 78 is mounted in this tank 76 to agitate the solution filled in the inside of the tank.

Temperature control means 82 for heating or cooling the reaction solution is disposed on the outer peripheral surface of the tank 76 to perform the temperature control of the solution filled in the inside of the tank. This temperature control means 82 is constituted by using, for example, means for heating or cooling by causing a heat exchange medium (water, water vapor, liquid organic material, flame gas, etc.) to flow to a temperature control part or means for performing a temperature control by installing an element for electrically heating or cooling at the temperature control section.

This tank 76 is equipped with a sidearm pipe passage 86 of a circulating system in which the solution in the tank 76 is taken out from the bottom, is fed by a pump 84, and is discharged to a liquid surface side of the tank 76 through the mixer 74 to be returned into the tank 76.

In this sidearm pipe passage 86, it is desired that an addition liquid can be completely mixed with the solution in the tank in the shortest possible time, and it is not desirable that it takes a long time to mix the addition liquid with the solution in the tank 76, the addition liquid circulates in the inside of the sidearm pipe passage 86 or the mixer 74, or it is partially circulated in some portion. Therefore, the large capacity pump 84 is mounted to the sidearm pipe passage 86 and the solution in the tank 76 is made to flow at a relatively large flow volume.

The mixer 74 installed in the sidearm pipe passage 86 is constituted by providing a part of the flow passage in the sidearm pipe passage 86 provided outside of the tank 76, which leads to the mixer 74 from the tank 76 and again returns to the tank 76, and by a passage for supplying water or an aqueous protective colloid solution in which nuclei of small crystals of silver halide formed in the nucleus forming processing microreactor 72 are dispersed, to the part of this passage.

Further, this mixer 74 is constituted such that mechanical agitating means or static agitating means is used (it may be constituted as a mixing microreactor), and the liquid in which the nuclei of the small crystals of silver halide are dispersed can be uniformly and instantaneously mixed with a large quantity of solution flowing through the sidearm pipe passage 86 without causing partial circulation.

The nucleus forming processing microreactor 72 for supplying the liquid in which the nuclei of the small crystals of silver halide are dispersed, as the addition liquid, to this mixer 74 is constituted similarly to the foregoing nucleus forming reaction microreactor 64 exemplified in FIG. 7.

This nucleus forming reaction microreactor 72 is constituted as a three-liquid mixing microreactor.

Here, the nucleus forming reaction microreactor 72 is formed such that a first flow passage for leading a silver salt solution (fluid 1), a second flow passage for leading a halide solution (fluid 2), and a third flow passage for leading water or an aqueous protective colloid solution (fluid 3) as an intermediate layer for preventing the fluids 1 and 2 from immediately coming in contact with each other are provided, and adjacent parts of these three flow passages come in contact with each other.

Incidentally, in order to process a required quantity of liquid by the microreactor 72, a plurality of such microreactors 72 are used to obtain the required quantity.

Further, the nucleus forming reaction microreactor 72 is constituted such that these three fluids 1, 2 (the silver salt solution and the halide solution) substantially form thin layers, respectively, open interfaces are formed between adjacent ones of the fluids 1, 2 and 3 (the silver salt solution, the halide solution, and the water or the aqueous protective colloid solution), and the thicknesses of the thin layers of these three fluids 1, 2 and 3 (the silver salt solution, the halide solution, and the water or the aqueous protective colloid solution) are within the range of 1 to 900 μm in the normal direction of the contact interface, preferably from 1 μm to 300 μm. A silver ion and a halogen ion diffuse and move to the intermediate layer of the water or the aqueous protective colloid solution provided between the silver salt solution and the halide solution, and the silver ion and the halogen ion react with each other so that the silver halide grain is continuously produced.

In the nucleus forming processing microreactor 72, a mixing time using the laminar flow is from 0.5 second to 2 minutes, more preferably from 1 second to 1 minute. In the case of less than 0.5 second, although dependent on the diffusion distance or diffusion rate, mixing or a reaction accompanied by mixing can be insufficient, and in the case of more than 2 minutes, it is close to a batch type agitation container, and the effect of using the microreactor declines.

In the nucleus forming reaction microreactor 72, since the nucleus formation is performed while the flow of the laminar flow occurs in one direction, the so-called local recycling in which a nucleus circularly flows does not occur. Thus, when the nucleus formation is performed, it is possible to prevent the occurrence of such a state that the so-called local recycling occurs in which the once formed nuclei circularly flow and the growth simultaneously occurs.

In the case where the nucleus growing process is performed by this sidearm emulsion preparation, a predetermined quantity of an aqueous dispersion medium solution containing at least a dispersion medium and water is injected into the tank 76 from an emulsion introduction pipe. Further, the motor 78 is driven and the agitation vane 80 is driven to be rotated to cause agitation, the temperature control is performed by the temperature control means 82 to keep the reaction solution in the tank 76 within a predetermined temperature range (for example, 5° C. to 45° C.), a state is produced in which for example, nuclei of minute tabular grains including a parallel twinning plane can be formed, and the pump 84 is driven to set a state where the aqueous dispersion medium solution is circulated in the side arm pipe 86.

When the nucleus forming process is performed by the sidearm emulsion preparation, since the water or the aqueous protective colloid solution in which the nuclei of the small crystals of silver halide produced by the nucleus forming processing microreactor 72 are rapidly mixed with the aqueous dispersion medium solution in the tank 76 by the mixer 74, the aqueous dispersion medium solution, together with the water or the aqueous protective colloid solution, is made to intervene between the nucleus grains formed by the nucleus forming reaction to further spread the distance between the nucleus grains, so that the nucleus forming reaction and the grain growth reaction do not simultaneously occur, and the nucleus grains of the silver halide emulsion formed by the nucleus forming reaction can be stably stored in the tank 76.

In this way, the size distribution of the nucleus grains is made narrow, and the shape, size and number of the nucleus grains can be made uniform, the growth reaction in the subsequent process becomes easy to perform, and the crystal shape of the final grains and the size distribution can be made more uniform. For example, it is possible to obtain the silver halide photographic emulsion having a high aspect ratio and containing tabular grains having a narrow grain size distribution.

Although not shown, in the fourth embodiment, instead of the nucleus forming processing microreactor 72 and the mixer 74 in the sidearm emulsion preparation of performing the nucleus forming process, a mixer provided outside of the tank 76 may be constituted by providing a flow passage 1 for supplying a halide solution, a flow passage 2 for supplying a silver nitrate solution, and a flow passage 3 for supplying a solution containing protective colloid in the tank 76 from a flow passage extending from the tank 76 to the mixer and again returning to the tank 76, and by using a nucleus forming processing microreactor.

In the fourth embodiment, in the case where a structure is adopted such that a process for growing nuclei is performed in the tank 76, the potential of the system is measured by a pAg measurement device provided in the tank 76 or the sidearm pipe passage 86, the flow rate of the silver nitrate solution and/or halide solution to be added to the nucleus forming processing microreactor 72 is controlled to control the potential of the reaction system, and the growth of the nuclei can be controlled.

Further, in the fourth embodiment, in the case where a structure is adopted such that a process of growing nuclei is performed in the tank 76, pH value of the reaction system is measured by a pH measurement device provided in the tank 76 or the sidearm pipe passage 86, an acid or alkali is added to the mixer 74 or the tank 76 so that the reaction in the mixer 74 and/or the pH value of the solution in the tank 76 is controlled to a predetermined condition, and the growth of the nuclei can be controlled.

Since the structure, operation and effect of the fourth embodiment other than the above descriptions are the same as those of the third embodiment, the descriptions are omitted.

Figure 11:
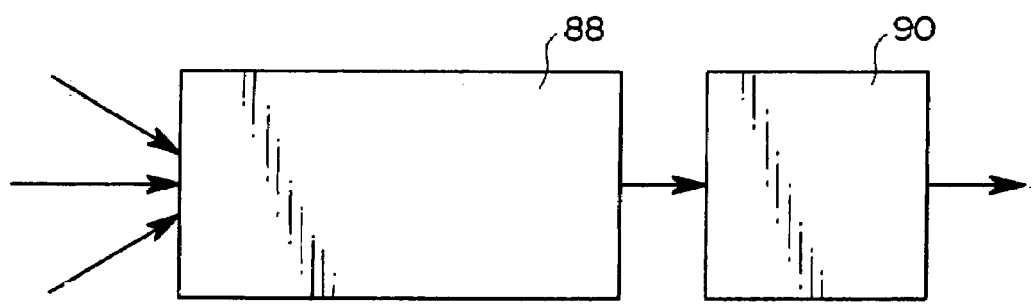
FIG. 11 is a schematic structural diagram showing a nucleus forming reaction and physical ripening reaction microreactor and a micro heat exchanger, in which a nucleus forming process in the grain forming process of silver halide emulsion is performed, nucleus growth is temporarily stopped at the stage when desired nuclei are formed so as to lead to the subsequent grain growing reaction in the pre-ripening process according to the fifth embodiment of the invention.
Figure 12:
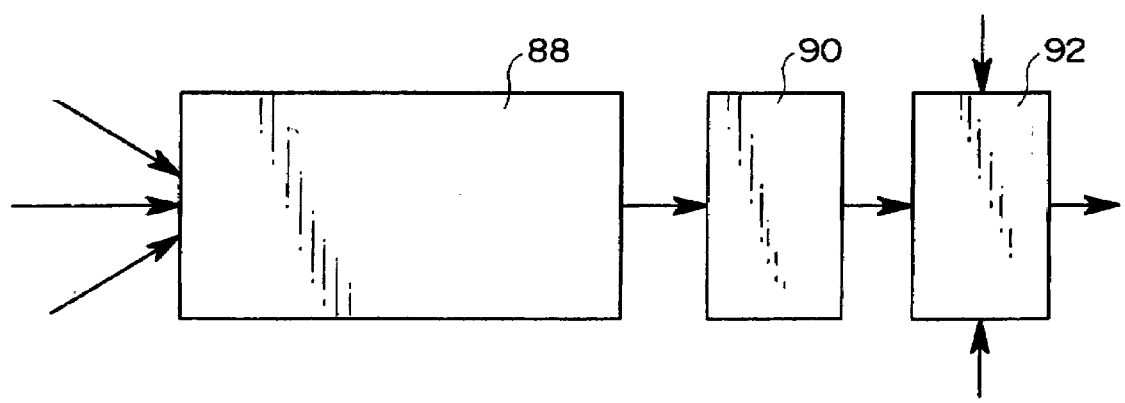
FIG. 12 is a schematic structural diagram showing a nucleus forming reaction and physical ripening reaction microreactor, a micro heat exchanger, and a nucleus growing microreactor, in which a nucleus forming process in the grain forming of silver halide emulsion is performed, nucleus growth is temporarily stopped at a stage when desired nuclei are formed to continue the subsequent physical ripening reaction in the pre-ripening process of the fifth embodiment of the invention.
Figure 13E:
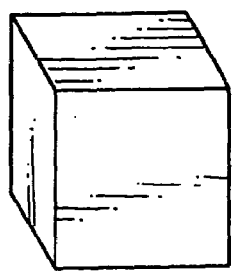
FIGS. 13A, 13B, 13C, 13D and 13E are perspective views exemplifying crystal structures of nuclei when the nucleus formation is performed by the production method and the production apparatus for a silver halide photographic emulsion of the invention.
Figure 13D:
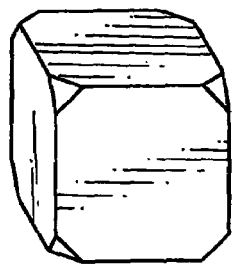
Figure 13C:
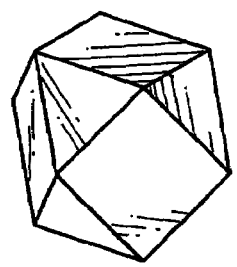
Figure 13B:
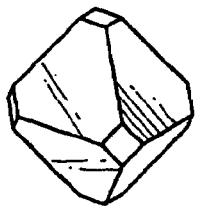
Figure 13A:
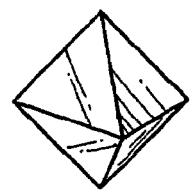

Next, a fifth embodiment of the invention will be described with reference to FIGS. 10 to 12.

The gist of the fifth embodiment is as follows.

First, a production apparatus of silver halide photographic emulsion is constituted by providing a nucleus forming and two-liquid mixing microreactor for forming silver halide grains by introducing a silver salt solution and a halide solution and causing a silver ion and a halogen ion to react with each other, and a temperature control means constituted such that a change control is enabled to a temperature at which a diffusion rate of the silver ion and the halogen ion becomes 1.1 times or more, preferably 1.5 times or more as high as a diffusion rate of a reaction solution at a temperature of a reaction solution supplied to a reaction portion in the nucleus forming and two-liquid mixing microreactor, heat conduction is enabled to change the temperature of the reaction solution at a rate of 5° C. or more per minute, preferably 10° C. or more per minute, more preferably 20° C. or more, a heat exchange range to the reaction solution is set so that a length of a time obtained by dividing a volume calculated from a length and depth of a microchannel in the nucleus forming and two-liquid mixing microreactor by a flow rate becomes a length of a heat exchangeable time 5 times or less, preferably 2 times or less as long as a diffusion time at a temperature of a liquid supplied to the microreactor, and the diffusion rate of the silver ion and the halogen ion can be increased.

By the constitution as described above, since the diffusion coefficient relates to the temperature, the diffusion rate can be increased by raising the temperature, and accordingly, the diffusion rate of the silver ion and the halogen ion is increased to a desired rate by heating the process liquid to enable the precise and efficient production, and the silver halide photographic emulsion having uniform emulsion performance can be produced by the microreactor in which the silver halide nucleus forming reaction is controlled. In addition, since the microreactor is used, a small production system can be easily scaled up to a mass production system, and the emulsion production is enabled at an optimum quantity of production scale corresponding to a required production quantity.

Second, a production apparatus of silver halide photographic emulsion is constituted by providing a nucleus forming reaction and three-liquid mixing microreactor in which water or an aqueous protective colloid solution is introduced from a first flow passage to form a laminar flow of a straightening thin layer shape and is made to flow, a silver salt solution is introduced from a second flow passage to form a laminar flow of a straightening lamella shape and is made to flow while the silver salt solution is brought into contact with one contact interface of the laminar flow of the water or the aqueous protective colloid solution, and a halide solution is introduced from a third flow passage to form a laminar flow of a straightening thin layer shape and is made to flow as a straightened flow of a thin layer in a state where the halide solution comes in contact with the other contact interface of the laminar flow of the water or the aqueous protective colloid solution and does not come in direct contact with the laminar flow of the silver salt solution, so that a silver ion and a halogen ion diffuse and move to the water or the aqueous protective colloid solution and react with each other to form the nucleus grains of silver halide, and temperature control means constituted such that a change control is enabled to a temperature at which a diffusion rate of the silver ion and the halogen ion becomes 1.1 times or more, preferably 1.5 times or more as high as a diffusion rate at a temperature of a reaction solution supplied to a reaction portion in the nucleus forming and two-liquid mixing microreactor, heat conduction is enabled to change the temperature of the reaction solution at a rate of 5° C. or more per minute, preferably 10° C. or more per minute, more preferably 20° C. or more, a heat exchange range to the reaction solution is set so that a length of a time obtained by dividing a volume calculated from a length and depth of a microchannel in the nucleus forming and two-liquid mixing microreactor by a flow rate becomes a length of a heat exchangeable time 5 times or less, preferably 2 times or less as long as a diffusion time at the temperature of the liquid supplied to the microreactor, and the diffusion rate of the silver ion and the halogen ion can be increased.

By the foregoing constitution as described above, in the inside of the nucleus forming reaction and three-liquid mixing microreactor, when viewed microscopically, a silver halide nucleus forming reaction is controlled so that the diffusion rate of the single silver ion and the single halogen ion dispersed at suitable intervals in the water or the aqueous protective colloid solution is increased to a required rate, so that the silver ion and the halogen ion meet each other precisely and efficiently in one-to-one correspondence to be bonded and to form a nucleus. Since the distance between the nuclei of silver halide formed at this time is widened by the water or the aqueous protective colloid solution around the nuclei, Ostwald ripening can be suppressed, and accordingly, the nucleus forming reaction and the grain growth reaction are separated so that they do not occur simultaneously, and after the nuclei of silver halide formed by the nucleus forming process are stably taken out, the grain growth reaction is suitably accelerated, so that the mono-dispersed silver halide emulsion grains is finally formed. That is, the size distribution of the nucleus grains is made narrow so that the crystals of the nucleus grains become only those having a desired single crystal structure, the shape, size and number of the nucleus grains can be made uniform, the growth reaction becomes easy to perform, and the crystal shape and size distribution of the final grains can be made more uniform. As stated above, the silver halide photographic emulsion having uniform emulsion performance can be produced by the microreactor. Moreover, since the microreactor is used, a small production system can be easily scaled up to a mass production system, and the emulsion production is enabled at an optimum quantity of production scale corresponding to a required production quantity.

Third, the production apparatus of the silver halide photographic emulsion as described above in the first or the second is constituted such that a micro heat exchanger is connected so that the reaction solution processed by the nucleus forming reaction and two-liquid mixing microreactor or the nucleus forming reaction and three-liquid mixing microreactor is introduced therein, the reaction solution introduced to the micro heat exchanger is cooled at a rate of 5° C. or more per minutes, preferably 10° C. or more per minute, more preferably 20° C. or more per minute, still more preferably 40° C. or more per minute, and a ripening reaction of nuclei in the reaction solution is stopped.

By the constitution as described above, the ripening reaction of the nuclei in the reaction solution is stopped by the micro heat exchanger, so that the generated nuclei become only those having a desired single crystal structure, the size distribution of the nucleus grains is made narrow, and the size and number of the nucleus grains are made uniform. Further, in the microreactor, the diffusion rate is increased by raising the temperature of the process liquid to lessen a time difference between the start of ion diffusion in the vicinity of the interface where two liquids are in contact with each other and the end of diffusion of an ion placed at the furthest place from this interface, and a more uniform reaction product can be obtained. Furthermore, in the inside of the microreactor, the process solution is heated up to a predetermined temperature by the temperature control means, the diffusion rate of the silver ion and the halogen ion is increased to the required rate, and the nucleus forming process is precisely and efficiently performed. Here, the reaction of the silver ion and the halogen ion is a reaction that is performed at a very high rate, and they react in the order of millisecond. On the other hand, in the Ostwald ripening, there arises such a ripening reaction that formed fine grains are molecule-dissolved and are merged in larger grains (host grain), and it is assumed that the reaction rate is slower than that of the ion reaction by approximately one order. Thus, in the microreactor, the process solution is heated by the temperature control means, so that the nucleus forming reaction is accelerated, and a fine-grain formation time by diffusion is shortened, and a time from the start of the first reaction to the end of the final reaction can be made short. Here, although the Ostwald ripening also proceeds, since the reaction speed is slow, by performing a cooling process in which the liquid is sent to the micro heat exchanger at the point of time when the reaction in the nucleus forming reaction and grain growth reaction microreactors has been completed, and the temperature of the process liquid is quickly lowered, it becomes possible to suppress the apparent reaction of the Ostwald ripening. In this way, the difference between the reaction rate of the silver ion and the halogen ion and the reaction rate of the Ostwald ripening is effectively utilized, and the process of the nucleus forming reaction and the grain growth reaction can be performed precisely and efficiently.

Fourth, in the production apparatus of the silver halide photographic emulsion as described in one of the first to the third, the temperature control means or the micro heat exchanger is constituted to enable heating such that within five seconds, a diffusion rate becomes a diffusion rate 1.1 times or more as high as a diffusion rate at a temperature before the reaction of a reactive ion.

By the constitution as described above, in the inside of the nucleus forming reaction and two-liquid mixing microreactor or the nucleus forming reaction and three-liquid mixing microreactor, the diffusion rates of the silver ions and the halogen ions are respectively increased to the required rates, and the silver halide nucleus forming reaction is accelerated so that the silver ions and the halogen ions are efficiently bonded to form nuclei, and the silver halide nucleus forming reaction can be controlled to enable efficient production.

(Fifth Embodiment)

Figure 10:
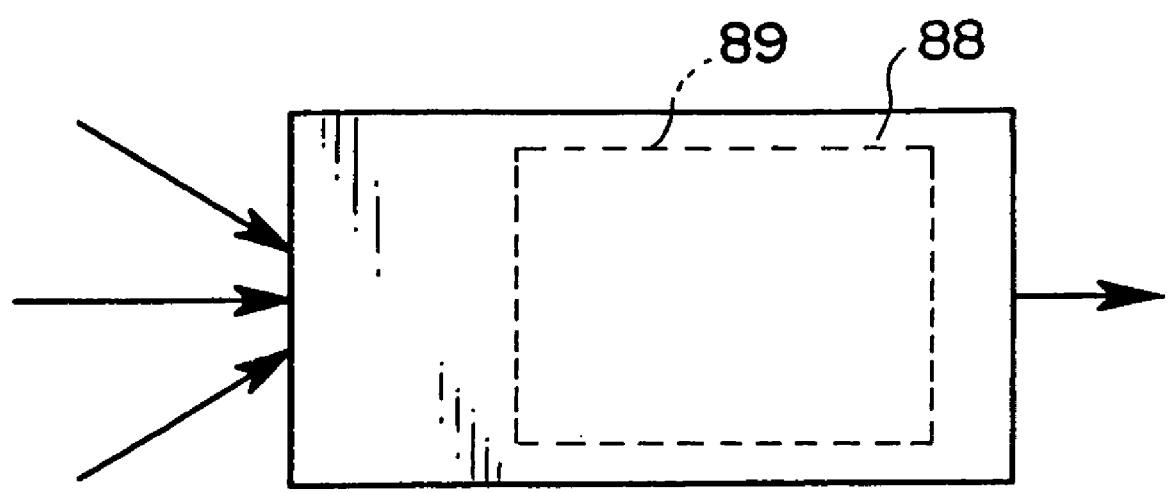
FIG. 10 is a schematic structural explanatory diagram showing a microreactor for a nucleus forming reaction and physical ripening reaction, which performs a nucleus forming process and initiates the subsequent a nucleus growing process in the grain forming process of silver halide emulsion in a pre-ripening process according to a fifth embodiment of the invention.

FIG. 10 is a schematic view of a nucleus forming reaction and physical ripening reaction microreactor 88 (corresponding to the process of the microreactor A30 and the heat exchanging microreactor A32 of FIG. 1) for performing a nucleus forming process in grain formation of a silver halide emulsion in a pre-ripening process concerning a production apparatus of silver halide photographic emulsion of the invention, and for starting a subsequent physical ripening process.

The nucleus forming reaction and physical ripening reaction microreactor 88 are constituted as a three-liquid mixing microreactor. Incidentally, it may be constituted as a two-liquid mixing microreactor.

Here, the nucleus forming reaction and physical ripening reaction microreactor 88 is formed such that a first flow passage for leading a silver salt solution (fluid 1), a second flow passage for leading a halide solution (fluid 2), and a third flow passage for leading water or an aqueous protective colloid solution (fluid 3) as an intermediate layer for preventing the silver salt solution and the halide solution from immediately coming in contact with each other, are formed, and parts of the adjacent ones of these three flow passages come in contact with each other.

Further, the nucleus forming reaction and physical ripening reaction microreactor 88 is constituted as such a device that these three fluids 1, 2 (the silver salt solution and the halide solution) substantially form thin layers, respectively, open interfaces are formed between adjacent ones of the fluids 1, 2 and 3 (the silver salt solution, the halide solution, and the water or the aqueous protective colloid solution), the thicknesses of the thin layers of these three fluids 1, 2 and 3 (the silver salt solution, the halide solution, and the water or the aqueous protective colloid solution) become 1 to 900 µm in the normal direction of the contact interface, a silver ion and a halogen ion diffuse and move to the intermediate layer of the water or the aqueous protective colloid solution provided between the silver salt solution and the halide solution, and the silver ion and the halogen ion react with each other, so that the silver halide grains are continuously generated.

In the nucleus forming reaction and physical ripening reaction microreactor 88, since the nucleus formation is performed while the flow of the laminar flow occurs in one direction, the so-called local recycling in which nuclei circularly flow does not occur. Thus, when the nucleus formation is performed, it is possible to prevent the occurrence of such a state that the local recycling occurs in which the once formed nuclei circularly flow and the unexpected growth occurs.

In this nucleus forming reaction and physical ripening reaction microreactor 88, the silver halide grains are made to diffuse into the water or the aqueous protective colloid solution. That is, the water or the aqueous protective colloid solution intervenes between the nucleus grains formed by the nucleus forming reaction to extend the distance between the nucleus grains.

As stated above, in the nucleus forming reaction and physical ripening reaction microreactor 88, since the distance between the nucleus grains is instantaneously extended immediately after the nucleus forming reaction, the nucleus forming reaction and the grain growth reaction are separated so that the nucleus forming reaction and the grain growth reaction do not simultaneously occur, the nucleus grains of silver halide emulsion formed by the nucleus forming reaction are formed, and can be suitably guided to the process for causing the grain growth reaction at a subsequent stage.

The nucleus forming reaction and physical ripening reaction microreactor 88 is constituted to include temperature control means 89 capable of performing the temperature control of an objective fluid by performing a heat exchange between the objective fluid introduced inside and a separately introduced temperature control medium.

This temperature control means 89 may be constituted such that the whole device of the nucleus forming reaction and physical ripening reaction microreactor 88 is housed in a container whose temperature is controlled.

Further, the temperature control means 89 may perform a thermal cycle in such a way that a heater structure of a metal resistance wire, polysilicon or the like is formed in the device of the nucleus forming reaction and physical ripening reaction microreactor 88, this is used for heating, and natural cooling is used for cooling.

With respect to the sensing of temperature, in the case of the metal resistance wire, the same resistance wire as the heater is formed, and temperature detection is performed on the basis of the change of the resistance value, and in the case of the polysilicon, a thermocouple is used to perform detection.

With respect to the temperature control means 89, a Peltier element is mounted in the nucleus forming reaction and physical ripening reaction microreactor 88 so that the element is brought into contact with the reactor, and heating and cooling may be performed from the outside. A temperature control method is selected in accordance with a use and a material of the body of the nucleus forming reaction and physical ripening reaction microreactor 88.

In order to increase the diffusion rate of the silver ion and the halogen ion in the nucleus forming reaction and physical ripening reaction microreactor 88, a structure is adopted to be capable of giving such a temperature that the diffusion rate of the silver ion and the halogen ion becomes 1.1 times or more, preferably 1.5 times or more as high as the diffusion rate at a temperature of a liquid supplied to a reaction portion in the nucleus forming reaction and physical ripening reaction microreactor 88.

That is, the structure is adopted to enable heating so that within five seconds, the diffusion rate becomes 1.1 times or more as high as the diffusion rate at the temperature before the reaction of a reactive ion.

Further, in the nucleus forming reaction and physical ripening reaction microreactor 88, the temperature control means 89 is constituted by a micro heat exchanger capable of transmitting heat so that the temperature of the liquid supplied to the reaction portion is increased at a rate of 5° C. or more per minute, preferably 10° C. or more per minute, more preferably 20° C. or more. In addition, the micro heat exchanger is constituted such that a heat exchange range is set so that a length of a time obtained by dividing a volume (Vh) calculated from a length and depth of a microchannel by a flow volume becomes 5 times or less, preferably 2 times or less as long as a diffusion time (td) at the temperature of the liquid supplied to the microreactor and the heat exchange can be made.

When the nucleus forming reaction and physical ripening reaction microreactor 88 and the temperature control means 89 are specifically constituted, conditions of specific numerical values and the like when each portion is constituted can be determined as described below.

In general, the diffusion rate is a function of concentration, temperature and the like. Various estimation methods are recited as estimation of a liquid layer diffusion coefficient in a paragraph of transport property of Chemical Engineering Handbook.

In this book, there is Wilke-Chang expression described below, in which the diffusion coefficient is recited as an expression relating to temperature.

$$D_{12}\infty = 2.946 * 10^{-11} (\beta M_{r,2})^{1/2} T/(\mu_2 V_{b,1}^{0.6})$$

where, $D_{12}\infty$; infinite dilution concentration $M_{r,2}$; molecular weight of diffusion medium $V_{b,1}$; mole volume of liquid layer at standard boiling point β; association factor of diffusion medium T; temperature μ; liquid viscosity.

As indicated in this Wilke-Chang expression, the diffusion coefficient relates to the temperature, and the diffusion rate can be improved by raising the temperature.

In the microreactor, in the case where channels having the same length are used, it is possible to increase throughput by widening the channel width. Thus, by using the relation of the Wilke-Chang expression, under the condition that the channel width is made constant, the diffusion rate is improved by raising the temperature, and it is possible to decrease a difference in time between the start of diffusion of an ion in the vicinity of the interface where two liquids are in contact with each other and the end of the diffusion of an ion at a place remotest from this interface, and a more uniform reaction product can be obtained.

Accordingly, in order to use the foregoing characteristic, it is advantageous to use a structure so as to make the diffusion rate as high as possible.

As stated above, when a structure is used such that the temperature control means 89 is provided in the nucleus forming reaction and physical ripening reaction microreactor 88, a silver halide nucleus formation and growth reaction can be controlled so that the diffusion rate of a silver ion and a halogen ion is increased to a required rate and the production can be precisely and efficiently made.

Next, a structural example shown in FIG. 11 in the fifth embodiment of the invention will be described. FIG. 11 is a schematic view of a nucleus forming reaction and physical ripening reaction microreactor 88 and a micro heat exchanger 90 in which in a pre-ripening process concerning a production apparatus of silver halide photographic emulsion of the invention, a nucleus forming process in grain formation of a silver halide emulsion is performed and the growth of nuclei is temporarily stopped at a stage where a desired nucleus is formed so as to be guided to a next grain growth reaction.

The nucleus forming reaction and physical ripening reaction microreactor 88 is constituted to be equivalent to that shown in FIG. 10.

The micro heat exchanger 90 is constituted as a microreactor for performing a temperature control of changing a temperature of an introduced process liquid to a predetermined temperature in the shortest possible time, and is constituted similarly to the temperature control means of the foregoing nucleus forming reaction and physical ripening reaction microreactor 88.

The micro heat exchanger 90 is disposed to be connected in series to the nucleus forming reaction and physical ripening reaction microreactor 88, water or an aqueous protective colloid solution, into which silver halide grains are diffused, which is discharged from the nucleus forming reaction and physical ripening reaction microreactor 88, is introduced into the micro heat exchanger 90, and a temperature control (for example, a cooling process) is performed at a rate of 10° C. or more per minute, preferably 20° C. or more per minute, more preferably 40° C. or more to stop the nucleus ripening reaction, so that only those having a desired single crystal structure exemplified in FIGS. 13A, 13B, 13C, 13D or 13E are obtained (the shapes of nucleus grains are made uniform), the size distribution of the nucleus grains is made narrow, and the size and number of the nucleus grains can be made uniform.

That is, the micro heat exchanger 90 is constituted to have a cooling rate of 5° C. or more per minute.

As stated above, in the case where the heating temperature control means is provided in the nucleus forming reaction and physical ripening reaction microreactor 88, and further, the micro heat exchanger 90 is provided which receives the process liquid processed by the nucleus forming reaction and physical ripening reaction microreactor 88 and can quickly cool it, for example, in the inside of the nucleus forming reaction and physical ripening reaction microreactor 88, the process liquid is heated to a predetermined temperature by the temperature control means to increase the diffusion rate of the silver ion and the halogen ion to a required rate, and the nucleus forming process is precisely and efficiently performed.

Here, the reaction of the silver ion and the halogen ion is a reaction performed at a very high rate, and the silver ion and the halogen ion react in the order of millisecond. On the other hand, in the Ostwald ripening, there occurs such a ripening reaction that generated fine grains are molecular-dissolved, and are merged by larger grains (host grain), and with respect to a reaction rate, it is presumed that the reaction is slower than the ion reaction by approximately one order.

Thus, in the nucleus forming reaction and physical ripening reaction microreactor, the process liquid is heated by the temperature control means, so that the nucleus forming reaction is accelerated, a fine-grain formation time by diffusion is accelerated, and a time from the start of a first reaction to the end of a final reaction can be made short.

Incidentally, here, although the Ostwald ripening reaction also proceeds, since the reaction rate is low, by performing a cooling process in which the liquid is sent to the micro heat exchanger 90 at the point of time when the reaction in the nucleus forming reaction and physical ripening reaction microreactor 88 is ended and the temperature of the process liquid is quickly lowered, it becomes possible to suppress the apparent reaction of the Ostwald ripening. In this way, the difference between the reaction rate of the silver ion and the halogen ion and the reaction rate of the Ostwald ripening is advantageously used, and the process of the nucleus forming reaction and the grain growth reaction can be performed precisely and efficiently.

Next, a structural example shown in FIG. 12 in the fifth embodiment of the invention will be described. FIG. 12 is a schematic view of a nucleus forming reaction and physical ripening reaction microreactor 88, a micro heat exchanger 90, and a nucleus growing microreactor 92, in which the nucleus forming process in the grain formation of the silver halide emulsion is performed in the pre-ripening process concerning the production apparatus of the silver halide photographic emulsion of the invention, and at a stage where desired nuclei are formed, the growth of the nuclei are temporarily stopped, and the subsequent grain growth reaction is continued.

The nucleus forming reaction and physical ripening reaction microreactor 88 is constituted to be equivalent to that shown in FIG. 10. Further, the micro heat exchanger 90 is constituted to be equivalent to that shown in FIG. 11.

The nucleus growing microreactor 92 is constituted similarly to the microreactor B34 shown in FIG. 1.

By the constitution as described above, by the same operation as the above, nuclei are formed by the nucleus forming reaction and physical ripening reaction microreactor 88, an emulsion subjected to temperature control (for example, cooling process) by the micro heat exchanger 90 is introduced into the nucleus growing microreactor 92, a new silver nitrate solution and halide solution are mixed simultaneously, the Ostwald ripening is accelerated, nuclei of small crystals of silver halide grow into nuclei of middle sized crystals of silver halide, and it proceeds to a next process, and further, a subsequent process is continuously performed by using the microreactor, and the silver halide photographic emulsion can be produced.

The emulsion subjected to the temperature control (for example, cooling process) by the micro heat exchanger 90 is stored in an unillustrated growth reacting tank, and the silver halide photographic emulsion can be produced by a conventional batch production system.

In the subsequent process, since the growth reaction can be performed from the nucleus grains having a desired single crystal structure, the growth reaction becomes easy to perform, and the crystal shape and size distribution of the final grains can be made more uniform.

Incidentally, since the structure, operation and effect of the fifth embodiment other than the above descriptions are the same as those of the first or third embodiment, the descriptions are omitted.

Next, a sixth embodiment of the invention will be described with reference to FIG. 14.

The gist of the sixth embodiment is as follows.

First, a production apparatus of silver halide photographic emulsion is constituted to perform a sensitizing process by a microreactor including a mixing space in which in an open interface where liquid chemicals for producing an emulsion introduced from a first flow passage and containing dispersed nuclei of silver halide, and a solution introduced from a second flow passage and containing a material having a low water solubility such as a dye are brought into contact with each other and flow in a state of thin layers, the material having a low water solubility such as the dye is diffused to be adsorbed by the nuclei of silver halide so that the sensitizing process is performed, and a temperature control means constituted to be capable of heating the respective liquids supplied to the mixing space from the respective flow passages up to a temperature at which rapid mixing is performed.

By the constitution as described above, the respective nuclei (grains) of silver halide and the respective dye molecules meet and react with each other under more uniform conditions, and the dye molecules can be uniformly adsorbed by the surfaces of all nuclei of silver halide, so that heterogeneous adsorption at the time when the added material having a low water solubility such as the dye is adsorbed by the surface of the silver halide grains can be prevented. Thus, in the case where the sensitizing process is performed by using this microreactor, the silver halide photographic emulsion having uniform emulsion performance can be produced. Further, when the sensitizing process is performed by using this microreactor, the diffusion rates of the nuclei (grains) of silver halide and the dye molecules are increased by heating, and the material having a low water solubility such as the dye can be efficiently adsorbed by the surface of the silver halide grains furthermore, since the microreactor is used, a small production system can be easily scaled up to a mass production system, and the emulsion production is enabled at an optimum quantity of production scale corresponding to a required production quantity.

Second, a production apparatus of silver halide photographic emulsion is constituted such that a first flow passage for leading liquid chemicals for producing an emulsion in which nuclei of silver halide are dispersed, and a second flow passage for leading a solution containing a material having a low water solubility such as a dye are provided, parts of the two flow passages are jointed to form an open interface between the fluids, the liquid chemicals for producing the emulsion and the solution containing the material having a low water solubility are brought into contact with each other in a state where they form thin layers, respectively, the thicknesses of the thin layers of the liquid chemicals for producing the emulsion and the solution containing the material having a low water solubility are made to be 10 to 5000 μm, the length of the thin layers is made a length equivalent to a time 0.6 to 1 times as long as a time required for the material having a low water solubility to diffuse in a length from an end to an end of the solution containing the material having a low water solubility at a predetermined flow and at a predetermined temperature of the dye, a micro heat exchanger is provided which can transfer heat to the liquid chemicals for producing the emulsion and the solution containing the material having a low water solubility, which come in contact with each other in the state of the thin layers, at a rate of 5° C. or more per minute, preferably 10° C. or more per minute, more preferably 20° C. or more per minute to improve the diffusion rate of a molecule such as the material having a low water solubility, and a sensitizing process is performed by a microreactor for causing the material having a low water solubility, such as the dye, diffused in the contact surface between the liquid chemicals for producing the emulsion and the solution containing the material having a low water solubility to be adsorbed by the nuclei of silver halide.

By the constitution as described above, the respective nuclei (grains) of silver halide and the respective dye molecules meet and react with each other under more uniform conditions, and the dye molecules can be uniformly adsorbed by the surfaces of all nuclei of silver halide, so that the heterogeneous adsorption at the time when the added material having a low water solubility such as the dye is adsorbed by the surface of the silver halide grain can be eliminated. Thus, in the case where the sensitizing process is performed by using this microreactor, the silver halide photographic emulsion having uniform emulsion performance can be produced. Further, in the case where the sensitizing process is performed by using this microreactor, the diffusion rates of the nuclei (grains) of silver halide and the material having a low water solubility are increased by quick heating using the micro heat exchanger, and the material having a low water solubility such as the dye can be efficiently adsorbed by the surface of the silver halide grain. Since the microreactor is used, a small production system can be easily scaled up to a mass production system, and the emulsion production is enabled by an optimum quantity of production scale corresponding to a required production quantity.

Third, a production apparatus of silver halide photographic emulsion is constituted such that a first flow passage for leading liquid chemicals for producing an emulsion in which nuclei of silver halide are dispersed, and a second flow passage for leading a solution containing a material having a low water solubility such as a dye are provided, parts of the two flow passages are joined to form an open interface between the fluids, and the liquid chemicals for producing the emulsion and the solution containing the material having a low water solubility are brought into contact with each other in a state where they form thin layers, respectively, and plural channels are formed so that the thicknesses of the thin layers of the liquid chemicals for producing the emulsion and the solution containing the material having a low water solubility become 10 to 5000 μm, the liquid chemicals for producing the emulsion and the solution containing the material having a low water solubility are made to flow into each of the channels at a pressure and a flow rate so that the respective flow rates become equal to each other, forcible mixing means is provided in a mixing space where they are brought into contact with each other after the flow is adjusted for 1 second or more, and a sensitizing process is performed by a microreactor in which the liquid chemicals for producing the emulsion and the solution containing the material having a low water solubility such as the dye are forcibly mixed, so that the dispersed material having a low water solubility, such as the dye, is adsorbed by the nuclei of silver halide.

By the constitution as described above, the respective nuclei (grains) of silver halide and the respective dye molecules meet and react with each other under more uniform conditions, and the dye molecules can be adsorbed by the surface of all nuclei of silver halide, so that heterogeneous adsorption at the time when the added material having a low water solubility such as the dye is adsorbed by the surface of the silver halide grain can be eliminated. Thus, in the case where the sensitizing process is performed by using this microreactor, the silver halide photographic emulsion having uniform emulsion performance can be produced. Further, in the case where the sensitizing process is performed by using this microreactor, the diffusion rates of the nuclei (grains) of silver halide and the material having a low water solubility are increased by quick mixing using the forcible mixing means, so that the material having a low water solubility such as the dye can be efficiently adsorbed by the surface of the silver halide grain. Moreover, since the microreactor is used, a small production system can be easily scaled up to a mass production system, and the emulsion production is enabled at an optimum quantity of production scale corresponding to a required production quantity.

(Sixth Embodiment)

Figure 14:
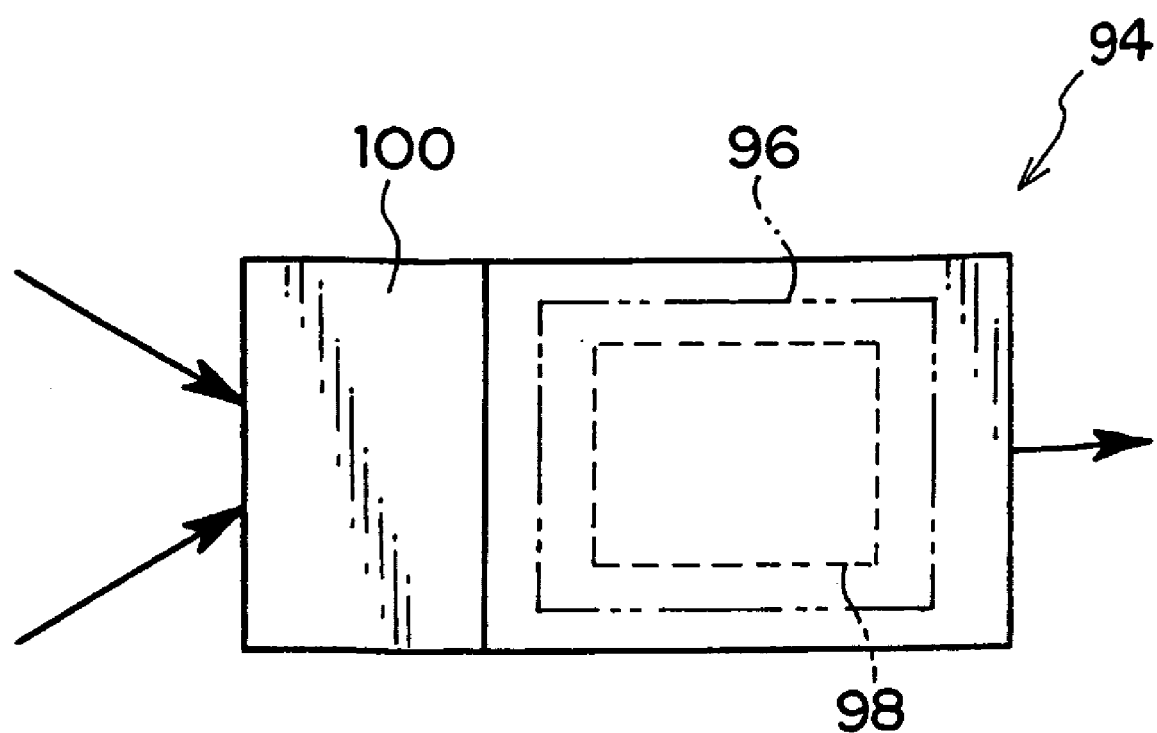
FIG. 14 is a schematic structural view showing a spectral sensitizing processing microreactor for performing a spectral sensitizing process of the silver halide photographic emulsion in an after-ripening process of a production method and a silver halide photographic emulsion production apparatus according to a sixth embodiment of the invention.

FIG. 14 is a schematic view of a spectral sensitizing processing microreactor 94 for performing a spectral sensitizing process (process in which a material having a low water solubility such as a sensitizing dye is added to adjust a light absorption wavelength) of a silver halide emulsion in an after-ripening process concerning a production apparatus of silver halide photographic emulsion of the invention.

The spectral sensitizing processing microreactor 94 can be constituted by using a general two-liquid mixing microreactor.

Here, the spectral sensitizing processing microreactor 94 is formed such that a first flow passage for leading liquid chemicals for producing an emulsion (fluid 1) in which a nuclei of silver halide are dispersed, and a second flow passage for leading a solution containing a material having a low water solubility such as a dye (solution in which a sensitizing dye is dissolved in methanol, etc.) (fluid 2) are formed, and parts of these two flow passages come in contact with each other.

Further, the spectral sensitizing processing microreactor 94 is constituted such that these two fluids 1 and 2 (the liquid chemicals for producing the emulsion in which the nuclei of silver halide are dispersed and the solution containing the material having a low water solubility such as a dye) substantially form thin layers, respectively, and an open interface is formed between the adjacent fluids.

The spectral sensitizing processing microreactor 94 is constituted such that the thicknesses of these two thin layers are made 10 to 5000 μm per layer, and the lengths of the two thin layers are respectively made a length equivalent to a time 0.6 to 1 times as long as a time required for the material having a low water solubility such as the dye, to diffuse from an end to the other end of the fluid 1 at a predetermined flow rate and at a predetermined temperature.

In this manner, at the interface formed by the solution for producing silver halide emulsion and the solution containing the material having a low water solubility such as the dye, the sensitizing dye is made to be adsorbed by the nuclei of silver halide by mutual diffusion from the contact interface, so that the sensitizing reaction is continuously caused.

As a method of adding a dye for the spectral sensitizing process of the silver halide emulsion in the after-ripening process, there are a method of using a solution in which a dye is dissolved in a solvent, and a method of using a solution containing a dye solid dispersion, and the spectral sensitizing processing microreactor 94 can used for both the methods.

Further, in the spectral sensitizing processing microreactor 94, in order to improve the diffusion rate of the dye molecule, a micro heat exchanger 96 as temperature control means is installed which can perform a temperature control to transfer heat at a rate of 5° C. or more per minute, preferably 10° C. or more per minute, more preferably 20°

C. or more to the liquid chemicals for producing the emulsion in which the nucleus of silver halide is dispersed and the solution containing the material having a low water solubility such as the dye, which are introduced in the spectral sensitizing processing microreactor 94 and are allowed to react to each other.

In addition, the spectral sensitizing processing microreactor 94 is constituted such that in each of the first flow passage for leading the liquid chemicals for producing the emulsion (fluid 1) in which the nuclei of silver halide are dispersed and the second flow passage for leading the solution containing the material having a low water solubility such as the dye (solution in which the sensitizing dye is dissolved in methanol, etc.) (fluid 2), a straightening field is provided at a predetermined portion on each of the flow passages from inlets for introducing the fluid 1 and the fluid 2 to a position where the fluid 1 and the fluid 2 come in contact with each other at parts of the two flow passages, a straightening structure 100 is provided in the straightening filed, which adjusts the flow for one second or more in a state where the thicknesses of the thin layers in the respective flow passages are 10 to 5000 µm per layer in the vertical direction and the fluids are made to flow in plural channels at a pressure and a flow volume so that the respective flow rates become equal to each other, and the two fluids are brought into contact with each other at a place where the flows are straightened by the straightening structure 100.

In addition, in the spectral sensitizing processing microreactor 94, a mixing space is provided at the place where the parts of the two flow passages come in contact with each other and the open interface is formed, and forcible mixing means 98 is installed in the mixing space, which gives mechanical energy, such as ultrasonic sound or ultra high frequency vibration, or electric energy, such as electromagnetic wave, for rapidly mixing the liquids supplied from the respective flow passages and quickly mixes the fluids to allow the dye to be adsorbed by the respective nuclei of silver halide.

The micro heat exchanger 96 installed in the spectral sensitizing processing microreactor 94, may be constituted to be disposed in one of or both of the straightening field provided in each of the flow passages and for adjusting the flow, and the mixing space for rapidly mixing the liquids supplied from the respective flow passages, so that heat is transferred to the introduced liquids at a rate of 5° C. or more per minute, preferably 10° C. or more per minute, more preferably 20° C. or more per minute to enable temperature control, and more precise temperature control may be enabled.

Further, the spectral sensitizing processing microreactor 94 may be constituted such that in order to increase places where the nuclei of silver halide in the liquid chemicals for producing the emulsion and the material having a low water solubility such as the dye meet each other, plural mixing spaces in the spectral sensitizing processing microreactor 94 are provided in parallel, and the process quantity can be further improved.

In the spectral sensitizing processing microreactor 94 constituted as stated above, the liquid chemicals for producing the emulsion in which the nuclei of silver halide are dispersed is introduced from the first flow passage, the solution containing the material having a low water solubility such as the dye is introduced from the second flow passage, these liquids are respectively made the straightened flows by the straightening structure 100, the temperature control is performed by the micro heat exchanger 96, and the respective liquids having the predetermined temperature are rapidly mixed by the forcible mixing means 98, so that the respective silver halide grains and the respective dye molecules meet and react with each other under more uniform conditions, and the dye molecules can be uniformly adsorbed by the surfaces of all silver halide grains, and accordingly, heterogeneous adsorption at the time when the added material having a low water solubility such as the dye is adsorbed by the surface of the silver halide grain can be eliminated.

Although heterogeneous adsorption appears in the reaction of the conventional macro mixing, for example, the dye or the like is adsorbed by the silver halide grains in multilayer adsorption, the dye or the like is adsorbed by the silver halide grain in monolayer adsorption, and the dye or the like is not adsorbed by the silver halide grains, it is possible to prevented the heterogeneous adsorption by this embodiment, and it is possible to prevent the photographic performance from being changed by, for example, the occurrence of rearrangement of the dye or the like adsorbed by the silver halide grains during preservation.

In addition, since the dye molecules can be equally adsorbed by the surfaces of all silver halide grains, it is not necessary to add an excessive number of dye molecules to a predetermined number of silver halide grains to eliminate silver halide grains by the surface on which a dye molecule is not adsorbed, and a suitable number of dye molecules have only to be added, and accordingly, the quantity of material having a low water solubility, such as an expensive dye, consumed can be reduced and the production cost can be reduced.

That is, in the case where the spectral sensitizing process is performed by using the mixing microreactor to simultaneously mix the liquid chemicals for producing the emulsion in which the nuclei (grains) of silver halide are dispersed in the aqueous protective colloid solution and the spectral sensitizing agent as the solution in which the spectral sensitizing dye is dissolved in methanol, when viewed microscopically, since one layer of molecules of the spectral sensitizing agent can be uniformly adsorbed by the surface of the single nucleus (grain) of silver halide, the suitable spectral sensitizing process can be performed.

Thus, in the case where the mixing microreactor is used to execute the spectral sensitizing process, it is possible to prevent the generation of the nucleus (grain) of silver halide by which the spectral sensitizing molecules are not adsorbed, to prevent the formation of the nucleus (grain) of silver halide on which spectral sensitizing molecules are excessively adsorbed (multilayer absorption state in which the molecules of the spectral sensitizing agent are adsorbed on the surface of the nucleus (grain) of silver halide to form a multilayer), or to prevent the spectral sensitizing molecule from remaining, and it is possible to prevent the spectral sensitizing agent from being wasted.

Further, in the case where the reaction was performed by using the spectral sensitizing processing microreactor 94 concerning the sixth embodiment, it was confirmed that the adsorption of the material having a low water solubility such as the dye, onto the silver halide grain becomes stronger. It was also confirmed that the storage property in a refrigerator and the storage property after being molten of the thus produced silver halide emulsion were remarkably improved.

Incidentally, since the structure, operation and effect of the sixth embodiment other than the above descriptions are the same as those of the first or the third embodiment, the descriptions are omitted.

Next, a seventh embodiment of the invention will be described with reference to FIGS. 15 to 18.

The gist of the seventh embodiment is as follows.

First, a production apparatus of silver halide photographic emulsion is constituted to be a microreactor including plural liquid incoming ports for a first process liquid and liquid incoming ports for a second process liquid, which are formed on one chip and are alternately disposed at equal intervals, and reaction portions formed on the one chip, one end of each of which is connected to the liquid incoming port of the first process liquid and the adjacent liquid incoming port of the second process liquid, and the other end of each of which is connected to a liquid outgoing port, the reaction portions being formed into microchannels in each of which the fluids substantially form thin layers, an open interface is formed between the adjacent liquids, and the liquids are mixed by diffusion and movement, and the number of the reaction portions being equal to the number of the liquid incoming ports of the first process liquid or the adjacent liquid incoming ports of the second process liquid.

By the constitution as described above, mixing is performed by the diffusion and movement in the plural reaction portions formed on the one chip, so that a scale can be increased to be capable of processing the liquid in large quantities, and a construction can be made to realize an optimum quantity of production scale corresponding to a required production quantity.

Second, a production apparatus of silver halide photographic emulsion is constituted to be a microreactor including a liquid incoming port for a first process liquid, a liquid incoming port for a second process liquid, and a liquid incoming port for a third process liquid, which are formed on one chip, and a reaction portion formed on the one chip, one end of which is connected to the liquid incoming port of the first process liquid, the liquid incoming port of the second process liquid, and the liquid incoming port of the third process liquid, and the other end of which is connected to a liquid outgoing port, the reaction portion being formed into a microchannel in which the fluids substantially form thin layers, an open interface is formed between the adjacent liquids, and the liquids are mixed by diffusion and movement.

By the foregoing structure, the mixing of three kinds of process liquids by diffusion and movement can be performed in the single reaction portion formed on the one chip, and by providing plural such chips in parallel, a scale can be increased so as to be capable of processing the liquid in large quantities, and a construction can be made to realize an optimum quantity of production scale corresponding to a required production quantity.

Third, a production apparatus of silver halide photographic emulsion is constituted to be a microreactor including plural liquid incoming ports of a silver salt solution and plural liquid incoming ports of a halide solution, which are formed on one chip and are alternately disposed at equal intervals, and reaction portions formed on the one chip, one end of each of which is connected to the liquid incoming port of the silver salt solution and the adjacent liquid incoming port of the halide solution, and the other end of each of which is connected to a liquid outgoing port, the reaction portions being formed into microchannels in each of which the fluids substantially form thin layers, an open interface is formed between the adjacent liquids, a silver ion and a halogen ion diffuse and move, and the silver ion and the halogen ion react with each other to continuously generate a nucleus of silver halide, and the number of the reaction portions being equal to the number of the liquid incoming ports of the silver salt solution or the adjacent liquid incoming ports of the halide solution.

By the constitution as describe above, the silver ions and the halogen ions simultaneously diffuse and move in the plural reaction portions formed on the one chip, and the silver ions and the halogen ions react so that the nuclei of silver halide can be continuously formed, and accordingly, a scale can be increased so as to be capable of processing the solutions in large quantities, and a construction can be made to realize an optimum quantity of production scale corresponding to a required production quantity.

Fourth, a production apparatus of silver halide photographic emulsion is constituted to be a microreactor including a liquid incoming port for a silver salt solution, a liquid incoming port of water or protective colloid solution, and a liquid incoming port for a halide solution, which are formed on one chip, and a reaction portion formed on the one chip, one end of which is connected to the liquid incoming port of the silver salt solution, the liquid incoming port for the water or the aqueous protective colloid solution, and the liquid incoming port for the halide solution, and the other end of which is connected to a liquid outgoing port, the reaction portion being formed into a microchannel in which a thin layer of the silver salt solution and a thin layer of the halide solution are disposed at both sides of a thin layer of the water or the aqueous protective colloid solution as an intermediate layer, open interfaces are formed between the adjacent thin layers of these three liquids, a silver ion and a halogen ion diffuse and move between these three thin layers, the silver ion and the halogen ion are made to react with each other while progress of Ostwald ripening is controlled by the water or the aqueous protective colloid solution, and a silver halide grain is continuously formed.

By the constitution as described above, the silver ion and the halogen ion are made to react with each other in the single reaction portion formed on the one chip while the progress of the Ostwald ripening is controlled by the water or the aqueous protective colloid solution, so that the process of continuously forming the silver halide grain can be performed, and by providing plural such chips in parallel, a scale can be increased so as to be capable of processing the solution in large quantities, and a construction can be made to realize an optimum quantity of production scale corresponding to a required production quantity.

(Seventh Embodiment)

Figure 15:
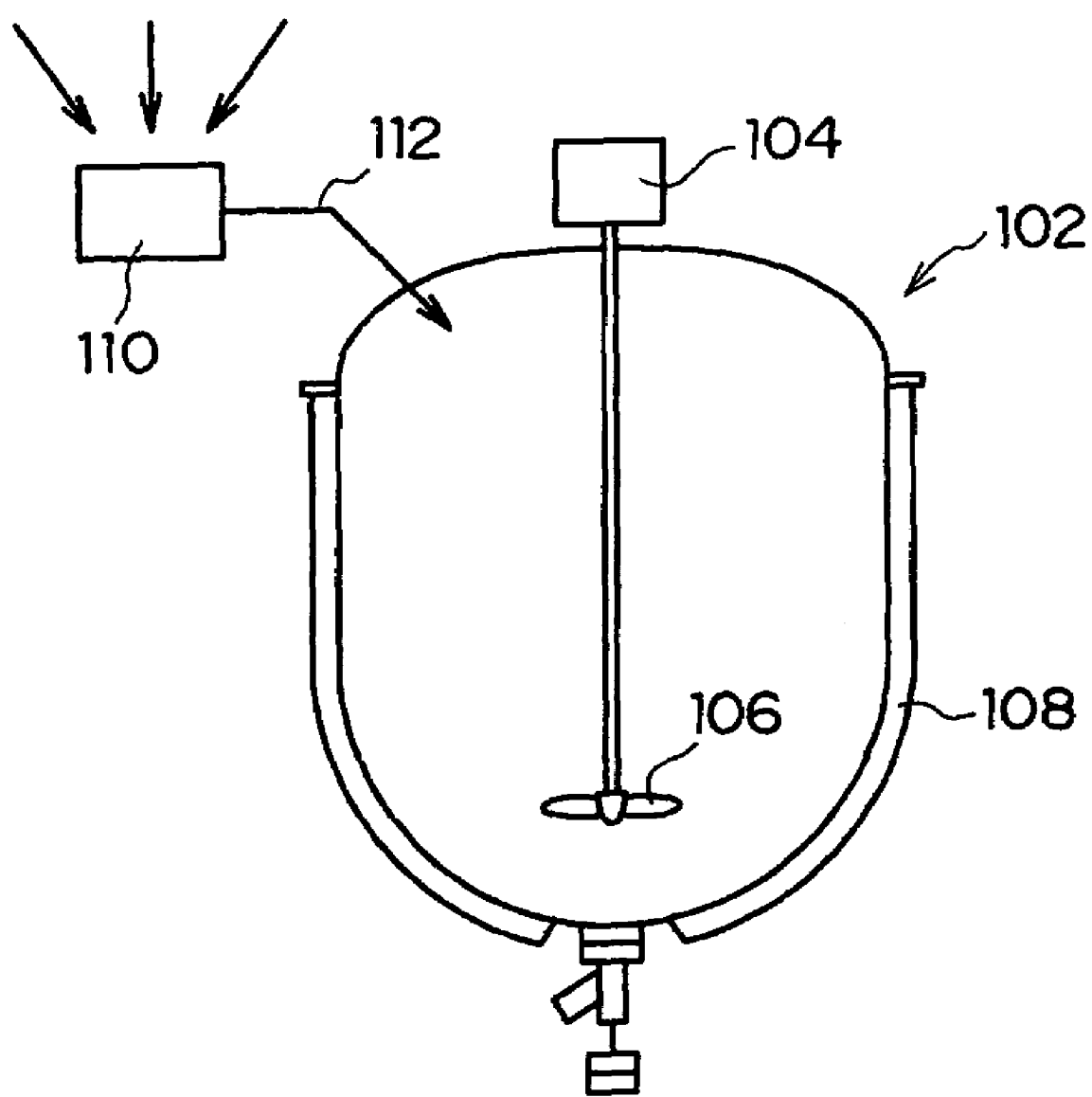
FIG. 15 is a schematic view showing a reaction tank apparatus for performing a nucleus forming process in the grain forming process of a silver halide emulsion in a pre-ripening process using a silver halide photographic emulsion production apparatus according to a seventh embodiment of the invention.

FIG. 15 is a schematic view exemplifying a reaction tank device for performing a nucleus forming process in grain formation of a silver halide emulsion in a pre-ripening process concerning a production apparatus of silver halide photographic emulsion of the invention.

As shown in FIG. 15, this reaction tank device uses a tank 102 as a reaction container (it may be a reaction tank for performing grain growth). This tank 102 is constituted as a batch type reaction container device provided with an agitator capable of processing a fixed large quantity, for example, 1000 l (1 t) of liquid at a time.

An agitation vane 106 to be rotatively driven by the rotation driving force of a motor 104 is installed in the tank 102 to agitate a solution filled in the inside of the tank.

A temperature control means 108 for heating or cooling the reaction solution is disposed on the outer peripheral surface of the tank 102 to perform a temperature control of the solution filled in the inside of the tank. The temperature control means 108 is constituted by using a means for heating or cooling by causing a heat exchange medium (water, water vapor, liquid organic material, flame gas, etc.) to flow through a temperature control part, or a means for performing a temperature control by installing an element for electrically heating or cooling in the temperature control part.

The tank 102 is connected to a flow passage 112 for supplying, from its upper part, water or protective colloid solution in which nuclei of small crystals of silver halide formed by a nucleus forming processing microreactor 110 are dispersed.

Figure 16:
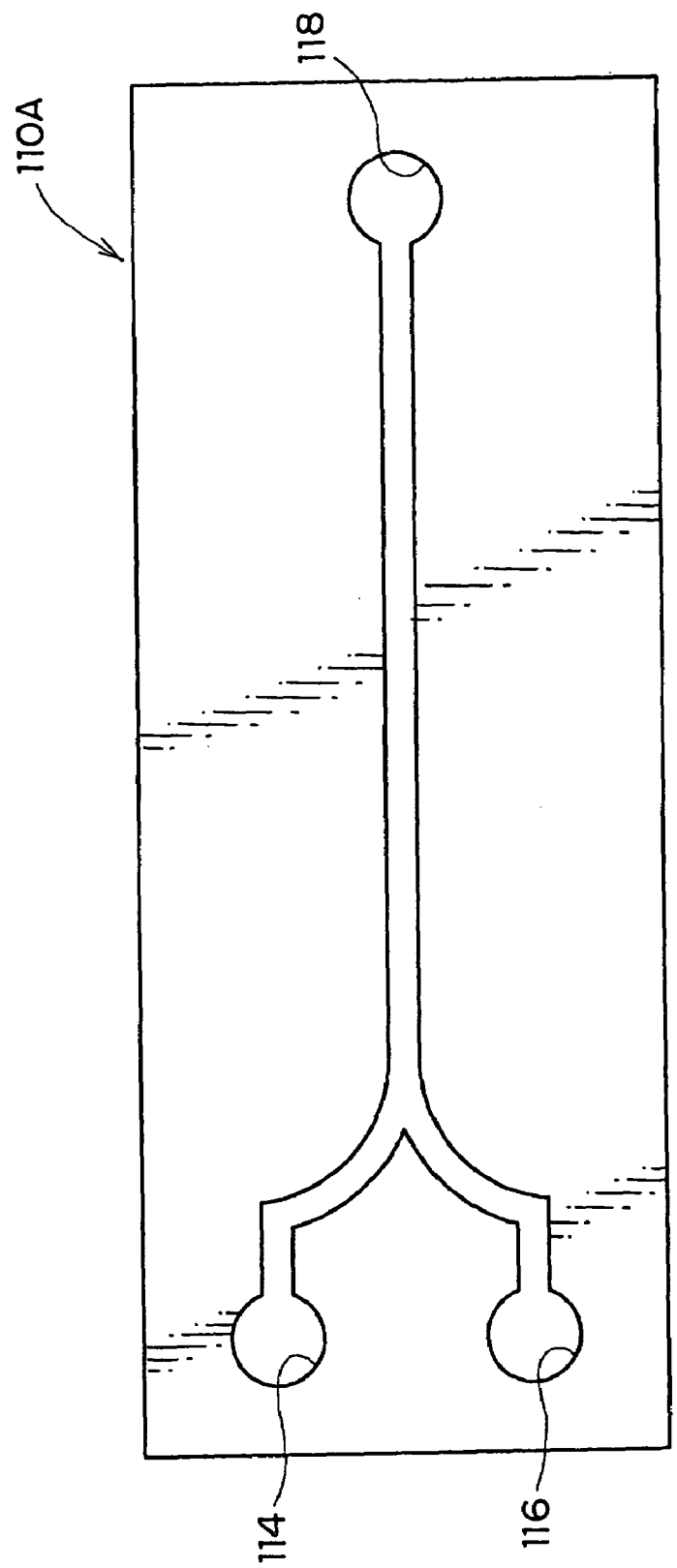
FIG. 16 is a plan view showing a two-liquid mixing microreactor chip for performing the nucleus forming process in the grain forming process of the silver halide emulsion in the pre-ripening process using the silver halide photographic emulsion production apparatus according to the seventh embodiment of the invention.
Figure 17:
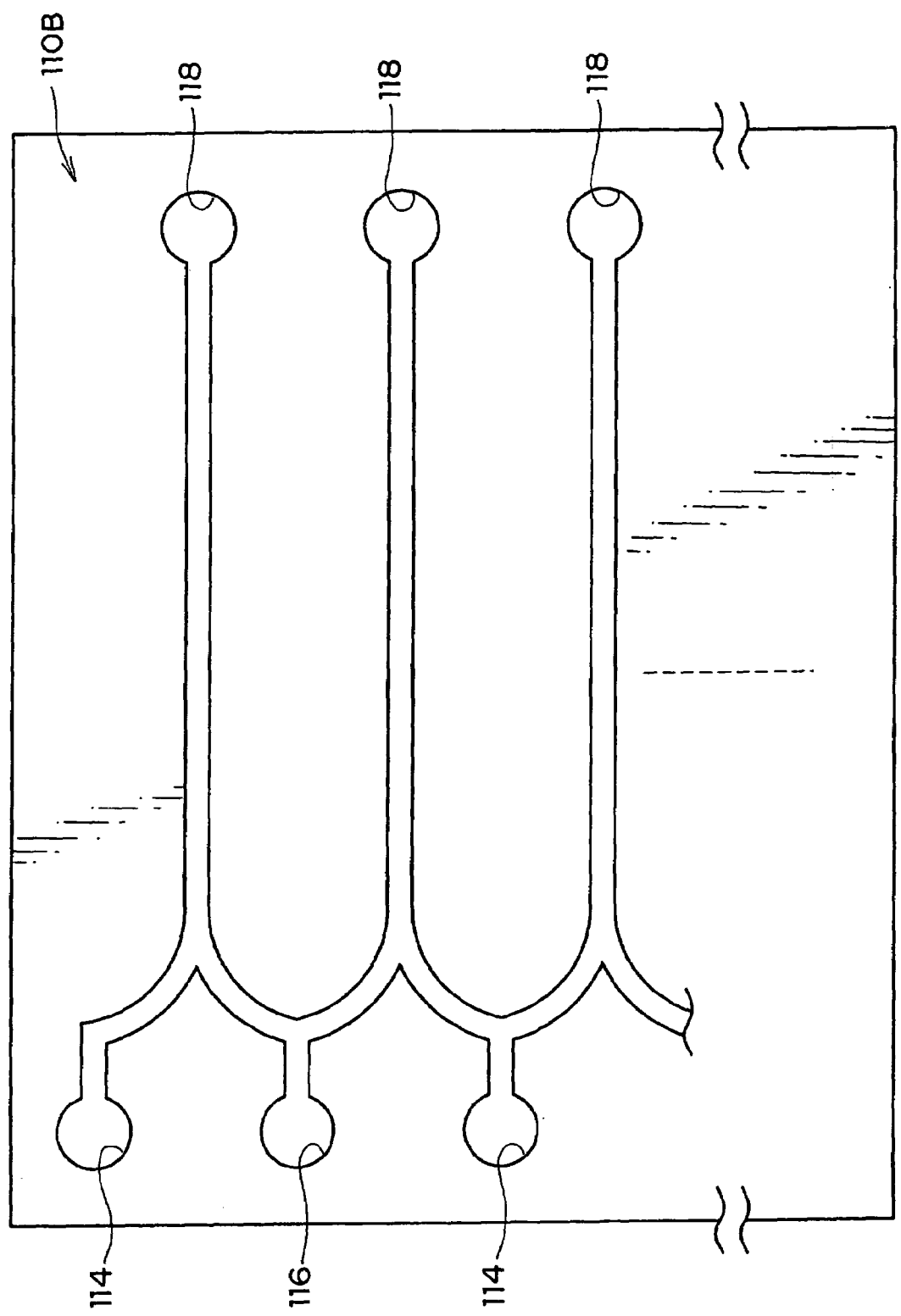
FIG. 17 is a plan view showing a two-liquid mixing microreactor chip constituted to be capable of enhancing the process capacity, for performing the nucleus forming process in the grain forming process of the silver halide emulsion in the pre-ripening process using the silver halide photographic emulsion production apparatus according to the seventh embodiment of the invention.
Figure 18:
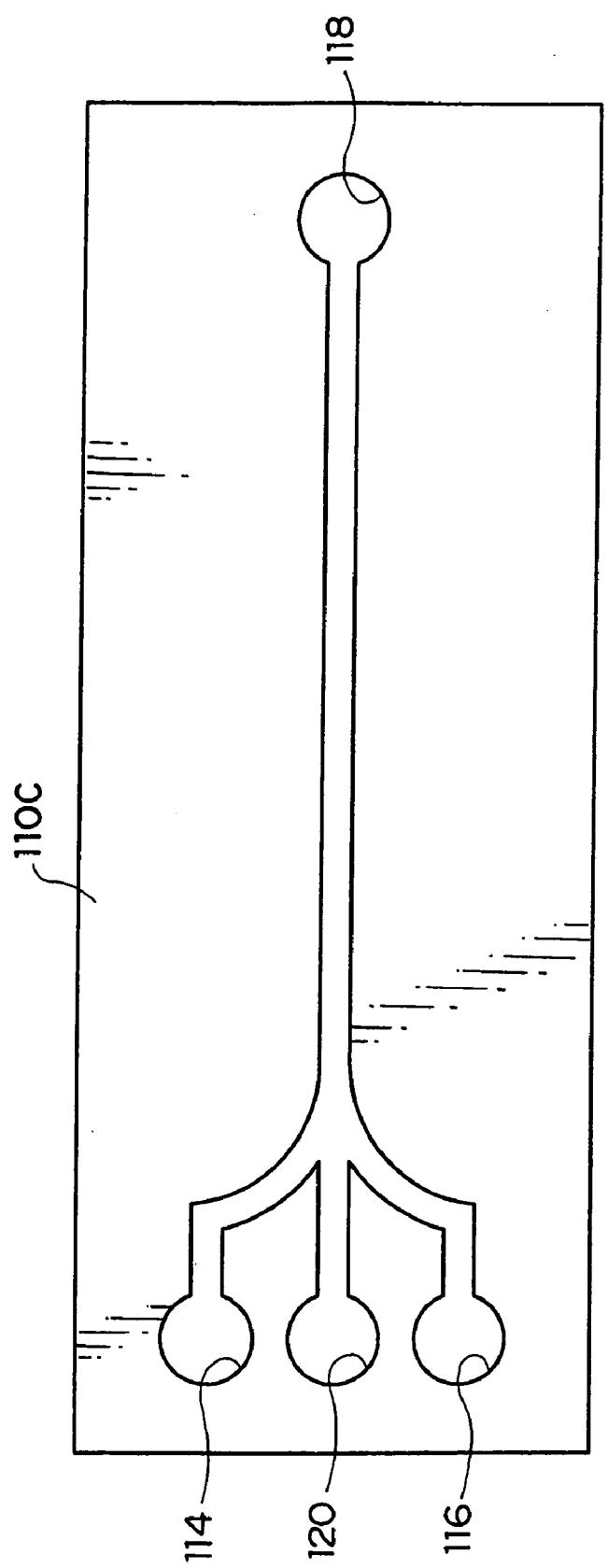
FIG. 18 is a plan view showing a three-liquid mixing microreactor chip for performing the nucleus forming process in the grain forming process of the silver halide emulsion in the pre-ripening process using the silver halide photographic emulsion production apparatus according to the seventh embodiment of the invention.

The nucleus forming processing microreactor 110 for supplying the liquid in which the nuclei of the small crystals of silver halide are dispersed is constituted as a two-liquid mixing microreactor as shown in FIG. 16 or 17 or a three-liquid mixing microreactor shown in FIG. 18.

A two-liquid mixing microreactor 110A shown in FIG. 16 is constituted as a microreactor chip having a Y-shaped groove and for performing a reaction of two liquids.

The two-liquid mixing microreactor 110A is constituted such that a liquid incoming port 114 and a liquid incoming port 116 are provided at tip ends of forked grooves having a Y shape, and a liquid outgoing port 118 is provided at a tip end of one extending groove of the Y shape.

In the two-liquid mixing microreactor 110A, a portion from the one liquid incoming port 114 to an intersection of the Y shape is made a first flow passage for leading a silver salt solution (silver nitrate solution) (fluid 1), and the other liquid incoming port 116 to the intersection of the Y shape is made a second flow passage for leading a halide solution (fluid 2).

In the two-liquid mixing microreactor 110A, a portion from the intersection of the Y shape to the tip end of the one extending groove is made a reaction portion (microchannel) where parts of the first flow passage and the second flow passage come into contact with each other, the two fluids substantially form thin layers here, an open interface is formed between these two fluids, the thicknesses of these two thin layers is 1 to 900 μm per layer in the normal direction of the contact interface, preferably 1 to 300 μm, reactive substances (ion, monomer, etc.), for example, a silver ion and a halogen ion diffuse and move between these two thin layers, and the silver ion and the halogen ion react with each other, so that the silver halide grains are continuously formed.

By using a plurality of the two-liquid mixing microreactors 110A simultaneously, a scale is increased and a structure having required processing capacity is obtained.

A two-liquid mixing microreactor 110B shown in FIG. 17 is constituted so as to increase process capacity as the need arises.

The two-liquid mixing microreactor 110B is constituted such that as shown in the drawing, a liquid incoming port 114 for a silver salt solution and a liquid incoming port 116 for a halide solution are alternately disposed at equal intervals, and a first flow passage and a second flow passage are disposed to be in parallel with each other.

The two-liquid mixing microreactor 110B is constituted such that except for the first flow passage or the second flow passage at both ends, each of the intermediate first flow passage and second flow passage forks into two branches, each of which is connected to a reaction portion (microchannel) from an intersection of a Y shape to a tip end of one extending groove.

By combining the Y-shaped grooves as stated above, the processing capacity can be increased as the need arises, and the two-liquid mixing microreactor 110B that has an integral structure as a whole and is scaled up, can be constituted.

Next, as shown in FIG. 18, a three-liquid mixing microreactor 110C that can constitute a system for allowing two reactive liquids to react with each other, will be described.

The three-liquid mixing microreactor 110C shown in FIG. 18 is constituted as a microreactor chip for performing a reaction of three liquids by providing a liquid incoming port 114, a liquid incoming port 116, and a liquid incoming port 120 at respective tip end parts of inverted E-shaped and three-forked grooves formed at one end part as shown in the drawing, and by providing a liquid outgoing port 118 at a tip end part of one groove extending toward the other end part of the inverted E shape.

In the three-liquid mixing microreactor 110C, a portion from the one liquid incoming port 114 to an inverted E-shaped intersection is made a first flow passage for leading a silver salt solution (silver nitrate solution) (fluid 1), a portion from the other liquid incoming port 116 to the inverted E-shaped crossing place is made a second flow passage for leading a halide solution (fluid 2), and a portion from the liquid incoming port 120 lying midway between them to the inverted E-shaped intersection is made a third flow passage for leading water or an aqueous protective colloid solution (protective colloid solution typified by gelatin or agar) as an intermediate layer for preventing both the first and second fluids from immediately coming in contact with each other and for stabilizing a reaction product formed by the reaction of these two fluids.

The three-liquid mixing microreactor 110C is constituted such that a portion leading to the tip end part of the groove extending toward the other end of the inverted E shape is made a reaction portion (microchannel) where parts of the first flow passage, the second flow passage, and the third flow passage come in contact with each other, the three fluids substantially form thin layers here, open interfaces are formed between the adjacent ones of these three fluids, the thicknesses of these three thin layers are 1 to 900 μm per layer in the normal direction of the contact interface, a reactive substance (ion, monomer, etc.), for example, a silver ion and a halogen ion diffuse and move between these three thin layers, and the silver ion and the halogen ion react with each other while the progress of the Ostwald ripening is controlled by the water or the aqueous protective colloid solution, so that a silver halide grain is continuously formed.

The three-liquid mixing microreactor 110C is constituted such that plural reaction spaces (reaction portions) are provided in one structure, or a required number of microreactors are simultaneously used, so that a scale is increased, and necessary processing capacity is obtained.

Next, the outline of a method of forming the two-liquid mixing microreactor 110A, the two-liquid mixing microreactor 110B or the three-liquid mixing microreactor 110C constituted as described above will be described. In the microreactor 110A, 110B or 110C, silicon (Si) or glass can be used for the material.

For example, when the microreactor 110A, 110B or 110C is constituted by using PDMS (polydimetylslloxane) as a kind of silicone rubber, it can be relatively easily formed when a method called soft lithography is used.

In the soft lithography, a microstructure patterned by a normal photolithographic process in advance is used as a mold to perform molding, and a PDMS microchip is fabricated.

Further, the PDMS microchip in which the microstructure is formed in this way is bonded onto a substrate, such as a flat acrylic plate, in which a required liquid incoming port and liquid outgoing port are bored in advance, and the microreactor 110A, 110B or 110C is constituted.

The microreactor 110A, the two-liquid mixing microreactor 110B, or the three-liquid mixing microreactor 110C can also be fabricated by using glass as a raw material and by a normally used LIGA method.

A micro heat exchanger is installed in the microreactor 110A, 110B or 110C.

The micro heat exchanger is constituted as, for example, a cooling mechanism including a flow passage which is disposed to be adjacent to a microchannel to allow a reaction solution to flow in the microreactor 110A, 110B or 110C and in which a heat medium flows, and precisely perform a temperature control so that respective liquids before reaction, reaction solutions, and liquids after completion of reaction rapidly come to have a predetermined temperature.

When the microreactor 110A, 110B or 110C and the reaction tank device are used to perform the nucleus forming process or nucleus growing process in the grain formation of the silver halide emulsion in the pre-ripening process in the production process of the silver halide photographic emulsion, respective supply rates of a halide solution and a silver nitrate solution are controlled by measuring pAg values of liquids during reaction or after the end of the reaction of a halide solution and a silver nitrate solution in the microreactor 110A, 110B or 110C, and the pAg value at the time of formation of the silver halide grain are controlled, alternatively, pH values of liquids during the reaction of the halide solution and the silver nitrate solution or after the end of the reaction are measured, and the pH values of the fluids are controlled so that the pH value at the time of the reaction becomes constant, and as a result, the production operation can be automated.

Incidentally, since the structure, operation and effect of the seventh embodiment other than the above descriptions are the same as those of the first or third embodiment, the descriptions are omitted.

EXAMPLES

Next, a description will be given of a specific example of the case where the nucleus forming process or the nucleus growing process in the grain formation of the silver halide emulsion in the pre-ripening process in the production process of the silver halide photographic emulsion is performed using the microreactor 110A, 110B or 110C and the reaction tank device constituted as described above.

In this example, silver bromo-iodide tabular grains are prepared by using the microreactor 110A, 110B or 110C and the reaction tank device.

In this example, there are described a case of a comparative example using a mixer (volume in the mixer is 0.5 ml) shown in FIG. 1 of JP-A No. 10-239787 in a system shown in FIG. 2 of JP-A No. 10-239787, and an example in which instead of this mixer, the foregoing microreactor 110A, 110B and 110C is used and tabular grains are prepared in a manner described below.

Comparative Example (Emulsion 1-A)

A reaction container was made empty in advance, and 500 ml of 0.021 M aqueous silver nitrate solution and 500 ml of 0.028M aqueous KBr solution containing 0.1 mass % of low molecular weight gelatin (average molecular weight 40,000) were continuously added for 20 minutes into a mixer (volume in the mixer was 0.5 ml) as shown in FIG. 1 of JP-A No. 10-239787, a resultant emulsion was continuously poured into the reaction container for 20 minutes, and 1,000 ml of a fine-grain emulsion was obtained. The revolving speed for agitation at that time was 2,000 rpm.

(Nucleus Formation)

300 ml of 10% bone gelatin solution in which 95% of amino groups was phthalated and KBr were added to the emulsion to make the pBr value of the emulsion in the reaction container to 2.1, and thereafter, the temperature was raised to 75° C. and it was permitted to stand for 5 minutes.

(Ripening)

Thereafter, 600 ml of 1.0 M silver nitrate solution, 600 ml of 0.99 M KBr containing KI in an amount of 3 mol %, and 800 ml of 5% low molecular weight gelatin solution were added the mixer at a constant flow rate for 60 minutes. The fine-grain emulsion thus formed by the mixer was continuously added into the reaction container. At that time, the revolving speed for agitation of the mixer was 2,000 rpm.

(Grain Growth)

During the grain growth, at the point of time when 70% of silver nitrate was added, $IrC_6$ was added in an amount of $8\times10^{-8}$ mol/mol Ag and doped. Further, before the end of the grain growth, a solution of yellow prussiate of potash was added into the mixer. The yellow prussiate of potash was doped in 3% (in terms of added silver) of shell parts of the grains at a local concentration of $3\times10^4$ mol/mol Ag. After the addition, the emulsion was cooled to 35° C., and was washed by a normal flocculation method, 70 g of lime processed bone gelatin was added and dissolved, and adjusted pAg value to 8.7 and pH value to 6.5, and then, the emulsion was preserved in a cold dark place. Table 1 shows properties of the tabular grain prepared and obtained by the conventional method.

Content of this Example (Emulsion 1-B)

Except that nucleus formation was changed as described below, the emulsion was prepared in the same way as the emulsion 1-A of the comparative example.

As a mixer, a microreactor made of glass and illustrated in FIG. 16 is fabricated by the LIGA method, which has such a configuration that flow passages each having a flow passage having a width of 200 µm and a depth of 200 µm, from which a halide solution and a silver nitrate solution flow and are supplied, and a plurality of the reactors are provided to constitute a process system capable of continuously forming fine grains similar to the comparative example.

In this process system, a micro heat exchanger was used at the exit of the two-liquid mixing microreactor 110A to perform a temperature control of a reaction solution. The silver nitrate solution and the KBr solution were added to the microreactor by syringe pumps.

TABLE 1

| Emulsion | Circle equivalent diameter (Mm) | Variation coefficient (%) of circle equivalent diameter | Average thickness (μm) | Tubular grain ratio (%) | Content |
|---|---|---|---|---|---|
| 1-A | 1.3 | 21 | 0.045 | 98 | Comparative example |
| 2-A | 1.4 | 16 | 0.045 | 99 | Example |

As shown in Table 1, it is understood that the size distribution of the tabular grains is narrow in this example.

$2.4 \times 10^{-4}$ mol/mol Ag of the following compound was added to the emulsions 1-A and 1-B at 40° C. prepared as described above, and sodium thiosulfate, potassium gold chloride, and potassium thiocyanate were added thereto, and subjected to optimum chemical sensitization at 60° C.

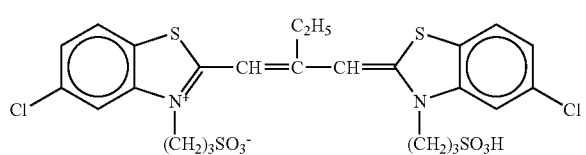

(1) Emulsion Layer

Emulsion . . . various kinds of emulsions (silver $3.6 \times 10^{-2}$ mol/m²) Coupler ($1.5 \times 10^{-3}$ mol/m²) described below.

(Compound)

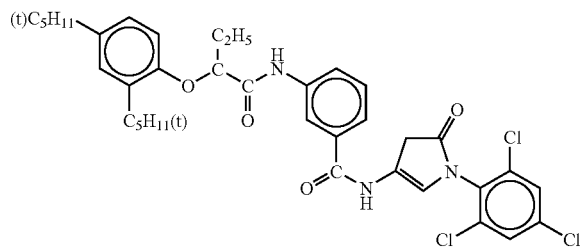

(Compound)
tricresyl phosphate (1.10 g/m²)
gelatin (2.30 g/m²)

(2) Protective Layer 2,4-dichloro-6-hydroxy-S-triazine Sodium Salt (0.08 g/m²)
Gelatin (1.80 g/m²)

After these samples were allowed to stand at 40° C. and relative humidity of 70% for 14 hours, the samples were exposed through a yellow filter and a continuous wedge for 1/100 second, and were color-processed according to the following process.

[Color Development]

| Process | processing time | processing temperature |
|---|---|---|
| Color development | 2 minutes 00 second | 40° C. |
| Breach-fixation | 3 minutes 00 second | 40° C. |

-continued

| Process | processing time | processing temperature |
|---|---|---|
| Washing (1) | 20 seconds | 35° C. |
| Washing (2) | 20 second | 35° C. |
| Stabilization | 20 seconds | 35° C. |
| Drying | 50 seconds | 65° C. |

Hereinafter, the compositions of processing solutions are described.

| | (Unit: g) |
|---|---|
| (Color development) | |
| diethylenetriamine pentaacetic acid | 2.0 |
| 1-hydroxyethylidene-1,1-disulphone | |
| sodium sulfite | 4.0 |
| potassium carbonate | 30.0 |
| potassium bromide | 1.4 |
| potassium iodide | 1.5 mg |
| hydroxylamine sulfate | 2.4 |
| 4-[N-ethyl-N-β-hydroxyethylamino]-2-methylaniline sulfate | 4.5 |
| water | up to 1.0 liter |
| pH | 10.05 |
| (Bleach-fixing solution) | |
| ethylenediaminetetraacetic acid ferric ammonium dihydrate | 90.0 |
| disodium ethylenediaminetetraacetate | 5.0 |
| sodium sulfite | 12.0 |
| ammonium thiosulfate solution (70%) | 260.0 ml |
| acetic acid (98%) | 5.0 ml |

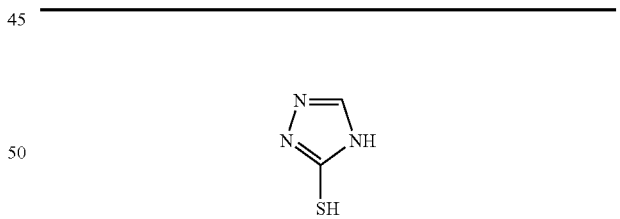

water up to 1.0 liter pH 6.0

(Washing Solution)

Tap water was made to flow through a mixed bed column filled with H form cation exchange resin (Amberlite IR-120B made by Rohm and Haas Company) and OH form anion exchange resin (Amberlite IR-400 made by Rohm and Haas Company), the concentration of calcium and magnesium ions was processed to 3 mg/liter or less, and subsequently, 20 mg/liter of sodium dichloroisocyanurate and 1.5 g/liter of sodium sulfate were added.

The pH value of this liquid is within the range of 6.5 to 7.5.

| (Stabilizing solution) | (Unit: mg) |
|---|---|
| formalin (37%) | 2.0 ml |
| polyoxyethylene-p-monononylphenyl ether (average polymerization degree 10) | 0.3 |
| disodium ethylenediaminetetraacetate | 0.05 |
| water | up to 1.0 liter |
| pH | 5.0 to 8.0 |

The results are shown in Table 2. The sensibility was expressed by relative values of a logarithm of an inverse number to light exposure, which gives density of 0.1 above fogging value and is expressed by lux second.

TABLE 2

| Emulsion | Sensitivity | Fogging | Gradation | Content |
|---|---|---|---|---|
| 1-A | 100 | 0.06 | 1.7 | Comparative example |
| 2-A | 104 | 0.06 | 1.9 | Example |

As shown in Table 2, the emulsion of the invention has a high gradation. This is a result from the fact that the size distribution of the tabular grains becomes narrow by the invention, so that the gradation becomes high.

In addition, in the foregoing example, the silver halide photographic emulsion of the high quality reaction product containing the tabular grains having a high aspect ratio and a narrow grain size distribution was obtained.

(Example of a Microreactor)

Next, microreactor devices that can be used in each embodiment of the invention will be described with reference to FIGS. 20 and 21.

Figure 20:
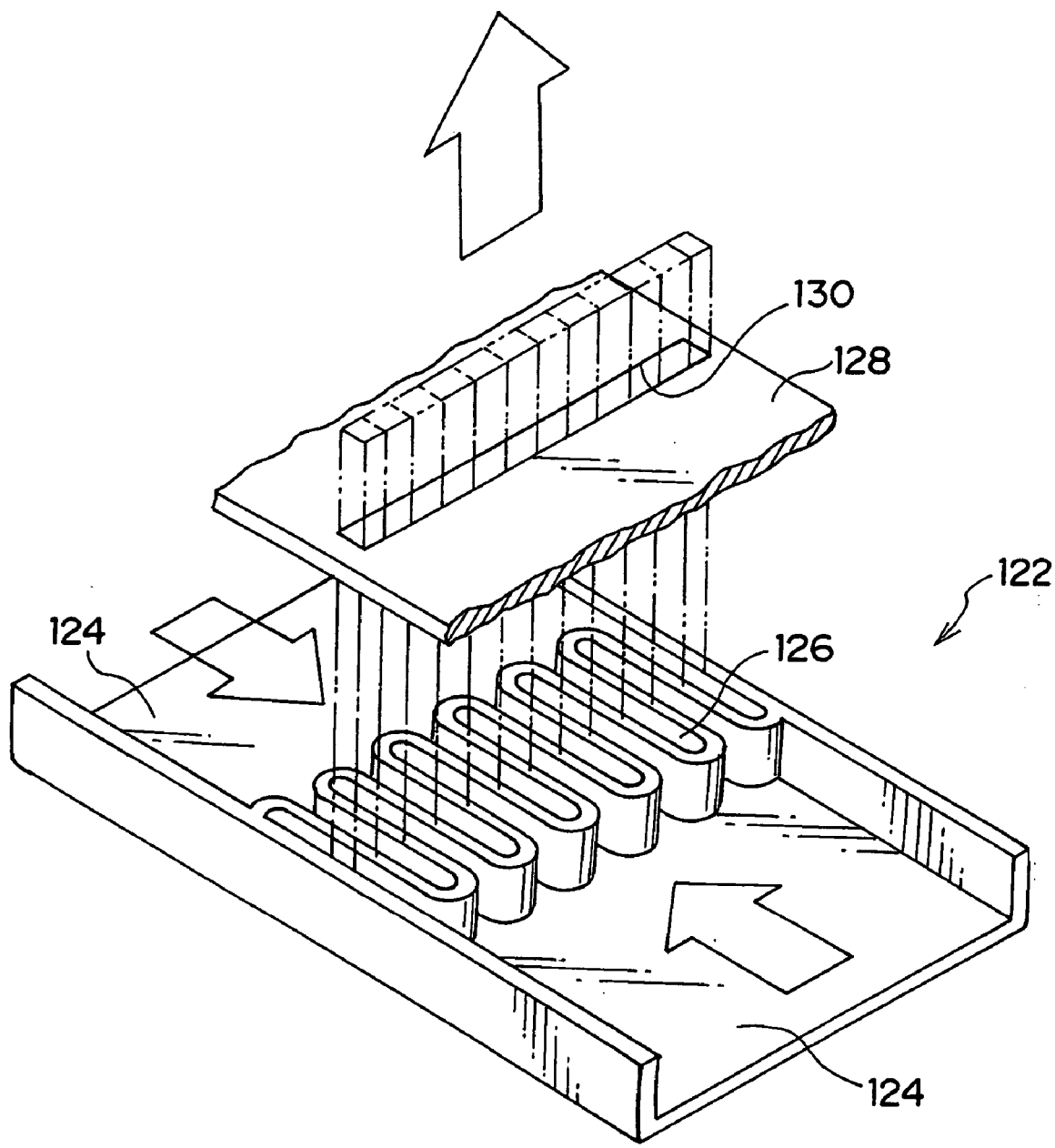
FIG. 20 is an exploded perspective view showing the main part of a mixing microreactor device that can be used for a silver halide photographic emulsion production apparatus of the invention.

The microreactor device is constituted as a mixing microreactor device 122 having a mixing structure, for example, illustrated in FIG. 20. In this mixing microreactor device 122, a channel member 126 is integrally disposed so as to cross a flow passage 124 formed into a minute rectangular groove shape.

This channel member 126 is formed into a corrugated partition plate which crosses and divides the flow passage 124, and constructs plural microchannels formed to be U-shaped.

A cover member 128 is fixed to an upper surface of the flow passage 124 shown in FIG. 20, and a minute rectangular shape is formed as a whole. A slit-shaped outlet 130 is bored in the cover member 128 at a predetermined position corresponding to the channel member 126. The outlet 130 is constituted to be connected to an unillustrated delivery port of a process liquid, and to deliver a mixed process liquid.

The mixing microreactor 122 constituted as stated above is such a device that two fluids flowing from both sides of the flow passage 124 shown in FIG. 20 enter the respective U-shaped channels of the channel member 126 to substantially form thin layers, and when the two fluids entering the adjacent U-shaped channels flow into the slit-shaped outlet 130, an open interface is formed between the adjacent two fluids, the thickness of each of the thin layers of these two fluids becomes a micrometer size in the normal direction of the contact interface, and movement like mutual diffusion from the open interface between the fluids occurs to produce a reaction and the like, so that a chemical change continuously occurs.

Since the mixing microreactor device 122 brings about a chemical change while the flow of laminar flow takes place in one direction, a chemical reaction does not occur at a place where the so-called local recycling occurs in which circulating flow occurs.

Figure 21:
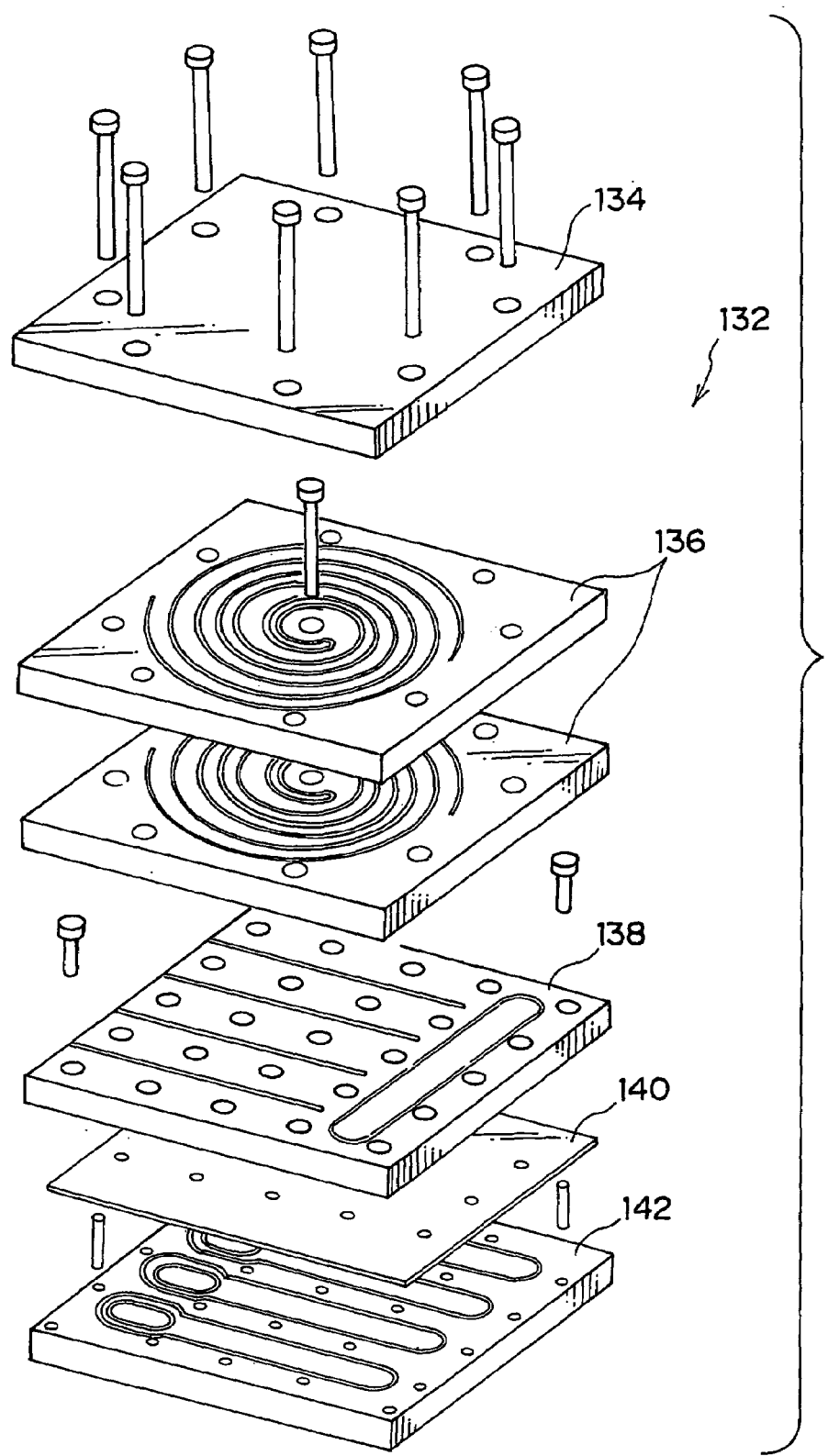
FIG. 21 is an exploded perspective view showing the main part of a multifunction microreactor device that can be used for a silver halide photographic emulsion production apparatus of the invention.

In addition, as a microreactor device provided with a mixing function, a heat exchange function, and a straightening function, for example, a multifunction microreactor device 132 exemplified in FIG. 21 has been known.

This multifunction microreactor device 132 is constituted as one module in such a way that two delay plates 136 provided with a structure for supplying a supply fluid after straightening or delaying the fluid are superposed to the lower part of an upper plate 134, a liquid supply plate 138 is disposed under the lower plate 136, a reaction plate 140 is disposed under the supply plate 138 to mix two liquids and allow to react the liquids with each other and further to perform a temperature control by making a heat exchange with the reaction solution, and a bottom plate 142 is disposed under the plate 140. These plates are integrally fastened together to form the module.

In the multifunction microreactor device 132, two kinds of process liquids are introduced from unillustrated introduction ports for process liquids provided in the upper plate 134 or the bottom plate 142, and after straightening is performed by the delay plate 136, the liquids are fed through the liquid supply plate 138 to the reaction plate 140, where the two kinds of process liquids are subjected to the temperature control and are mixed to react with each other, and a reacted process liquid is delivered from an unillustrated discharge port provided in the upper plate 134 or the bottom plate 142.

Next, an eighth embodiment concerning a production apparatus which can be used for a production method of silver halide photographic emulsion of the invention will be described with reference to FIGS. 22 to 29.

The eighth embodiment has an object to provide a microreactor which can easily form, in a mixer body, fluid supply passages, the number of which is equal to the number of kinds of fluids to be mixed even in the case where there are three or more kinds of fluids to be mixed, and can supply these fluids from these fluid supply passages to mixing flow passages in the form of lamella-like laminar flows, respectively.

To this end, in the micromixer (microreactor) of this embodiment, a first fluid supply passage formed along the surface part of a base plate is provided with a first header part which is bored in the surface part of the base plate and to which a fluid is supplied from the outside of a mixer body, and a slit-shaped first supply port which is connected with the first header part and is bored in the surface part of the base plate, and a second fluid supply passage formed in the base plate is provided with a second header part which is bored in a back surface part of the base plate and to which a fluid is supplied from the outside of the mixer body, and a slit-shaped second supply port which is connected with the second header part through a through part passing through the base plate, and is bored in the surface part of the base plate so as to be adjacent to the first supply port in the width direction, whereby it becomes unnecessary to form the header part in the second fluid supply passage and a minute groove part (microchannel part) for connecting the header part to the second supply port in the front surface part of the base plate.

Accordingly, even in the case where at most two first fluid supply passage can only be formed in the front surface part of the base plate by restriction in space, the second supply port having a minute opening width of 1 µm to 50 µm is bored in the front surface part of the base plate, so that the fluid can be introduced to the mixing flow passage formed in the mixing plate through the first supply port and the second supply port, and accordingly, if one or two second fluid supply passages are formed in the base plate, two kinds to four kinds of fluids are introduced to the mixing flow passage through the first and the second fluid supply passages, and while these fluids are made laminar flows having minute widths corresponding to the open widths of the first and the second supply ports and are made to flow in the mixing flow passage, these fluids can be diffused and mixed.

Furthermore, according to the micromixer of the invention, especially in the case where the supply port in the fluid supply passage branches into plural parts from the header part and is arranged like the teeth of a comb, the plural supply ports connected to the different fluid supply passages are alternately disposed, and the maximum number of fluid supply passages formed in one side surface (front surface part or back surface part) of the base plate are actually limited to two. However, even in such a case, the microreactor that can mix three or four kinds of fluids can be easily realized.

Moreover, in the micromixer of the invention, as fluids supplied to the plural flow supply passages from the outside, for example, a liquid, a gas, a solid liquid mixture in which metal fine particles or the like are dispersed in liquid, a solid gas mixture in which metal fine particles or the like are dispersed in gas, a gas liquid mixture in which gas is dispersed in liquid without being dissolved are also objects. That the kind of fluid is different includes not only a case where chemical compositions are different, but also a case where a state of temperature, solid liquid ratio or the like is different.

(No. 1 of Eighth Embodiment)

Figure 22A:
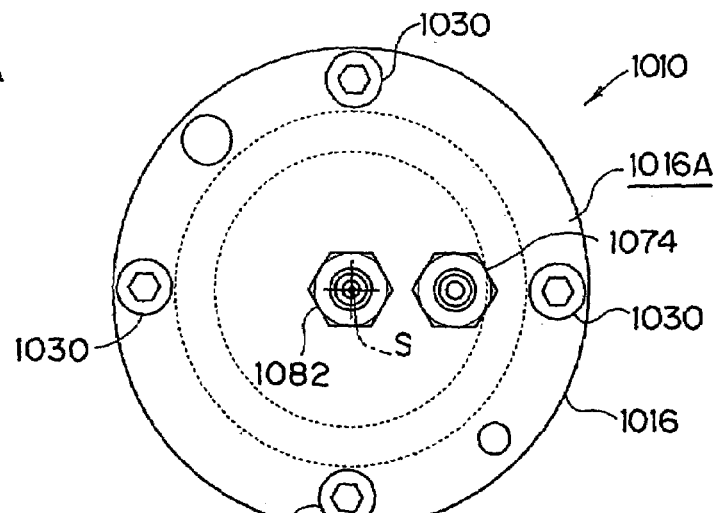
FIGS. 22A and 22C are plan views showing a structure of an example of a microreactor according to No. 1 of an eighth embodiment of the invention.
Figure 22B:
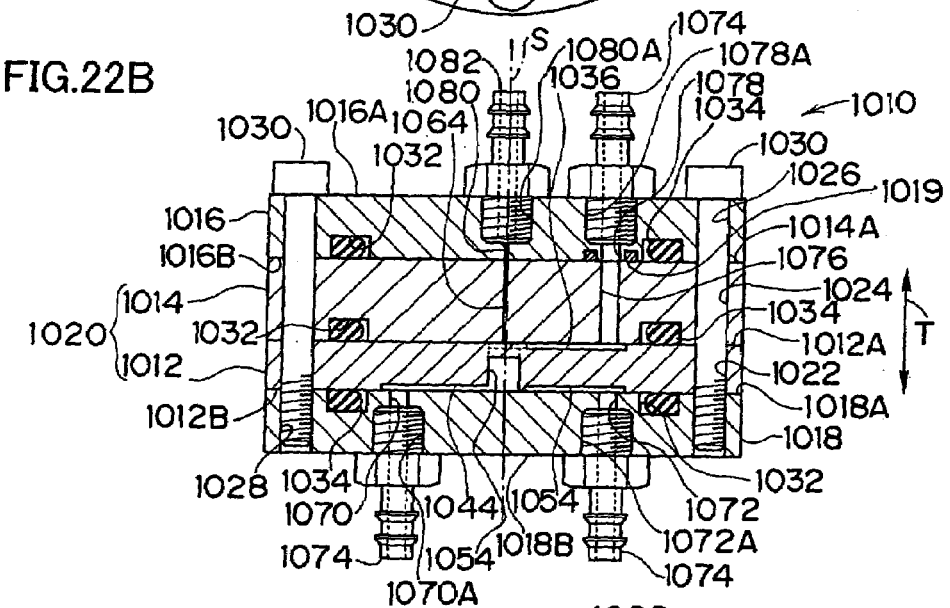
FIG. 22B is a side cross-sectional view showing the structure of the example of the microreactor according to No. 1 of the eighth embodiment of the invention.
Figure 22C:
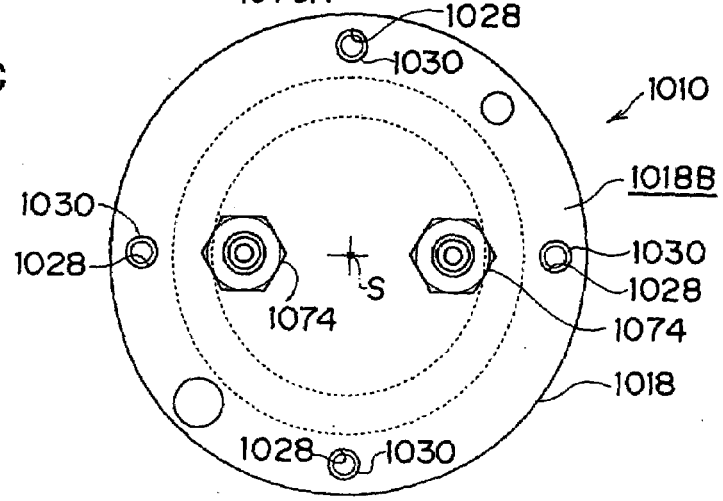
Figure 23:
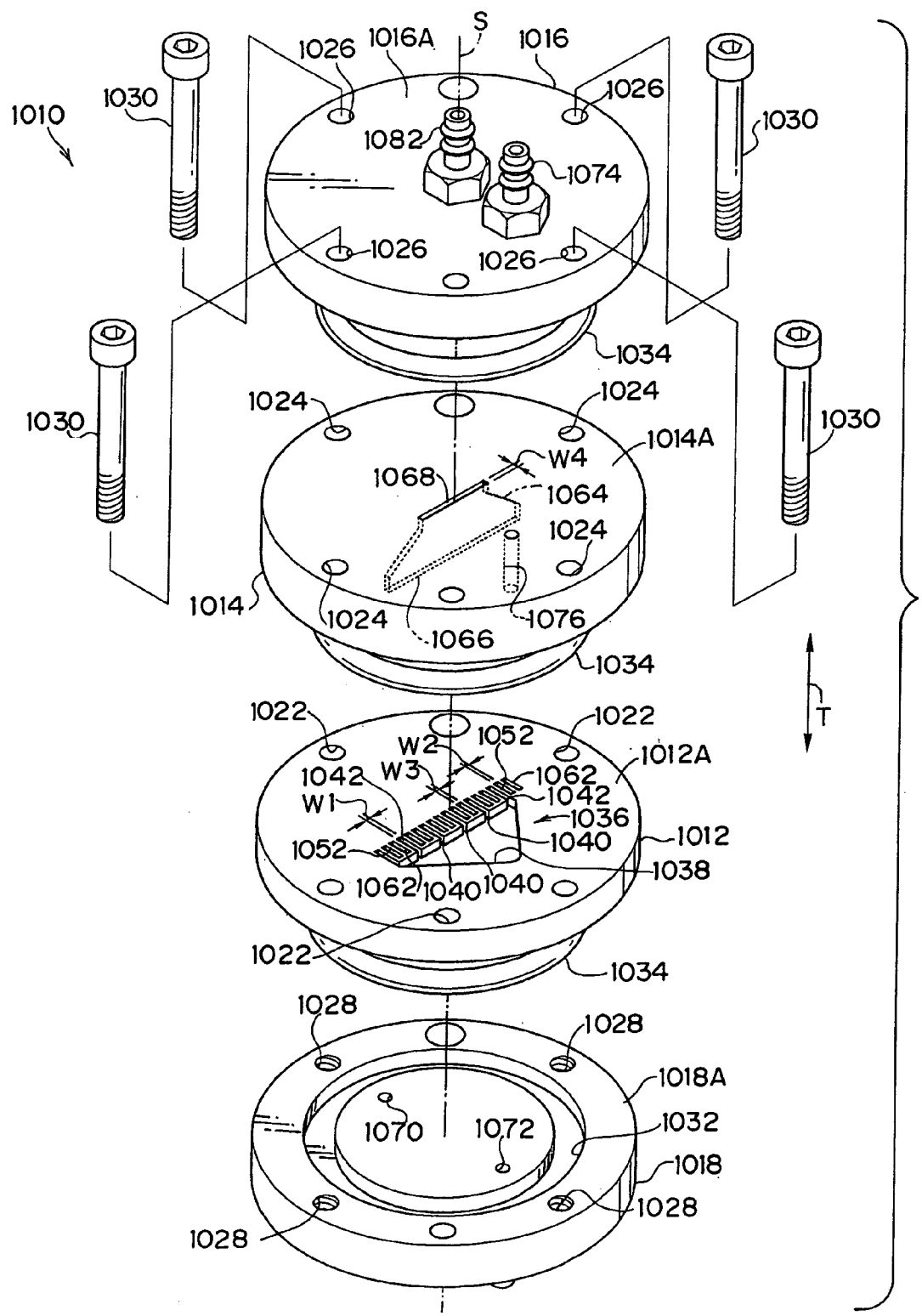
FIG. 23 is an exploded perspective view of the microreactor shown in FIG. 22.

FIGS. 22 and 23 show an example of a micromixer according to No. 1 of the eighth embodiment of the invention. This micromixer 1010 mixes three kinds of solutions L1, L2 and L3 simultaneously, and produces a solution LM in which these solutions L1, L2 and L3 are uniformly mixed. Here, when the solutions L1, L2 and L3 are mixed by a micromixer 1010, it is conceivable that a chemical reaction occurs between the solutions L1, L2 and L3 in some case and a chemical reaction does not occur in another case, and the micromixer of this embodiment can be used for both the cases.

As shown in FIG. 22, the micromixer 1010 is formed to be substantially cylindrical as a whole, and a base plate 1012, a mixing plate 1014, and cover plates 1016 and 1018 are stacked in the thickness direction (direction of an arrow T) of the plate. These four plates 1012, 1014, 1016 and 1018 are respectively formed to have disk shapes having the same outer diameter. Here, the base plate 1012 and the mixing plate 1014 constitute a mixer body 1020 for mixing the solutions L1, L2 and L3, and the cover plates 1016 and 1018 are disposed so that the mixer body 1020 is sandwiched between plates 1016 and 1018 in the thickness direction. Incidentally, on the paper surface of FIG. 22B, a surface positioned at the upper side of each of the plates 1012, 1014, 1016 and 1018 is referred to as a front surface part, and a surface positioned at the lower side of each of the plates 1012, 1014, 1016 and 1018 is referred to as a back surface part.

Plural insertion holes 1022, 1024, and 1026 passing through in the thickness direction are bored in the cover plate 1016, the mixing plate 1014, and the base plate 1012 at the outer peripheral parts. Plural screw holes 1028 corresponding to the plural insertion holes 1022, 1024 and 1026 are bored in the outer peripheral part of the cover plate 1018 in the thickness direction. After the plates 1012, 1014, 1016 and 1018 are superposed so that the insertion holes 1022, 1024 and 1026 and the screw holes 1028 coincide with each other, coupling bolts 1030 are inserted from the side of the cover plate 1016 into the insertion holes 1022, 1024 and 1026, and are screwed into the screw holes 1028 of the cover plate 1018, so that the plates are coupled by the coupling bolts 1030 and are assembled as the micromixer 1010.

As shown in FIG. 22B, a circular groove 1032 is formed in each of a back surface part 1016B of the cover plate 1016, a back surface part 1014B of the mixing plate 1014, and a front surface part 1018A of the cover plate 1018 in the peripheral direction at a slightly inner peripheral side with respect to the insertion hole 1024 or 1026 or the screw holes 1028, and an O-ring 1034 (see FIG. 23) made of elastic material such as silicone rubber is inserted in each of these circular grooves 1032. These three O-rings 1034 are respectively compressed in the thickness direction between the plates 1014 and 1016, between the plates 1012 and 1014, and between the plates 1012 and 1018, and prevent the leak of the solutions L1, L2, L3 and LM from the interfaces of the plates 1012 and 1014, the plates 1014 and 1016, and the plates 1012 and 1018.

As shown in FIG. 23, a recess-shaped liquid supply passage 1036 is formed in the front surface part 1012A of the base plate 1012. In the liquid supply passage 1036, a header part 1038 is provided at a portion near the outer periphery of the front surface part 1012, and the shape of this header part 1038 in the surface direction is a fan shape in which its width widens from the outer peripheral side to the center side. In the liquid supply passage 1036, plural (six in FIG. 23) microchannel parts 1040 extending from the center end part of the header part 1038 are integrally formed. These microchannel parts 1040 are respectively formed to have thin and long groove shapes extending in parallel with each other in the diameter direction of the base plate 1012, and are arranged like the teeth of a comb as a whole. In each of the plural microchannel parts 1040, a slit-like liquid supply port 1042 is bored in the front surface part 1012A of the base plate 1012, and an opening width W1 (see FIG. 23) of the liquid supply port 1042 is suitably set within the range of from 1 µm to 500 µm in accordance with the kind, supply amount and the like of the solution L1. Further, the depth of the microchannel part 1040 is also suitably set in accordance with the supply amount of the solution L1, and is preferably set to be one or more times as long as the opening width W1, and is more preferably set to be two or more times as long as the opening width W1. The number of the microchannel parts 1040 extending from the header part 1038 is also suitably set in accordance with the supply amount of the solution L1, and in the case where the opening width W1 is constant, it is necessary to increase the number in accordance with the increase of the supply amount.

Figure 25:
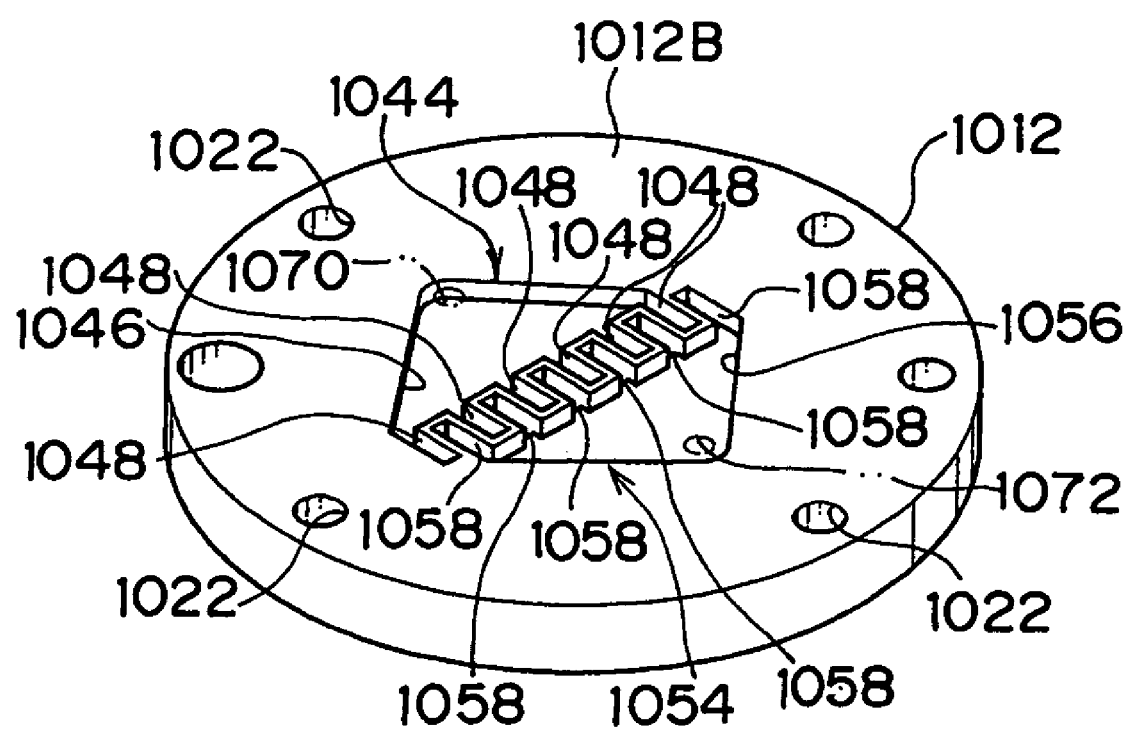
FIG. 25 is a perspective view showing a back surface part of the base plate in the microreactor shown in FIG. 22.

As shown in FIGS. 24D and 25, a pair of recess-shaped liquid supply passages 1044 and 1054 are formed in the back surface part 1012B of the base plate 1012. Also in these liquid supply passages 1044 and 1054, header parts 1046 and 1056 having the same shape as the liquid supply passage 1036 in the front surface part 1012A are formed, and these header parts 1046 and 1056 are symmetrically arranged with respect to the axial center S of the micromixer 1010. In the one liquid supply passage 1044, plural (six in FIGS. 25 and 25) microchannel parts 1048 are integrally formed from the center end part of the header part 1046. These microchannel parts 1048 are respectively formed to have thin and long groove shapes extending in parallel with each other in the diameter direction, and are disposed like the teeth of a comb as a whole. These microchannel parts 1048 deviate respectively from the microchannel parts 1040 of the liquid supply passage 1036 by a predetermined distance in the channel width direction (direction of an arrow W), and are disposed to substantially coincide with the microchannel parts 1040 in the channel length direction (direction of an arrow E).

Also in the other liquid supply passage 1054, plural (six in FIGS. 24 and 25) microchannel parts 1058 are integrally formed from the center end part of the header part 1056. These microchannel parts 1058 are respectively formed to have thin and long groove shapes extending in parallel with each other in the diameter direction, and are disposed like the teeth of a comb as a whole. These microchannel parts 1058 are respectively positioned between the microchannel parts 1040 and the microchannel parts 1048 in the channel width direction, and are disposed to substantially coincide with the microchannel parts 1048 and 1058 in the channel length direction. Here, the back surface part 1014B of the mixing plate 1014 comes in close contact with the front surface part 1012A of the base plate 1012, so that the opening of the liquid supply passage 1036 at the side of the mixing plate 1014 is closed by this back surface part 1014B, and a space divided from the outside is formed in the liquid supply passage 1036. The front surface part 1018A of the cover plate 1018A comes in close contact with the back surface part 1012B of the base plate 1012, so that the openings of the liquid supply passages 1044 and 1054 at the side of the cover plate 1018 are closed by this front surface part 1018A, and spaces divided from the outside are respectively formed in the liquid supply passages 1044 and 1054.

As shown in FIGS. 24B and 24C, through parts 1050 and 1060 are formed in the liquid supply passages 1044 and 1054 to pass through from the bottom portions of the microchannel parts 1048 and 1058 to the front surface part 1012A of the base plate 1012 in the thickness direction. The opening ends of these through parts 1050 and 1060 at the front surface part 1012A are made thin and long slit-like liquid supply ports 1052 and 1062 in the channel length direction. As shown in FIG. 24A, these liquid supply ports 1052 and 1062 extend in parallel with the liquid supply port 1042 of the liquid supply passage 1036. The three kinds of liquid supply ports 1042, 1052 and 1062 are disposed alternately in the channel width direction. Here, similarly to the liquid supply port 1042, the opening widths W2 and W3 of the liquid supply ports 1052 and 1062 in the channel width direction are suitably set within the range of from 1 μm to 500 μm in accordance with the kind, supply amount and the like of the solutions L2 and L3, and the opening widths W1, W2 and W3 in this embodiment are made to have the same size. It is preferable that the pitch among the three kinds of liquid supply ports 1042, 1052 and 1062 in the channel width direction is as narrow as possible from the viewpoint of the suppression of the occurrence of stagnation and the shortening of the mixing time of the solutions L1, L2 and L3.

Figure 26:
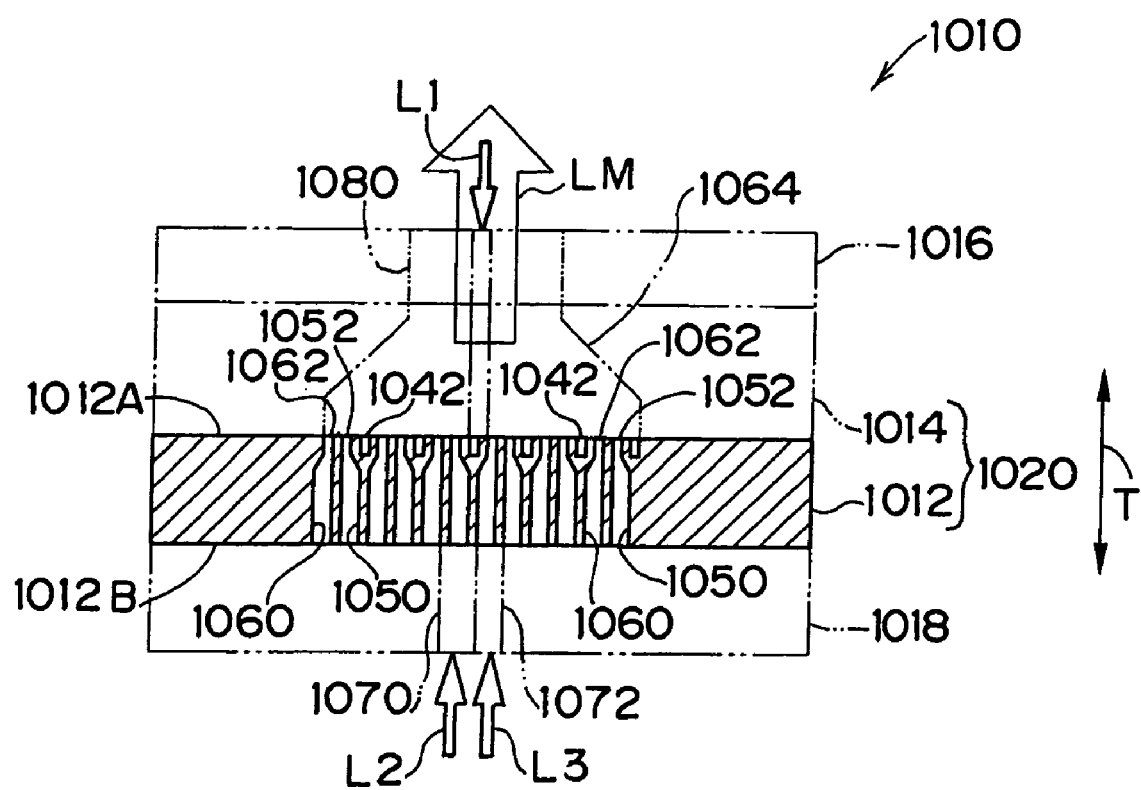
FIG. 26 is a side cross-sectional view schematically showing the structure of the microreactor shown in FIG. 22, and shows the flows of solutions before and after mixing thereof in the microreactor.

As shown in FIGS. 23 and 26, a mixing flow passage 1064 piercing from the back surface part 1014B to the front surface part 1014A is bored in the center of the mixing plate 1014. The cross-sectional shape of this mixing flow passage 1064 is made a slit shape which is thin and long in the direction (channel width direction) orthogonal to the liquid supply ports 1042, 1052 and 1062 and the opening width of which is narrow in the channel length direction. The opening length of the mixing flow passage 1064 in the channel width direction becomes narrow like a taper from the back surface part 1014B to the front surface part 1014A, and a liquid incoming port 1066 and a liquid outgoing port 1068 thin and long in the channel width direction are respectively bored in the back surface part 1014B and the front surface part 1014A. The liquid incoming port 1066 faces the liquid supply ports 1042, 1052 and 1062 of the base plate 1012, and is disposed to cross the center part of the liquid supply ports 1042, 1052 and 1062 in the channel width direction. Accordingly, the liquid supply passages 1036, 1044 and 1054 are in the state where only the centers of the liquid supply ports 1042, 1052 and 1062 communicate with the mixing flow passage 1064 through the liquid incoming port 1066. Here, the opening width W4 (see FIG. 23) of the mixing flow passage 1064 in the channel length direction is suitably set within the range of from 1 μm to 500 μm in accordance with the opening widths W1, W2 and W3 of the liquid supply ports 1042, 1052 and 1062 and the liquid supply quantities of the solutions L1, L2 and L3 from the liquid supply ports 1042, 1052 and 1062.

As shown in FIG. 22, two liquid injection holes 1070 and 1072 are bored in the lower cover plate 1018 in the thickness direction, and these liquid injection holes 1070 and 1072 pass through the cover plate 1018. End parts of the liquid injection holes 1070 and 1072 are respectively connected to the header parts 1046 and 1056 in the liquid supply passages 1044 and 1054, and female screw parts 1070A and 1072A are respectively formed at the other end parts. Male screw parts of nipple members 1074 formed into tubes are screwed in these female screw parts 1070A and 1072A. Liquid supply pipes (not shown) are connected to the pair of liquid injection holes 1070 and 1072 through the pair of nipple members 1074, and the pressurized solutions L2 and L3 are supplied through the pair of liquid supply pipes.

Also in the mixing plate 1014 and the upper cover plate 1016, liquid injection holes 1076 and 1078 are bored in the thickness direction, these liquid injection holes 1076 and 1078 respectively pass through the mixing plate 1014 and the cover plate 1016, and are connected to each other at the interface between the mixing plate 1014 and the back surface part 106B of the cover plate 1016. One end part of the liquid injection hole 1076 is connected to the header part 1038 in the liquid supply passage 1036, and a female screw part 1078A is formed at the other end part of the liquid injection passage 1078. The male screw part of the nipple member 1074 is screwed in this female screw part 1078A. Liquid supply pipes (not shown) are connected to the liquid injection holes 1076 and 1078 through the nipple members 1074, and the pressurized solution L1 is supplied through this liquid supply pipe. In addition, a circular groove is formed in the back surface part 1016B of the cover plate 1016 at the outer peripheral side of the liquid supply passage 1078, an O-ring 1019 is inserted in this circular groove as shown in FIG. 1B, and this O-ring is compressed between the cover plate 1016 and the mixing plate 1014 in the axial direction. This prevents the solution L3 flowing in the liquid injection holes 1076 and 1078 from leaking out from a portion between the back surface part 1016B of the cover plate 1016 and the front surface part 1014A of the mixing plate 1014.

As shown in FIG. 22, a liquid outgoing port 1080 is bored in the upper cover plate 1016 along the axial center S, and this liquid outgoing port 1080 pierces the cover plate 1016. One end part of the liquid outgoing hole 1080 is connected to the liquid outgoing port 1068 of the mixing flow passage 1064, and a female screw part 1080A is formed at the other end part. A male screw part of a nipple member 1082 formed into a tube is screwed in this female screw part 1080A. A liquid outgoing pipe (not shown) is connected to the liquid outgoing hole 1080 through the nipple member 1082. By this, the solution LM in which the three kinds of solutions L1, L2 and L3 are mixed is supplied to the liquid outgoing pipe through the liquid outgoing hole 1080, and is sent through this liquid outgoing pipe to another micromixer in which a next process is performed or a solution tank for storing the solution LM.

In the micromixer 1010 of the embodiment constituted as described above, the solutions L1 to L3 are supplied to the header parts 1038, 1046 and 1056 formed in the front surface part 1012A and the back surface part 1012B of the base plate 1012 through the liquid injection holes 1070, 1072, 1076 and 1078, so that these solutions L1 to L3 are introduced into the mixing flow passage 1064 through the liquid supply port 1042, 1052 and 1062 of the microchannel parts 1040, 1048 and 1058. At this time, since the opening widths W1 to W3 of the liquid supply ports 1042, 1052 ad 1062 are made very small widths of 1 μm to 500 μm, the solutions L1 to L3 discharged from the liquid supply ports 1042, 1052 and 1062 into the mixing flow passage 1064 respectively become lamellar-shaped laminar flows having widths corresponding to the opening widths W1 to W3, and flow from the liquid incoming port 1066 to the side of the liquid outgoing port 1068, molecular diffusion occurs at the interface of the respective laminar flows in the normal direction, and the solutions L1 to L3 are mixed, so that the solution LM in which the solutions L1 to L3 are uniformly mixed is generated at the front side of the liquid outgoing port 1068. Accordingly, according to the micromixer 1010, the three kinds of solutions L1 to L3 are simultaneously mixed in the mixing flow passage 1064, and after the solutions are uniformly mixed, or a required chemical reaction, together with the mixing, is completed, the obtained solution LM can be supplied to the liquid outgoing pipe connected to the nipple member 1082.

Next, a modified example of the micromixer of the eighth embodiment of the invention will be described. FIGS. 27 and 28 respectively show modified examples of the micromixer of the eighth embodiment of the invention.

A micromixer 1086 shown in FIG. 27, similar to the micromixer 1010 as shown in FIGS. 22 and 23, is for generating the solution LM by mixing three kinds of solutions L1, L2 and L3. Main changing points of the micromixer 1086 with respect to the micromixer 1010 are that the one liquid supply passage 1054 formed in the back surface part 1012B of the base plate 1012 is omitted, and a liquid supply passage 1088 is added and formed in the front surface part 1012A of the base plate 1012.

The liquid supply passage 1088 added to and formed in the front surface part 1012A of the base plate 1012, similar to the other liquid supply passage 1036, is provided with a header part 1090 and a microchannel part 1092, and is disposed symmetrically with the other liquid supply passage 1036 with respect to the axial center S. In the micromixer 1086, correspondingly to these main changing points, one liquid injection hole 1072 passing through the lower cover plate 1018 is omitted, and liquid injection holes 1096 and 1098 are added and bored in the mixing plate 1014 and the upper cover plate 1016. The liquid injection holes 1096 and 1098 are made to have similar shapes to the other liquid injection holes 1076 and 1078, the one end part is connected to the header part 1090 of the liquid supply part 1088 added and formed in the front surface part 1012A, and a female screw part (not shown) is formed at the other tip end. The nipple member 1074 (see FIG. 22), similar to the other liquid injection holes 1076 and 1078, is screwed in this female screw part. Liquid supply pipes (not shown) are connected to the liquid injection holes 1096 and 1098 through the nipple member 1074, and the pressurized solution L3 is supplied through this liquid supply pipe.

Figure 27A:
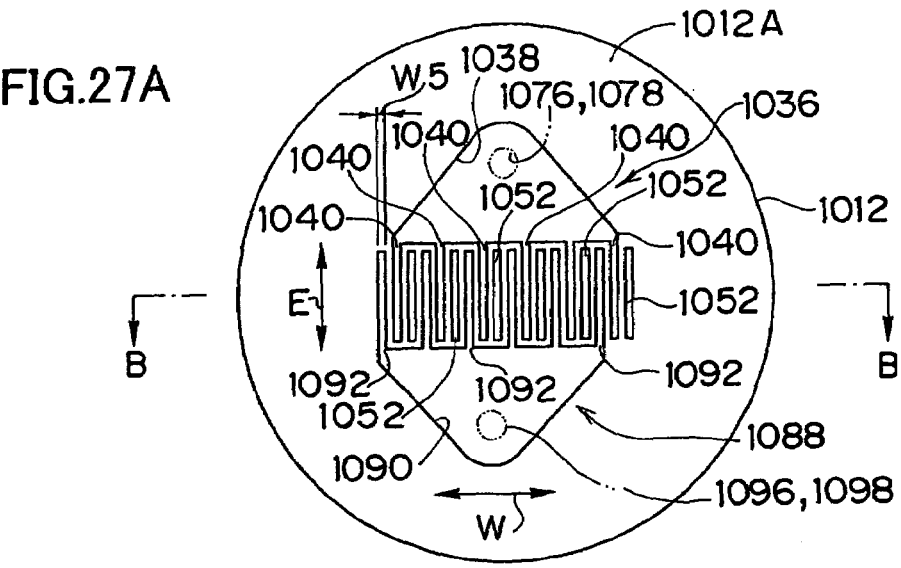
FIGS. 27A and 27C are plan views showing a structure of a modified example of the microreactor according to No. 1 of the eighth embodiment of the invention.
Figure 27B:
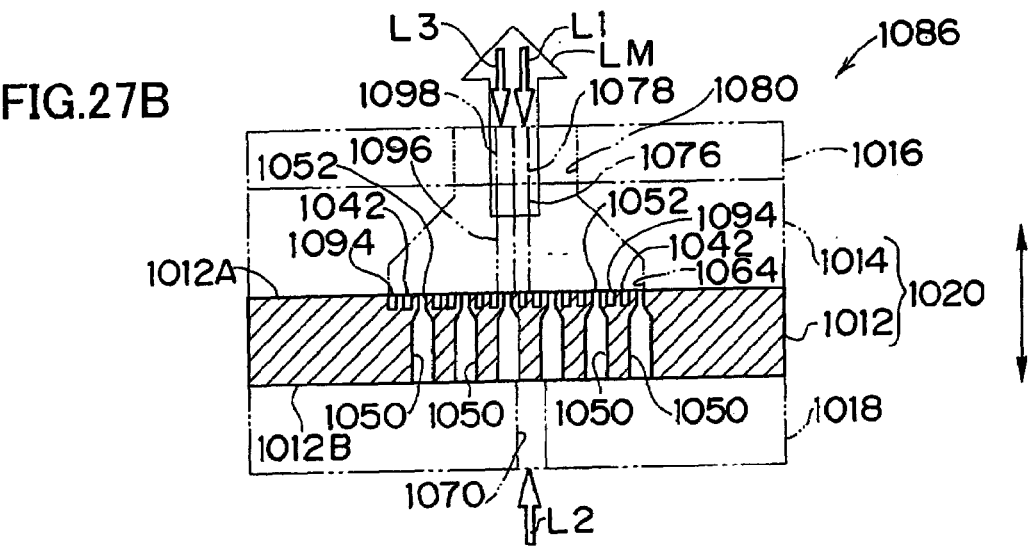
FIG. 27B is a side cross-sectional view thereof.
Figure 27C:
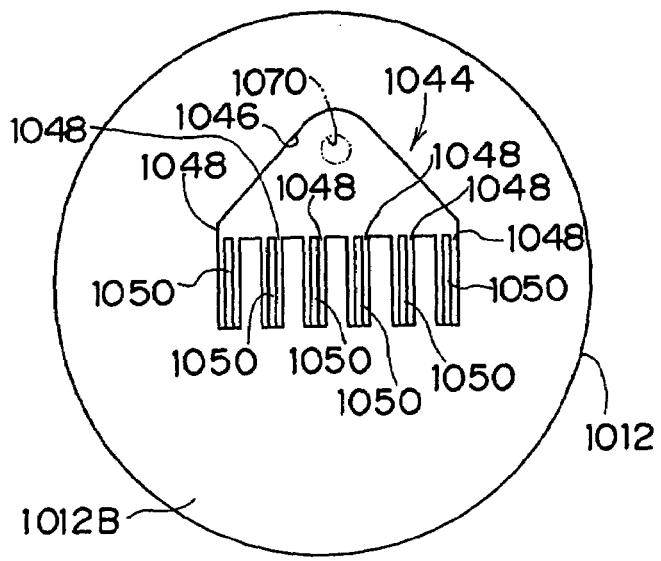

As shown in FIG. 27A, the microchannel part 1040 of the liquid supply passage 1036 formed in the front surface part 1012A of the base plate 1012 and the microchannel part 1092 of the liquid supply passage 1088 are disposed to be adjacent to each other in the channel width direction, and the liquid supply port 1042 and the liquid supply port 1094 are bored in the front surface part 1012A. Here, an opening width W5 of the liquid supply port 1094 in the channel width direction, similar to the other liquid supply port 1042, is suitably set within the range of from 1 μm to 500 μm in accordance with the kind, supply amount and the like of the solution L3. The depth of the microchannel part 1092, similar to the other microchannel part 1040, is also set to be preferably 1 or more times as long as the opening width W1, more preferably 2 or more times as long as the opening width W4. These liquid supply ports 1042 and 1094 and the liquid supply port 1052 connected to the liquid supply passage 1044 formed in the back surface part 1012B are alternately disposed in the channel width direction. These liquid supply ports 1042, 1052 and 1094 are respectively connected to the liquid incoming port 1066 of the mixing flow passage 1064. By this, the solutions L1, L2 and L3 are introduced through the liquid supply ports 1042, 1052 and 1094 and the liquid incoming port 1066 from the liquid supply passages 1036, 1044 and 1088 into the mixing flow passage 1064, and are supplied, as the solution LM, through this mixing flow passage 1064 to the liquid outgoing pipe.

Also by the micromixer 1086 of this embodiment constituted as described above, similarly to the micromixer 1010 shown in FIGS. 22 and 23, the three kinds of solutions L1 to L3 are simultaneously mixed in the mixing flow passage 1064, and after these solutions are uniformly mixed or a required chemical reaction, together with the mixing, is completed, the obtained solution LM can be supplied to the liquid outgoing pipe connected to the nipple member 1082.

A micromixer 1100 as shown in FIG. 28 is for mixing four kinds of solutions L1, L2, L3 and L4 to form a solution LM. A main changing point of this micromixer 1100 with respect to the micromixer 1010 is that a liquid supply passage 1102 is additionally formed in a front surface part 1012A of a base plate 1012.

The liquid supply passage 1102 formed in the front surface part 1012A of the base plate 1012, similar to the other liquid supply passage 1036, is provided with a header part 1104 and a microchannel part 1106, and is disposed symmetrically with the other liquid supply passage 1036 with respect to the axial center S. In the micromixer 1100, corresponding to this main changing point, liquid injection holes 1096 and 1098 communicating with each other are additionally bored in the mixing plate 1014 and the upper cover plate 1016. The liquid injection holes 1096 and 1098 are made to have the same shape as the other liquid injection holes 1076 and 1078, and the one end part is connected to the header part 1104 of the liquid supply passage 1102 additionally formed in the front surface part 1012A. A female screw part (not shown) is formed in the other end part of the liquid injection hole 1098, and the nipple member 1074 (see FIG. 22) is screwed in this female screw part. Liquid supply pipes (not shown) are connected to the liquid injection holes 1096 and 1098 through the nipple member 1074, and the pressurized solution L4 is supplied through this liquid supply pipe.

Figure 28A:
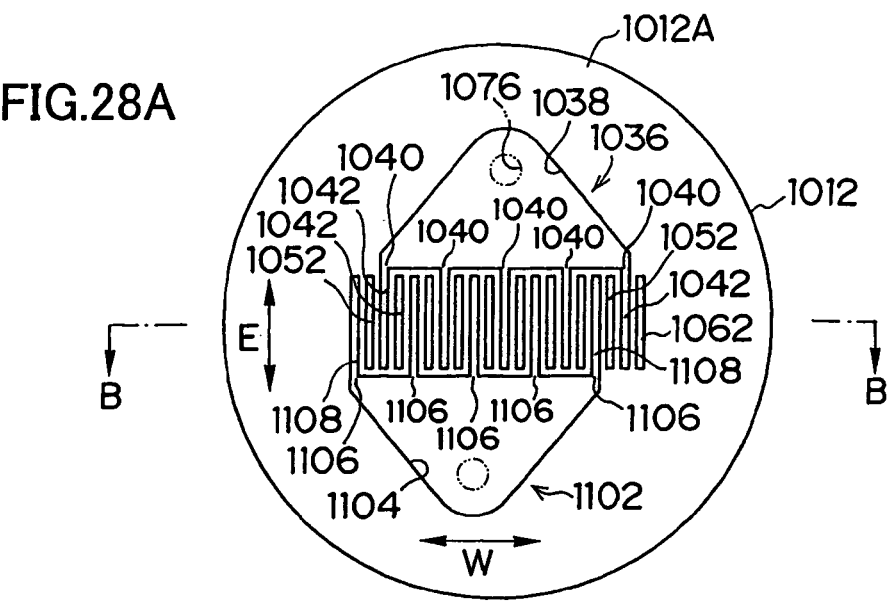
FIGS. 28A and 28C are plan views showing a structure of a modified example of the microreactor according to No. 1 of the eighth embodiment of the invention.
Figure 28B:
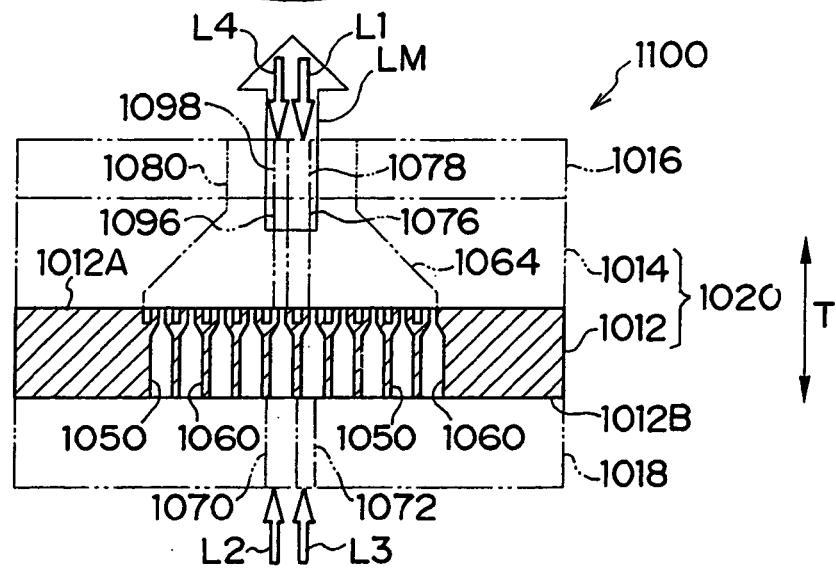
FIG. 28B is a side cross-sectional view thereof.
Figure 28C:
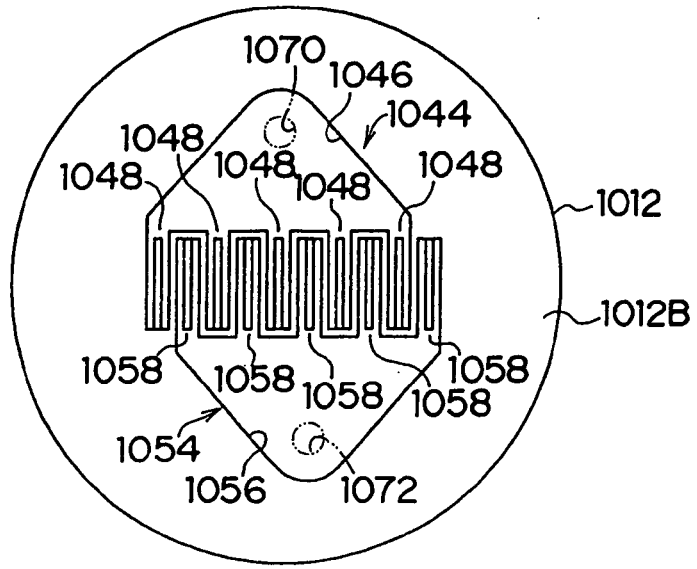

As shown in FIG. 28A, the microchannel part 1040 of the liquid supply passage 1036 formed in the front surface part 1012A of the base plate 1012 and the microchannel part 1106 of the liquid supply passage 1102 are disposed to adjacent with each other, while the liquid supply port 1052 or the liquid supply port 1062 intervenes therebetween in the channel width direction, and the liquid supply port 1042 and the liquid supply port 1094 are bored in the front surface part 1012A. Here, similarly to the other liquid supply ports 1042, 1052 and 1062, an opening width W6 of the liquid supply port 1094 in the channel width direction is suitably set within the range of from 1 μm to 500 μm in accordance with the kind, supply amount and the like of the solution L4. These liquid supply ports 1042, 1052, 1062 and 1098 are disposed alternately in the channel width direction. These four kinds of liquid supply ports 1042, 1052, 1062 and 1094 are respectively connected to the liquid incoming port 1066 of the mixing flow passage 1064. By this, the solutions L1, L2, L3 and L4 supplied into the liquid supply passages 1036, 1044, 1054 and 1102 through the liquid supply pipe are introduced into the mixing flow passage 1064 through the liquid supply ports 1042, 1052, 1062 and 1094 and the liquid incoming port 1066, and are supplied as the solution LM to the liquid outgoing pipe through the mixing flow passage 1064.

According to the micromixer 1100 of the embodiment constituted as described above, four kinds of solutions L1 to L4 are simultaneously mixed in the mixing flow passage 1064, and after these solutions are uniformly mixed or a required chemical reaction, together with the mixing, is completed, the obtained solution LM can be supplied to the liquid outgoing pipe connected to the nipple member 1082.

Next, a production method of the micromixers 1010, 1086 and 1100 of this embodiment will be described. With respect to the raw material of each of the plates 1012, 1014, 1016 and 1018 constituting the micromixers 1010, 1086 and 1100, it is necessary to consider strength, chemical stability such as corrosion resistance to the solutions L1 to L4, fluidity at the contact interface to the solutions L1 to L4, and the like, and specifically, for example, stainless (SUS system), non-ferrous metals, fine ceramics, special ceramics, plastic or the like is used, and what is obtained by applying a surface treatment, such as coating, to the material as the need arises, is used as the material of the plates 1012, 1014, 1016 and 1018. These materials and main processing methods for processing these materials are shown in Table 3 described below.

TABLE 3

| | Example of material | Main processing method |
|---|---|---|
| (1) Metal material | Metal material such as SUS, Ni, Al, Cu, Ag, Au, Pt, Ta or Ti, alloy material such as Ni—Fe or Au—Pt | Ultra-fine machining, electric discharge machining, dry etching such as ICP |
| (2) Fine ceramics | Glass, Al$_2$O$_3$ | Ultra-fine machining, electric discharge machining, dry etching such as ICP |
| (3) Special ceramics | Machinable ceramic, conductive ceramic such as SiC, etc. | Ultra-fine machining, electric discharge machining, dry etching such as ICP |
| (4) Plastic | Acrylic resin, etc. | Ultra-fine machining |
| (5) Ceramic coating layer | TiN, SiC | MOCVD, plasma CVD |

For example, in the case where the base plate 1012 is formed of metal material, the liquid supply passage 1036 can be processed in this base plate 1012 by a method as described in the following paragraphs (1) to (3).

(1) After the microchannel part 1040 is carved and formed in the front surface part 1012A of the base plate 1012 by the electrical discharge machining, the front surface part 1012A is subjected to die cutting electrical discharge machining by using an electrode having a surface shape corresponding to an opening shape of the header part 1038, and the header part 1038 is formed.

(2) After the header part 1038 is formed in the front surface part 1012A of the base plate 1012 by die cutting electrical discharge machining, the microchannel part 1040 is formed by electrical discharge machining using a minute electrode having a diameter of several μm to approximately 20 μm corresponding to the opening width W1.

(3) In the case where the opening width W1 of the microchannel part 1040 is wider than approximately 10 μm, the microchannel part 1040 is formed in the front surface part 1012A of the base plate 1012 by fine electrical discharge machining using an electrode corresponding to a groove shape of the microchannel part 1040, or after the microchannel part 1040 is formed by using ultra-fine machining (micro cutting machining), the header part 1038 is formed by die cutting electrical discharge machining.

In the case where the liquid supply passages 1044 and 1054 are formed in the base plate 1012, after the microchannel parts 1048 and 1058 and the header parts 1046 and 1057 are formed in the back surface part 1012B of the base plate 1012 by some method described in the above paragraphs (1) to (3), the through holes 1050 and 1060 passing through from the bottom portions of the microchannel parts 1048 and 1058 to the front surface part 1012A are formed by electrical discharge working using a minute electrode, so that these liquid supply passages 1044 and 1054 can also be formed.

In the case where the base plate 1012 is formed of material with no electoconductivity, such as glass, the liquid supply passages 1036, 1044, 1054, 1088 and 1100 can be formed in the base plate 1012 by, for example, ultra-fine cutting machining, or dry etching machining such as ICP.

Further, in the micromixers 1010, 1086 and 1100, as an equivalent diameter (an inner diameter in the case where the sectional shape of a channel is converted into a circle) of each of the microchannel parts 1040, 1048, 1058, 1092 and 1106 becomes small, there is a fear that the influence of viscosity of the solutions L1 to L4 is increased, and the fluidity is deteriorated. Such decrease in the fluidity can be effectively prevented by, for example, finishing the inner surfaces of the microchannel parts 1040, 1048, 1058, 1092 and 1106 into ultra-smooth surfaces of $R_{max} \leq 0.2$ μm by wet polishing using an agent such as an acid solution, or in contrast with this, by performing a surface roughening treatment such as a stain crape treatment. Furthermore, it is also effective to apply ceramic coating of $Si_3N_4$, $SiO_2$ or $Al_2O_3$ to the inner surfaces of the microchannel parts 1040, 1048, 1058, 1092 and 1106 for the purpose of preventing the decrease in the fluidity. As a material effective in preventing the decrease in the fluidity, for example, SUS 316 can be named.

When it is expected that especially the solutions L1 to L4 having high corrosiveness is processed, the corrosion resistance to the solutions L1 to L4 having corrosiveness can be improved by applying coating of TEFLON$^{TR}$, TiN or SiC to the contact parts of the respective plates 1012, 1014, 1016 and 1018 with respect to the solutions L1 to L4, or by plating these parts with metal, such as gold (Au), having a high chemical stability.

Figure 8:
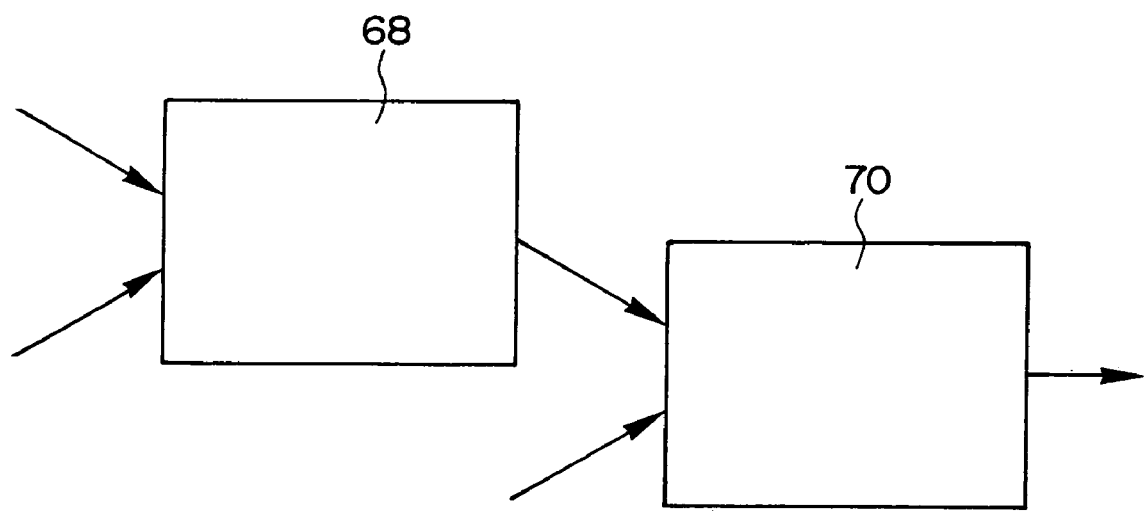
FIG. 8 is a schematic structural explanatory diagram showing a structural example of a pre-processing microreactor for mixing two liquids and a nucleus forming reaction microreactor for mixing two liquids in the production apparatus of the silver halide photographic emulsion according to the third embodiment of the invention.

(No. 2 of the Embodiment of FIG. 8)

Figure 29A:
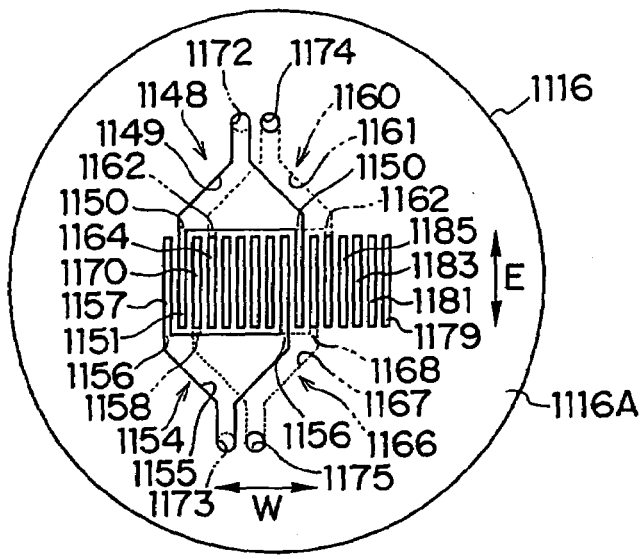
FIGS. 29A and 29C are plan views showing a structure of a microreactor according to No. 2 of the eighth embodiment of the invention.
Figure 29B:
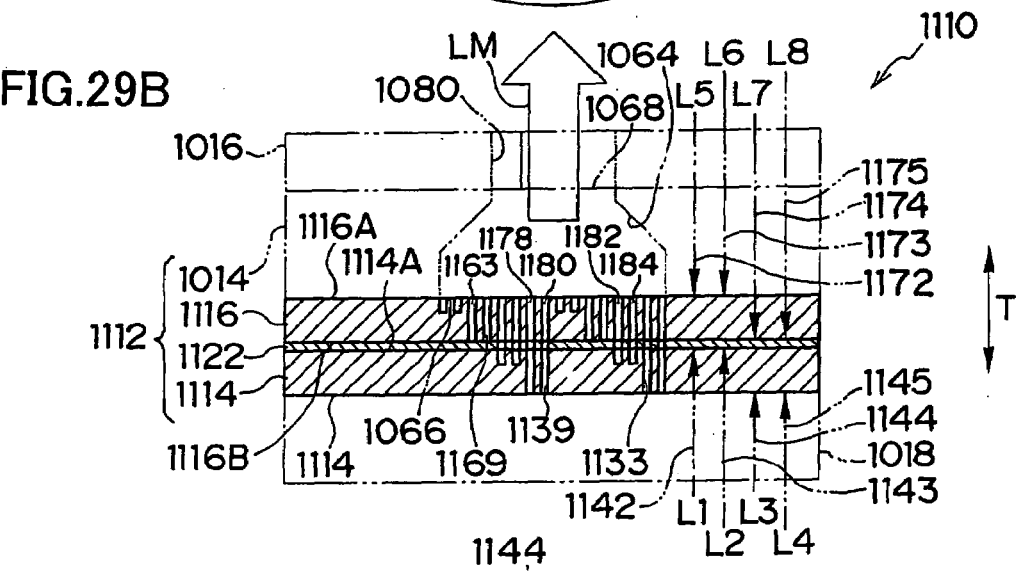
FIG. 29B is a side cross-sectional view thereof.
Figure 29C:
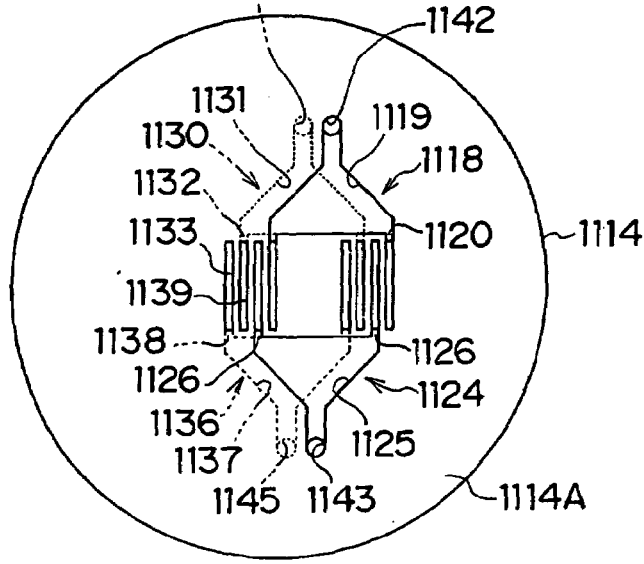

FIG. 29 shows a micromixer according to No. 2 of the eighth embodiment of the invention. A solution LM is formed by mixing eight kinds of solutions L1 to L8 by using the micromixer 1110. Incidentally, in the micromixer 1110 as shown in FIG. 29, members common to the micromixers 1010, 1086 and 1100 of the eighth embodiment in the structure and operation are designated by the same symbols and the descriptions are omitted.

In the micromixer 1110 of this embodiment, as shown in FIG. 29B, a mixer body 1112 is constituted such that two base plates 1114 and 1116 are superposed through a seal plate 1122, and further, one mixing plate 1014 is superposed on the base plate 1116. The micromixer 1110 is assembled such that cover plates 1016 and 1018 are superposed on both sides of the mixer body 1112, respectively, and these are coupled by a coupling bolt (not shown). In the base plate 1114 as shown in the lower side of FIG. 29B, a pair of liquid supply passages 1118 and 1124 are formed in its front surface part 1114A, and a pair of liquid supply passages 1130 and 1136 are formed in its back surface part 1114B. Also in the upper base plate 1116, similar to the lower base plate 1114, a pair of liquid supply passages 1148 and 1154 are formed in its front surface part 1116A, and a pair of liquid supply passages 1160 and 1166 are formed in its back surface part 1116B.

The liquid supply passages 1118 and 1124 and the liquid supply passages 1130 and 1136 formed in the lower base plate 1114 have basically the same structure as the liquid supply passages 1044 and 1054 and the liquid supply passages 1036 and 1102 formed in the base plate 1012 of the micromixer 1100 of the eighth embodiment, and respectively include header parts 1119, 1125, 1131 and 1137, plural (two in this embodiment) microchannel parts 1120, 1126, 1132 and 1138 extending from inner peripheral side end parts of these header parts 1119, 1125, 1131 and 1137, and through parts 1133 and 1139 passing through from the bottom portions of the microchannel parts 1132 and 1138 to the front surface part 1114A.

Here, four liquid injection holes 1142, 1143, 1144 and 1145, end parts of which are connected to the header parts 1119, 1125, 1131 and 1137 and the other end parts of which are opened to the outside of the micromixer 1110, are bored in the lower cover plate 1018 and the base plate 1114. Liquid supply pipes (not shown) are connected to the other end parts of these liquid injection holes 1142, 1143, 1144 and 1145, and the solutions L1 to L4 are supplied to the header parts 1119, 1125, 1131 and 1137 through these liquid supply pipes and the liquid injection holes 1142, 1143, 1144 and 1145.

The liquid supply passages 1148 and 1154 and the liquid supply passages 1160 and 1166 formed in the upper base plate 1116 also have the same structure as the liquid supply passages 1044 and 1054 and the liquid supply passages 1036 and 1102 formed in the base plate 1012 of the micromixer 1100 of the eighth embodiment, and respectively include header parts 1149, 1155, 1161 and 1167, plural (two in this embodiment) microchannel parts 1150, 1156, 1162 and 1168 extending from the inner peripheral side end parts of these header parts 1149, 1155, 1161 and 1167, and through parts 1163 and 1169 (see FIG. 29B) piecing from the bottom portions of the microchannel parts 1162 and 1168 to the front surface part 1116A.

Here, four liquid injection holes (not shown), end parts of which are connected to the header parts 1149, 1155, 1161 and 1167 and the other end parts of which are opened to the outside of the micromixer 1110, are bored in the upper cover plate 1016, the mixing plate 1014 and the upper base plate 1116. Liquid supply pipes (not shown) are connected to the other end parts of these liquid injection holes 1172, 1173, 1174 and 1175, and the solutions L5 to L8 are respectively supplied to the header parts 1149, 1155, 1161 and 1167 through these liquid supply pipes and the liquid injection holes 1172, 1173, 1174 and 1175.

As shown in FIG. 29B, extension passages 1178, 1180, 1182 and 1184 passing through from the back surface part 1116B to the front surface part 1116A are bored in the upper base plate 1116. Here, in the extension passages 1178 and 1180, lower open ends are connected to the through parts 1133 and 1139 bored in the front surface part 1114A of the base plate 1114, and upper open ends are bored in the front surface part 1116A of the base plate 1116 to form liquid supply ports 1179 and 1181. In the extension passages 1182 and 1184, lower open ends are connected to the microchannel parts 1120 and 1126 bored in the front surface part 1114A of the base plate 1114, and upper open ends are bored in the front surface part 1116A of the base plate 1116 to form liquid supply ports 1183 and 1185. In the seal plate 1122, the through parts 1133 and 1139 and opening parts piercing in the thickness direction at the portions opposite to the microchannel parts 1120 and 1126 are formed, and these opening parts respectively constitute parts of the extension passages 1178, 1180, 1182 and 1184.

Accordingly, the liquid supply ports 1151 and 1157 and the liquid supply ports 1164 and 1170 respectively connected to the liquid supply passages 1148 and 1154 and the liquid supply passages 1160 and 1166 formed in the front surface part 1116A and the back surface part 1116B are bored in the front surface part 1116A of the upper base plate 1116, and further, the liquid supply ports 1179 and 1181 and the liquid supply ports 1183 and 1185 respectively connected through the extension passages 1178, 1180, 1182 and 1184 to the liquid supply passages 1118 and 1124 and the liquid supply passages 1130 and 1136 formed in the front surface part 1114A and the back surface part 1114B of the lower base plate 1114 are bored. These liquid supply ports 1151, 1157, 1164, 1170, 1179, 1181, 1183 and 1185 are disposed alternately in the channel width direction, and the opening widths are suitably set within the range of 1 μm to 500 μm. These opening widths are basically set by the same method as the case of the micromixers 1010, 1086 and 1100 of the eighth embodiment.

The liquid supply ports 1151, 1157, 1164, 1170, 1179, 1181, 1183 and 1185 bored in the base plate 1116 are respectively connected to the liquid incoming port 1066 of the mixing flow passage 1064 formed in the mixing plate 1014. By this, the solutions L1 to L8 supplied to the header parts 1119, 1125, 1131, 1137, 1149, 1155, 1161 and 1167 are introduced into the mixing flow passage 1064 through the liquid supply ports 1151, 1157, 1164, 1170, 1179, 1181, 1183 and 1185 and the liquid incoming port 1066, and are supplied as the solution LM to the liquid outgoing pipe through this mixing flow passage 1064.

According to the micromixer 1110 of this embodiment constituted as described above, the eight kinds of solutions L1 to L8 are simultaneously mixed in the mixing flow passage 1064, and after these solutions are uniformly mixed, or a required chemical reaction, together with the mixing, is completed, the resultant solution LM can be supplied to the liquid outgoing pipe connected to the liquid outgoing hole 1080. In the case where the kinds of solutions to be processed by the micromixer 1110 is less than eight kinds, that is, in the case of five to seven kinds, both ends of one to three passages of the liquid supply passages 1118, 1124, 1130, 1136, 1142, 1148, 1154, 1160 and 1166 are closed according to the kinds of the solutions, so that the solution LM in which five to seven kinds of solutions are mixed by the micromixer 1110 can be produced.

According to the micromixers 1010, 1086 and 1100 of No. 1 and No. 2 of the eighth embodiment of the invention as described above, the one or two liquid supply passages 1036, 1088 and 1102 are formed in the front surface part 1012A of the base plate 1012, the header parts 1046 and 1056 and the microchannel parts 1048 and 1058 in the one or two liquid supply passages 1044 and 1054 are formed in the back surface part 1012B, and the through parts 1050 and 1060 piecing from the bottom portions of the microchannel parts 1048 and 1058 to the front surface part 1012A are bored in the base plate 1012, so that with respect to the liquid supply passages 1044 and 1054, it becomes unnecessary to form the header parts 1046 and 1056 and the microchannel parts 1048 and 1058 in the front surface part 1012A of the base plate 1012.

Accordingly, by merely boring the liquid supply ports 1052 and 1062 connected to the liquid supply passage 1044 and 1054 in the front surface part 1012A of the base plate 1012, it becomes possible to introduce three or four kinds of solutions L1 to L4 into the mixing flow passage 1064 formed in the mixing plate 1014 and to diffuse and mix them.

According to the micromixer 1110 of No. 2 of the eighth embodiment of the invention, the mixer body 1112 is constituted by superposing the two base plates 1114 and 1116, which have substantially the same structure as the base plate 1012 in the micromixer 1100 of No. 1 of the eighth embodiment, and the mixing plate 1014, so that it becomes possible to introduce five to eight kinds of solutions L1 to L8 into the mixing flow passage 1064 formed in the mixing plate 1014 and to diffuse and mix them.

Incidentally, in the micromixers 1010, 1086, 1100 and 1110 of No. 1 and No. 2 of the eighth embodiment as described above, when plural kinds of solutions flow in a laminar flow state in the mixing flow passage 1064, the laminar flows formed of the plural kinds of solutions are put in a regular arrangement (for example, L1-L2-L3-L1- . . . ) in the mixing flow passage 1064. However, it is not always necessary to put the plural kinds of solutions in such a regular arrangement in the mixing flow passage 1064, and the plural kinds of solutions may be supplied in the mixing flow passage 1064 so that a laminar flow made of another solution always intervenes between predetermined two kinds of solutions (for example, L1-L3-L2-L3-L1-L3-L2- . . . )

Next, a ninth embodiment of a production apparatus which can be used for a production method of silver halide photographic emulsion of the present invention will be described with reference to FIGS. 30 to 33.

The ninth embodiment has a further object to provide a micromixer which can effectively suppress stagnancy of a solution in a mixing flow passage as a space where mixing of plural solutions or a chemical reaction proceeds.

To this end, in the micromixer (microreactor) of this embodiment, first, the micromixer is constituted to include a plurality of header parts respectively receiving fluids from the outside, a plurality of fluid supply passages, end parts of which are connected to the plurality of header parts, a plurality of supply ports provided to be bored along circular loci at the other end parts of the plurality of fluid supply passages and to become substantially concentric with each other, and a mixing fluid, one end of which is connected to the plurality of supply ports and in which fluids introduced through the plurality of supply ports flow out from the other end part, wherein opening widths of the supply ports in an opening width direction orthogonal to the circular loci are formed to be from 1 μm to 500 μm.

By the constitution as described above, the plural supply ports bored along the circular loci and disposed to be substantially concentric with each other are provided at the other end parts of the plural fluid supply passage, one end part of the mixing flow passage at the upstream side is connected to these plural supply ports so that plural kinds of fluids introduced into the mixing flow passages through the plural supply ports become lamella-like laminar flows corresponding to the opening widths of the supply ports and flow in the mixing flow passage, and molecules of the respective fluids mutually diffuse at the interface between the mutually adjacent laminar flows, and accordingly, when the opening widths of the plural supply ports are made sufficiently minute widths (from 1 μm to 500 μm), the plural kinds of fluids introduced into the mixing flow passage through the plural supply ports are uniformly mixed in a very short time, and a fluid in which the plural kinds of fluids are mixed can be supplied from the liquid outgoing port of the mixing flow passage to the outside of the micromixer.

In the micromixer constituted as stated above, when the downstream side end parts in the plural fluid supply passages and the mixing flow passage are linearly disposed, and the mixing flow passage itself is extended linearly, the flow of the fluid in the mixing flow passage also becomes linear, so that stagnancy of the fluid caused by an abrupt change of the flow in the mixing flow passage does not occur, and when the cross-sectional area of the mixing flow passage is made constant at an arbitrary position, the stagnancy of the mixed fluid caused by a change of the cross-sectional area in the mixing flow passage also does not occur.

In the micromixer constituted as stated above, as the fluid supplied to the plural fluid supply passages from the outside, for example, a liquid, a gas, a solid liquid mixture in which metal fine particles or the like are dispersed in the liquid, a solid gas mixture in which metal fine particles or the like are dispersed in the gas, or a gas liquid mixture in which gas is not dissolved but is dispersed in the liquid also becomes an object, and that the kind of a fluid is different includes not only a case where a chemical composition is different, but also a case where a state of, for example, temperature or a solid liquid ratio is different.

(No. 1 of Ninth Embodiment)

FIG. 30 shows an example of a micromixer according to No. 1 of the ninth embodiment of the invention. The micromixer 2010 is for simultaneously mixing two kinds of solutions L1 and L2 and supplying a solution LM in which these solutions L1 and L2 are uniformly mixed to the outside. Here, when the solutions L1 and L2 are mixed by the micromixer 2010, it is conceivable that a chemical reaction occurs between the solutions L1 and L2 in some case and a reaction does not occur in another case, and the micromixer of this embodiment can be used for both the cases.

As shown in FIG. 30, the micromixer 2010 is formed to be substantially cylindrical as a whole, and includes a cylindrical mixer body 2012 constituting an outer shell part of a device. Here, a straight line S in the drawing indicates the axial center of the device, and a direction along this axial center S is made an axial direction of the device in the following description. A base end part of the mixer body 2012 in the axial direction is a large diameter part 2014 which is made large as compared with a tip side portion, and a pair of first header part 2016 and second header part 2018 receiving the solutions L1 and L2 from the outside are provided in the large diameter part 2014. A tip side portion of the mixer body 2012 with respect to the large diameter part is a circular pipe part 2020 the inner diameter of which is constant, a liquid outgoing port 2022 of the solution LM is bored in the tip end part of this circular pipe part 2020, and a ring-shaped flange part 2024 is provided at the tip end part of the circular pipe part 2020 so as to extend toward the outer peripheral side.

Here, a liquid outgoing pipe (not shown) provided with a flange part paired with the flange part 2024 is coupled to the tip end part of the mixer body 2012, and the solution LM discharged from the liquid outgoing port 2022 of the mixer body 2012 is sent to a storage container for temporal storage through the liquid outgoing pipe, another micromixer for performing a next process to the solution LM, and the like. Here, the flange part 2024 of the mixer body 2012 and the flange part of the liquid outgoing pipe can be coupled by various joint structures, such as a screw joint using a bolt and a nut, or a ferule joint in which a ring-shaped coupling member is fitted from the outer peripheral side of a pair of flange parts, or may be coupled by welding.

The base end surface of the large diameter part 2014 in the mixer body 2012 is closed by a disk-shaped bottom cover 2026, and a circular insertion hole 2028 is bored in the center of this bottom cover 2026. A round rod straightening member 2030 is coaxially disposed in the mixer body 2012 so as to protrude from the inside of the large diameter part 2014 into the circular pipe part 2020. The base end part of the straightening member 2030 is inserted into the insertion hole 2028 of the bottom cover 2026 and is supported. A conical part 2032 the diameter of which becomes small toward the tip side is formed at the tip end part of the straightening member 2030. Here, the outer diameter of the straightening member 2030 is smaller than the inner diameter of the circular pipe part 2020, and a dimension difference with respect to the inner diameter of the circular pipe part 2020 is set on the basis of the flow volumes of the solutions L1 and L2 in the circular pipe part 2020.

A disk-shaped partition plate 2034 for substantially dividing a space in the large diameter part 2014 into two equal parts in the axial direction is disposed in the large diameter part 2014 of the mixer body 2012, and a base end side space and a tip end side space divided by this partition plate 2034 are made a first header part 2016 and a second header part 2018. Liquid supply pipes 2036 and 2038 are respectively connected to these header parts 2016 and 2018. Pressurized solutions L1 and L2 are supplied through these liquid supply pipes 2036 and 2038 to the header parts 2016 and 2018 from two liquid supply sources (not shown) installed at the upstream side of the micromixer 2010. These liquid supply sources are constituted by, for example, other micromixers for producing the solutions L1 and L2, or storage tanks for storing the solutions L1 and L2, and pumps.

A circular opening part having an opening diameter of an intermediate size between the inner diameter of the circular pipe part 2020 and the outer diameter of the straightening member 2030 is bored in the center of the partition plate 2034, and a pipe-like partition wall member 2040 protruding from the peripheral fringe part of the opening part into the circular pipe part 2020 is integrally formed in the partition plate 2034. This partition wall member 2040 is disposed coaxially with the circular pipe part 2020 and the straightening member 2030, and divides a space between the circular pipe part 2020 and the straightening member 2030 into an inner peripheral side space and an outer peripheral side space. Here, the outer peripheral side space and the inner peripheral side space divided by the partition wall member 2040 are made a first liquid supply passage 2042 and a second liquid supply passage 2044, and these first and second liquid supply passages 2042 and 2044 respectively communicate with the first and second header parts 2016 and 2018 at the base end side. A cylindrical space thicker than the liquid supply passages 2042 and 2044 is formed in the circular pipe part 2020 of the mixer body 2012 at the tip end side of the partition wall member 2040 and the base end side of the conical part 2032 of the straightening member 2030, and this cylindrical space is a mixing flow passage 2046 in which mixing or mixing and a chemical reaction of the solution L1 and the solution L2 supplied from the liquid supply passages 2042 and 2044 are performed.

Plural (four in this embodiment) spacers 2048 are provided between the inner peripheral surface of the circular pipe part 2020 and the outer peripheral surface of the partition wall member 2040 in the mixer body 2012, and plural (four in this embodiment) spacers 2050 are also provided between the inner peripheral surface of the partition wall member 2040 and the outer peripheral surface of the straightening member 2030. Each of these plural spacers 2048 and 2050 is formed to have a rectangular plate shape, and is supported so that its front and back surface parts are in parallel with the flow direction (direction of an arrow F) of the solutions L1 and L2 in the circular pipe part 2020. The plural spacers 2048 and 2050 are disposed at intervals of 90° in the circumferential direction with the axial center S as the center, and the positions in the circumferential direction are coincident with each other. Here, the outer peripheral side spacer 2048 couples the partition wall member 2040 to the circular pipe part 2020, the inner peripheral side spacer 2050 couples the straightening member 2030 to the partition wall member 2040, and the opening widths W1 and W2 (see FIG. 30A) of the liquid supply passages 2042 and 2044 in the diameter direction are set. By this, the partition wall member 2040 and the straightening member 2030 are coupled and fixed to the circular pipe part 2020 at sufficient strength, displacement from a predetermined position or deformation by the influence of liquid pressure of the solutions L1 and L2 or gravity is prevented, and the opening widths W1 and W2 are certainly kept at previously set sizes.

Figures 30A, 30B:
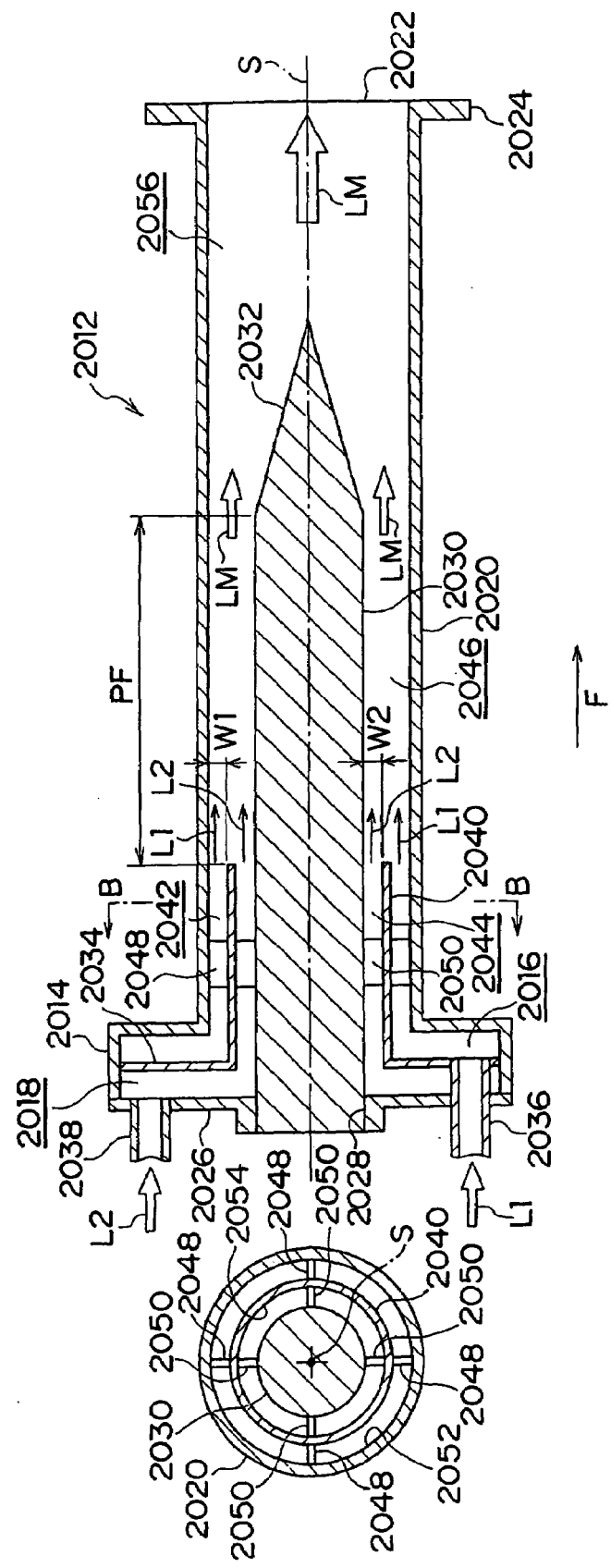
FIG. 30A is a cross-sectional view showing a structure of an example of a microreactor according to No. 1 of a ninth embodiment of the invention in an axial direction.
FIG. 30B is a cross-sectional view in a direction orthogonal to an axis.

As shown in FIG. 30B, a first liquid supply port 2052 and a second liquid supply port 2054 opened in the mixing flow passage 2046 are formed at the tip end part of the first liquid supply passage 2042 and the second liquid supply passage 2044. These liquid supply ports 2052 and 2054 are bored along the circular loci with the axial center S as the center, and are disposed to become concentric with each other. Here, the opening width W1 of the first liquid supply port 2052 in the diameter direction is suitably set within the range of from 1 μm to 500 μm in accordance with the supply amount, kind and the like of the solution L1 to the first header part 2016. The opening width W2 of the second liquid supply port 2054 in the diameter direction is also suitably set within the range of from 1 μm to 500 μm in accordance with the supply amount, kind and the like of the solution L2 to the second header part 2018.

Here, the opening widths W1 and W2 respectively define the opening areas of the liquid supply ports 2052 and 2054, and the initial flow rates of the solutions L1 and L2 introduced into the mixing flow passage 2046 through the liquid supply ports 2052 and 2054 are determined in accordance with the opening areas of the liquid supply ports 2052 and 2054 and the supply amounts of the solutions L1 and L2. These opening widths W1 and W2 are set so that for example, the flow rates of the solutions L1 and L2 supplied into the mixing flow passage 2046 through the liquid supply ports 2052 and 2054 become equal to each other. However, in the case where consideration is given to the shortening of the time until the solutions L1 and L2 are uniformly mixed, naturally, it is advantageous to narrow the opening widths W1 and W2, and it is desirable that the thickness of the partition wall member 2040 in the diameter direction is also made as thin as possible.

A space in the circular pipe part 2020 at the tip end side with respect to the mixing flow passage 2046 is made a liquid outgoing passage 2056 in which the solution LM flows toward the liquid outgoing port 2022 after the solutions L1 and L2 are mixed in the mixing flow passage 2046, or mixing and a chemical reaction are performed. Here, in the case where the solution LM is produced by only the mixing of the solutions L1 and L2, it is necessary that the solutions L1 and L2 are substantially uniformly mixed at the exit part of the mixing flow passage 2046, and in the case where the solution LM is produced by the mixing of the solutions L1 and L2 and the chemical reaction, it is necessary that the solutions L1 and L2 are substantially uniformly mixed at the exit part of the mixing flow passage 2046 and the chemical reaction of the solutions L1 and L2 is also substantially perfectly completed. Accordingly, it is necessary to set the passage length PF (see FIG. 30A) of the mixing flow passage 2046 in the flow direction of the solutions L1 and L2 to such a length that the mixing of the solutions L1 and L2 is completed or the mixing and the chemical reaction are substantially completed. Incidentally, it is assumed that the solutions L1 and L2 and the solution LM in which these are mixed are always closely filled in the mixer body 2012, and flow from the header parts 2016 and 2018 to the side of the liquid outgoing port 2022.

In the micromixer 2010 of this embodiment constituted as described above, the pressurized solutions L1 and L2 are supplied to the header parts 2016 and 2018 through the liquid supply pipes 2036 and 2038, and these solutions L1 and L2 are supplied from the header parts 2016 and 2018 into the liquid supply passages 2042 and 2044, flow in these liquid supply passages 2042 and 2044, and are introduced, as liquid flows having predetermined flow rates, into the mixing flow passage 2046 through the liquid supply port 2052. At this time, since the opening widths W1 and W2 of the liquid supply ports 2052 and 2054 are made as minute as 1 μm to 500 μm, the solutions L1 and L2 introduced into the mixing flow passage 2046 through the liquid supply ports 2052 and 2054 respectively become lamella-like laminar flows having widths corresponding to the opening widths W1 and W2, and flow to the side of the liquid outgoing passage 2056, and at the interface of the respective laminar flows, molecular diffusion occurs in the normal direction and the solutions L1 and L2 are mixed, and the solutions L1 and L2 are uniformly mixed at the front side of the liquid outgoing passage 2056, or they are uniformly mixed and the chemical reaction between the solutions L1 and L2 is completed, so that the solution LM is produced. This solution LM flows in the liquid outgoing passage 2056, and is supplied to the liquid outgoing pipe connected to the tip end part of the mixer body 2012 through the flange part 2024.

According to the micromixer 2010 of No. 1 of the ninth embodiment of the invention, the two liquid supply ports 2052 and 2054, which are bored along the circular loci and are disposed to be substantially concentric with each other, are provided at the tip end parts of the plural liquid supply passages 2042 and 2044, and the mixing flow passage 2046 is connected to these liquid supply ports 2052 and 2054, so that the two kinds of solutions L1 and 12 introduced into the mixing flow passage through the liquid supply ports 2052 and 2054 become lamella-like laminar flows corresponding to the opening widths W1 and W2 of the liquid supply ports 2052 and 2054 and flow in the mixing flow passage 2046, and molecules of the respective solutions L1 and L2 are mutually diffused at the interface between the adjacent laminar flows. Accordingly, when the opening widths W1 and W2 of the liquid supply ports 2052 and 2054 are made sufficiently minute (from 1 μm to 500 μm), the two kinds of solutions L1 and L2 introduced into the mixing flow passage 2046 through the liquid supply ports 2052 and 2054 are uniformly mixed in a short time, and the solution LM obtained after the two kinds of solutions L1 and L2 are mixed or the mixing and the chemical reaction are completed is sent to the liquid outgoing passage 2056, and can be supplied to another micromixer, a storage tank, or the like through the liquid outgoing pipe.

Further, in the micromixer 2010, since the two liquid supply passages 2042 and 2044 and the mixing flow passage connected to the liquid supply ports 2052 and 2054 in the liquid supply passages 2042 and 2044 are linearly disposed with the axial center S as the center, there does not occur stagnancy of the solutions L1, L2 and LM by abrupt change of flows of the solutions L1, L2 and LM in the mixing flow passage 2046, and since the cross-sectional area of the mixing flow passage 2046 in the direction orthogonal to the axis is constant at an arbitrary position, there does not also occur stagnancy of the solutions L1, L2 and LM due to the change of the cross-sectional area in the mixing flow passage 2046. As a result, since it is possible to suppress deposition and aggregation caused by stagnancy of the solutions L1 and L2 and the solution LM in the micromixer 2010, it becomes possible to prevent clogging due to the aggregation or deposition or to prevent reduction of homogeneity of a product due to mixing of aggregates or deposits. Incidentally, although the cross-sectional area of the mixing flow passage 2046 of this embodiment is larger than the total of the cross-sectional area s of the liquid supply passages 2042 and 2044 by the cross-sectional area of the partition wall member 2040, the inner diameter of the mixing flow passage 2046 may be made small relatively to the inner diameter of the liquid supply port 2052 so that the cross-sectional area of the mixing flow passage 2046 is coincident with the total of the cross-sectional area s of the liquid supply passages 2042 and 2044.

In the micromixer 2010, the flange part 2024 is provided at the tip end part of the mixer body 2012, and the mixer body 2012 can be directly connected to the liquid outgoing pipe having the paired flange part by using this flange part 2024, so that a specific pipe dedicated for a micromixer, for connecting the mixer body 2012 to another micromixer disposed at the downstream side, a storage tank or the like can also be eliminated, and installation to a production line of a chemical substance, medicines, or the like becomes easy.

Next, modified examples of the micromixer of No. 1 of the ninth embodiment of the invention will be described. FIGS. 31 and 32 show modified examples of the micromixer of No. 1 of the ninth embodiment of the invention.

First, a micromixer 2060 shown in FIG. 31 will be described. This micromixer 2060 is for mixing three kinds of solutions L1, L2 and L3 to produce a solution LM. In the micromixer 2060, a space in a large diameter part 2014 is substantially divided into three equal parts in an axial direction by two first partition plates 2062 and a second partition plate 2064, and three spaces divided by these partition plates 2062 and 2064 are made a first header part 2066, a second header part 2068 and a third header part 2070 in sequence from a base end side to a tip end side. Liquid supply pipes 2036, 2037 and 2038 are respectively connected to these header parts 2066, 2068 and 2070. A pressurized solution L1, solution L2 and solution L3 are respectively supplied from three liquid supply sources (not shown) installed at the upstream side of the micromixer 2010 to the header parts 2066, 2068 and 2070 through these liquid supply pipes 2036, 2037 and 2038.

A circular opening part having an opening diameter of an intermediate dimension between an inner diameter of a circular pipe part 2020 and an outer diameter of a straightening member 2030 is bored in the center of the first partition plate 2062, and a pipe-shaped first partition wall member 2072 protruding into the circular pipe part 2020 from the peripheral part of the opening part is integrally formed in the first partition plate 2062. A circular opening part having an opening diameter of an intermediate dimension between the inner diameter of the first partition wall member 2072 and the outer diameter of the straightening member 2030 is bored also in the center of the second partition plate 2064, and a pipe-shaped second partition wall member 2074 protruding from the peripheral part of the opening part into the inner peripheral side of the first partition wall member 2072 is integrally formed in the second partition plate 2062. These partition wall members 2072 and 2074 are disposed coaxially with the circular pipe part 2020 and the straightening member 2030, and divide a space between the circular pipe part 2020 and the straightening member 2030 into an outer peripheral side space, an intermediate space and an inner peripheral side space in the diameter direction. Here, the outer peripheral side, intermediate, and inner peripheral side spaces divided by the partition wall member 2040 are made a first liquid supply passage 2076, a second liquid supply passage 2078 and a third liquid supply passage 2080, and these liquid supply passages 2076, 2078 and 2080 communicate with the header parts 2066, 2068 and 2070 at the side of the base end part.

In the mixer body 2012, plural (four in this embodiment) spacers 2082, 2084 and 2086 intervene between the circular pipe part 2020 and the first partition wall member 2072, between the first partition wall part 2072 and the second partition wall member 2074, and between the second partition wall member 2074 and the straightening member 2030. Each of these plural spacers 2082, 2084 and 2086 is formed to have a rectangular plate shape, and is supported so that its front and back surface parts are in parallel with the flow direction (direction of an arrow F) of the solutions L1 to L3 in the circular pipe part 2020. These spacers 2082, 2084 and 2086, similar to the spacers 2048 and 2050 in the micromixer 2010 shown in FIG. 30, couple and fix the first partition wall member 2072, the second partition wall member 2074, and the straightening member 2030 to the circular pipe part 2020, and set the opening widths W1, W2 and W3 (see FIG. 31A) of the liquid supply passages 2076, 2078 and 2080 in the diameter direction. By this, the partition wall members 2072 and 2074 and the straightening member 2030 are coupled and fixed to the circular pipe part 2020 at sufficient strength, so that displacement from a predetermined position or deformation by the influence of liquid pressure of the solutions L1 to L3 or the gravity can be prevented, and the opening widths W1, W2 and W3 are certainly kept at previously set dimensions.

As shown in FIG. 31B, a first liquid supply port 2088, a second liquid supply port 2090 and a third liquid supply port 2092 respectively opened in the mixing flow passage 2046 are formed at tip end parts of the first liquid supply passage 2076, the second liquid supply passage 2078 and the third liquid supply passage 2080. These liquid supply ports 2088, 2090 and 2092 are bored along the circular loci with the axial center S as the center and are disposed to become concentric with each other. Here, The opening widths W1, W2 and W3 of the liquid supply ports 2088, 2090 and 2092 in the diameter direction, similar to the case of the micromixer 2010 shown in FIG. 30, are suitably set within the range of from 1 μm to 500 μm in accordance with the supply amounts, kinds and the like of the solutions L1 to L3 to the header parts 2066, 2068 and 2070.

In the case where the solution LM is produced by only the mixing of the solutions. L1 to L3, it is necessary that the solutions L1 and L2 are substantially uniformly mixed at the exit part of the mixing flow passage 2046, and in the case where the solution. LM is produced by the mixing of the solutions L1 to L3 and a chemical reaction, it is necessary that the solutions L1 to L3 are substantially uniformly mixed at the exit part of the mixing flow passage 2046, and the chemical reaction among the solutions L1 to L3 is also substantially perfectly completed. Accordingly, it is necessary that the passage length PF (see FIG. 31A) of the mixing flow passage 2046 in the flow direction of the solutions L1 to L3 is set to such a length that the mixing of the solutions L1 to L3 is completed, or the mixing and the chemical reaction are completed.

In the micromixer 2060 of this embodiment constituted as described above, when the pressurized solutions L1 to L3 are supplied to the header parts 2066, 2068 and 2070 through the liquid supply pipes 2026, 2027 and 2028, these solutions L1 to L3 are supplied from the header parts 2066, 2068 and 2070 into the liquid supply passages 2076, 2078 and 2080, flow in these liquid supply passages 2076, 2078 and 2080, and are introduced, as liquid flows having predetermined flow rates, into the mixing flow passage 2046 through the liquid supply ports 2088, 2090 and 2092. At this time, since the opening widths W1, W2 and W3 of the liquid supply ports 2088, 2090 and 2092 are made as minute as 1 μm to 500 μm, the three kinds of solutions L1 to L3 introduced into the mixing flow passage 2046 through the liquid supply ports 2088, 2090 and 2092 become lamella-like laminar flows having widths corresponding to the opening widths W1, W2 and W3 and flow to the side of the liquid outgoing passage 2056, and molecular diffusion occurs at the interface of the respective laminar flows in the normal direction to mix the solutions L1 to L3, so that the solution LM is obtained after the solutions L1 to L3 are uniformly mixed at the front side of the liquid outgoing passage 2056, or these solutions are uniformly mixed and the chemical reaction among the solutions L1 to L3 is completed. This solution LM flows in the liquid outgoing passage 2056, and is supplied to the liquid outgoing pipe connected to the tip end part of the mixer body 2012 through the flange part 2024.

As is apparent from the comparison between the micromixer 2010 and the micromixer 2060, according to the constitution of the micromixers 2010 and 2060 of this embodiment, by installing more partition plates for dividing the large diameter part 2014 in the axial direction, and more partition wall members integrally formed with the partition plates and dividing the space between the circular pipe part 2020 and the straightening member 2030 in the diameter direction, it is possible to easily install more header parts to which the solutions are supplied and more liquid supply passages for supplying the solutions as the laminar flows into the mixing flow passage 2046. Accordingly, the operation and effect similar to the micromixer 2010 shown in FIG. 30 are obtained, and it becomes possible to easily realize the micromixer that mixes four or more kinds of solutions as lamella-like laminar flows in the mixing flow passage 2046, or mixes them and causes the chemical reaction to occur.

Next, a micromixer 2100 shown in FIG. 32 will be described. Similarly to the micromixer 2010 shown in FIG. 30, this micromixer 2100 is for mixing two kinds of solutions L1 and L2 to produce a solution LM. This micromixer 2100 is different from the micromixer 2010 in that spacers 2048 and 2050 disposed between the circular pipe part 2020 and the partition wall member 2040 and between the partition wall member 2040 and the straightening member 2030 are omitted, and instead of these spacers 2048 and 2050, ring-shaped nozzle plates 2102 and 2104 are attached to opening parts of the liquid supply passages 2042 and 2044 at the tip end side.

The two nozzle plates 2102 and 2104 are provided between the circular pipe part 2020 and the partition wall member 2040 and between the partition wall member 2040 and the straightening member 2030, and are fixed so as to close the opening parts of the liquid supply ports 2052 and 2054 at the tip end side. As shown in FIG. 32B, plural circular liquid supply ports 2106 and 2108 are bored in these nozzle plates 2102 and 2104, and liquid supply ports 2052 and 2054 communicate with a mixing flow passage 2046 through the liquid supply ports 2106 and 2108. The inner diameters R1 and R2 of these liquid supply ports 2106 and 2108 are made smaller than the opening widths W1 and W2 of the liquid supply passages 2042 and 2044. The plural liquid supply ports 2106 are provided in the nozzle plate 2102 so that the pitches in the peripheral direction with the axial center S as the center become equal to each other, and the plural liquid supply ports 2108 are also provided in the nozzle plate 2104 so that pitches in the peripheral direction with the axial center S as the center become equal to each other. At this time, it is desired that the liquid supply port 2106 and the liquid supply port 2108 are disposed in the nozzle plates 2102 and 2104 as close as possible.

Here, similarly to the spacers 2048 and 2050 in the micromixer 2010, in the nozzle plates 2102 and 2104, the partition wall member 2040 and the straightening member 2030 are coupled and fixed to the circular pipe part 2020, and the opening widths of the liquid supply passages 2042 and 2044 in the diameter direction are set. By this, the partition wall member 2040 and the straightening member 2030 are coupled and fixed to the circular pipe part 2020 at sufficient strength, displacement from a predetermined position or deformation by the influence of liquid pressure of the solutions L1 and L2 or the gravity can be prevented, and the opening widths of the liquid supply passages 2042 and 2044 can be certainly kept at previously set size. The inner diameter R1 of the liquid supply port 2106 in the nozzle plate 2102 is suitably set within the range of from 1 µm to 500 µm in accordance with the supply amount, kind and the like of the solution L1, and further, the number of the liquid supply ports 2106 in the nozzle plate 2102 is determined in accordance with the inner diameter R1 and the supply amount of the solution L1 to the first header part 2016. The inner diameter R2 of the liquid supply port 2108 in the nozzle plate 2104 is also suitably set within the range of from 1 µm to 500 µm in accordance with the supply amount, kind and the like of the solution L2 to the second header part 2018, and further, the number of the liquid supply ports 2108 in the nozzle plate 2104 is determined in accordance with the inner diameter R2 and the supply amount of the solution L2 to the second header part 2018.

In the micromixer 2100 of this embodiment constituted as described above, when the pressurized solutions L1 and L2 are supplied to the header parts 2016 and 2018 through the liquid supply pipes 2036 and 2038, these solutions L1 and L2 are supplied from the header parts 2016 and 1018 into the liquid supply passages 2042 and 2044, flow in these liquid supply passages 2042 and 2044, and are introduced as liquid flows having predetermined flow rates into the mixing flow passage 2046 through the liquid supply ports 2106 and 2108. At this time, since the inner diameters R1 and R2 of the liquid supply ports 2106 and 2108 are as minute as 1 µm to 500 µm, the two kinds of solutions L1 and L2 introduced into the mixing flow passage 2046 through the liquid supply ports 2106 and 2108 respectively become plural thin rod-shaped laminar flows having outer diameters corresponding to the inner diameters R1 and R2 and flow to the side of the liquid outgoing passage 2056, and at the interface of the respective laminar flows, molecular diffusion occurs in its normal direction and the solutions L1 and L2 are mixed, and the solutions L1 and L2 are uniformly mixed at the front side of the liquid outgoing passage 2056, or they are uniformly mixed and the chemical reaction between the solutions L1 and L2 is completed, so that the solution LM is obtained. This solution LM flows through the liquid outgoing passage 2056, and is supplied to the liquid outgoing pipe connected to the tip end part of the mixer body 2012.

In the micromixer 2100 shown in FIG. 32, the solutions L1 and L2 are introduced into the mixing flow passage 2046 through the circular liquid supply ports 2106 and 2108, these solutions L1 and L2 are divided into the plural thin rod-shaped laminar flows and flow in the mixing flow passage 2046. On the other hand, in the micromixer 2010 shown in FIG. 30, each of the solutions L1 and L2 becomes a single lamella-like laminar flow, and flows in the mixing flow passage 2046. Accordingly, in the micromixer 2100, as compared with the micromixer 2010 shown in FIG. 30, in addition to the same operation and effect as the micromixer 2010, it becomes possible to increase specific surface areas concerning the laminar flows respectively formed by the solutions L1 and L2 in the mixing flow passage 2046, and it becomes possible to shorten the time until the solutions L1 and L2 are uniformly mixed in the mixing flow passage 2046, or the time until the chemical reaction is completed.

In the micromixer 2100 shown in FIG. 32, although the liquid supply ports 2106 and 2108 in the nozzle plates 2102 and 2104 are made circular, the shapes of these liquid supply ports 2106 and 2108 are not necessarily required to be circular, and an arbitrary shape, such as a fan shape widening toward the outer peripheral side, a hexagon, or an ellipse, can be used, and the specific surface areas of the laminar flows formed by the solutions L1 and L2 discharged from the liquid supply ports 2106 and 2108 may be adjusted by changing the shapes of the liquid supply ports 2106 and 2108.

In the micromixers 2010, 2060 and 2100 of this embodiment as described above, although the respective liquid supply ports 2052, 2054, 2088, 2090, 2092, 2106 and 2108 are bored along the circular loci, it is not necessarily required to bore these liquid supply ports 2052, 2054, 2088, 2090, 2092, 2106 and 2108 along the circular loci, and may be bored along annular loci other than the circle, such as a rectangular annular shape, an elliptical annular shape, or an oblong annular shape. Alternatively, the liquid supply ports 2052, 2054, 2088, 2090, 2092, 2106 and 2108 may be made zigzag-shaped, such as a continuous wavy shape or conical shape to substantially increase the areas of the contact interfaces among the solutions L1 to L3.

(No. 2 of the Ninth Embodiment)

FIG. 33 shows a micromixer of No. 2 of the ninth embodiment of the invention. Incidentally, this micromixer 2120 is based on the micromixer 2060 (see FIG. 31) of No. 1 of the ninth embodiment, and additionally includes liquid temperature control devices 2122, 2124 and 2126 for controlling the liquid temperature of the solutions L1 to L3 and the solution LM. Therefore, in the micromixer 2120 shown in FIG. 33, members having the same structure and operation as the micromixers 2010 and 2060 of No. 1 of the ninth embodiment are designated by the same symbols and the descriptions are omitted.

Figures 33A, 33B:
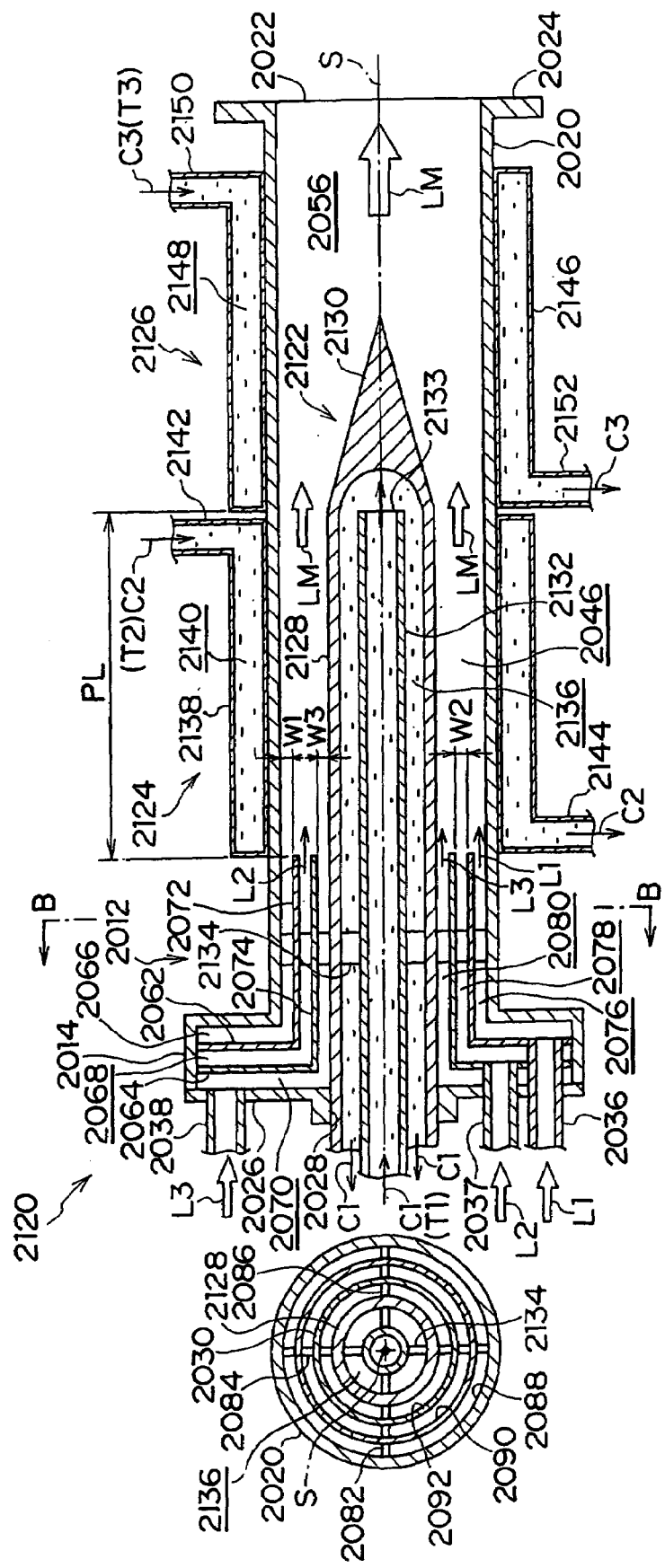
FIG. 33A is a cross-sectional view showing a structure of an example of a microreactor according to No. 2 of the ninth embodiment of the invention in an axial direction.
FIG. 33B is a cross-sectional view in a direction orthogonal to an axis.
Figure 37:
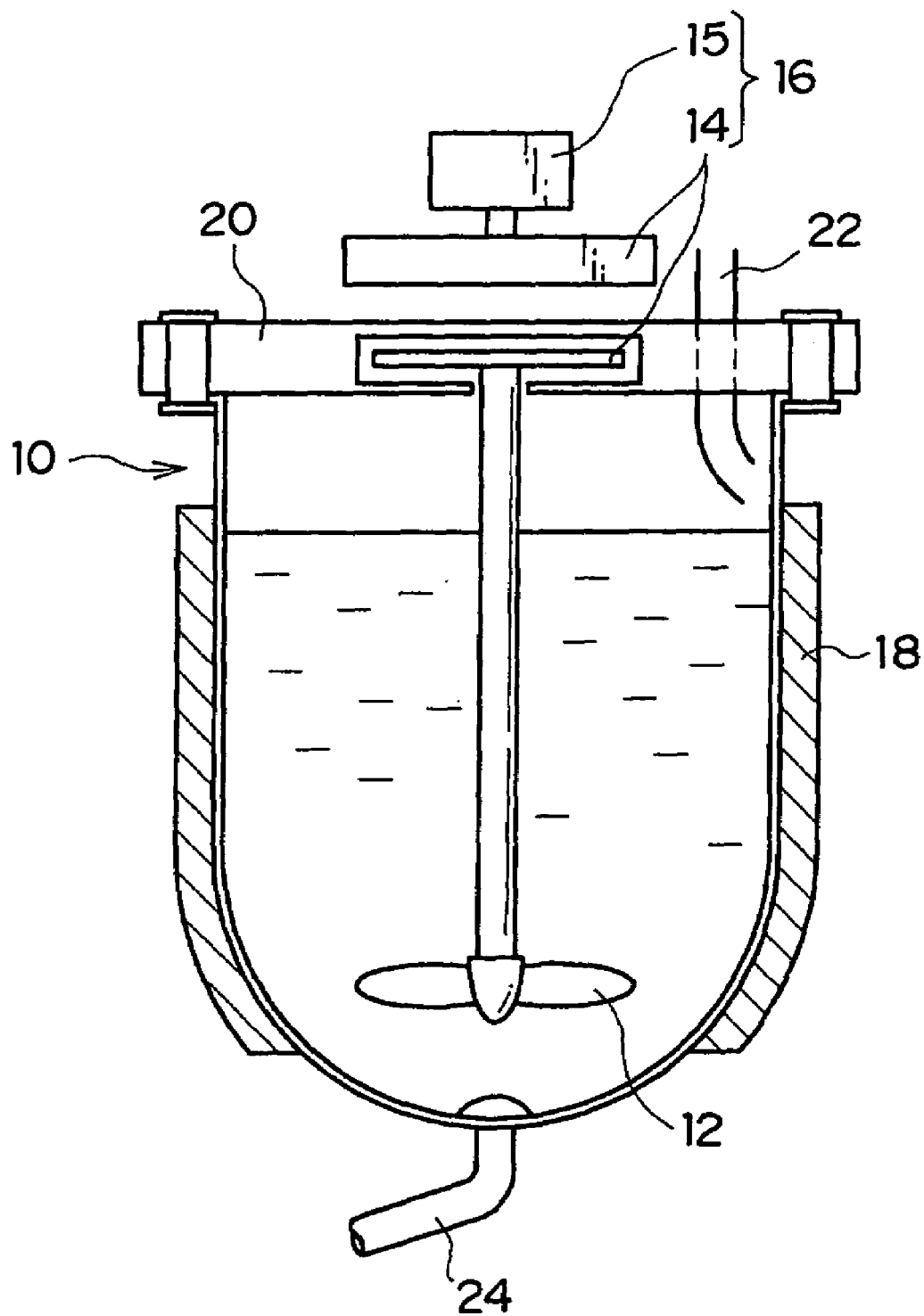
FIG. 37 is a schematic structural diagram exemplifying a production apparatus of silver halide photographic emulsion according to a conventional batch type production system.

The micromixer 2120 of No. 1 and No. 2 of the ninth embodiment, similar to the micromixer 2060 shown in FIG. 31, is for mixing three kinds of solutions L1, L2 and L3 or for mixing thereof and effecting a chemical reaction to produce the solution LM, and this is especially suitable for the case where the chemical reaction accompanies the mixing of the solutions L1 to L3. As shown in FIG. 33B, the micromixer 2120 is provided with a first liquid temperature control device 2122, a second liquid temperature control device 2124, and a third liquid temperature control device 2126 using liquids having relatively large heat capacities, such as water or oil, as heat transfer media C1, C2 and C3, respectively. Here, the liquid temperature control devices 2122 and 2124 are for mainly controlling the liquid temperatures of the solutions L1 to L3 which are flowing in the mixing flow passage 2046 and in which mixing or mixing and a chemical reaction are proceeding, and the liquid temperature control device 2126 is for controlling the liquid temperature of the solution LM flowing in a liquid outgoing passage 2056.

The first liquid temperature control device 2122 includes a straightening member 2128 disposed at the center of a mixer body 2012, and a first heat exchanger (not shown). The straightening member 2128, similar to the straightening member 2030 of No. 1 of the ninth embodiment, has a substantially cylindrical outer shape in which a conical part 2130 is formed at a tip end part. However, differently from the straightening member 2030 that has a solid shape, an outer shell part is formed of a thin metal plate, and an inner part is hollow. A liquid supply pipe 2132 having a diameter smaller than an inner diameter of the straightening member 2128 is inserted into the straightening member 2128 from its base end side, and the liquid supply pipe 2132 is supported coaxially with the straightening member 2128 by a closing plate (not shown) for closing an opening of the straightening member 2128 at the base end side and plural spacers 2134.

The tip end of the liquid supply pipe 2132 reaches the vicinity of the root of the conical part 2130, and a liquid supply port 2133 for supplying the heat transfer medium C1 into the straightening member 2128 is bored in the tip end surface. In the straightening member 2128, the gap formed between its inner peripheral surface and the outer peripheral surface of the liquid supply pipe 2132 is a return current passage 2136 of the heat transfer medium C1, and the heat transfer medium C1 flowing out from the liquid supply port 2133 of the liquid supply pipe 2132 flows through this return flow passage 2136 from the tip end side of the straightening member 2128 to the base end side.

Here, a liquid return pipe (not shown) is coupled to the closing plate for closing the base end surface of the liquid supply pipe 2132, and the tip end part of this liquid return pipe communicates with the return flow passage 2136. In addition, the base end part of the liquid return pipe and the base end part of the liquid supply pipe 2132 are respectively connected to a first heat exchanger (not shown), and this first heat exchanger adjusts the temperature of the heat transfer medium C1 returned from the straightening member 2128 through the liquid return pipe to a previously set liquid temperature T1, and sends out it into the straightening member 2128 through the liquid supply pipe 2132.

A circulation pump (not shown) is provided in the first liquid temperature control device 2122, and this pump always circulates the heat transfer medium C1 between the heat exchanger and the straightening member 2128 through the liquid supply pipe 2132 and the liquid return pipe. In the case where there is a temperature difference between the liquid temperature T1 of the heat transfer medium C1 flowing in the return flow passage 2136 and the liquid temperature of the solution L3 flowing in the third liquid supply passage 2080, or the liquid temperatures of the solutions L1 to L3 which flow in the mixing flow passage 2046 and in which the mixing is proceeding, the heat exchange is performed between the heat transfer medium C1 and the solution L3 or the solutions L1 to L3 through the outer shell part of the straightening member 2128, and the temperature change is made so that the liquid temperature of the solution L3 or the liquid temperatures of the solutions L1 to L3 approach the liquid temperature T1.

The second liquid temperature control device 2124 includes a heat exchange jacket 2138 disposed at the outer peripheral side of the mixing flow passage 2046 in the circular pipe part 2020 and a second heat exchanger (not shown). The heat exchange jacket 2138 has a thick cylindrical outer shape, and is fixed to the mixer body 2012 so that its inner peripheral surface comes in close contact with the outer peripheral surface of the circular pipe part 2020. The inside of the heat exchange jacket 2138 is made hollow, and this inner space is made a circular liquid chamber 2140 in which the heat transfer medium C2 flows. End parts of the liquid supply pipe 2142 and the liquid return pipe 2144 are respectively connected to the heat exchange jacket 2138, and the other end parts of the liquid supply pipe 2142 and the liquid return pipe 2144 are respectively connected to a second heat exchanger (not shown).

The second heat exchanger adjusts the temperature of the heat transfer medium C2 returned from the heat exchange jacket 2138 through the liquid return pipe 2144 to a previously set liquid temperature T2, and sends out it into the circular liquid chamber 2140 of the heat exchange jacket 2138 through the liquid supply pipe 2142. This heat transfer medium C2 flows in the circular liquid chamber 2140, passes through the liquid return pipe 2144 and returns to the second heat exchanger. A partition wall (not shown) for restricting the flow direction of the heat transfer medium C2 is installed in this circular liquid chamber 2140, and by this partition wall, after the heat transfer medium C2 makes at least one round in the circulation liquid chamber 2140, it reaches the liquid return pipe 2144.

The second temperature control device 2124, similar to the first liquid temperature control device 2122, also includes a pump for circulation (not shown), and this pump always circulates the heat transfer medium C2 between the second heat exchanger and the circulation liquid chamber 2140 through the liquid supply pipe 2142 and the liquid return pipe 2144. Therefore, in the case where there is a temperature difference between the liquid temperature T2 of the heat transfer medium C2 flowing in the circulation liquid chamber 2140 and the liquid temperature of the solutions L1 to L3 which flow in the mixing flow passage 2046 and in which the mixing is proceeding, the heat exchange is performed between the heat transfer medium C2 and the solutions L1 to L3 through the inner peripheral wall part of the heat exchange jacket 2138 and the outer peripheral wall part of the circular pipe part 2020, and the temperature change occurs so that the liquid temperature of the solutions L1 to L3 approach the liquid temperature T2.

The third liquid temperature control device 2126 includes a heat exchange jacket 2146 disposed at the outer peripheral side of the liquid outgoing passage 2056 in the circular pipe part 2020, and a third heat exchanger (not shown). The heat exchange jacket 2146 has the same shape and structure as the heat exchange jacket 2138, and a circulation liquid chamber 2148 in which the heat transfer medium C3 flows is provided in its inside. End parts of the liquid supply pipe 2150 and the liquid return pipe 2152 are respectively connected to the heat exchange jacket 2146, and the other end parts of the liquid supply pipe 2150 and the liquid return pipe 2152 are respectively connected to the second heat exchanger (not shown).

The third heat exchanger adjusts the temperature of the heat transfer medium C3 returned from the heat exchange jacket 2146 through the liquid return pipe 2152 to a previously set liquid temperature T3, and sends out it into the circulation liquid chamber 2148 of the heat exchange jacket 2138 through the liquid supply pipe 2150. This heat transfer medium C3 flows in the circulation liquid chamber 2148, passes through the liquid return pipe 2152, and returns to the third heat exchanger. A partition wall (not shown) for restricting the flow direction of the heat transfer medium C3 is installed in this circulation liquid chamber 2148, and by this partition wall, after the heat transfer medium C3 makes at least one round in the circulation liquid chamber 2148, it flows to reach the liquid return pipe 2152.

The third liquid temperature control device 2126, similar to the first liquid temperature control device 2122, also includes a circulating pump (not shown), and this pump always circulates the heat transfer medium C3 between the third heat exchanger and the circulation liquid chamber 2148 through the liquid supply pipe 2150 and the liquid return pipe 2152. Therefore, in the case where there is a temperature difference between the liquid temperature T3 of the heat transfer medium C3 flowing in the liquid circulation chamber 2148 and the liquid temperature of the solution LM flowing in the liquid outgoing passage 2056, heat exchange is performed between the heat transfer medium C3 and the solution LM through the inner peripheral wall part of the heat exchange jacket 2146 and the outer peripheral wall part of the circular pipe part 2020, and the temperature change occurs so that the liquid temperature of the solution LM approaches the liquid temperature T3.

Next, the operation of the micromixer 2120 of this embodiment constituted as described above will be described. In the micromixer 2120, when the pressurized solutions L1 to L3 are supplied to the header parts 2066, 2068 and 2070 through the liquid supply pipes 2026, 2027 and 2028, these solutions L1 to L3 are supplied from the header parts 2066, 2068 and 2070 into the liquid supply passages 2076, 2078 and 2080, flow in these liquid supply passages 2076, 2078 and 2080, and are introduced as liquid flows having predetermined flow rates into the mixing flow passage 2046 through the liquid supply ports 2088, 2090 and 2092. At this time, since the opening widths W1, W2 and W3 of the liquid supply ports 2088, 2090 and 2092 are made as minute as 1 μm to 500 μm, the three kinds of solutions L1 to L3 introduced into the mixing flow passage 2046 through the liquid supply ports 2088, 2090 and 2092 become lamella-like laminar flows having widths corresponding to the opening widths W1, W2 and W3 and flow toward the side of the liquid outgoing passage 2056, and at the interface of the respective laminar flows, molecular diffusion occurs in the normal direction and the solutions L1 to L3 are mixed, and the solutions L1 to L3 are uniformly mixed at the front side of the liquid outgoing passage 2056, or they are mixed and a chemical reaction among the solutions L1 to L3 is completed, so that the solution LM is obtained. This solution LM flows through the liquid outgoing port 2056, and is supplied to the liquid outgoing pipe connected to the tip end part of the mixer body 2012.

In the micromixer 2120 of this embodiment, the liquid temperature T1 of the heat transfer medium C1 is suitably set, so that the liquid temperature of the solution L3 flowing in the third liquid supply passage 2080 can be raised, kept or lowered by the first liquid temperature control device 2122, and accordingly, the liquid temperature of the solution L3 supplied into the mixing flow passage 2046 through the third liquid supply port 2092 can be controlled to a desired temperature. Further, in the micromixer 2120, the liquid temperatures T1 and T2 of the heat transfer media C1 and C2 are suitably set, so that the liquid temperatures of the solutions L1 to L3 which flow in the mixing flow passage 2046 and in which the mixing proceeds or the mixing and a chemical reaction proceed can be raised, kept or lowered by the liquid temperature control devices 2122 and 2124. At this time, in the case where the chemical reaction accompanies the mixing of the solutions L1 to L3, and the rate of the chemical reaction, the property of a reaction product, and the like are influenced by the liquid temperatures of the solutions L1 to L3, the reaction rate of the chemical reaction accompanying the mixing of the solutions L1 to L3, the property of the reaction product and the like can be precisely controlled. Further, in the micromixer 2120, the liquid temperature T3 of the heat transfer medium C3 is suitably set, so that the liquid temperature of the solution LM flowing in the liquid outgoing passage 2056 can be raised, kept or lowered by the third liquid temperature control device 2126. At this time, in the case where also after the completion of a primary chemical reaction of the solutions L1 to L3, a secondary reaction such as coalescence, growth or decomposition of the product continuously occurs in the solution LM, and the secondary reaction is influenced by the liquid temperature of the solution LM, it becomes possible to precisely control the reaction rate, the property of the reaction product and the like in the secondary reaction.

In the micromixer 2120 of this embodiment, although the liquid temperature control devices 2122, 2124 and 2126 are such that liquids are made the heat transfer media C1, C2 and C3, and the liquid temperatures of the solutions L1 to L3 or that of the solution LM is controlled by the heat exchange with these heat transfer media C1, C2, and C3, instead of these liquid temperature control devices 2122, 2124 and 2126, for example, a Peltier element is disposed at the inside of the straightening member 2128 or the outer peripheral side of the circular pipe part 2020, and heat exhaust from and heat supply to the solutions L1 to L3 or the solution LM may be performed by the Peltier element. In the case where the liquid temperatures of the solutions L1 to L3 or that of the solution LM has only to be raised, a heat generating resistor such as a halogen heater is disposed in the inside of the straightening member 2128 or at the outer peripheral side of the circular pipe 2020, and the liquid temperature may be raised.

Next, a tenth embodiment of a production apparatus which can be used for a production method of silver halide photographic emulsion of the invention will be described with reference to FIGS. 34 to 36.

The tenth embodiment has a further object to provide a micromixer in which the mixing of fluids introduced into a mixing flow passage through plural supply ports and the progress of a chemical reaction can effectively accelerated and can be controlled with sufficiently high accuracy.

Thus, in the micromixer (microreactor) of this embodiment, first, the micromixer includes plural fluid supply passages in each of which a fluid supplied from the outside flows from one end part to the other end part, plural supply ports respectively bored at the other end parts of the plural fluid supply passages and disposed to be adjacent to each other in a predetermined diffusion direction orthogonal to the flow direction of the fluids in the fluid supply passage, a mixing flow passage one end part of which is connected to the plural supply ports and which discharges the fluids from the other end part, the fluids being introduced through the plural supply ports, and diffusion control means for transmitting a mechanical vibration in the diffusion direction to the fluids flowing in the mixing flow passage, and opening widths of the plural supply ports in the diffusion direction are from 1 µm to 500 µm.

By the construction as described above, the plural supply ports are provided which are bored in the other end parts of the plural fluid supply passages and are disposed to be adjacent to each other in the predetermined diffusion direction orthogonal to the flow direction of the fluids in the fluid supply passages, the one end part of the mixing flow passage at the upstream side is connected to these plural supply ports, the diffusion control means transmits the vibration in the diffusion direction to the fluids flowing in the mixing flow passage, so that the plural kinds of fluids introduced into the mixing flow passage through the plural supply ports become lamella-like laminar flows corresponding to the opening widths of the supply ports and flow in the mixing flow passage, the movement of minute fluid bodies in the diffusion direction is accelerated at the interface between the adjacent laminar flows, and molecular movement of the respective fluids is increased, and accordingly, when the opening widths of the plural supply ports are respectively made sufficiently minute widths (from 1 µm to 500 µm), the plural kinds of fluids introduced into the mixing flow passage through the plural supply ports can be efficiently mixed by the movement of the minute fluid bodies. Further, since the molecular movements of the fluids flowing in the mixing flow passage can be increased mainly in the diffusion direction among the fluids by the vibration from the diffusion control means, the movement of molecules in the diffusion direction is increased in the vicinity of the contact interface between the laminar flows formed by the fluids, and the mixing between the fluids in the mixing flow passage and the chemical reaction accompanying the mixing can be efficiently accelerated.

As a result, by suitably controlling the frequency, the intensity (vibration energy) and the like of the vibration transmitted to the fluids by the diffusion control means in accordance with the kind, liquid temperature, viscosity, flow rate and the like of the fluids introduced into the mixing flow passage, it becomes possible to precisely control the progress of the mixing between the fluids in the mixing flow passage and the progress of the chemical reaction accompanying the mixing. Here, to control the progress of the mixing and the progress of the chemical reaction mainly mean the mixing rate among the fluids and the chemical rate, and in the case where the chemical reaction accompanies the mixing of the fluids, it also includes the control of properties of the reaction product, such as the shape and size, and the control of acceleration and suppression of the coalescence or flocculation of the reaction product.

Second, instead of the diffusion control means for transmitting the vibration in the diffusion direction to the fluids flowing in the mixing flow passage in the first micromixer, diffusion control means for irradiating the fluids flowing in the mixing flow passage with a microwave in the diffusion direction is provided to constitute the micromixer.

By the constitution as described above, since the molecular movement of the fluids flowing in the mixing flow passage can be increased mainly in the diffusion direction between the fluids by the microwave irradiated from the diffusion control means, similarly to the first micromixer of this embodiment, it is possible to increase the diffusion rate of a molecule in the vicinity of the contact interface between the laminar flows formed by the fluids, and to efficiently accelerate the mixing between the fluids in the mixing flow passage and the chemical reaction accompanying the mixing.

As a result, by suitably controlling the frequency, the intensity (electromagnetic energy) and the like of the microwave irradiated to the fluids by the diffusion control means in accordance with the kind, liquid temperature, viscosity, flow rate and the like of the fluids introduced into the mixing flow passage, it becomes possible to precisely control the progress of the mixing between the fluids in the mixing flow passage and the progress of the chemical reaction accompanying the mixing.

In the second micromixer, since the molecular movement of the fluids is increased by the microwave with high directionality, it becomes possible to concentratedly increase the molecular movement of the fluids existing in a specific region of the micro flow passage, and as compared with the first micromixer of this embodiment, it becomes possible to control the progress of the mixing between the fluids in the mixing flow passage and the progress of the chemical reaction accompanying the mixing with higher accuracy.

Incidentally, in the first and second micromixers, as the fluids supplied from the outside to the plural fluid supply passages, for example, a liquid, a gas, a solid liquid mixture in which metal fine grains or the like are dispersed in liquid, a solid gas mixture in which metal fine grains are dispersed in gas, or a gas liquid mixture in which gas is not dissolved in liquid but is dispersed therein also becomes an object, and that the kind of fluid is different includes not only a case where a chemical composition is different, but also a case where the state of, for example, temperature or a solid liquid ratio or the like is different.

(No. 1 of the Tenth Embodiment)

FIG. 34 shows an example of a micromixer of this embodiment. This micromixer 3010 is for mixing two kinds of solutions L1 and L2 and for supplying a solution LM in which these solutions L1 and L2 are uniformly mixed to the outside. When the solutions L1 and L2 are mixed by the micromixer 3010, it is conceivable that a chemical reaction occurs between the solutions L1 and L2 in some case and a chemical reaction does not occur in another case, and the micromixer of this embodiment can be used for both the cases.

As shown in FIG. 34, the outer shape of the micromixer 3010 is formed into a substantially prismatic shape as a whole, and includes a thin tubular body 3012 constituting an outer shell part of the device. Here, a straight line S in the drawing indicates an axial center connecting the centers of cross-sections of the mixer body 3012. The cross-section of the mixer body 3012 in the direction orthogonal to the axis is rectangular, and a partition wall plate 3014 dividing an inner space of the mixer body 3012 is disposed in the mixer body 3012 at the base end side (left side in FIG. 34) in the axial direction. This partition wall plate 3014 substantially divides the space in the mixer body 3012 into two equal parts in the short side direction of the cross-section, so that, a first liquid supply passage 3016 and a second liquid supply passage 3018 linearly extending in the axial direction are formed in the mixer body 3012.

As shown in FIG. 34A, a base end part of the mixer body 3012 is closed by a cover plate 3020, and two liquid supply pipes 3038 and 3039 are connected to this cover plate 3020. The pressurized solutions L1 and L2 are supplied into the liquid supply passages 3016 and 3018 through these liquid supply pipes 3038 and 3039 from two liquid supply sources (not shown) installed at the upstream side of the micromixer 3010. These liquid supply sources are constituted by, for example, other micromixers for producing the solutions L1 and L2, storage tanks storing the solutions L1 and L2, pumps and the like.

As shown in FIG. 34B, a first liquid supply port 3022 and a second liquid supply port 3024, each being substantially rectangular, are bored in the tip end surfaces of the two liquid supply passages 3016 and 3018 in the mixer body 3012, and these liquid supply ports 3022 and 3024 are adjacent to each other in the diffusion direction (direction of an arrow D) of the solutions L1 and L2. Here, the diffusion direction is a direction orthogonal to the flow direction (direction of an arrow F) of the solutions L1 and L2 in the liquid supply passages 3016 and 3018, and is coincident with the short side direction in the cross-section orthogonal to the axis of the mixer body 3012 in this embodiment. Each of the liquid supply ports 3022 and 3024 has a thin and long rectangular shape in an interface direction (direction of an arrow B) orthogonal to the diffusion direction.

As shown in FIG. 34A, in the mixer body 3012, a prismatic space where the liquid supply passages 3016 and 3018 meet each other is formed in the flow direction at the downstream side of the liquid supply passages 3016 and 3018, and this space is a mixing flow passage 3026 in which the mixture of the solutions L1 and L2 supplied from the liquid supply passages 3016 and 3018 or the chemical reaction accompanying the mixture is performed. In this mixing flow passage 3026, the end part at the upstream side in the flow direction is connected to the liquid supply ports 3022 and 3024, and the end part at the downstream side communicates with the liquid outgoing port 3028 bored in the tip end surface of the mixer body 3012. An annular flange part 3030 is provided at the tip end part of the mixer body 3012 to extend toward the outer peripheral side of the liquid outgoing port 3028.

Here, the opening width W1 of the first liquid supply port 3022 in the diffusion direction is suitably set within the range of from 1 μm to 500 μm in accordance with the supply amount, kind and the like of the solution L1 to the first liquid supply passage 3016. The opening width W2 of the second liquid supply port 3024 in the diffusion direction is suitably set within the range of from 1 μm to 500 μm in accordance with the supply amount, kind and the like of the solution L2 to the second liquid supply passage 3018. The opening width WB of the liquid supply ports 3022 and 3024 in the interface direction is set to at least the size of the opening widths W1 and W2. These opening widths W1, W2 and WB define the opening areas of the liquid supply ports 3022 and 3024, and initial flow rates of the solutions L1 and L2 introduced into the mixing flow passage 3026 through the liquid supply ports 3022 and 3024 are determined in accordance with the opening areas of the liquid supply ports 3022 and 3024 and the supply amounts of the solutions L1 and L2. Among these opening widths W1, W2 and WB, the opening widths W1 and W2 are set so that, for example, the flow rates of the solutions L1 and L2 supplied through the liquid supply ports 3022 and 3024 into the mixing flow passage 3026 become equal to each other. However, when consideration is given to the shortening of the time until the solutions L1 and L2 are uniformly mixed, naturally, it is advantageous to narrow the opening widths W1 and W2, and it is also desired that the thickness of the partition wall plate 3014 in the diffusion direction is made as thin as possible.

In the micromixer 3010, the mixture of the solutions L1 and L2 is performed in the mixing flow passage 3026, or the mixture and the chemical reaction are performed, and the obtained solution LM is discharged from the liquid outgoing port 3028. In the case where the solution LM is produced only by the mixture of the solutions L1 and L2, it is necessary that the solutions L1 and L2 are substantially uniformly mixed at the exit part of the mixing flow passage 3026, and in the case where the solution LM is produced by the mixture of the solutions L1 and L2 and the chemical reaction, it is necessary that the solutions L1 and L2 are substantially uniformly mixed at the exit part of the mixing flow passage 3026 and the chemical reaction between the solutions L1 and L2 is also substantially perfectly completed. Accordingly, it is necessary that the passage length PF (see FIG. 34A) of the mixing flow passage 3026 in the flow direction is set to such a length that the mixture of the solutions L1 and L2 is completed, or the mixture and the chemical reaction are completed. It is assumed that the solutions L1 and L2 and the solution LM in which these are mixed are always closely filled in the mixer body 3012, and flow in the liquid supply passages 3016 and 3018 toward the side of the liquid outgoing port 3028.

Here, a liquid outgoing pipe (not shown) having a flange part paired with the flange part 3030 is coupled to the tip end part of the mixer body 3012, and the solution LM discharged from the liquid outgoing port 3028 of the mixer body 3012 is sent through the liquid outgoing pipe to a storage container for temporal storage, another micromixer for performing a next process to the solution LM, and the like. The flange part 3030 of the mixer body 3012 and the flange part of the liquid outgoing pipe can be coupled by various joint structures, such as a screw joint using a bolt and a nut, or a ferule joint in which a ring-shaped coupling member is inserted from the outer peripheral side of the pair of flange parts, or may be coupled by welding. As the liquid outgoing pipe, as long as the flange part provided at the downstream end part is conformable to the shape of the flange part 3030 of the micromixer 3010, a general cylindrical metal pipe or the like can be used.

Thick plate-shaped vibration generators 3032 are attached to an upper surface part and a lower surface part of the mixer body 3012 at the downstream side so as to adhere closely thereto. The length of the pair of vibration generators 3032 is substantially equal to the length of the mixing flow passage 3026 in the flow direction, and the width in the interface direction is substantially equal to the opening width of the mixing flow passage 3026. Here, the vibration generator 3032 is disposed so that its upstream side end coincides with the upstream side end of the mixing flow passage 3026. Therefore, this, the pair of vibration generators 3032 correctly face the whole of the upper surface part and the whole of the lower surface part in the mixing flow passage 3026. A vibration part 3034 is provided in the vibration generator 3032 at the adherence surface to the mixer body 3012, and this vibration part 3034 transmits a mechanical vibration with a predetermined frequency to the solutions L1 and L2 in the mixing flow passage 3026 and the solution LM through the mixer body 3012 at the time of driving the vibration generator 3032. At this time, the vibration from the vibration part 3034 is transmitted to the solutions L1 and L2 and the solution LM in the diffusion direction as indicated by an arrow V of FIG. 34, and the molecular movement of the solutions L1, L2 and LM is increased in the diffusion direction by this transmitted vibration, so that the mixture between the solutions L1 and L2 or the chemical reaction accompanying the mixture is accelerated.

The vibration generator 3032 uses, for example, a piezoelectric element as a vibration generating source, and by supplying an alternate current to the piezoelectric element, the mechanical vibration corresponding to the current frequency is generated from the vibration part 3034. At this time, the vibration frequency generated from the vibration part 3034 is controlled within the range of 1 KHz to 10 MHz, that is, within the band of a high frequency and an ultrasonic wave. Specifically, mainly, when the solutions L1 and L2 flowing in the mixing flow passage 3026 are mixed or mixed and chemically reacted, the vibration frequency is suitably set in accordance with a desired mixture rate or chemical reaction rate of the solutions L1 and L2. At this time, when consideration is not given to the resonance effect in the mixer body 3012 in which the vibration is transmitted and in the solutions L1, L2 and LM, in general, as the vibration frequency becomes high, the vibration energy (kinetic energy) becomes high. Accordingly, the mixture of the solutions L1 and L2 in the mixing flow passage 3026 and the progress of the chemical reaction are accelerated.

As shown in FIG. 34A, the micromixer 3010 is provided with a drive control part 3036 for controlling the driving of the pair of vibration generators 3032. When the solutions L1, L2 and LM flow in the mixing flow passage 3026, this drive control part 3036 controls the on and off state of the vibration generators 3032, the duty ratio as a ratio of an on time to an off time, and the vibration frequency in accordance with a control condition previously set in an internal memory or the like. The control condition varies according to the kinds of the solutions L1 L2, that is, the chemical composition, liquid temperature, viscosity, etc. of the solutions L1 and L2, and the property of a reaction product in the case where the chemical reaction accompanies the mixture of the solutions L1 and L2. This control condition also varies according to the change of the supply amounts of the solutions L1 and L2, that is, the flow rates of the solutions L1 and L2 in the mixing flow passage 3026. Such a control condition is set, for example, through an operation terminal or the like operated by an operator of a production line in which the micromixer 3010 is disposed, or is automatically set by a host process computer for controlling the whole production line on the basis of a production schedule or the like.

In the micromixer 3010 constituted as stated above, the pressurized solutions L1 and L2 are supplied to the liquid supply passages 3016 and 3018 through the liquid supply pipes 3038 and 3039, so that these solutions L1 and L2 flow in the liquid supply passages 3016 and 3018, and are introduced as the liquid flows having predetermined flow rates into the mixing flow passage 3026 through the liquid supply ports 3022 and 3024. At this time, since the opening widths W1 and W2 of the liquid supply ports 3022 and 3024 are made as minute as 1 μm to 500 μm, the solutions L1 and L2 introduced into the mixing flow passage 3026 through the liquid supply ports 3022 and 3024 become lamella-like laminar flows having widths corresponding to the opening widths W1 and W2 and flow toward the side of the liquid outgoing port 3028, and at the contact interface of the respective laminar flows, the molecular diffusion occurs in the normal direction, and the mixture of the solutions L1 and L2 proceeds. At the same time, in the micromixer 3010, since the mechanical vibration from the pair of vibration generators 3032 is transmitted to the solutions L1, L2 and LM in the mixing flow passage 3026 in the diffusion direction, the movement of minute fluid bodies of the solutions L1 and L2 flowing in the mixing flow passage 3026 and the molecular movement in the diffusion direction can be increased by the transmitted vibration, and therefore, the movement rate of the molecule in the diffusion direction and in the vicinity of the contact interface between the laminar flows formed by the solutions L1 and L2 can be increased, and the mixture of the solutions L1 and L2 in the mixing flow passage 3026 and the chemical reaction accompanying the mixing can be efficiently accelerated.

Accordingly, according to the micromixer 3010 of this embodiment, the frequency and the like of the vibration transmitted to the solutions L1, L2 and LM by the vibration generator 3032 are suitably controlled in accordance with the kind, liquid temperature, viscosity and the like of the solutions L1 and L2 introduced into the mixing flow passage 3026, so that the mixing between the solutions L1 and L2 in the mixing flow passage 3026 and the progress of the chemical reaction accompanying the mixing can be precisely controlled. As a result, it becomes possible to control the mixing rate of the solutions L1 and L2 and the chemical reaction rate to desired rates, and especially in the case where the chemical reaction accompanies the mixing between the solutions L1 and L2, the mixing rate and the reaction rate are precisely controlled, or the vibration is transmitted also to the reaction product in the solutions L1, L2 and LM, so that it becomes also possible to control the properties such as the shape or size of the reaction product, and to control the acceleration and suppression of the coalescence or flocculation of the reaction product.

In the micromixer 3010, since the mixing and the chemical reaction between the solutions L1 and L2 in the mixing flow passage 3026 can be accelerated by the vibration from the vibration generator 3032, as compared with the case where the vibration generator 3032 does not exist, the passage length PF of the mixing flow passage 3026 necessary for uniformly mixing the solutions L1 and L2 or completing the chemical reaction accompanying the mixing can be shortened and the device can be miniaturized.

It is not necessary to always drive the vibration generator 3032 at the time of supply of the solutions L1 and L2 to the mixing flow passage 3026, and in the case where the chemical reaction between the solutions L1 and L2 is desired to be slowly performed, the driving of the vibration generator 3032 may be stopped. The mixer body 3012 is formed of stainless having high mechanical stability and less vibration damping, or metal material such as copper, titanium alloy, aluminum alloy, gold or platinum, and further, in view of the corrosion resistance, a contact part with the solutions L1, L2 and LM may be coated or plated with other material such as glass or ceramics. In the case where the mixer body 3012 can not be made sufficiently thin, or must be formed of a material having high vibration damping, an opening part is formed in the mixer body 3012 to face the mixing flow passage 3026, and the vibration generator 3032 may be disposed so that the oscillation part 3034 is inserted into the mixing flow passage 3026 from this opening part.

Next, a modified example of the micromixer of No. 1 of the tenth embodiment of the invention will be described. FIG. 35 shows a modified example of the micromixer of No. 1 of the tenth embodiment of the invention. In structure, a micromixer 3040 shown in FIG. 35 is different from the micromixer 3010 shown in FIG. 34 only in that three vibration generators 3042, 3044 and 3046 are attached to a mixer body 3012, and the number of vibration generators is increased, and the structures of the micromixers 3010 and 3040 in other points are made common. The structures themselves of the vibration generators 3042, 3044 and 3046 are also made common to the vibration generator 3032.

As described above, the vibration generators 3042, 3044 and 3046 are attached to the mixer body 3012 so as to adhere closely to each of the upper surface part and the lower surface part at the downstream side. These vibration generators 3042, 3044 and 3046 are adjacent to each other in the flow direction, the length in the flow direction is made approximately ⅓ of the mixing flow passage 3026, and the width in the interface direction is made substantially equal to the opening width of the mixing flow passage 3026. Here, the vibration generators are disposed such that the upstream end of the vibration generator 3042 disposed at the most upstream side coincides with the upstream end of the mixing flow passage 3026, and the downstream end of the vibration generator 3046 disposed at the most downstream side substantially coincides with the downstream end of the mixing flow passage 3026. Therefore, the upper and lower three vibration generators 3042, 3044 and 3046 correctly face the whole of the upper surface part and the whole of the lower surface part in the mixing flow passage 3026.

As shown in FIG. 35A, a drive control part 3048 for controlling the driving of the vibration generators 3042, 3044 and 3046 are provided in the micromixer 3040. When the solutions L1, L2 and LM flow in the mixing flow passage 3026, this drive control part 3048 controls the on and off state of the vibration generators 3042, 3044 and 3046, the duty ratio as a ratio of an on time to an off time, and the vibration frequency to comply with the control condition previously set in the internal memory or the like. At this time, the drive control part 3048 can control the vibration generators 3042, 3044 and 3046 located at different positions in the flow direction in accordance with different control conditions.

The control conditions set in the drive control part 3036, basically similar to the micromixer 3010 shown in FIG. 34, vary with the kinds of the solutions L1 and L2, that is, the chemical composition, liquid temperature, viscosity, etc. of the solutions L1 and L2, and the properties of a reaction product, etc. in the case where the chemical reaction accompanies the mixing of the solutions L1 and L2. In addition, the control conditions vary with the change of the supply amounts of the solutions L1 and L2, that is, the flow rates of the solutions L1 and L2 in the mixing flow passage 3026. Such control conditions are set, for example, through an operation terminal or the like operated by an operator of a production line in which the micromixer 3010 is disposed, or is automatically set by a host process computer for controlling the whole production line on the basis of a production schedule or the like.

In the micromixer 3040 constituted as set forth above, the pressurized solutions L1 and L2 are supplied to the liquid supply passages 3016 and 3018 through the liquid supply pipes 3038 and 3039, and similarly to the micromixer 3010 shown in FIG. 34, the solutions L1 and L2 introduced into the mixing flow passage 3026 through the liquid supply ports 3022 and 3024 become lamella-like laminar flows having widths corresponding to the opening widths W1 and W2, and flow toward the side of the liquid outgoing port 3028, and at the contact interface of the laminar flows, the movement of minute fluid bodies is accelerated in the normal direction, the molecular motion is increased, and the mixing of the solutions L1 and L2 proceeds, and at the same time, the mechanical vibration from the vibration generators 3042, 3044 and 3046 is transmitted to the solutions L1, L2 and LM in the mixing flow passage 3026 in the diffusion direction, whereby the movement rates of the molecules of the solutions L1 and L2 in the mixing flow passage 3026 are increased and the mixing and the chemical reaction accompanying the mixing can be efficiently accelerated.

Further, in the micromixer 3040, since the vibration generators 3042, 3044 and 3046 disposed at different positions in the flow direction can be driven under different control conditions, the vibration transmitted to the solutions L1 and L2 and the solution LM flowing in the mixing flow passage 3026 can be changed stepwise in the flow direction. As a result, since the mixing of the solutions L1 and L2 in the mixing flow passage 3026 or the chemical reaction accompanying the mixing can be accelerated under different vibration conditions correspondingly to the three vibration generators 3042, 3044 and 3046, as compared with the micromixer 3010 shown in FIG. 34, the mixing of the solutions L1 and L2 in the mixing flow passage 3026 and the progress of the chemical reaction accompanying the mixing can be precisely controlled.

Incidentally, at the time of supply of the solutions L1 and L2 to the mixing flow passage 3026, it is not necessary to simultaneously drive all of the three vibration generators 3042, 3044 and 3046, and one of the three vibration generators 3042, 3044 and 3046 may be selectively driven or its driving may be stopped. In the micromixers 3010 and 3040 of this embodiment, although the vibration generators 3032, 3042, 3044 and 3046 having the piezoelectric elements as the vibration generating sources are used, any vibration generating source may be used as long as a mechanical vibration of approximately 1 KHz to 10 MHz can be generated, and for example, an eccentric cam driven by a motor, an electromagnetic actuator, an air pressure actuator or the like may be used as a vibration generating source. In the micromixers 3010 and 3040 of this embodiment, in order to change the intensity (vibration energy) of the vibration transmitted to the solutions L1, L2 and LM in the mixing flow passage 3026, the frequency of the vibration generated by the vibration generators 3032, 3042, 3044 and 3046 is changed, however, the vibration energy may be changed by changing the amplitude of the vibration.

(No. 2 of the Tenth Embodiment)

FIG. 36 shows a micromixer of No. 2 of the tenth embodiment of the invention. This micromixer 3110, similar to the micromixers 3010 and 3040 of No. 1 of the tenth embodiment, is for simultaneously mixing two kinds of solutions L1 and L2 and for supplying a solution LM to the outside, in which these solutions L1 and L2 are uniformly mixed or the chemical reaction accompanying the mixing is completed.

As shown in FIG. 36, the micromixer 3110 is formed to be substantially cylindrical as a whole, and includes a cylindrical mixer body 3112 constituting an outer shell part of the device. A straight line S in the drawing indicates the axial center of the device, and a direction along this axial center is made an axial direction of the device in the following description. A base end part of the mixer body 3112 in the axial direction is made a large diameter part 3114 having a large diameter as compared with a portion at the tip end side, and a pair of first header part 3116 and second header part 3118 which receive the supply of the solutions L1 and L2 from the outside are provided in the large diameter part 3114. In the mixer body 3112, a portion at the tip end side with respect to the large diameter part is made a circular pipe part 3120 having a constant inner diameter, a liquid outgoing port 3122 of the solution LM is bored in the tip end surface of this circular pipe part 3120, and a ring-shaped flange part 3124 is provided at the tip end part of the circular pipe part 3120 so as to extend to the outer peripheral side of the liquid outgoing port 3122.

A liquid outgoing pipe (not shown) having a flange part paired with the flange part 3124 is coupled to the tip end part of the mixer body 3112, and the solution LM discharged from the liquid outgoing port 3122 of the mixer body 3112 is sent through the liquid outgoing pipe to a storage container for temporal storage or another micromixer for performing a next process to the solution LM. The flange part 3124 of the mixer body 3112 and the flange part of the liquid outgoing pipe can be coupled by various joint structures, such as a screw joint using a bolt and a nut, or a ferule joint in which a ring-shaped coupling member is fitted from the outer peripheral side of the pair of flange parts, or may be coupled by welding.

A base end surface of the large diameter part 3114 in the mixer body 3112 is closed by a disk-shaped cover plate 3126, and a circular insertion hole 3128 is bored in the center of this cover plate 3126. A round rod-shaped straightening member 3130 is coaxially disposed in the mixer body 3112 so as to protrude from the large diameter part 3114 into the circular pipe part 3120. A base end part of the straightening member 3130 is inserted into the insertion hole 3128 of the cover plate 3126 and is supported. A conical part 3132 shrinking in diameter toward the tip end side is formed at the tip end part of the straightening member 3130. The outer diameter of the straightening member 3130 is made smaller than the inner diameter of the circular pipe part 3120, and a size difference between the outer diameter and the inner diameter of this circular pipe part 3120 is set on the basis of the flow volumes of the solutions L1 and L2 in the circular pipe part 3120.

A disk-shaped partition plate 3134 for substantially dividing a space in the large diameter part 3114 into two equal parts in the axial direction is disposed in the large diameter part 3114 of the mixer body 3112, and a base end side space and a tip end side space divided by this partition plate 3134 are respectively made a first header part 3116 and a second header 3118. Liquid supply pipes 3136 and 3138 are connected to these header parts 3116 and 3118. The pressurized solution L1 and solution L2 are supplied to the header parts 3116 and 3118 through these liquid supply pipes 3136 and 3138 from two liquid supply sources (not shown) installed at the upstream side of the micromixer 3110. These liquid supply sources comprises, for example, other micromixers for producing the solutions L1 and L2, storage tanks for storing the solutions L1 and L2, pumps and the like.

A circular opening part having an opening diameter of an intermediate size between the inner diameter of the circular pipe part 3120 and the outer diameter of the straightening member 3130 is bored in the center of the partition plate 3134, and a pipe-shaped partition wall member 3140 protruding from the peripheral part of the opening part into the circular pipe part 3120 is integrally formed on the partition plate 3134. The partition wall member 3140 are disposed coaxially with the circular pipe part 3120 and the straightening member 3130, and divides the space between the circular pipe part 3120 and the straightening member 3130 into an inner peripheral side space and an outer peripheral side space. Here, the outer peripheral side and inner peripheral side spaced divided by the partition wall member 3140 are respectively made a first liquid supply passage 3142 and a second liquid supply passage 3144, and these first and second liquid supply passage 3142 and 3144 communicate with the first and second header parts 3116 and 3118 at the base end side. In the circular pipe part 3120 of the mixer body 3112, a space of a cylindrical shape made thick with respect to the liquid supply passages 3142 and 3144 is formed at the tip end side of the partition wall member 3140 and at the base end side of the conical part 3132 of the straightening member 3130, and this cylindrical space is made a mixing flow passage 3146 in which the mixing of the solution L1 and the solution L2 supplied from the liquid supply passages 3142 and 3144 or the mixing and the chemical reaction are performed.

In the mixer body 3112, plural (four in this embodiment) spacers 3148 are provided between the inner peripheral surface of the circular pipe part 3120 and the outer peripheral surface of the partition wall member 3140, and plural (four in this embodiment) spacers 3150 are provided between the inner peripheral surface of the partition wall member 3140 and the straightening member 3130. These plural spacers 3148 and 3150 are respectively formed into rectangular plate shapes, and are supported so that its front and back surface parts become parallel with the flow direction (direction of an arrow F) of the solutions L1 and L2 in the circular pipe part 3120. The plural spacers 3148 and 3150 are disposed at intervals of 90° in the peripheral direction with the axial center S as the center, and the positions in the peripheral direction are coincident with each other. Here, the spacer 3148 at the outer peripheral side couples the partition wall member 3140 to the circular pipe part 3120, and the spacer 3150 at the inner peripheral side couples the straightening member 3130 to the partition wall member 3140, and sets the opening widths W1 and W2 (see FIG. 36A) of the liquid supply passages 3142 and 3144 in the diameter direction. Therefore, the partition wall member 3140 and the straightening member 3130 are coupled and fixed to the circular pipe part 3120 at sufficient strength, so that the displacement from a predetermined position or deformation by the influence of liquid pressure of the solutions L1 and L2 or the gravity can be prevented, and the opening widths W1 and W2 can be certainly kept at previously set sizes.

As shown in FIG. 36B, a first liquid supply port 3152 and a second liquid supply port 3154 opened in the mixing flow passage are formed at the tip end parts of the first liquid supply passage 3142 and the second liquid supply passage 3144. These liquid supply ports 3152 and 3154 are bored along circular loci with the axial center S as the center and are disposed to be concentric to each other. Here, the opening width W1 of the first liquid supply port 3152 in the diameter direction is suitably set within the range of from 1 μm to 500 μm in accordance with the supply amount, kind, etc. of the solution L1 to the first header part 3116. In addition, the opening width W2 of the second liquid supply port 3154 in the diameter direction is also suitably set within the range of from 1 μm to 500 μm in accordance with the supply amount, kind, etc. of the solution L2 to the second header part 3118.

Here, the opening widths W1 and W2 define the opening areas of the liquid supply ports 3152 and 3154, and initial flow rates of the solutions L1 and L2 introduced into the mixing flow passage 3146 through the liquid supply ports 3152 and 3154 are determined in accordance with the opening areas of the liquid supply ports 3152 and 3154 and the supply amounts of the solutions L1 and L2. These opening widths W1 and W2 are set such that for example, the flow rates of the solutions L1 and L2 supplied into the mixing flow passage 3146 through the liquid supply ports 3152 and 3154 become equal to each other. However, in the case where consideration is given to the shortening of the time until the solutions L1 and L2 are uniformly mixed, naturally, it is advantageous to narrow the opening widths W1 and W2, and it is desired that the thickness of the partition wall member 3140 in the diameter direction is made as thin as possible.

A space at a tip end side relative to the mixing flow passage 3146 in the circular pipe part 3120 is made a liquid outgoing passage 3156 in which the solution LM, which is obtained after the solutions L1 and L2 are mixed or the mixing and the chemical reaction are performed in the mixing flow passage 3146, flows to the liquid outgoing port 3122. Here, in the case where the solution LM is produced only by the mixing of the solutions L1 and L2, it is necessary that the solutions L1 and L2 are substantially uniformly mixed at the exit part of the mixing flow passage 3146, and in the case where the solution LM is produced by the mixing of the solutions L1 and L2 and the chemical reaction, it is necessary that the solutions L1 and L2 are substantially uniformly mixed at the exit part of the mixing flow passage 3146 and the chemical reaction of the solutions L1 and L2 are also substantially perfectly completed. Accordingly, it is necessary that the passage length PF (see FIG. 36A) of the mixing flow passage 3146 in the flow direction of the solutions L1 and L2 is set so that the mixing of the solutions L1 and L2 is completed, or the mixing and the chemical reaction are substantially completed. Incidentally, it is assumed that the solutions L1 and L2 and the solution LM in which these are mixed are always closely filled in the mixer body 3112, and flow from the header parts 3116 and 3118 to the side of the liquid outgoing port 3122.

As shown in FIG. 36A, plural opening parts 3158 are provided in the circular pipe part 3120 of the mixer body 3112 so as to face the mixing flow passage 3146. These opening parts 3158 are provided at portions corresponding to an upstream part, an intermediate part and a downstream part of the mixing flow passage 3146 in the flow direction, and are disposed at intervals of 90° in the peripheral direction with the axial center S as the center. Accordingly, in the circular pipe part 3120, four opening parts 3158 are provided at each of places corresponding to the upstream part, the intermediate part and the downstream part of the mixing flow passage 3146, and twelve opening parts 3158 are provided in total. Plural microwave generators 3160 are attached on the outer peripheral surface of the circular pipe part 3120 to correspond to the opening parts 3158. A cylindrical protrusion insertion part 3162 is provided at the inner peripheral side of each of the microwave generators 3160, and in the microwave generator 3160, the insertion part 3162 is inserted into the opening part 3158, and the tip end surface of the insertion part 3162 is exposed in the mixing flow passage 3146.

The microwave generator 3160 irradiates the solutions L1, L2 and LM in the mixing flow passage 3146 with a microwave from the tip end surface of the insertion part 3162 at the time of driving. At this time, the microwave from the microwave generator 3160 is irradiated to the solutions L1 and L2 and the solution LM in the diameter direction coincident with the diffusion direction of the solutions L1 and L2 as indicated by a dotted line of FIG. 36. Since the molecular motion of the solutions L1, L2 and LM is increased in the diffusion direction by this microwave, the mixing of the solutions L1 and L2 or the chemical reaction accompanying the mixing is accelerated.

The microwave generator 3160 uses, for example, a magnetron as a generating source of the microwave, and by supplying a driving current to this magnetron, the microwave having intensity corresponding to the current value is generated. At this time, as the microwave generated by the microwave generator 3160, one having a frequency of 10 MHz or more is selected. Specifically, a frequency of the microwave is selected such that the molecular movement of the solutions L1, L2 and LM can be efficiently increased without causing an excessive heating phenomenon in the solutions L1, L2 and LM flowing in the mixing flow passage 3146.

As shown in FIG. 36A, a drive control part 3164 for controlling the drive of the microwave generator 3160 is provided in the micromixer 3110. When the solutions L1, L2 and LM flow in the mixing flow passage 3146, this drive control part 3164 controls the on/off state of the microwave generator 3160, and the intensity of the microwave to comply with a control condition previously set in an internal memory or the like. The control condition varies basically with the kinds of the solutions L1 and L2, that is, the chemical compositions, liquid temperature, viscosity, etc. of the solutions L1 and L2, and the property etc. of a reaction product in the case where the chemical reaction accompanies the mixing of the solutions L1 and L2. The control condition varies according to the change of the supply amounts of the solutions L1 and L2, that is, the flow rates of the solutions L1 and L2 in the mixing flow passage 3146. Such a control condition is set, for example, through an operation terminal etc. operated by an operator of a production line in which the micromixer 3110 is disposed, or is automatically set by a host computer for controlling the whole production line on the basis of a production schedule or the like. The drive control part 3164 can control the microwave generators 3160 located at different positions in the flow direction in accordance with different control conditions.

In the micromixer 3110 of this embodiment constituted as set forth above, similarly to the micromixer 3010 and 3040 of No. 1 of the tenth embodiment, the two kinds of solutions L1 and L2 introduced into the mixing flow passage 3146 through the liquid supply ports 3152 and 3154 become lamella-like laminar flows corresponding to the opening widths W1 and W2 of the liquid supply ports 3152 and 3154 and flow in the mixing flow passage 3146, and molecules of the solutions L1 and L2 diffuse mutually at the interface of the adjacent laminar flows, so that the two kinds of solutions L1 and L2 introduced into the mixing flow passage 3146 can be uniformly mixed in a short time, or the chemical reaction accompanying the mixing can be completed, and the obtained solution LM can be supplied to the outside. At this time, since the microwave from the microwave generator 3160 is irradiated to the solutions L1, L2 and LM in the mixing flow passage 3146, the diffusion rate of molecules of the solutions L1 and L2 in the mixing flow passage 3146 is increased and the mixing and the chemical reaction accompanying the mixing can be efficiently accelerated.

Further, in the micromixer 3110, since the microwave generators 3160 disposed at different positions in the flow direction can be driven under different control conditions, the microwave irradiated to the solutions L1 and L2 and the solution LM flowing in the mixing flow passage 3146 can be changed stepwise in the flow direction. As a result, since the mixing of the solutions L1 and L2 in the mixing flow passage 3146 or the chemical reaction accompanying the mixing can be accelerated under different vibration conditions correspondingly to the microwave generators 3160 located at different positions, the mixing of the solutions L1 and L2 in the mixing flow passage 3146 and the progress of the chemical reaction accompanying the mixing can be precisely controlled. At this time, since the microwave has high directionality as compared with the mechanical vibration, it is possible to suppress the solutions L1, L2 and LM existing in a region corresponding to the microwave generator 3160 located at a certain position in the flow direction from receiving the influence of the microwave from the microwave generator 3160 located at another position. As a result, as compared with the micromixers 3010 and 3040, the mixing of the solutions L1, L2 and LM in the mixing flow passage 3146 and the chemical reaction accompanying the mixing can be further precisely controlled.

Although the micromixers 3010, 3040 and 3110 of Nos. 1 and 2 of the tenth embodiment described above are for mixing or mixing and chemically reacting the two kinds of solutions L1 and L2 in the mixing flow passages 3026 and 3146, also in a micromixer for mixing or mixing and chemically reacting three or more kinds of solutions in the mixing flow passage, the mixing of the solutions and the chemical reaction can be accelerated by applying the mechanical vibration or microwave to the three or more kinds of solutions flowing in the mixing flow passage, and the mixing of the solutions or the progress of the chemical reaction in the mixing flow passage can be precisely controlled by suitably controlling the vibration generator or the microwave generator.

First, according to the invention, in a production method of silver halide photographic emulsion, at least one of a nucleus forming process, a nucleus growing process, a chemical sensitizing process, and a spectral sensitizing process are carried out by utilizing the process by using a microreactor. In this method, there is an effect that when viewed microscopically, the nucleus forming process for bonding a single silver ion and a single halogen ion in one-to-one correspondence is carried out by using a minute region of the microreactor, and a reaction for suitably forming desired nuclei can be accurately carried out. Alternatively, there is an effect that nuclei of silver halide newly supplied to grow grains (host grains) of nuclei of silver halide formed by the nucleus forming process are made to uniformly meet the grains (host grains) of the nuclei of silver halide to allow to react each other, conditions from the meeting of the grains (host grains) of the nuclei of silver halide and the nuclei of newly supplied silver halide at the same timing to the end of the reactions are made uniform, and the grains (host grains) of the nuclei of silver halide can be uniformly grown. Alternatively, there is an effect that each crystal lattice in the single nucleus of silver halide is accurately doped with a predetermined number (for example, one molecule for each crystal lattice) of molecules for chemical sensitization, and the sensitizing process is performed, so that it is possible to prevent a crystal lattice which is not doped with the molecule for chemical sensitization from being formed, to prevent a crystal lattice which is excessively doped with the molecule for chemical sensitization from being formed, and to prevent a molecule for chemical sensitization from being in excess, and it is possible to prevent the agent for chemical sensitization from wasting. Alternatively, there is an effect that the spectral sensitizing process is performed in which one layer of molecules of a spectral sensitizing agent is uniformly adsorbed on the surface of the single nucleus (grain) of silver halide, so that it is possible to prevent the generation of a nucleus (grain) of silver halide on which the molecule for spectral sensitization is not adsorbed, to prevent the generation of a nucleus (grain) of silver halide in an adsorption state in which molecules for spectral sensitization are excessive (multi-molecule adsorption state in which multi-layer molecules of the spectral sensitizing agent are adsorbed on the surface of the nucleus (grain) of silver halide), or to prevent the molecule for spectral sensitization from being in excess, and it is possible to prevent the agent for spectral sensitization from wasting.

As stated above, there is an effect that the silver halide photographic emulsion having a uniform emulsion property can be produced by the microreactor. Further, there is an effect that since the microreactor is used, a small production system can be easily scaled up to a mass production system, and the emulsion can be produced at an optimum production scale corresponding to a required production quantity.

Second, according to the invention, in a production method of a silver halide photographic emulsion, when at least one of a nucleus forming process, a nucleus growing process, a chemical sensitizing process, and a spectral sensitizing process is performed, a temperature control of a process liquid is carried out by using a microreactor including temperature control means of the process liquid.

Accordingly, in the case where the temperature control is executed by introducing the process liquid into the microreactor having the temperature control means for controlling the process liquids to perform heat transfer, since the thermal energy is transmitted in a state where the process liquids form thin layers and the quantity thereof is very small, a temperature changes rapidly to an objective set temperature. Thus, in the case where the temperature control is executed by the microreactor having the temperature control means for controlling the process liquids, since it can be said that the timing of temperature change does not deviate between infinitesimal liquid chemicals for producing an emulsion forming thin layers, there is an effect that it is possible to prevent occurrence of difference in the liquid chemicals for producing the emulsion to be produced due to the difference in the history of the temperature change. Further, in the case where the temperature control is executed by the microreactor having the temperature control means for controlling the temperature of the process liquid, the thermal energy is transferred to the infinitesimal liquid chemicals for producing an emulsion forming the thin layers and flowing in the inside of the microreactor having the temperature control means for controlling the temperature of the process liquid, and the temperature change of the liquid chemicals for producing the emulsion is completed. Thus, in the case where the temperature control is executed by the microreactor having the temperature control means for controlling the temperature of the process liquid, there is an effect that a waiting time from the start of the temperature change of the liquid chemicals for producing the emulsion to the completion is eliminated, and the whole process time can be greatly shortened. In addition, in the case where the temperature control is executed by the microreactor having the temperature control means for controlling he temperature of the process liquids, the rate of the temperature change of the liquid chemicals for producing the emulsion is high (good responsiveness to the temperature change), and there is no stagnancy and no recycling flow, so that there is an effect that the control operation of the temperature to the liquid chemicals for producing the emulsion can be precisely controlled, and the suitable silver halide photographic emulsion can be produced.

Since the microreactor is used, there is an effect that a small production system can be easily scaled up to a mass production system, and the emulsion production is enabled at an optimum production scale corresponding to a required production quantity.

Third, according to the invention, a production apparatus of silver halide photographic emulsion is constituted such that after process liquids processed by using plural microreactors for performing a nucleus forming process are collected, the process liquids are supplied to a next process through a liquid guiding pipe, and are distributed and supplied through the liquid guiding pipe to plural microreactors connected to the liquid guiding pipe, having processing capacity equivalent to all of the plural microreactors for performing the nucleus forming process, and for performing a nucleus growing process, and after process liquids processed by using the plural microreactors for performing the nucleus forming process are collected, the process liquids are supplied to a next process through a liquid guiding pipe, and the process liquids are distributed and supplied to plural microreactors to be subjected to a chemical sensitizing process or a spectral sensitizing process.

By doing this, when each of the nucleus forming process, the nucleus growing process, the chemical sensitizing process and the spectral sensitizing process is ended and started, the collection and distribution of the process liquids is repeated, so that the liquid chemicals for producing the emulsion processed in the respective microreactors are mutually mixed and made uniform at end points of respective processes, and accordingly, there is an effect that the quality and performance of the finally produced silver halide photographic emulsion can be made uniform.

Further, the production apparatus of the silver halide photographic emulsion constituted in this series of lines, the number of the predetermined plural microreactors installed in each process is suitably set in accordance with the processing capacity or the like, so that there is an effect that the flow rate of the liquid chemicals for producing the emulsion between the respective processes becomes constant, and the whole production system can be constituted such that the process liquid does not stagnate and the process can be efficiently performed.

Furthermore, there is an effect that the silver halide photographic emulsion having uniform emulsion characteristics can be produced by the microreactors.

Fourth, according to the invention, in a production apparatus of a silver halide photographic emulsion, process liquids sent to a subsequent process for effecting the subsequent process, from plural microreactors for performing at least one process in plural microreactors for performing a nucleus forming process, plural microreactors for performing a nucleus growing process, plural microreactors for performing a chemical sensitizing process, and plural microreactors for performing a spectral sensitizing process, are collected and are temporarily stored in a storage tank, and the process liquids are distributed and supplied from the storage tank to plural microreactors for effecting the subsequent process.

By doing this, there is an effect that it is possible to proceed with the operation in such a way that the process liquids are temporarily stored in the storage tank at the point of time when the nucleus forming process, the nucleus growing process, the chemical sensitizing process, or the spectral sensitizing process in the production process of the silver halide photographic emulsion is performed, and a subsequent process is performed at a suitable point of time thereafter. In addition, since the process liquids processed by the plural microreactors provided in parallel are respectively collected in the storage tank, are blended and can be used, there is an effect that the process liquids, which are collected in the storage tank, are mixed, and have the same characteristics, are distributed and supplied to the plural microreactors provided in parallel, and the uniform silver halide photographic emulsion can be produced.

Furthermore, since the microreactors are used, there is an effect that a small production system can be easily scaled up to a mass production system, and the emulsion can be produced at an optimum production scale corresponding to a required production quantity.

What is claimed is:

1. A production apparatus of silver halide photographic emulsion, which performs a nucleus forming process, a nucleus growing process, a chemical sensitizing process or a spectral sensitizing process, comprising:
   a first liquid guiding pipe that collects process liquids processed by using plural microreactors for performing the nucleus forming process, and thereafter feeds the liquids to a next process;
   a second liquid guiding pipe which is connected to the first liquid guiding pipe for distributing and supplying the process liquids to plural microreactors which has a processing capacity equivalent to all of the processing capacities of the plural microreactors for performing the nucleus forming process for performing the nucleus growing process;
   a third liquid guiding pipe which collects the process liquids processed by using the plural microreactors for performing the nucleus growing process, and thereafter feeds the process liquids to a next process; and
   a fourth liquid guiding pipe for distributing and supplying the process liquids for the chemical sensitizing process or the spectral sensitizing process to plural microreactors.

2. A production apparatus of silver halide photographic emulsion according to claim 1, wherein the nucleus forming process is performed by bringing an aqueous halide solution into contact with a silver nitrate solution in a state of at least one laminar flow to form silver halide grain nuclei.

3. A production apparatus of silver halide photographic emulsion according to claim 1, wherein the nucleus forming process, the nucleus growing process, the chemical sensitizing process, or the spectral sensitizing process is performed in the presence of gelatin or chemically modified gelatin.

4. A production apparatus of silver halide photographic emulsion according to claim 3, wherein a surface of a process liquid flow passage in the microreactor is formed of a material selected from the group consisting of nickel, aluminum, silver, gold, platinum, tantalum, stainless, hastelloy, titanium, fine ceramics, special ceramics, and plastic.

5. A production apparatus of silver halide photographic emulsion, which performs a nucleus forming process by using plural microreactors, performs a nucleus growing process by using plural microreactors, and performs a chemical sensitizing process or a spectral sensitizing process by using plural microreactors, wherein
   process liquids which have been forwarded to a next process from the plural microreactors for performing at least one process of the plural microreactors for carrying out the nucleus forming process, the plural microreactors for carrying out the nucleus growing process, the plural microreactors for carrying out the chemical sensitizing process, and the plural microreactors for carrying out the spectral sensitizing process are collected and are temporarily stored in a storage tank, and the process liquids are distributed and supplied to the plural microreactors from the storage tank for performing the next process.

6. A production apparatus of silver halide photographic emulsion according to claim 5, wherein the nucleus forming process is performed by bringing an aqueous halide solution into contact with silver nitrate solution in a state of at least one laminar flow to form silver halide grain nuclei.

7. A production apparatus of silver halide photographic emulsion according to claim 6, wherein the nucleus forming process, the nucleus growing process, the chemical sensitizing process, or the spectral sensitizing process is performed in the presence of gelatin or chemically modified gelatin.

8. A production apparatus of silver halide photographic emulsion according to claim 7, wherein a surface of a process liquid flow passage in the microreactor is formed of a material selected from the group consisting of nickel, aluminum, silver, gold, platinum, tantalum, stainless, hastelloy, titanium, fine ceramics, special ceramics, and plastic.

* * * * *